US008089850B2

(12) United States Patent
Tanaka et al.

(10) Patent No.: US 8,089,850 B2
(45) Date of Patent: Jan. 3, 2012

(54) OPTICAL PICKUP, OPTICAL DISC APPARATUS, INTEGRATED COUPLING LENS, INTEGRATED PRISM, AND OPTICAL INFORMATION EQUIPMENT

(75) Inventors: Toshiyasu Tanaka, Osaka (JP); Fumitomo Yamasaki, Nara (JP); Yoshiaki Komma, Osaka (JP); Kanji Wakabayashi, Kyoto (JP)

(73) Assignee: Panasonic Corporation, Osaka (JP)

( * ) Notice: Subject to any disclaimer, the term of this patent is extended or adjusted under 35 U.S.C. 154(b) by 1039 days.

(21) Appl. No.: 11/966,211

(22) Filed: Dec. 28, 2007

(65) Prior Publication Data
US 2008/0175129 A1 Jul. 24, 2008

Related U.S. Application Data

(60) Provisional application No. 60/877,605, filed on Dec. 29, 2006, provisional application No. 60/877,616, filed on Dec. 29, 2006.

(51) Int. Cl.
*G11B 7/135* (2006.01)
(52) U.S. Cl. .............................. 369/112.24; 369/112.22
(58) Field of Classification Search ............. 369/112.24, 369/112.22
See application file for complete search history.

(56) References Cited

U.S. PATENT DOCUMENTS

| 5,892,749 | A | 4/1999 | Yamanaka | |
| 7,668,066 | B2* | 2/2010 | Atarashi et al. | 369/112.24 |
| 7,801,011 | B2* | 9/2010 | Nagatomi et al. | 369/112.23 |
| 7,898,922 | B2* | 3/2011 | Yoo et al. | 369/100 |
| 2005/0249099 | A1* | 11/2005 | Komma | 369/112.08 |
| 2006/0002247 | A1 | 1/2006 | Kim et al. | |
| 2006/0136951 | A1 | 6/2006 | Nakao et al. | |
| 2007/0008858 | A1* | 1/2007 | Yukawa | 369/112.16 |

FOREIGN PATENT DOCUMENTS

| JP | 9-212905 | 8/1997 |
| JP | 11-120606 | 4/1999 |
| JP | 2001-344803 | 12/2001 |
| JP | 2004-295983 | 10/2004 |
| JP | 2006-24351 | 1/2006 |
| JP | 2006-147075 | 6/2006 |
| JP | 2007-4875 | 1/2007 |

(Continued)

OTHER PUBLICATIONS

International Preliminary Report on Patentability (in English language) issued Jul. 7, 2009 in International Application No. PCT/JP2007/075097.

(Continued)

*Primary Examiner* — Wayne Young
*Assistant Examiner* — Dionne Pendleton
(74) *Attorney, Agent, or Firm* — Wenderoth, Lind & Ponack, L.L.P.

(57) ABSTRACT

An optical pickup is provided for directing a blue-violet laser beam to access a first information recording medium covered with a first transparent substrate or a second information recording medium covered with a second transparent substrate, which includes a light path switching unit disposed either between a light source and a coupling lens or between the coupling lens and an objective lens for switching the blue-violet laser beam between a first light path and a second light path. The coupling lens is arranged to convert the laser beam reflected on the first or second information recording medium to a converged light. The converged light of the laser beam is then received by a photo detector.

2 Claims, 71 Drawing Sheets

FOREIGN PATENT DOCUMENTS

| | | |
|---|---|---|
| JP | 2007-87493 | 4/2007 |
| JP | 2008-10130 | 1/2008 |
| WO | 2006/112153 | 10/2006 |
| WO | 2006/112249 | 10/2006 |
| WO | 2007/055167 | 5/2007 |
| WO | 2007/114047 | 10/2007 |

OTHER PUBLICATIONS

Kousei Sano et al., "*Novel One-Beam Tracking Detection Method for Dual-Layer Blu-Ray Discs*", Japaneses Journal of Applies Physics, vol. 45, No. 2B, 2006, pp. 1174-1177.

J.J.H.B. Schleipen, "*A Bit Engine for Digital Video Recording (DVR) on a 12 CM Disc With 22 Gbytes User Capacity and 50 MBIT/S Data Rate*", Optical Data Storage 2000, Douglas G. Stinson, Ryuichi Katayama, Editors, Proceedings of SPIE, vol. 4090 (2000).

Toshiyasu Tanaka et al., "*Optical Pickup for Recording to Dual-Layer 2X-Speed Blu-Ray Disc, DVD and Compact Disc*", Optical Data Storage 2006, edited by Ryuichi Katayama, Tuviah E. Schlesinger, Proc. of SPIE, vol. 6282, 62822C, (2006).

Kousei Sano et al., "*Optical Pickup for Recording to Dual-Layer High Speed Blu-Ray Disc*", Technical Digest of Optical Data Storage (ODS) Topical Meeting and Tabletop Exhibit, Optical Society of America (OSA).

Fumitomo Yamasaki et al., "*Radical Tilt Detection Using Push-Pull Signals*", Japanese Journal of Applied Physics, vol. 45, No. 2B, 2006, pp. 1158-1161.

\* cited by examiner

GATE

OPTICAL PICKUP, OPTICAL DISC APPARATUS, INTEGRATED COUPLING LENS, INTEGRATED PRISM, AND OPTICAL INFORMATION EQUIPMENT

This application claims the benefit of U.S. Provisional Application No. 60/877,605, filed Dec. 29, 2006 and U.S. Provisional Application No. 60/877,616, filed Dec. 29, 2006.

BACKGROUND OF THE INVENTION

1. Field of the Invention

The present invention relates to an optical pickup for performing at least the action of either optically recording or reproducing the data on different types of information recording mediums such as optical discs and the like, an optical disc apparatus equipped with the optical pickup, an optical information equipment equipped with the optical disc apparatus, and an integrated coupling lens and an integrated prism installed in the optical pickup.

2. Description of the Related Art

As blue-violet semiconductor laser diodes have been introduced for practical use, Blu-ray Discs (referred to as BDs hereinafter) of high-density, mass-storage optical information recording mediums (referred to as optical disc hereinafter) are now put to practical use which are identical in the size to CDs (compact discs) and DVDs (digital versatile discs). The BDs are optical discs on which data are recorded or played back with the use of a blue-violet laser source which emits a blue-violet laser beam. Also, HD-DVDs are put to practical use on the basis of a blue-violet laser source. The expression "either recording or playing back" in this specification means that at least either the recording action or the playback action is to be performed.

The CDs are optical discs in which the thickness of their transparent substrate from the optical disc surface to the information recording surface is 1.2 mm, the wavelength of laser beam for performing either the recording or playback is substantially 780 nm, the numerical aperture NA of their objective lens ranges from 0.45 to 0.55, and their recording capacity is substantially 650 MBytes.

It is required for performing either the recording action or the playback action at higher densities on the optical discs to minimize the diameter of the spot of the laser beam focused by the objective lens. To minimize the diameter of the spot of the laser beam, the wavelength $\lambda$ has to be shortened while the numerical aperture NA of the objective lens is increased.

However, when the numerical aperture NA of the objective lens is increased, in proportion to the cube of the NA, the comatic aberration derived from tilting of the transparent substrate becomes large. As the comatic aberration is proportional to the thickness of the transparent substrate, it can be suppressed by thinning the transparent substrate.

The DVDs are optical discs in which the thickness of their transparent substrate is 0.6 mm, the wavelength of laser beam for performing either the recording or playback action is substantially 650 nm, the numerical aperture NA of their objective lens ranges from 0.60 to 0.65, and their recording capacity at one layer is substantially 4.7 GBytes. The DVD is made of two 0.6 mm thick discs bonded to each other and its total thickness is thus 1.2 mm as equal to that of a CD.

The BDs are optical discs in which the thickness of their transparent substrate is about 0.1 mm, the wavelength of laser beam for performing either the recording or playback action is substantially 405 nm, the numerical aperture NA of their objective lens is 0.85, and their recording capacity at one layer is substantially 25 GBytes. The BD has a recording layer provided on a disc base material of 1.1 mm thick and protected with a transparent cover layer of 0.1 mm thick (the transparent substrate) and its total thickness is thus 1.2 mm as equal to that of a CD. Either the recording action or the playback action on the recording layer is performed with a laser beam converged from the transparent cover layer to the recording layer. An increase of the comatic aberration produced by a combination of the laser beam at shorter wavelengths and the objective lens at higher NA is suppressed by thinning the transparent cover layer through which the laser beam passes to substantially 0.1 mm.

The HD-DVDs are optical discs in which the wavelength of laser beam for performing either the recording or playback action is substantially 405 nm, the numerical aperture NA of their objective lens is 0.65, and their recording capacity at one layer is substantially 15 GBytes. The HD-DVD like the DVD is made of two 0.6 mm thick discs bonded to each other and its total thickness is 1.2 mm as equal to that of a CD.

As explained, there are available such different types, CD, DVD, BD, and HD-DVD, of the optical discs. Accordingly, some optical pickups of compatible type have been proposed for performing either the recording action or the playback action with the use of three different wavelengths of the laser beams focused by a plurality of objective lenses to scan the different types of the optical discs.

For example, disclosed in Japanese Patent Laid-open Publication No. 2006-147075, is an optical pickup arranged compatible with four different types, CD, DVD, BD, and HD-DVD, of the optical discs by switching the combination of two objective lenses and light sources.

In an optical pickup 150 illustrated in FIG. 69 is an optical disc 101 of four different standards of optical discs, BD 101a, HD-DVD 101b, DVD 101c, and CD 101d.

A blue-violet laser beam with an oval shape of intensity distribution emitted from the light source 102 is converted into a beam substantially a circular shape of the intensity distribution by a beam shaping part 103. The laser beam released from the beam shaping part 103 is then directed to a diffraction grating 104 where diffracted light components are produced for controlling the tracking action with a differential push pull (DPP) technique, passed through a polarizing beam splitter 105, and converted into a collimated light beam by a collimator lens 106. Then part of the laser beam released from the beam shaping part 103 is entered into a monitor optical detector 108 by a dichroic mirror 107.

The laser beam passed through the dichroic mirror 107 is passed through a spherical aberration compensating system 109. The spherical aberration compensating system 109 has a function of compensating the spherical aberration caused by a variation in the thickness of the transparent substrate of the optical disc of particularly the BD standard. The laser beam released from the spherical aberration compensating system 109 is bent to substantially 90 degrees in the optical axis by a riser mirror 110 and then passed through a ¼ waveplate 111a or 111b. The laser beam passed through the ¼ waveplate 111a is focused by an objective lens 112a to form its spot on the information recording surface of a BD 101a. The laser beam passed through the ¼ waveplate 111b is focused by an objective lens 112b to form its spot on the information recording surface of an HD-DVD 101b.

For ease of the description, the optical axis shown in FIG. 69 is turned through 90 degrees in relation to the paper surface between the spherical aberration compensating system 109 and the riser mirror 110.

The ¼ waveplates 111a, 111b and the objective lenses 112a, 112b are mounted on and driven together by an actuator 114 in order to follow surface undulations and data track eccentricities of any of the optical discs 101a to 101d. Also, the objective lenses 112a and 112b disposed on the actuator 114 for performing either the recording action or the playback action can be switched from one to the other by turning an objective lenses mount about its optical axis for scanning the BD 101a or the HD-DVD 101b.

The laser beam reflected by the BD 101a or the HD-DVD 101b is passed back through the objective lens 112a or 112b and received by the ¼ waveplate 111a or 111b where it is shifted to a linearly polarized light which is different from that at the advancing path. The laser beam is further passed through the riser mirror 110, the spherical aberration compensating system 109, the dichroic mirror 107, and the collimator lens 106 before reflected by the polarizing beam splitter 105. The laser beam reflected by the polarizing beam splitter 105 is projected on an optical detector 116 by a detecting part 115. The optical detector 116 is provided for detecting the focusing error signal, the tracking error signal, and the data signals recorded on the BD 101a or the HD-DVD 101b.

The recording action and the playback action on the DVD 101c will now be described. A red laser beam emitted from a light source 117 is passed through a diffraction grating 118, reflected by a dichroic beam splitter 119 and a polarizing mirror 120, and converted into a collimated light beam by a collimator lens 121. The laser beam released from the collimator lens 121 is passed through a dichroic mirror 107 and then is partially received by a monitor optical detector 108.

The laser beam reflected by the dichroic mirror 107 is further passed through the spherical aberration compensating system 109, the riser mirror 110, and the ¼ waveplate 111a and focused by the objective lens 112a to form its spot on the DVD 101c.

The reflection of the laser beam from the DVD 101c is passed back through the objective lens 112a and received by the ¼ waveplate 111a where it is shifted to a linearly polarized mode which is different from that at the advancing path. The laser beam at its polarized mode is passed through the riser mirror 110, the spherical aberration compensating system 109, the dichroic mirror 107, and the collimator lens 121 before received by the polarizing mirror 120. The laser beam passed through the polarizing mirror 120 is projected on an optical detector 123 by a detector lens 122. The optical detector 123 is provided for detecting the focusing error signal, the tracking error signal, and the data signals recorded on the DVD 101c.

The recording action and the playback action on the CD 101d will now be described. An infrared laser beam emitted from a light source 124 is passed through a diffraction grating 125 and the dichroic beam splitter 119, reflected by the polarizing mirror 120, and converted into a collimated light beam by the collimator lens 121. The laser beam released from the collimator lens 121 is passed through the dichroic mirror 107 and then partially received by the monitor optical detector 108.

The laser beam reflected by the dichroic mirror 107 is further passed through the spherical aberration compensating system 109, the riser mirror 110, and the ¼ waveplate 111b and focused by the objective lens 112b to form its spot on the CD 101d.

The laser beam reflected on the CD 101d is passed back through the objective lens 112b and received by the ¼ waveplate 111b where it is shifted to a linearly polarized mode which is different from that at the advancing path. The laser beam at its polarized mode is passed through the riser mirror 110, the spherical aberration compensating system 109, the dichroic mirror 107, and the collimator lens 121 before received by the polarizing mirror 120.

The laser beam passed through the polarizing mirror 120 is projected on the optical detector 123 by the detector lens 122. The optical detector 123 is provided for detecting the focusing error signal, the tracking error signal, and the data signals recorded on the CD 101d.

The first objective lens 112a is of a compatible type for use with both the BD 101a and the DVD 101c. For performing the recording action or the playback action on the BD 101a, the light source 102 is activated for emitting a blue-violet laser beam through transmission across its transparent substrate of about 0.1 mm thick and convergence at the numerical aperture NA of 0.85. For performing the recording action or the playback action on the DVD 101c, the light source 117 is activated for emitting a red laser beam through transmission across its transparent substrate of about 0.6 mm thick and convergence at the numerical aperture NA of 0.6 to 0.65.

The second objective lens 112b is of a compatible type for use with both the HD-DVD 101b and the CD 101d. For performing the recording action or the playback action on the HD-DVD 101b, the light source 102 is activated for emitting a blue-violet laser beam through transmission across its transparent substrate of about 0.6 mm thick and convergence at the numerical aperture NA of 0.65. For performing the recording action or the playback action on the CD 101d, the light source 124 is activated for emitting an infrared laser beam through transmission across its transparent substrate of about 1.2 mm thick and convergence at the numerical aperture NA of 0.45 to 0.55.

As described, the conventional optical pickup 150 of the compatible type where the objective lenses are switched from one to the other is capable of performing either the recording action or the playback action on any of the four different types, CD, DVD, BD, and HD-DVD, of the optical discs.

Further, other apparatuses arranged compatible with different types of the optical disc by optically switching the optical path of laser beam emitted from a single light source are disclosed in Japanese Patent Laid-open Publication No. 2001-344803 and Japanese Patent Laid-open Publication No. 11-120606. For example, disclosed in Japanese Patent Laid-open Publication No. 2001-344803 is an optical pickup for selectively switching the optical path of laser beam with the use of a polarization converter and a polarizing beam splitter.

An optical pickup 250 is illustrated in FIG. 70 where a blue-violet laser beam emitted from a first light source 201 is converted into a collimated light beam by a collimator lens 202. The collimated laser beam is passed through a polarization converter 203. When the laser beam emitted from the light source 201 is of polarized laser beam A (of which the direction of polarization extends upwardly and downwardly in the drawing), it directly passes through the polarization converter 203 which remains not in action. The polarized laser beam A of the laser beam is then passed through a dichroic mirror 205 and received by a polarizing beam splitter 213. The polarized laser beam A of the laser beam passed through the polarizing beam splitter 213 is converted into a circularly polarized laser beam By a ¼ waveplate 212 and then focused by a first objective lens 211 to form its spot on the information recording surface of an optical disc corresponding to the first optical lens 211.

The laser beam is reflected by the information recording surface, passed through the first objective lens 211, and converted into a polarized laser beam B by the ¼ waveplate 212. The polarized laser beam B is reflected by the polarizing beam splitter 213 and projected on an optical detector 215 by a detecting part 214.

The polarization converter 203 in the optical pickup 250 plays an important role. The polarization converter 203 may be implemented by a liquid crystal device or a transparent piezoelectric device. An example is shown in FIG. 71 where the polarization converter 203 is implemented by a liquid crystal device which lines up in a direction denoted by OD with respect to the optical axis. With its electrodes 208, shown in FIG. 71, loaded with a voltage, the polarization converter 203 converts the laser beam from the polarized laser beam A to a polarized laser beam B. With its electrodes 208 remaining loaded with no voltage, the polarization converter 203 passes the polarized laser beam A without changing the direction of polarization. When the polarization converter 203 is in action, it converts the laser beam to the polarized laser beam B (of which the direction of polarization extends vertical to the paper surface in the drawing) which is turned through 90 degrees in the direction of polarization from the incident beam. This allows the laser beam to be reflected by the polarizing beam splitter 213, converted into a circularly polarized laser beam By the ¼ waveplate 210, and focused by a second objective lens 209 to form its spot on the information recording surface of an optical disc corresponding to the second objective lens 209.

The laser beam reflected on the information recording surface of the optical disc is passed through the second objective lens 209, and converted back to the polarized laser beam A by the ¼ waveform plate 210. The polarized laser beam A is then passed through the polarizing beam splitter 213 and projected on the optical detector 215 by the detecting part 214.

As described, the laser beam at the polarized laser beam A is converted by the polarization converter 203 into the polarized laser beam B of which the direction of polarization extends at a right angle to that of the polarized laser beam A. By switching its light path with the polarizing beam splitter 213 and selecting the objective lens to be used, the laser beam can be operable with two different types, BD and HD-DVD for example, of the optical discs which are identical in the light source wavelength.

Also, a red laser beam emitted from a second light source 207 for performing either the recording action or the playback action on the DVD is of polarized laser beam B. The red laser beam emitted from the light source 207 is converted into a collimated light beam by a collimator lens 206. The collimated laser beam is reflected by the dichroic mirror 205 and the polarizing beam splitter 213, passed through the ¼ waveplate 210, and focused by the second objective lens 209 to form its spot on the information recording surface of the DVD.

The laser beam reflected on the information recording surface of the DVD is passed again through the second objective lens 209, converted into the polarized laser beam A by the ¼ waveplate 210, passed through the polarizing beam splitter 213, and projected on the optical detector 215 by the detecting part 214.

As described, the conventional optical pickup 250 is capable of performing either the recording action or the playback action on different types of the optical disc.

SUMMARY OF THE INVENTION

However, according to the conventional constructions, for example, the optical pickup 150 disclosed in Japanese Patent Laid-open Publication No. 2006-147075 employs an axis rotating type of the actuator 114. Such axis rotating type of the actuator 114 is hardly tilted in relation to the optical system, hence failing to compensate the comatic aberration caused by a difference between the optical discs or a deflection of the optical disc which results from an abrupt change in the temperature.

The JP-'075 also describes the arrangement of an actuator for sliding and switching the objective lens along the circumferential direction of an optical disc by the action of a feed motor and a gear mechanism or a piezoelectric device or the like. The arrangement permits the actuator of a so-called wire suspension type to be employed thus to compensate the comatic aberration. However, the problem arises that the mechanism for sliding the actuator at high accuracy may be too intricate to simplify the structure of an optical pickup.

Japanese Patent Laid-open Publication No. 2001-344803 discloses the optical pickup which is favorably compatible with conventional DVDs and CDs. It is however necessary for performing either the recording action or the playback action on an optical disc of the advanced BD standard to prepare a particular arrangement for compensating the comatic aberration derived from variations of the thickness of the transparent substrate in different production lots or for the two or more recording layers of the optical disc. One of such particular arrangements is known, for example, where the collimator lens is moved along the optical axis of a laser beam until the laser beam entering into the objective lens shifts to a diverged or converged light thus to form a degree of spherical aberration at the opposite polarity in the objective lens which is then used for eliminating the intrinsic spherical aberration.

However, the optical pickup 250 disclosed in the JP-'803 allows the collimator lens 202, which is arranged movable along the optical axis, to be disposed across only the advancing path, whereby the movement along the optical axis of the laser beam of the collimator lens 202 for compensating the spherical aberration will cause the optical system at the returning path to receive the diverged or converged light of the laser beam thus producing a defocusing effect and a spherical aberration on the optical detector 215. This results in an offset in the focusing error signal, hence declining the performance during the recording action or the playback action on the optical disc. The arrangement disclosed in the JP-'803 provides no measure to overcome the above problem.

It is hence an object of the present invention to provide an optical pickup arranged for optically switching the light path of a laser beam with no switching action of objective lenses in order to have a compatible characteristic for recording and playing back different types, such as CD, DVD, BD, and HD-DVD, of the optical disc through focusing three different types of the laser beam by two objective lenses and simultaneously for suppressing declination of the performance during the recording action or the playback action on the optical disc.

According to a first aspect of the present invention, an optical pickup comprising: a first light source configured to emit a first laser beam at a wavelength λ1; a light path switching unit configured to switch the first laser beam emitted from the first light source between a first light path and a second light path; a first coupling lens disposed across the first light path configured to convert the first laser beam to substantially a collimated light beam; a first objective lens disposed across the first light path configured to focus the first laser beam passed through the first coupling lens on a first information recording medium which has a first transparent substrate thickness; a second coupling lens disposed across the second light path configured to convert the first laser beam to substantially a collimated light beam; and a second objective lens disposed across the second light path configured to focus the first laser beam passed through the second coupling lens on a second information recording medium which has a second transparent substrate thickness different from the first transparent substrate thickness and is different in the type from the first information recording medium, the light path switching unit being arranged to switch the light path of the first laser beam through selectively transmitting and reflecting the first laser beam emitted from the first light source, the first coupling lens being configured to convert the reflection of the first laser beam or a first reflected laser beam from the first information recording medium into a converged light; and the second coupling lens being configured to convert the reflection of the first laser beam or a second reflected laser beam from the second information recording medium into a converged light.

The light path switching unit may be structured to have a polarization converting element configured to convert the first laser beam emitted from the first light source into a first polarized light or a second polarized light which is different from the first polarized light, and an optical surface configured to transmit or reflect the first laser beam in response to the polarized mode of the first laser beam passed through the polarization converting element.

Also, the optical pickup may further be structured to include: a photo detector configured to receive the first reflected laser beam and the second reflected laser beam, wherein the optical surface of the light path switching unit is configured to receive the first reflected laser beam and the second reflected laser beam at their converged light and then guide the received first reflected laser beam and the second reflected laser beam to the photo detector.

The polarization direction of a light at the first light path between the light path switching unit and the first coupling lens and the polarization direction of a light at the second light path between the light path switching unit and the second coupling lens may be arranged to be orthogonal to each other.

According to the first aspect of the present invention, the optical pickup may further be structured to include: a photo detector configured to receive the first reflected laser beam and the second reflected laser beam; a first waveplate disposed across the first light path; and a second waveplate disposed across the second light path, wherein the light path switching unit has a polarization converting element configured to convert the first laser beam emitted from the first light source into a first polarized light or a second polarized light which is different from the first polarized light, and an optical surface has a polarized light splitting function configured to allow a P polarized light of the first laser beam passed through the polarization converting element to transmit and direct to the first light path while allow an S polarized light of the first laser beam passed through the polarization converting element to reflect and direct to the second light path, whereby the P polarized light of the first laser beam passed through the optical surface is passed along the first light path through the first waveplate and focused by the first objective lens on the first information recording medium, and the first reflected laser beam reflected from the first information recording medium is converted by the first waveplate into the S polarized light which is orthogonal to the P polarized light and received by the light path switching unit; while the first reflected laser beam reflected from the optical surface is received by the photo detector, and the S polarized light of the first laser beam reflected from the optical surface is passed along the second light path through the second waveplate and focused by the second objective lens on the second information recording medium, and the second reflected laser beam reflected from the second information recording medium is converted by the second waveplate into the P polarized light and received by the light path switching unit; while the second reflected laser beam passed through the optical surface is received by the photo detector.

The optical pickup may further be structured to include: a second light source configured to emit a second laser beam at a wavelength λ2 which is different from the wavelength λ1, wherein the second laser beam emitted from the second light source is focused by the second coupling lens and the second objective lens on a third information recording medium which is different from the first and second information recording mediums.

The optical pickup may further be structured to include: a photo detector configured to receive the first reflected laser beam, the second reflected laser beam, and a third reflected laser beam formed by the reflection of the second laser beam on the third information recording medium, wherein the second coupling lens is configured to convert the third reflected laser beam into a converged light, the light path switching unit is configured to receive the converged lights of the first reflected laser beam, the second reflected laser beam, and the third reflected laser beam and then direct the converged lights of the first reflected laser beam, the second reflected laser beam, and the third reflected laser beam to the photo detector.

The optical pickup may further be structured to include: a photo detector for receiving the first reflected laser beam, the second reflected laser beam, and a third reflected laser beam formed by the reflection of the second laser beam on the third information recording medium; a first waveplate disposed across the first light path; and a second waveplate disposed across the second light path, wherein the light path switching unit has a polarization converting element configured to convert the first laser beam emitted from the first light source into a first polarized light or a second polarized light which is different from the first polarized light, and an optical surface has a wavelength dependent polarized light splitting function configured to allow a P polarized light of the first laser beam passed through the polarization converting element to transmit and direct to the first light path, allow an S polarized light of the first laser beam passed through the polarization converting element to reflect and direct to the second light path, and allow the second laser beam at the wavelength λ2 to transmit, whereby the P polarized light of the first laser beam passed through the optical surface is passed along the first light path through the first waveplate and focused by the first objective lens on the first information recording medium, and the first reflected laser beam from the first information recording medium is converted by the first waveplate into the S polarized light which is orthogonal to the P polarized light and received by the light path switching unit; while the first reflected laser beam reflected from the optical surface is received by the photo detector, the S polarized light of the first laser beam reflected from the optical surface is passed along the second light path through the second waveplate and focused by the second objective lens on the second information recording medium, and the second reflected laser beam from the second information recording medium is converted by the second waveplate into the P polarized light and received by the light path switching unit; while the second reflected laser beam passed through the optical surface is received by the photo detector, and the second laser beam is passed through the second waveplate and focused by the second objective lens on the third information recording medium, and the third reflected laser beam from the third information recording medium is received by the light path switching unit, and passed through the optical surface due to its wavelength $\lambda 2$ and received by the photo detector.

The optical pickup may further include a third light source configured to emit a third laser beam at a wavelength $\lambda 3$ which is different from the wavelengths $\lambda 1$ and $\lambda 2$, wherein the third laser beam is focused by a combination of the second coupling lens and the second objective lens on a fourth information recording medium which is different from the first, second, and third information recording mediums.

The optical pickup may further be structured to include a photo detector configured to receive the first reflected laser beam, the second reflected laser beam, a third reflected laser beam formed by the reflection of the second laser beam on the third information recording medium, and a fourth reflected laser beam formed by the reflection of the third laser beam on the fourth information recording medium, wherein the second coupling lens is configured to convert the third reflected laser beam and the fourth reflected laser beam into a converged light, the light path switching unit is configured to receive converged lights of the first reflected laser beam, the second reflected laser beam, the third reflected laser beam, and the fourth reflected laser beam, and then direct the converged lights of the first reflected laser beam, the second reflected laser beam, the third reflected laser beam, and the fourth reflected laser beam to the photo detector.

The optical pickup may further be structured to include: a photo detector configured to receive the first reflected laser beam, the second reflected laser beam, a third reflected laser beam formed by the reflection of the second laser beam on the third information recording medium, and a fourth reflected laser beam formed by the reflection of the third laser beam on the fourth information recording medium; a first waveplate disposed across the first light path; and a second waveplate disposed across the second light path, wherein the light path switching unit has a polarization converting element configured to convert the first laser beam emitted from the first light source into a first polarized light or a second polarized light which is different from the first polarized light, and an optical surface has a wavelength dependent polarized light splitting function configured to allow a P polarized light of the first laser beam passed through the polarization converting element to transmit and direct to the first light path, allow an S polarized light of the first laser beam passed through the polarization converting element to reflect and direct to the second light path, allow the second laser beam at the wavelength $\lambda 2$ to transmit, and allow the third laser beam at the wavelength $\lambda 3$ to transmit, whereby the P polarized light of the first laser beam passed through the optical surface is passed along the first light path through the first waveplate and focused by the first objective lens on the first information recording medium, and the first reflected laser beam from the first information recording medium is converted by the first waveplate into the S polarized light which is orthogonal to the P polarized light and received by the light path switching unit; while the first reflected laser beam reflected from the optical surface is received by the photo detector, the S polarized light of the first laser beam reflected from the optical surface is passed along the second light path through the second waveplate and focused by the second objective lens on the second information recording medium, and the second reflected laser beam from the second information recording medium is converted by the second waveplate into the P polarized light and received by the light path switching unit; while the second reflected laser beam passed through the optical surface is received by the photo detector, the second laser beam is passed through the second waveplate and focused by the second objective lens on the third information recording medium, and the third reflected laser beam from the third information recording medium is received by the light path switching unit, passed through the optical surface due to its wavelength $\lambda 2$, and received by the photo detector, and the third laser beam is passed through the second waveplate and focused by the second objective lens on the fourth information recording medium, and the fourth reflected laser beam from the fourth information recording medium is received by the light path switching unit, passed through the optical surface due to its wavelength $\lambda 3$, and received by the photo detector.

The optical pickup may further include: a first photo detector configured to receive the first reflected laser beam; and a second photo detector configured to receive the second reflected laser beam, wherein the light path switching unit is configured to receive the first reflected laser beam converted to the converged light and direct the converged light of the first reflected laser beam to the first photo detector while the second reflected laser beam converted to the converged light is transmitted to the second photo detector.

The optical pickup may further be arranged to include: a first photo detector configured to receive at least the first reflected laser beam; and a second photo detector which is different from the first photo detector, wherein the light path switching unit is configured to receive the first reflected laser beam at the converged light and direct the first reflected laser beam at the converged light to the first photo detector while the second reflected laser beam at the converged light is enabled either to be received and directed to the first photo detector by the light path switching unit or to be transmitted to the second photo detector without being received by the light path switching unit, and a third reflected laser beam formed by the reflection of the second laser beam on the third information recording medium is enabled either to be received and directed to the first photo detector by the light path switching unit or to be transmitted to the second photo detector without being received by the light path switching unit.

The optical pickup may further be structured to include: a first photo detector configured to receive at least the first reflected laser beam; and a second photo detector which is different from the first photo detector, wherein the light path switching unit is configured to receive the first reflected laser beam converted to the converged light and direct the first reflected laser beam at the converged light to the first photo detector, the second reflected laser beam converted to the converged light is enabled either to be received and directed to the first photo detector by the light path switching unit or to be transmitted to the second photo detector without being received by the light path switching unit, a third reflected laser beam formed by the reflection of the second laser beam on the third information recording medium is enabled either to be received and directed to the first photo detector by the light path switching unit or to be transmitted to the second photo detector without being received by the light path switching unit, and a fourth reflected laser beam formed by the reflection of the third laser beam on the fourth information recording medium is enabled either to be received and directed to the first photo detector by the light path switching unit or to be transmitted to the second photo detector without being received by the light path switching unit.

The optical pickup may further be structured to include a light quantity detector disposed between the first to third light sources and the first and second objective lenses configured to measure the light quantity of at least one of the first to third laser beams.

The light path switching unit may be arranged to have an optical surface thereof configured to guide a portion of at least one of the first to third laser beams to the light quantity detector for measuring the light quantity by the light quantity detector.

The optical pickup may further include a lens actuator configured to move the first coupling lens along optical axis of the first coupling lens.

The optical axis of the first coupling lens and the optical axis of the second coupling lens may be arranged to extend substantially in parallel with each other.

The optical pickup may further include a lens actuator configured to move the first coupling lens and the second coupling lens along their optical axes.

In addition, according to a second aspect of the present invention, an optical pickup includes: a first objective lens configured to focus the laser beam at a first light path on a first information recording medium; a second objective lens configured to focus the laser beam at a second light path on a second information recording medium; a first coupling lens disposed at such a location that the optical axis of the laser beam at the first light path and the optical axis of the laser beam at the second light path extend substantially in parallel to each other configured to convert the laser beam at the first light path into substantially a collimated light beam; and a second coupling lens disposed at such the location that the optical axis of the laser beam at the first light path and the optical axis of the laser beam at the second light path extend substantially in parallel to each other configured to convert the laser beam at the second light path into substantially a collimated light beam, wherein $$L<(Dc1/2)+(Dc2/2) \text{ is satisfied}$$

where $Dc1$ is the diameter of the first coupling lens, $Dc2$ is the diameter of the second coupling lens, and $L$ is the distance between the optical axis of the first coupling lens and the optical axis of the second coupling lens.

In addition, according to a third aspect of the present invention, an optical pickup includes: a first light source configure to emit a first laser beam at a wavelength $\lambda 1$; a light path switching unit configured to switch the first laser beam emitted from the first light source between a first light path and a second light path; a first objective lens disposed across the first light path configured to focus the first laser beam at its numerical aperture of NA1 on a first information recording medium which has a first transparent substrate thickness $t1$; and a second objective lens disposed across the second light path configured to focus the first laser beam at its numerical aperture of NA2 (NA1>NA2) on a second information recording medium which has a second transparent substrate thickness $t2$ ($t1<t2$), wherein the first objective lens and the second objective lens are arranged along the radial direction of either the first information recording medium or the second information recording medium, and the first objective lens is located at the outer side of either the first information recording medium or the second information recording medium than the second objective lens.

According to the third aspect of the present invention, the optical pickup may further include a second light source configured to emit a second laser beam at a wavelength $\lambda 2$, wherein the second objective lens is configured to focus the second laser beam at its numerical aperture NA3 (NA1>NA3) on a third information recording medium which has a third transparent substrate thickness $t3$ ($t1<t3$).

Also, according to a fourth aspect of the present invention, an optical pickup includes: a first light source configured to emit a first laser beam at a wavelength $\lambda 1$; a first objective lens configured to focus the first laser beam on a first information recording medium which has a first transparent substrate thickness $t1$; a second light source configured to emit a second laser beam at a wavelength $\lambda 2$; a second objective lens configured to focus the second laser beam on a second information recording medium which has a second transparent substrate thickness $t2$ different from the first transparent substrate thickness $t1$; a first reflective surface provided between the first light source and the first objective lens configured to bend the optical axis of the first laser beam so as to extend substantially vertical to the information recording surface of the first information recording medium; and a second reflective surface provided between the second light source and the second objective lens configured to bend the optical axis of the second laser beam so as to extend substantially vertical to the information recording surface of the second information recording medium, wherein the first reflective surface and the second reflective surface are arranged substantially in parallel with each other.

According to the fourth aspect of the present invention, the first reflective surface and the second reflective surface may be arranged to lie substantially on one plane.

According to the fourth aspect of the present invention, the first reflective surface and the second reflective surface may be implemented by a riser mirror which incorporates one plane.

According to the first aspect of the present invention, the optical pickup may further include: a first reflective surface disposed between the first light source and the first objective lens configured to bend the optical axis of the first laser beam so as to extend substantially vertical to the information recording surface of the first information recording medium; and a second reflective surface disposed between the second light source and the second objective lens configured to bend the optical axis of the second laser beam so as to extend substantially vertical to the information recording surface of the second information recording medium, wherein the first reflective surface and the second reflective surface are arranged substantially orthogonal to each other.

The optical axis of the first laser beam emitted from the first light source and received by the first reflective surface and the optical axis of the first laser beam received by the second reflective surface are arranged to extend substantially in parallel with each other, and the direction of propagation of the first laser beam emitted from the first light source and received by the first reflective surface before being focused on the first information recording medium and the direction of propagation of the first laser beam received by the second reflective surface before being focused on the second information recording medium may be arranged to extend opposite to each other.

The optical axis of the first laser beam received by the first reflective surface and the optical axis of the first laser beam received by the second reflective surface may be arranged to extend coaxially.

According to the first aspect of the present invention, the optical pickup may be structured such that the first information recording medium is subjected to the action of recording or playing back information while the second information recording medium is subjected to only the action of playing back information, and the light path switching unit is configured to reflect the first laser beam for recording or playing back information on the first information recording medium and transmit the first laser beam for playing back information from the second information recording medium.

In addition, according to a fifth aspect of the present invention, the optical pickup includes: a first light source configured to emit a first laser beam at a wavelength λ1; a first objective lens configured to focus the first laser beam on a first information recording medium; a second light source configured to emit a second laser beam at a wavelength λ2; a second objective lens configured to focus the second laser beam on a second information recording medium which is different from the first information recording medium; an optical axis aligning surface configured to reflect one of the two light beams and transmit the other, the two light beams being the first laser beam emitted from the first light source and directed to the first objective lens and the second laser beam emitted from the second light source and directed to the second objective lens, and thus to align the optical axis of the first laser beam and the optical axis of the second laser beam substantially with each other; and an optical axis separating surface configured to reflect one of the first and second laser beams and transmit the other thus to split their optical axes aligned substantially with each other by the optical axis aligning surface into each other, wherein the first laser beam separated by the optical axis separating surface is directed to the first objective lens while the second laser beam separated by the optical axis separating surface is directed to the second objective lens.

The optical surface may be arranged of a polarized light splitting layer configured to transmit a P polarized light and reflecting an S polarized light.

In addition, according to a sixth aspect of the present invention, the optical pickup includes: alight source configured to emit a laser beam at a diverged light; an advancing path coupling lens disposed across the advancing path configured to convert the laser beam of the diverged light to substantially a collimated light beam; a light path switching unit configured to switch the laser beam at the collimated light beam produced by the coupling lens at the advancing path between a first light path and a second light path; a first objective lens disposed across the first light path configured to focus the laser beam on a first information recording medium which has a first transparent substrate thickness; a second objective lens disposed across the second light path configured to focus the laser beam on a second information recording medium which has a second transparent substrate thickness different from the first transparent substrate thickness and thus is different from the first information recording medium; a returning path coupling lens disposed across the returning path configured to convert a first reflected laser beam formed by the reflection of the laser beam on the first information recording medium and a second reflected laser beam formed by the reflection of the laser beam on the second information recording medium into a converged light; and a photo detector configure to receive the reflected laser beam converged by the returning path coupling lens.

In addition, according to a seventh aspect of the present invention, an integrated coupling lens for use in an optical pickup having a first objective lens for focusing the laser beam at a first light path on a first information recording medium and a second objective lens for focusing the laser beam at a second light path on a second information recording medium, comprising: a first coupling lens configured to convert the laser beam at the first light path into substantially a collimated light beam; and a second coupling lens configured to convert the laser beam at the second light path into substantially a collimated light beam, wherein the first coupling lens and the second coupling lens are arranged integrally of a single unit and disposed at such a location that the optical axis of the first light path and the optical axis of the second light path extend substantially in parallel with each other.

According to the seventh aspect of the present invention, the integrated coupling lens may be structured such that $L > (De1/2) + (De2/2)$ is satisfied where De1 is the effective diameter of the first coupling lens, De2 is the effective diameter of the second coupling lens, and L is the distance between the optical axis of the first coupling lens and the optical axis of the second coupling lens.

According to the seventh aspect of the present invention, the integrated coupling lens may be structured such that $L > (Do1/2) + (Do2/2)$ is satisfied where Do1 is the diameter of the first objective lens, Do2 is the diameter of the second objective lens, and L is the distance between the optical axis of the first coupling lens and the optical axis of the second coupling lens.

According to the seventh aspect of the present invention, the compound coupling may be structured such that when the straight line extending from a point across the optical axis in the first coupling lens to a point across the optical axis in the second coupling lens is Z, an intersection point between the circumferential edge of the first coupling lens and the straight line Z is X1, an intersection point between the circumferential edge of the second coupling lens and the straight line Z is X2, a distance between the optical axis of the first coupling lens and the intersection point X1 is r1, a distance between the optical axis of the second coupling lens and the intersection point X2 is r2, and a distance between the optical axis of the first coupling lens and the optical axis of the second coupling lens is L, $L < r1 + r2$ is satisfied.

According to the seventh aspect of the present invention, the integrated coupling lens may be structured such that when the diameter of the first objective lens is Do1, the diameter of the second objective lens is Do2, the straight line extending from a point across the optical axis in the first coupling lens to a point across the optical axis in the second coupling lens is Z, an intersection point between the circumferential edge of the first coupling lens and the straight line Z is X1, an intersection point between the circumferential edge of the second coupling lens and the straight line Z is X2, a distance between the optical axis of the first coupling lens and the intersection point X1 is r1, a distance between the optical axis of the second coupling lens and the intersection point X2 is r2, and a distance between the optical axis of the first coupling lens and the optical axis of the second coupling lens is L, $(r1 + r2) > L > (Do1/2) + (Do2/2)$ is satisfied.

In addition, according to an eighth aspect of the present invention, an integrated prism has a diagonal surface of a right triangular prism bonded with a parallel surface of a parallel plate, wherein the interface between the right triangular prism and the parallel plate is defined as a first surface which acts as a polarized light splitting surface configured to be varied in the transmission rate or the reflection rate depending on the direction of polarization of the incoming laser beam, and a second surface opposite to the first surface of the parallel plate serves as a light reflective surface for substantially reflecting the incoming laser beam.

Also, according to a ninth aspect of the present invention, an optical disc apparatus includes: an optical pickup having a first light source configured to emit a first laser beam at a wavelength λ1; a first objective lens configured to focus the first laser beam on a first information recording medium which has a first transparent substrate thickness t1; a first coupling lens disposed between the first light source and the first objective lens configured to convert the first laser beam into substantially a collimated light beam; a second light source configured to emit a second laser beam at a wavelength λ2; a second objective lens configured to focus the second laser beam on a second information recording medium which has a second transparent substrate thickness t2 different from the first transparent substrate thickness t1; and a second coupling lens disposed between the second light source and the second objective lens configured to convert the second laser beam into substantially a collimated light beam; a motor configured to rotate the first information recording medium and the second information recording medium; and a moving mechanism configured to move the optical pickup along the radial direction of the first information recording medium or the second information recording medium, which all are mounted on an optical platform, the optical platform being divided into two regions by a plane which extends substantially perpendicular to the first information recording medium or the second information recording medium and in which the center axis of rotation of the motor and the straight line parallel with the direction of the movement of the optical pickup are present, and either the first light source or the second light source being disposed in one of the two regions.

According to the ninth aspect of the present invention, the first coupling lens and the second coupling lens may be disposed at one of the two regions of the optical platform.

In addition, according to a tenth aspect of the present invention, the optical disc apparatus includes: the optical pickup of the first aspect of the present invention; a motor configured to rotate the information recording medium; and a controller for controlling the action of the optical pickup and the motor.

In addition, according to an eleventh aspect of the present invention, an optical information equipment includes: the optical disc apparatus defined in the ninth aspect of the present invention; and a calculating part configured to calculate data played back by the optical disc apparatus.

In addition, according to a twelfth aspect of the present invention, an optical information equipment includes: the optical disc apparatus defined in the tenth aspect of the present invention; and a calculating part configured to calculate data played back by the optical disc apparatus.

According to a first aspect of the optical pickup of the present invention, the light path switching unit for switching between the first light path and the second light path of the first laser beam emitted from the first light source is positioned between the first light source and the first coupling lens or between the first light source and the second coupling lens. Also, the first coupling lens and the second coupling lens are arranged for converting the first reflection of the laser beam produced by the first information recording medium and the second reflection of the laser beam produced by the second information recording medium respectively into a converged light. The first and second reflections of the laser beam passed through the first and second coupling lenses respectively are received by the photo detector.

Accordingly, even when the coupling lens is moved along its optical axis in order to compensate the spherical aberration derived from a variation in the thickness of the first transparent substrate of the first information recording medium to scanned by the first laser beam for performing the recording action or the playback action, the laser beam reflected on the first information recording medium can favorably be received by the photo detector after passed through the coupling lens. This prevents unwanted defocusing or spherical aberration from occurring on the photo detector. As the result, the focusing error signal will be protected from having any offset, thus inhibiting declination of the performance during the recording action or the playback action on the optical disc.

DETAILED DESCRIPTION OF THE PREFERRED EMBODIMENTS

Some embodiments of the present invention will be described in the form of an optical pickup, an integrated coupling lens and an integrated prism installed in the optical pickup, an optical disc apparatus equipped with the optical pickup, and a computer, an optical disc player, or an optical disc recorder equipped with the optical disc apparatus. Throughout this specification, the computer, the optical disc player, and the optical disc recorder may be referred to simply as optical information equipments.

Embodiment 1

Figure 1:
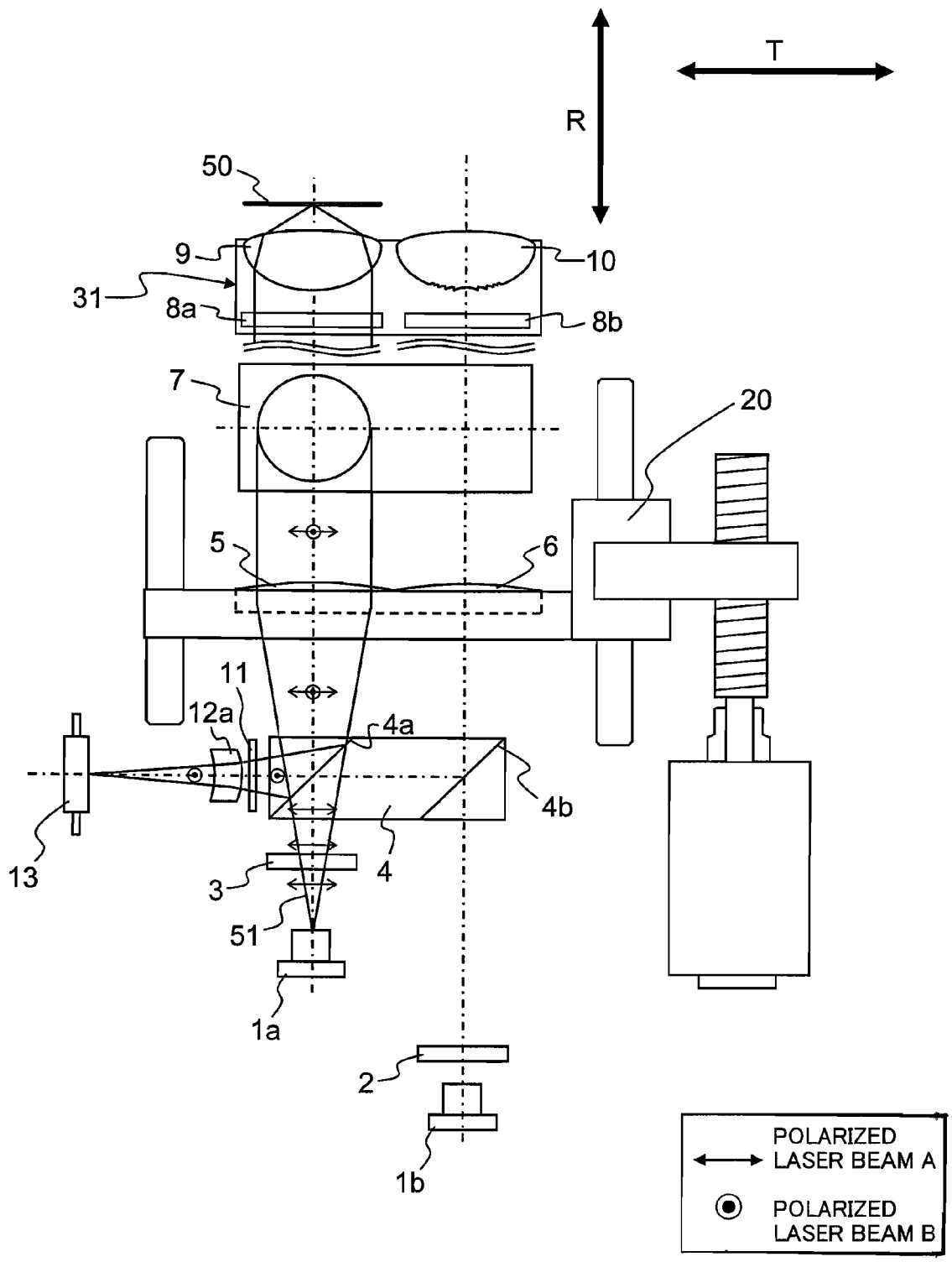
FIG. 1 is a schematic structural view of an optical pickup at its action of recording or playing back a first optical disc according to Embodiment 1 of the present invention.
Figure 2:
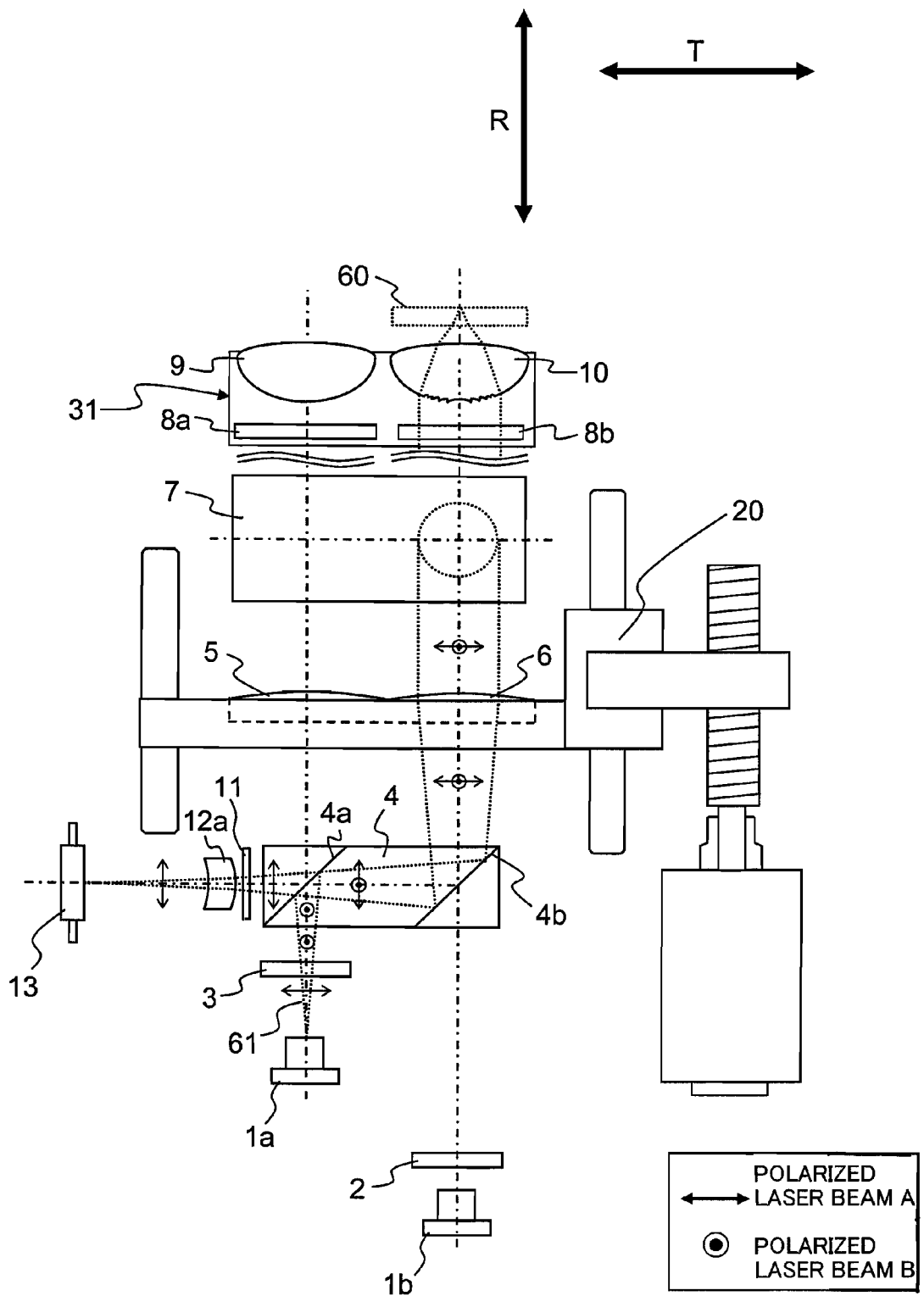
FIG. 2 is a schematic structural view of the optical pickup according to Embodiment 1 of the present invention at its action of recording or playing back a second optical disc.
Figure 3:
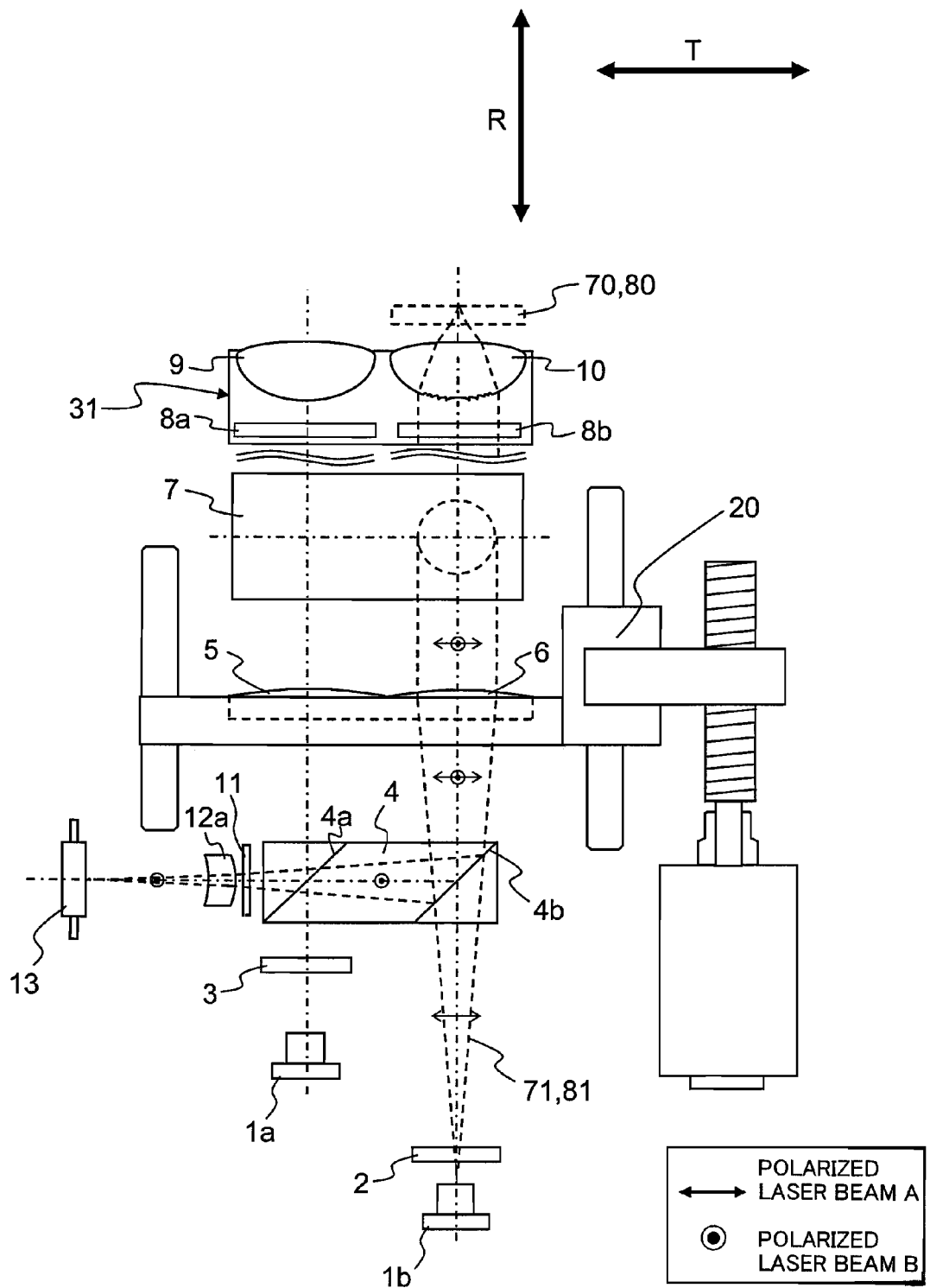
FIG. 3 is a schematic structural view of the optical pickup according to Embodiment 1 of the present invention at its action of recording or playing back a DVD or a CD.
Figure 30:
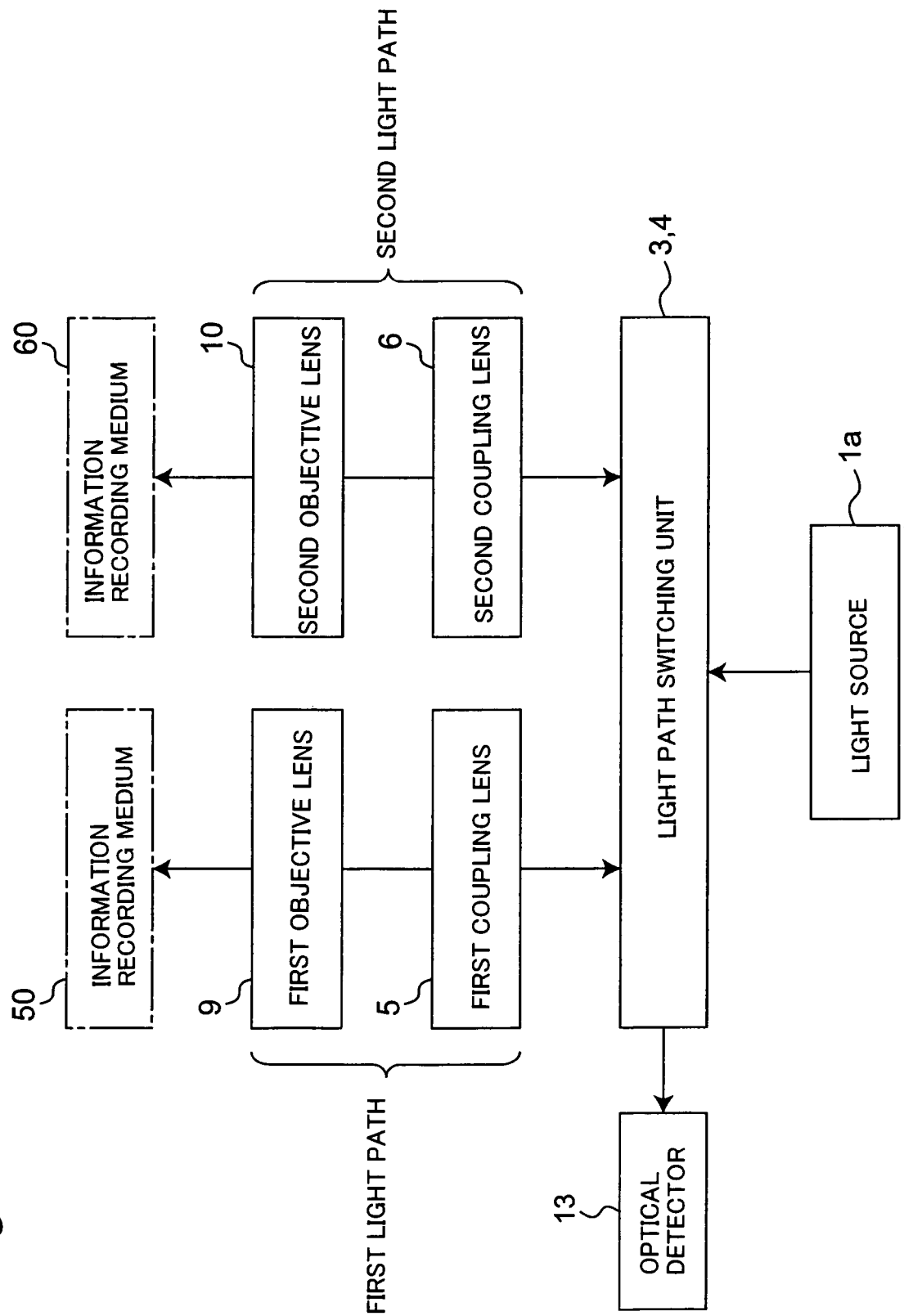
FIG. 30 is a block diagram of the primary components for accessing the first optical disc and the second optical disc in the optical pickup shown in FIGS. 1 to 3.
Figure 31:
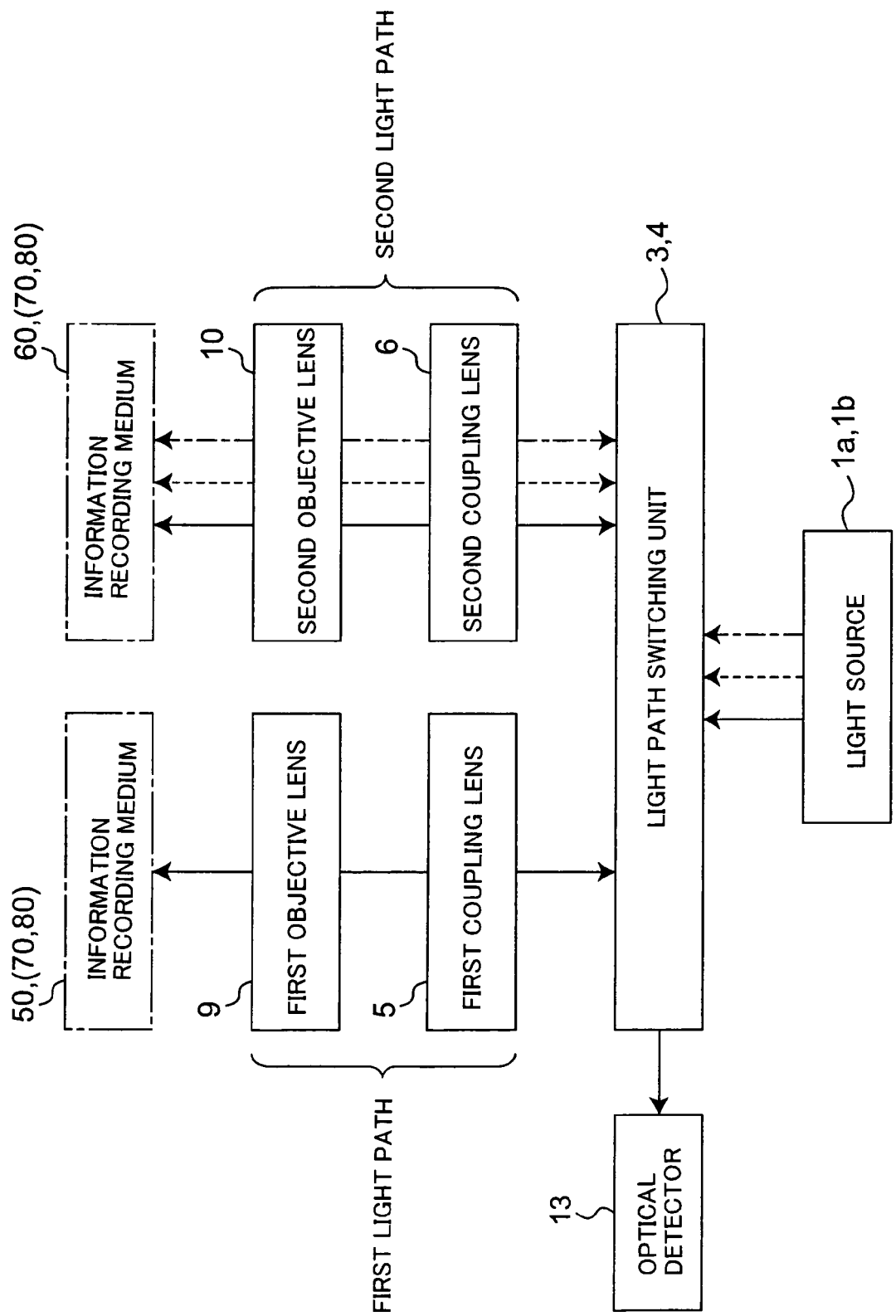
FIG. 31 is a block diagram of the primary components in the optical pickup shown in FIGS. 1 to 3.

FIGS. 1, 2, and 3 are schematic views of the optical pickup according to one embodiment of the present invention. FIGS. 30 and 31 are block diagrams of a primary structural arrangement of the optical pickup shown in FIGS. 1 to 3. The optical pickup shown in FIG. 30 is arranged capable of operating both a first information recording medium 50 of optical disc form and a second information recording medium 60 of optical disc form with the use of a laser beam having a wavelength λ1. The optical pickup shown in FIG. 31 is arranged to be used compatible with three, second, third, and fourth, information recording mediums 60, 70, 80 of optical disc form as well as the first information recording medium 50. As shown in FIG. 31, the optical pickup includes a couple of light sources 1a, 1b, a first coupling lens 5, a first objective lens 9, a second coupling lens 6, a second objective lens 10, and a pair of light path switching units 3, 4. The optical pickup of the embodiment of the present invention will then be described referring to the arrangement shown in FIG. 31.

The first coupling lens 5 and the first objective lens 9 are arranged to form a first light path for the first information recording medium 50 while the second coupling lens 6 and the second objective lens 10 form a second light path for the second, third, and fourth information recording mediums 60, 70, 80. Alternatively, the arrangement of the first coupling lens 5 and the first objective lens 9 may be modified for accessing the third and fourth information recording mediums 70, 80.

The light path switching units 3, 4 are disposed closer to the light sources 1a, 1b than to the first and second coupling lenses 5, 6 for switching between the transmission and the reflection of a first laser beam (denoted by the straight line) emitted from the first light source 1a in order to guide the first laser beam to the first light path or the second light path. More particularly, for performing either the recording action or the playback action on the first information recording medium 50, the first information recording medium 50 is set to face the first objective lens 9 and the light path switching units 3, 4 are operated to guide the first laser beam along the first light path. For performing either the recording action or the playback action on the second information recording medium 60, the second information recording medium 60 is set to face the second objective lens 10 for guiding the first laser beam along the second light path.

For performing either the recording action or the playback action on the third 70 or fourth information recording medium 80 which is set to face the second objective lens 10, the light path switching units 3, 4 are operated to guide the second or third laser beam (denoted by the dotted or one-dot chain line) emitted from the light source 1b along the second light path. For performing either the recording action or the playback action on the third 70 or fourth information recording medium 80 which is set to face the first objective lens 9, the light path switching units 3, 4 are operated to guide the second or third laser beam (denoted by the dotted or one-dot chain line) emitted from the light source 1b along the first light path. Furthermore, the light path switching units 3, 4 allow the laser beam reflected by any of the first to fourth information recording mediums to pass through the first 5 or second coupling lens 6 and fall on an optical detector 13 which is one example acting as the photo detector.

The optical pickup of the embodiment of the present invention will further be described in more detail with reference to FIGS. 1 to 3.

As shown in FIGS. 1, 2, and 3, the first light source 1a is provided for emitting a blue-violet laser beam as the first laser beam while the second light source 1b is provided for emitting two different wavelengths of the laser beam, a red laser beam as the second laser beam and an infrared laser beam as the third laser beam.

Denoted by 2 is a diffraction grating and denoted by 3 is a polarization converter such as a liquid crystal device or a transparent piezoelectric device. Denoted by 4 is a multi-surface prism which has at least two or more optical surfaces in this embodiment. The multi-surface prism 4 incorporates an example for performing a light path switching prism function. The polarization converter 3 is disposed between the first light source 1a and the multi-surface prism 4. A combination of the polarization converter 3 and the multi-surface prism 4 or more specifically the first optical surface 4a of the multi-surface prism 4, which will be described later, constitutes the above described light path switching unit.

In the optical pickup of this embodiment, the multi-surface prism 4 has multiple optical surfaces because both the first and second laser beams are used. Meanwhile, the optical pickup shown in FIG. 30 is provided for operating compatible with both the first information recording medium 50 and the second information recording medium 60 with the use of one single laser beam and therefore its optical face member acting as the multi-surface prism 4 may have one optical surface. The optical surface in this case is designed to have a polarization-separation characteristic for passing P polarized light and reflecting S polarized light. The P polarized light and the S polarized light are known as commonly defined in the optical technology field. More particularly, the P polarized light has polarization in parallel to a plane on which both the optical axis of incoming light received by the optical surface and the optical axis of outgoing light departing from the optical surface are present. The S polarized light has polarization vertical to the plane. The expression "passing the P polarized light" covers the passing the laser beam entirely as well as the passing the laser beam mostly. It means that the rate of transmission of the laser beam is not concerned. Similarly, the expression "reflecting the S polarized light" covers the reflecting the laser beam entirely as well as the reflecting the laser beam mostly. It means that the rate of reflection of the laser beam is not concerned. Since the optical surface has the polarization-separation characteristic described above, the laser beam passed through the optical surface is either P polarized light or S polarized light.

As explained, the optical face member which functions as the multi-surface prism 4 is different from the construction of this embodiment, the optical face member basically has to have single optical surface with the polarization-separation characteristic and act as a first optical surface 4a of the multi-surface prism 4 described beneath.

The first optical surface 4a of the multi-surface prism 4 is designed to act as a polarizing beam splitter (PBS) for passing almost entirely the polarized laser beam A of blue-violet laser beam (of which the direction of polarization extends parallel to the plane at the drawing) and reflecting almost entirely the polarized laser beam B of the same (of which the direction of polarization extends vertical to the plane at the drawing) while passing almost entirely the red laser beam and the infrared laser beam. A second optical surface 4b of the multi-surface prism 4 is also designed to act as another PBS for passing almost entirely the polarized laser beam A of the red laser beam or the infrared laser beam and reflecting almost entirely the polarized laser beam B of the same while reflecting almost entirely the blue-violet laser beam.

It is noted in this specification that the polarized laser beam A corresponds to the first polarized laser beam and the polarized laser beam B corresponds to the second polarized laser beam. Accordingly, the polarized laser beam A and the polarized laser beam B represent the state of polarization of the laser beam which is held from the emission from the light source to before entering the multi-surface prism 4. Since the polarized laser beam A and the polarized laser beam B represent the state of polarization of the laser beam emitted from the light source, there is a case that they may not correspond to the P polarized light or the S polarized light. In this way, the concept of the polarized laser beam A and the polarized laser beam B basically is not identical to the above-described P polarized light or the S polarized light. The description of this specification is however based on the assumption that the polarized laser beam A is substantially of the P polarization light while the polarized laser beam B is substantially of the S polarization light.

In response to different wavelengths of the laser beam employed in this embodiment, the first optical surface 4a and the second optical surface 4b of the multi-surface prism 4 are faces to be arranged different from each other in the optical characteristic in accordance with the difference of the wavelength of the laser beam. In other words, the first optical surface 4a and the second optical surface 4b have an optical characteristic of wavelength dependent polarized light splitting.

There are also provided a first collimator lens 5 acting as the coupling lens for collimating at least the blue-violet laser beam and a second collimator lens 6 acting as the coupling lens for collimating a plurality of different wavelengths of the laser beam. Denoted by 7 is an integrated riser mirror for performing the rise of the two optical axes with the use of a single element. Denoted by 8a and 8b are a first ¼ waveplate for accepting at least the blue-violet laser beam and a second ¼ waveplate for accepting a plurality of different wavelengths of the laser beam respectively. Denoted by 9 and 10 are a first objective lens for accepting at least the blue-violet laser beam and a second objective lens for accepting a plurality of different wavelengths of the laser beam respectively.

There are further provided a detection diffractor 11, a first detection lens 12a, and an integrated optical detector 13 acting as the photo sensor for receiving all the blue-violet, red, and infrared lights of the laser beam.

Denoted by 20 is a collimator lens actuator for driving both the first collimator lens 5 and the second collimator lens 6 together along the optical axis in this embodiment. Denoted by 31 is an objective lens actuator for driving a combination of the first objective lens 9 and the first ¼ waveplate 8a, and a combination of the second objective lens 10 and the second ¼ waveplate 8b along the optical axis and along a radial direction of the optical disc which extends vertical to the optical axis. The optical pickup includes the above described components. The objective lenses 9, 10, the detection diffractor 11, and the collimator lens actuator 20 will now be described separately in more detail.

It is noted that the radial direction of the optical disc is denoted by "R" while the tangential direction of the optical disc is denoted by "T" in FIGS. 1 to 3.

The optical discs are classified into a first optical disc 50 arranged to be accessed with the blue-violet laser beam of which the transparent substrate is substantially 0.1 mm in the thickness, a second optical disc 60 arranged to be accessed with the blue-violet laser beam of which the transparent substrate is substantially 0.6 mm in the thickness, a DVD 70, and a CD 80.

The optical pickup of this embodiment is designed for performing both the recording action and the playback action on the first optical disc 50 and only the playback action on the second optical disc 60. Also, both the recording action and the playback action can be performed on the DVD 70 and the CD 80. However, the optical pickup of this embodiment is not limited to the above described actions. It may be applicable for recording data on the second optical disc 60 as well.

(First Optical Disc)

The action of the optical pickup for recording or playing back data on the first optical disc 50 will now be described with reference to FIG. 1.

A blue-violet laser beam 51 emitted from the light source 1a and acting as the first laser beam is of linear polarization or the polarized laser beam A. The polarized laser beam A of the laser beam 51 is passed without changing the direction of polarization through the polarization converter 3 with its electrodes (not shown) loaded with no voltage and received by the first optical surface 4a of the multi-surface prism 4. The first optical surface 4a allows the polarized laser beam A of the laser beam 51 to pass almost entirely. The polarized laser beam A of the laser beam 51 passed through the multi-surface prism 4 is transmitted to the first collimator lens 5 where it is converted to substantially a collimated light beam.

The first collimator lens 5 is held to a lens holder in the collimator lens actuator 20, which will be described later in mode detail referring to FIG. 6, and can thus be moved along the optical axis of the laser beam by the action of a stepping motor. The polarized laser beam A at substantially the collimated light beam of the laser beam 51 produced by the first collimator lens 5 is then bent through substantially 90 degrees in the optical axis by the integrated riser mirror 7 to run in a direction vertical to the paper surface before entering the first ¼ waveplate 8a. The polarized laser beam A of the laser beam 51 is converted into a circularly polarized laser beam By the first ¼ waveplate 8a and, at the advancing path, focused across the transparent substrate by the first objective lens 9 to form its spot on the information recording surface of the first optical disc 50. It is noted that, for ease of the description, the optical axis bent in the direction vertical to the paper surface by the integrated riser mirror 7 is illustrated to extend in a direction parallel to the paper surface (as is repeated equally hereinafter).

When the laser beam is focused to form its spot on the information recording surface of the first optical disc 50, it may have a degree of spherical aberration derived from a variation in the thickness of the transparent substrate of the first optical disc 50. Such spherical aberration formed depending on the thickness of the transparent substrate can be offset by a degree of spherical aberration at the opposite polarity which is produced by making the laser beam entering the first objective lens 9 be the diverged or converged light. For example, as shown in FIG. 1, the collimator lens actuator 20 is driven to move the first collimator lens 5 forward and backward along the optical axis for producing the diverged or converged light of the laser beam before received by the first objective lens 9. Accordingly, the spherical aberration at the opposite polarity can be created at the first objective lens 9 for canceling the spherical aberration derived from the variation in the thickness of the transparent substrate of the optical disc 50.

In this manner, the arrangement with the collimator lens actuator 20 being driven to move the first collimator lens 5 forward and backward along the optical axis forms a spherical aberration compensating mechanism.

Then, the laser beam 51 acting as the first reflection light after reflected on the information recording surface of the first optical disc 50 is transmitted along the returning path to the first ¼ waveplate 8a where it is converted from the circularly polarized light to a linear polarized light of the polarized laser beam B (of which the direction of polarization extends vertical to the polarized laser beam A to be received by the first ¼ waveplate 8a). The polarized laser beam B of the laser beam 51 in the returning path is then bent by the integrated riser mirror 7 and converted by the first collimator lens 5 from substantially the collimated light beam to a converged light before falling on the first optical surface 4a of the multi-surface prism 4. The optical surface 4a allows the laser beam 51 in the returning path to be reflected almost entirely. The laser beam 51 released along the returning path from the multi-surface prism 4 is split by the detection diffractor 11 for detection of a servo signal and provided with a predetermined of spherical aberration by the first detection lens 12a before received by the integrated optical detector 13. The integrated optical detector 13 then produces the data signal and the servo signal from the polarized laser beam B of the laser beam 51 which has been received.

The first ¼ waveplate 8a, the second ¼ waveplate 8b, the first objective lens 9, and the second objective lens 10 shown in FIG. 1 are mounted together on the objective lens actuator 31 for being driven at once to follow surface undulations and data track eccentricities of the first optical disc 50. This allows the same effective diameter to be obtained at the first ¼ waveplate 8a and the second ¼ waveplate 8b and minimized in the effective diameter even if the objective lenses 9, 10 are shifted. Alternatively, when its effective diameter is slightly increased, the first ¼ waveplate 8a may be disposed not on the objective lens actuator 31. In the latter case, the objective lens actuator 31 can be decreased in the weight particularly at its movable region, hence contributing to the recording action and the playback action at higher speeds on the optical disc.

(Second Optical Disc)

The action of the optical pick for recording or playing back data on the second optical disc 60 will be described with reference to FIG. 2.

A blue-violet laser beam 61, similar to the laser beam 51, emitted from the light source 1a and acting as the first laser beam is of linear polarization or the polarized laser beam A. With its electrodes (not shown) loaded with a voltage, the polarization converter 3 converts the laser beam 61 from the polarized laser beam A to the polarized laser beam B. The polarized laser beam B of the laser beam 61 is then received by the first optical surface 4a of the multi-surface prism 4. The first optical surface 4a allows the polarized laser beam B of the laser beam 61 to be reflected almost entirely and bent at its light path before received by the second optical surface 4b of the multi-surface prism 4. The polarized laser beam B of the laser beam 61 is further reflected and bent at its light path by the second optical surface 4b. The laser beam 61 passed along the advancing path through the multi-surface prism 4 is converted into substantially a collimated light beam by the second collimator lens 6. The polarized laser beam B at substantially the collimated light beam of the laser beam 61 is then bent through substantially 90 degrees along the optical axis by the integrated riser mirror 7 to run in the direction vertical to the paper surface. The polarized laser beam B of the laser beam 61 is converted into a circularly polarized laser beam By the second ¼ waveplate 8b and focused across the transparent substrate by the second objective lens 10 to form its spot on the information recording surface of the second optical disc 60.

It is also possible that the collimator lens actuator 20 is driven to move the second collimator lens 6 forward and backward along the optical axis for producing the diverged or converged light of the laser beam which is received by the second objective lens 10 so that the spherical aberration derived from a variation in the thickness of the transparent substrate of the second optical disc 60 can be canceled. In this manner, the arrangement with the collimator lens actuator 20 being driven to move the second collimator lens 6 forward and backward along the optical axis forms a spherical aberration compensating mechanism.

Then, the polarized laser beam B of the laser beam 61 acting as the second reflection light after reflected on the information recording surface of the second optical disc 60 is transmitted to the second ¼ waveplate 8b where it is converted from the circularly polarized light to the polarized light A. The polarized light A of the laser beam 61 is then bent at the optical path by the integrated riser mirror 7 and converted by the second collimator lens 6 from substantially the collimated light beam to a converged light before falling on the second optical surface 4b of the multi-surface prism 4. The optical surface 4b allows the polarized light A of the laser beam 61 to be reflected almost entirely before received by the first optical surface 4a of the multi-surface prism 4. The polarized light A of the laser beam 61 is passed almost entirely through the first optical surface 4a. The laser beam 61 released from the multi-surface prism 4 is passed through the detection diffractor 11 (where a diffracted light for the servo signal assigned to the first optical disc 50 is produced but not used for the second optical disc 60 in this example, whereby the light is passed through as explained) and provided with a predetermined of spherical aberration by the first detection lens 12a before received by the integrated optical detector 13. The integrated optical detector 13 then produces the data signal and the servo signal from the polarized light A of the laser beam 61 which has been received.

Similarly, the first ¼ waveplate 8a, the second ¼ waveplate 8b, the first objective lens 9, and the second objective lens 10 shown in FIG. 2 are mounted together on the objective lens actuator 31 for being driven at once to follow surface undulations and data track eccentricities of the first optical disc 50, whereby the effective diameter of the second ¼ waveplate 8b can be minimized. Alternatively, when its effective diameter is slightly increased, the second ¼ waveplate 8b may be disposed not on the objective lens actuator 31. In the latter case, the objective lens actuator 31 can be decreased in the weight particularly at its movable region, hence contributing to the recording action and the playback action at higher speeds on the optical disc.

Moreover, both the first ¼ waveplate 8a and the second ¼ waveplate 8b may be mounted not on the objective lens actuator 31. In this case, the weight of the movable region of the objective lens actuator 31 will further be decreased, permitting the recording action and the playback action to be performed at much higher speeds on the optical disc.

(DVD)

The action of the optical pick for recording or playing back data on the DVD 70 will be described with reference to FIG. 3.

A red color laser beam 71 emitted from the light source 1b and acting as the second laser beam is of linear polarization or the polarized laser beam A. The polarized light A of the laser beam 71 is passed through the diffraction grating 2 which produces diffracted light for generating the tracking error signal with the use of a DPP (differential push pull) technique and received by the second optical surface 4b of the multi-surface prism 4. The second optical surface 4b allows the polarized light A of the laser beam 71 to pass almost entirely. The polarized light A of the laser beam 71 passed through the multi-surface prism 4 is converted into substantially a collimated light beam by the collimator lens 6 and bent to substantially 90 degrees along the optical axis by the integrated riser mirror 7 to run in a direction vertical to the paper surface before received by the second ¼ waveplate 8b. The polarized light A of the laser beam 71 is then converted into a circularly polarized laser beam B y the second ¼ waveplate 8b and focused across the transparent substrate by the second objective lens 10 to form its spot on the information recording surface of the DVD 70.

The red color laser beam 71 acting as the third reflection light after reflected on the information recording surface of the DVD 70 is transmitted along the returning path to the second ¼ waveplate 8b where it is converted into the polarized laser beam B. The polarized light B of the laser beam 71 is reflected by the integrated riser mirror 7 and converted by the collimator lens 6 from substantially the collimated light beam to a converged light before falling on the second optical surface 4b of the multi-surface prism 4. The second optical surface 4b allows the laser beam 71 in the returning path to be reflected almost entirely before received by the first optical surface 4a of the multi-surface prism 4. The first optical surface 4a permits the polarized light B of the laser beam 71 to be passed almost entirely. The laser beam 71 released along the returning path is passed through the detection diffractor 11 and provided with a predetermined of spherical aberration by the first detection lens 12a before received by the integrated optical detector 13. The integrated optical detector 13 then produces the data signal and the servo signal from the polarized laser beam B of the laser beam 71 which has been received.

(CD)

The optical pickup of this embodiment is capable of performing either the recording action or the playback action on the CD 80 with its second light source 1b emitting an infrared laser beam as the third laser beam, one of two different wavelengths to be emitted. The action of the optical pickup for recording and playing back data on the CD 80 is identical to the action for recording and playing back data on the DVD 70 described previously with reference to FIG. 3 and will be described in no more detail. In this action, the infrared laser beam reflected by the information recording surface of the CD 80 acts as the fourth laser beam along the returning path.

The function of the first objective lens 9 and the second objective lens 10 will now be described in more detail with reference to FIGS. 4A and 4B.

In particular, the first objective lens 9 is a specific objective lens selected for performing either the recording action or the playback action on the first optical disc 50. More specifically, the objective lens at 0.85 of the numerical aperture NA is designed for producing the spot of light at the diffraction limit on the first optical disc 50 of which the transparent substrate is substantially 0.1 mm in the thickness.

The second objective lens 10 is arranged to have at least one surface thereof, preferably the incident surface (at the light source side) in this embodiment, arranged of a blazing diffraction construction with a saw-tooth like pattern in the cross section for focusing the second optical disc 60, the DVD 70, and the CD 80 respectively. The blazing diffraction construction is aberration compensated so that laser beam of a corresponding wavelength is focused, in combination with the power of refraction of the second objective lens 10, at the diffraction limit on each of the second optical disc 60, the DVD 70, and the CD 80 to be recorded or played back. The second objective lens 10 with the blazing diffraction construction for diffracting a portion of the incident light allows the laser beam to be spotted at the diffraction limit on each of the different types of the optical disc which are different in the thickness of the transparent substrate. Also, the second objective lens 10 is configured for permitting the infrared laser beam to be focused on the CD 80 through a center region, including the optical axis, of the objective lens 10 and both the blue-violet laser beam and the red laser beam to be focused on the second optical disc 60 or the DVD 70 through the center region and outer region of the objective lens 10. This allows the numerical aperture to be limited to about 0.45 for the CD 80 and set incrementally to about 0.65 for the second optical disc 60 and the DVD 70.

Figure 4A:
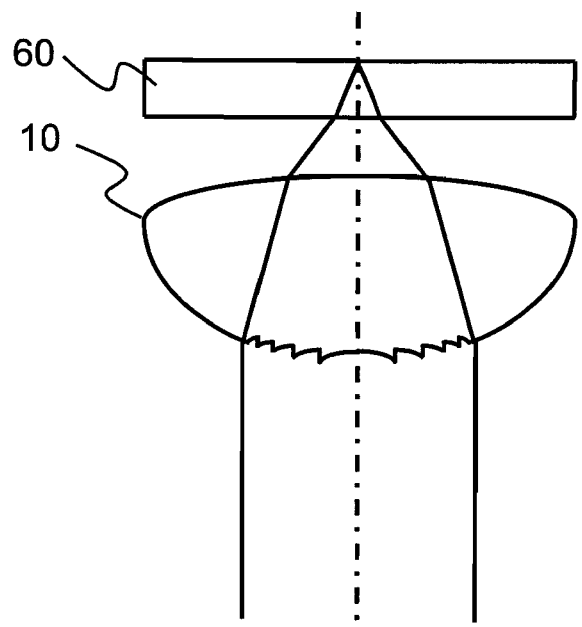
FIG. 4A is a schematic view showing a construction of a second objective lens according to Embodiment 1 of the present invention.
Figure 4B:
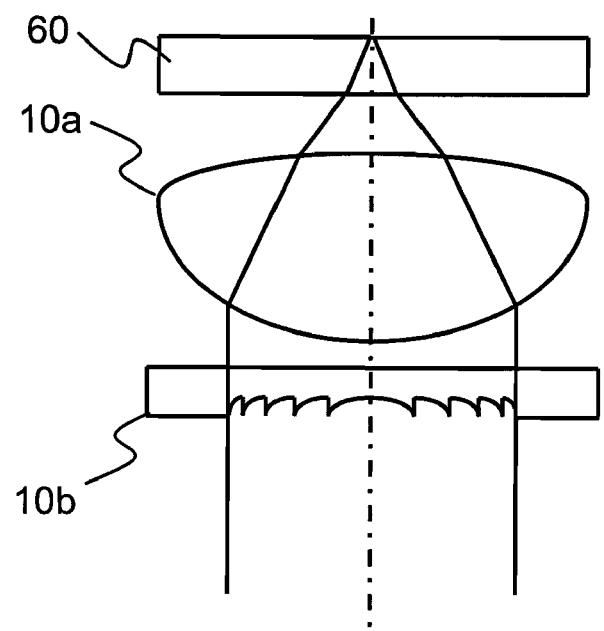
FIG. 4B is a schematic view showing another construction of the second objective lens according to Embodiment 1 of the present invention.

The second objective lens 10 is not limited to the arrangement with the blazing diffraction construction at the incident surface shown in FIG. 4A but may be modified to a combination of an objective lens 10a of a refractive type with positive power and a hologram lens 10b provided separately, as shown in FIG. 4B, for being driven at once in either the recording action or the playback action on to each of the second optical disc 60, the DVD 70, and the CD 80. With the use of the hologram lens 10b, the objective lens requires no diffraction construction at the lens surface which is tilted at a greater angle, then molding dies of the objective lens for the production will favorably be simplified.

Alternatively, the second objective lens 10 for focusing the second optical disc 60, the DVD 70, and the CD 80 is not limited to the brazing diffraction grating construction having a saw-tooth like pattern but may be arranged of a phase step construction, a step type diffraction grating constructing, or a rectangular diffraction grating construction.

The focusing error signal from the first optical disc 50 or the second optical disc 60 is measured by a so-call astigmatism technique detecting the spot of light provided with astigmatism by the first detection lens 12a from four separate patterns of the received light at the integrated optical detector 13.

The tracking error signal from the first optical disc 50 is detected with the use of plus first order diffracted light produced by the detection diffraction grating 11. The tracking error signal may be produced by a DPP technique or a three beam technique employing the main and sub beams produced by a diffraction grating.

The tracking error signal from the second optical disc 60 is produced by a so-called phase difference detecting method for detecting zero-order diffracted light passed through the detection diffraction grating 11 from four separate patterns of the received light at the integrated optical detector 13.

Figure 5:
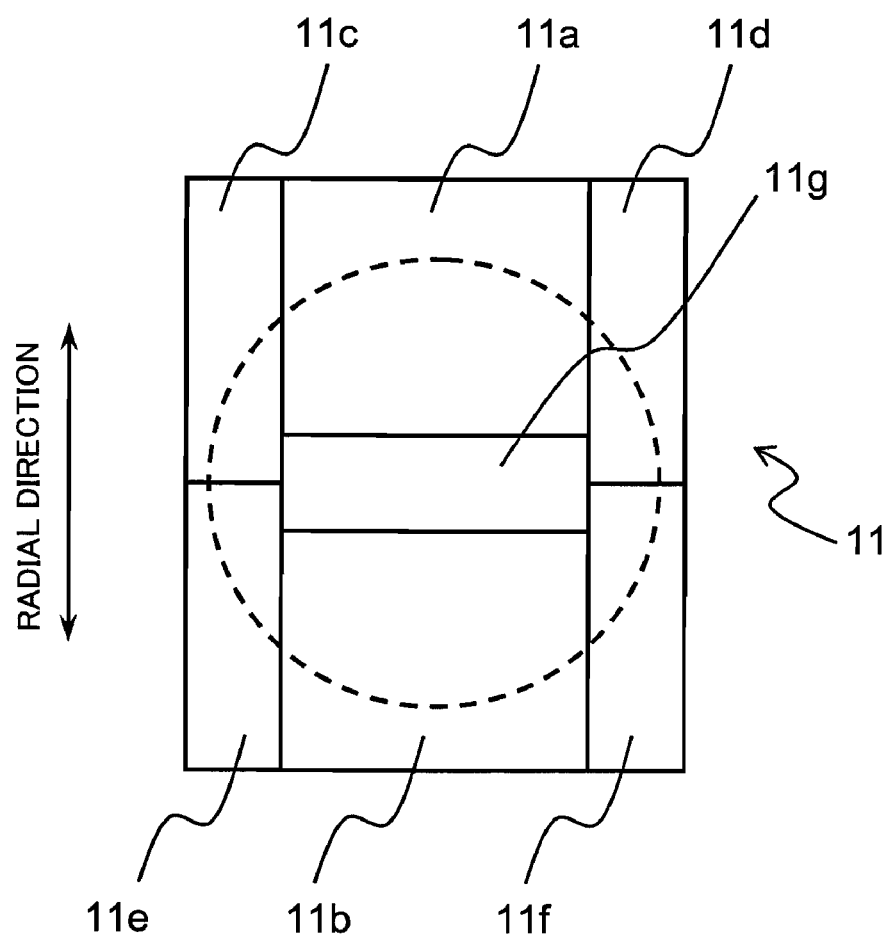
FIG. 5 is a schematic view showing a splitting pattern of a detection diffraction grating according to Embodiment 1 of the present invention.

FIG. 5 schematically illustrates a split pattern of the detection diffraction grating 11. Denoted by the dotted line is a flux of the laser beam reflected by the information recording surface of the first optical disc 50 and received by the detection hologram 11.

The detection diffraction grating 11 has seven detecting regions 11a to 11g for splitting the laser beam into zero-order diffracted component, plus and minus first order diffracted components. The tracking error signal TE is calculated from the current signals Ia to Ig corresponding to the intensity of plus first order diffracted light components of the regions 11a to 11g, using $$TE=(Ia-Ib)-k(Ic+Id-Ie-If).$$

The focusing error signal from the DVD 70 or the CD 80 is measured by a so-called astigmatism technique detecting the spot of the laser beam provided with astigmatism by the first detection lens 12a from four separate patterns of the received light at the integrated optical detector 13. The tracking error signal is detected by a DPP technique using plus and minus first order diffracted lights produced by the diffraction grating 2.

The action of the optical pickup of this embodiment for detecting the focusing error signal and the tracking error signal from each of the optical discs is not limited to those described above but may be carried out by any applicable technique for detecting the focusing error signal and the tracking error signal.

The collimator lens actuator 20 in this embodiment will now be described in more detail.

Figure 6:
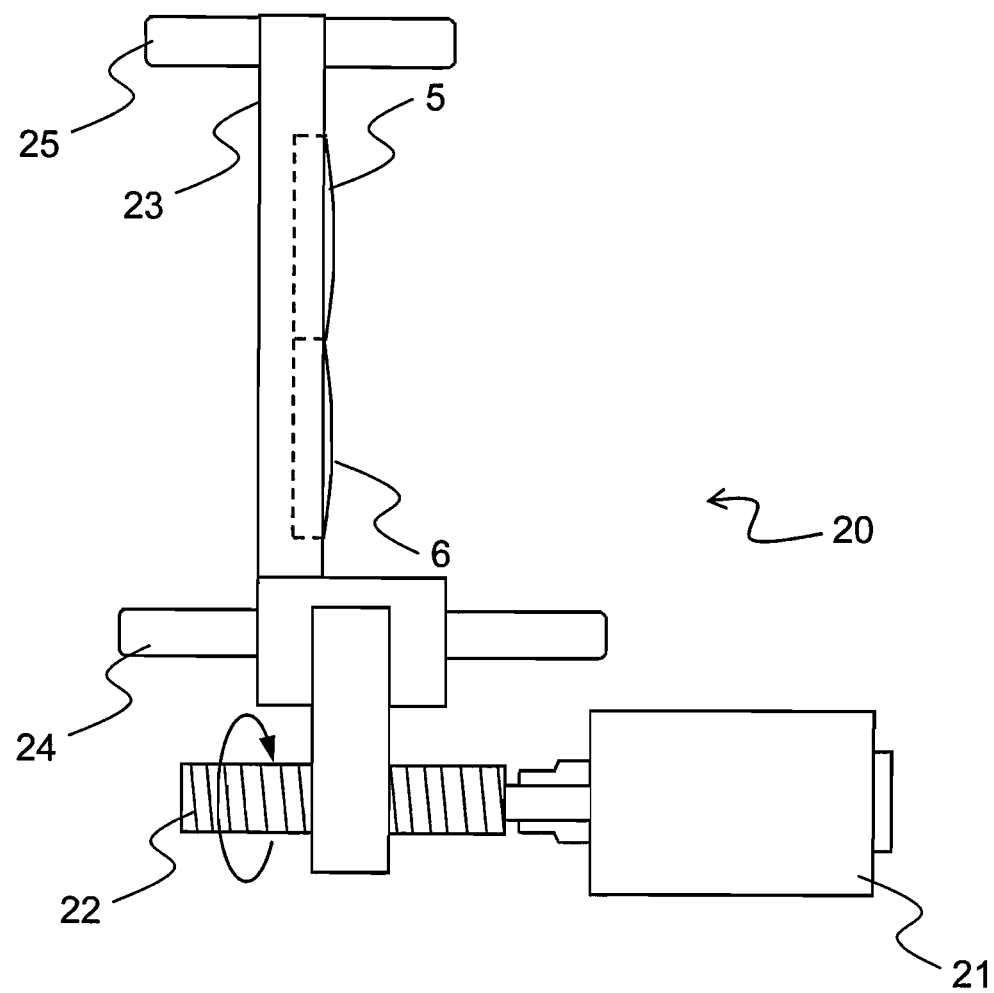
FIG. 6 is a schematic view showing a construction of a collimator lens actuator according to Embodiment 1 of the present invention.

FIG. 6 is a schematic structural view of the collimator lens actuator 20. Shown in FIG. 6 are the first collimator lens 5, the second collimator lens 6, a stepping motor 21, a screw shaft 22, a lens holder 23, a main shaft 24, and a sub shaft 25.

As shown in FIG. 6, the rotating action of the screw shaft 22 driven by the stepping motor 21 permits the lens holder 23 carrying the first collimator lens 5 and the second collimator lens 6 together to be moved between the main shaft 24 and the sub shaft 25 along the optical axes of both the first collimator lens 5 and the second collimator lens 6.

When the first collimator lens 5 is moved from the reference position, where outgoing light of the first collimator lens 5 is at substantially a collimated light beam, towards the light source 1a, the outgoing light turns to a diverged light, whereby the spherical aberration derived from the increasing of thickness of the transparent substrate of the first optical disc 50 can be canceled. On the other hand, when the first collimator lens 5 is moved towards the objective lens 9, the outgoing light turns to a converged light, whereby the spherical aberration derived from the decreasing of thickness of the transparent substrate of the first optical disc 50 can be canceled. The action of the second collimator lens 6 produces an equal effect for compensating the spherical aberration derived from variations in the thickness of the transparent substrate of the second optical disc 60.

The parts for moving the first collimator lens 5 along the optical axis is not limited to the arrangement with the stepping motor 21 shown in FIG. 6 but may be implemented by any applicable actuator mechanism such as a magnetic system or a piezoelectric system. Since the former parts using the stepping motor requires no monitoring of the location of the collimator lens 5 along its optical axis, its overall arrangement can be simplified. As the latter actuator mechanism using a magnetic system or a piezoelectric system is minimized in the driving mechanism, it can contribute to the size reduction of the optical pickup.

Generally speaking, the second optical disc 60 is smaller in the incidence rate of spherical aberration derived from variations in the thickness of the transparent substrate than the first optical disc 50. Accordingly, provided that the spherical aberration derived from the second optical disc 60 is negligible, the second collimator lens 6 may not be mounted on the lens holder 23 of the collimator lens actuator 20 provided for moving the lens along its optical axis. In this case, the collimator lens actuator 20 is designed for moving only the first collimator lens 5 and can thus be minimized in the overall dimensions. This will contribute to the size reduction as well as the cost down of the optical pickup.

Meanwhile, when both the first collimator lens 5 and the second collimator lens 6 are mounted together on the same lens holder 23, the distance between the optical axis of the first collimator lens 5 and the optical axis of the second collimator lens 6 can be decreased. As the result, the distance between the first objective lens 9 and the second objective lens 10 can be reduced thus permitting the movable region of the objective lens actuator 31 to be minimized in both the size and the weight. Accordingly, the recording action and the playback action at higher speeds on the optical disc can be more facilitated.

The second objective lens 10 may be arranged to receive a diverged light of the laser beam in view of the fact that, when performing the recording action or the playback action on the CD 80, the second objective lens 10 fails to cancel the spherical aberration because the thickness of the transparent substrate of the CD 80 is relatively large or that the working distance (WD) is maintained sufficiently. For the purpose, the collimator lens actuator 20 is moved towards the light source 1b to convert the infrared laser beam into a diverged light. This allows the arrangement of the collimator lens actuator 20 for compensating the spherical aberration derive from variations in the thickness of the transparent substrate of the first optical disc 50 to be shared and the laser beam source 1b for emitting two different wavelengths, red color light and infrared light, of the laser beam which are substantially equal at the emission point to be used with no modification, thus contributing to the structural simplification of the optical pickup.

Figure 7A:
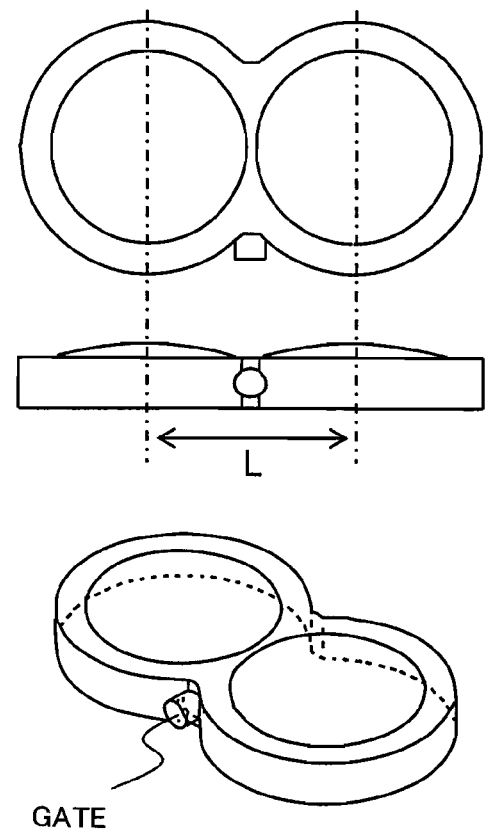
FIG. 7A is a schematic structural view showing an integrated collimator lens according to Embodiment 1 of the present invention.
Figure 7B:
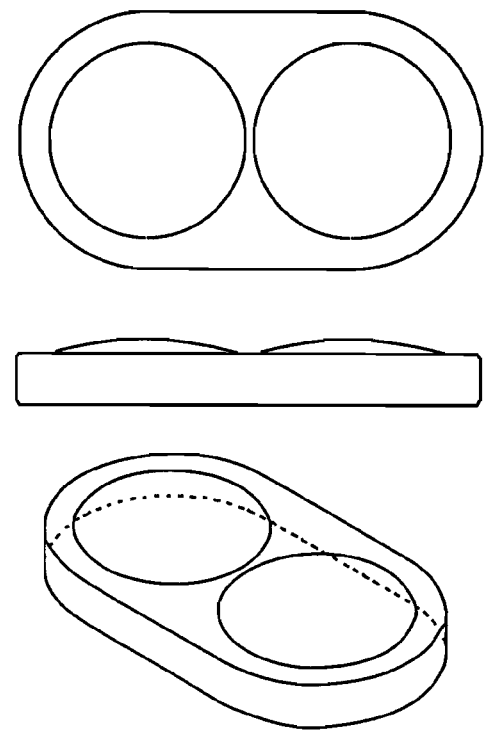
FIG. 7B is a schematic structural view showing an integrated collimator lens according to Embodiment 1 of the present invention.

The first collimator lens 5 and the second collimator lens 6 may be manufactured separately and mounted at accurate positioning on the lens holder 23. Alternatively, the first collimator lens 5 and the second collimator lens 6 may be manufactured integrally while their manufacturing and positioning steps are reduced. For example, when the first 5 and the second collimator lens 6 are shaped to such a binocular lens as shown in FIG. 7A, the distance L between them can be smaller, thus contributing to the downsizing of the optical pickup. Also, the glass material can be reduced or a gate G for injection forming, shown in FIG. 7A, may be provided at the location which is not interfered by the mounting surface of the lens holder 23. In case that the integrated collimator lens is employed, its shape may be arranged of such an oval form as shown in FIG. 7B. This oval shape will be favorable for flowing of the material at the injection step as compared with the binocular lens type of the integrated collimator lens, thus reducing the residual aberration of the lens.

Figure 32:
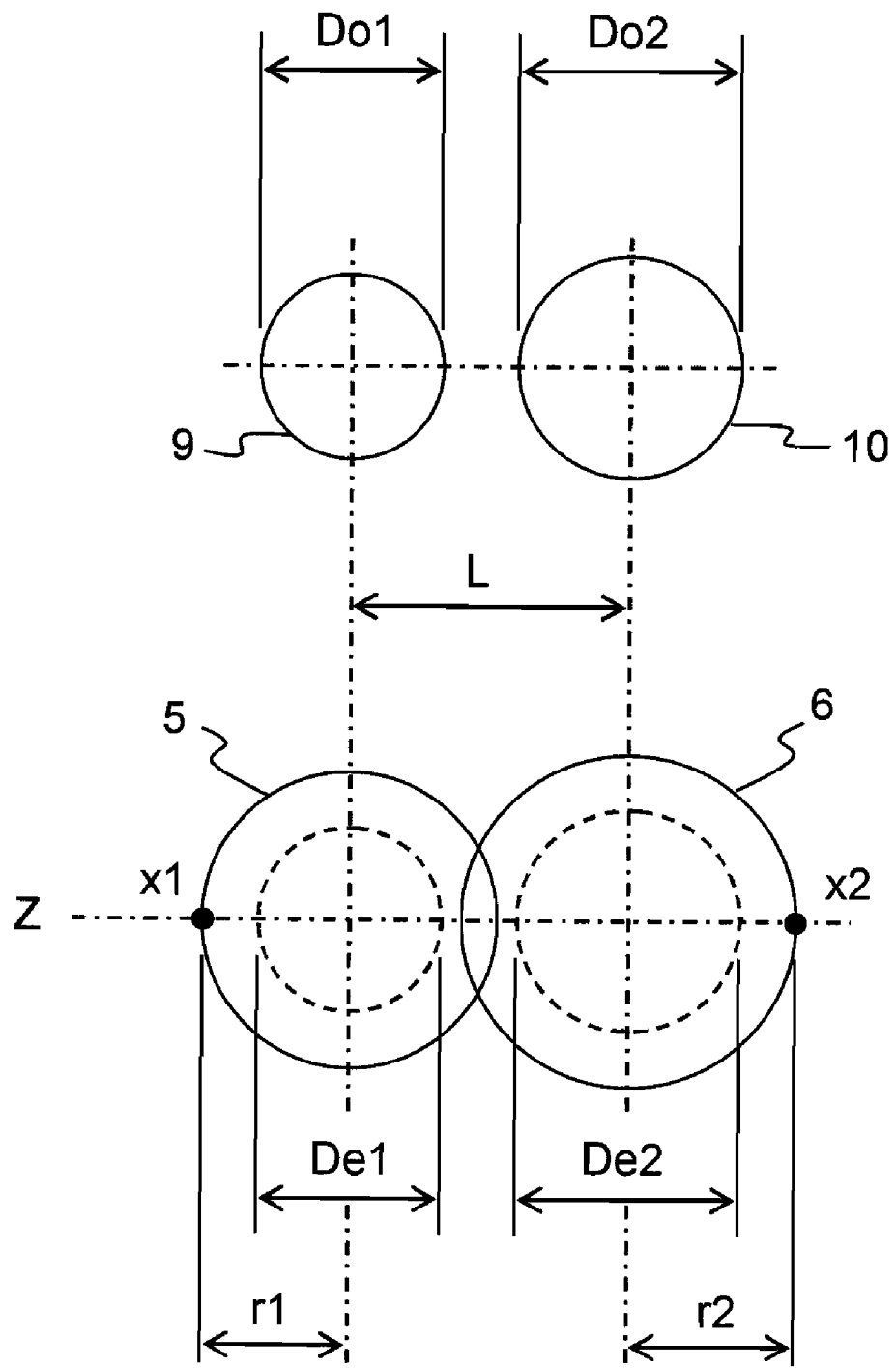
FIG. 32 is an explanatory view showing a positional relationship between the first collimator lens and the second collimator lens shown in FIG. 1.

It is assumed in this embodiment that the first laser beam and the second laser beam converted into substantially the collimated light beams by the first collimator lens 5 and the second collimator lens 6 which have been manufactured in a single unit are bent by the integrated riser mirror 7 and received by the first objective lens 9 and the second objective lens 10 respectively. This allows the distance L between the optical axis of the first collimator lens 5 and the optical axis of the second collimator lens 6 to be equal to the distance between the optical axis of the first objective lens 9 and the optical axis of the second objective lens 10 as shown in FIG. 32.

The first objective lens 9 and the second objective lens 10 have to be designed for best matching the corresponding different types of the optical disc. Accordingly, if the first objective lens 9 and the second objective lens 10 are different from each other in the glass material, they can hardly be manufactured in a single unit. Even if their glass materials are equal, since each of the two objective lenses has to be high in the aberration property and is asymmetrical about the optical axis, they will thus be manufactured in a single unit with much difficulty.

Accordingly in practice, the first objective lens 9 and the second objective lens 10 are manufactured separately. The manufacturing of the first collimator lens 5 and the second collimator lens 6 in the form of an integrated collimator lens assembly by a single molding method is conditioned, in view of the distance L between their optical axes, that the circumference of the first objective lens 9 does not overlap the circumference of the second objective lens 10. More specifically, assuming that the diameter of the first objective lens 9 is Do1 and the diameter of the second objective lens 10 is Do2, the distance L between the optical axis of the first collimator lens 5 and the optical axis of the second collimator lens 6 is satisfied if $L \geq (Do1/2)+(Do2/2)$.

The manufacturing of the collimator lenses in a single unit is conditioned that the effective diameter of the first collimator lens 5 and the effective diameter of the second collimator lens 6 does not overlap each other. The effective diameter of the collimator lens is equivalent to a diameter of a region where the aberration property of the laser beam passing action the collimator lens is ensured. More specifically, assuming that the effective diameter of the first collimator lens 5 is De1 and the effective diameter of the second collimator lens 6 is De2, the distance L between the optical axis of the first collimator lens 5 and the optical axis of the second collimator lens 6 is satisfied if $L \geq (De1/2)+(De2/2)$.

Figure 33:
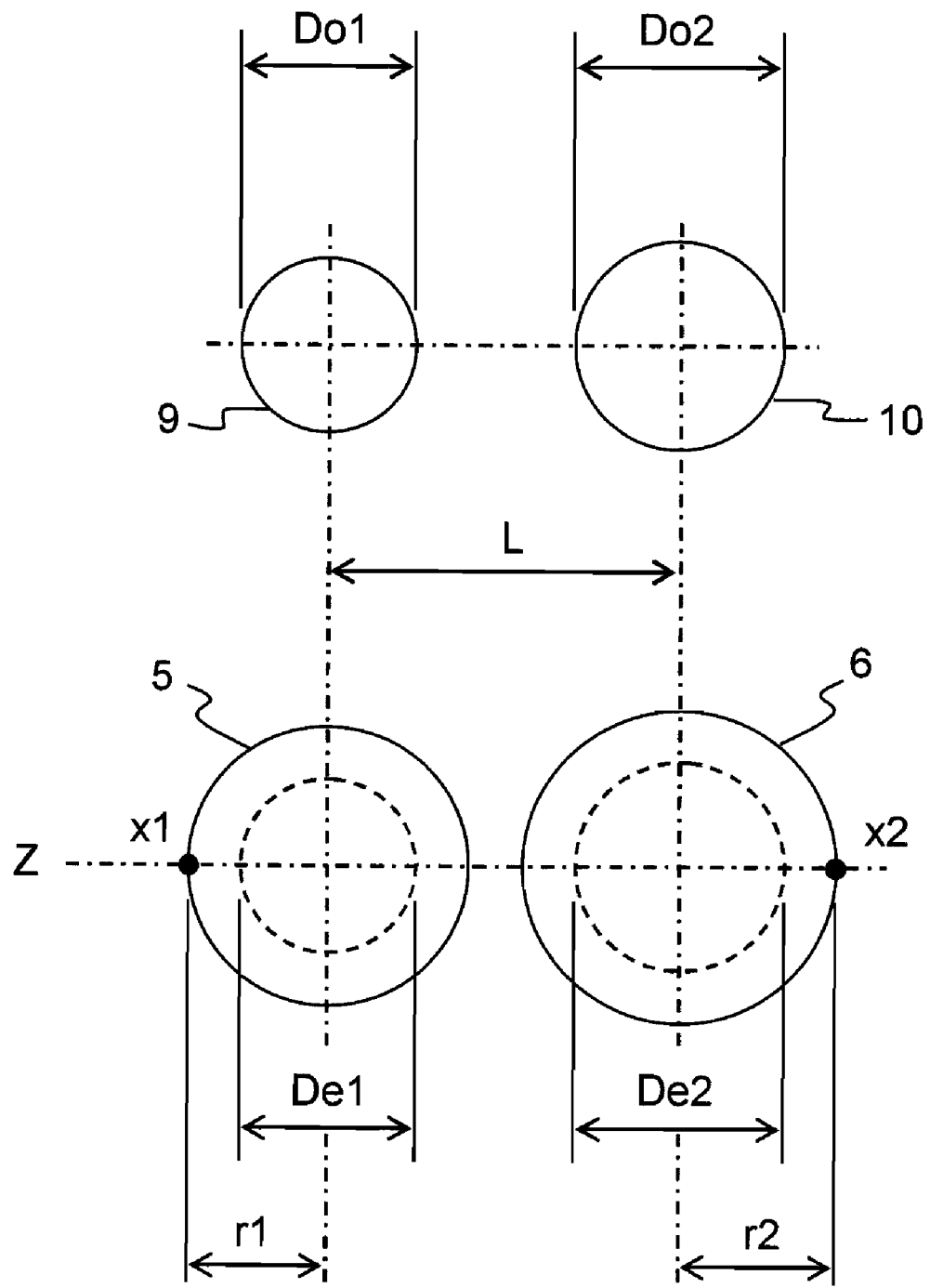
FIG. 33 is an explanatory view showing another positional relationship between the first collimator lens and the second collimator lens shown in FIG. 1.

When the distance L between the optical axis of the first collimator lens 5 and the optical axis of the second collimator lens 6 is too large as shown in FIG. 33, the advantage of the integrated collimator lens will decline. Accordingly, the integrated collimator lens may favorably be employed in this embodiment only when the distance L between the optical axis of the first collimator lens 5 and the optical axis of the second collimator lens 6 is determined by $L<(r1+r2)$ where r1 is the distance (equivalent to the radius of the first collimator lens 5) between the optical axis of the first collimator lens 5 and the point X1, and r2 is the distance (equivalent to the radius of the second collimator lens 6) between the optical axis of the second collimator lens 6 and the point X2. The point X1 is the intersection between an edge of the circumference of the first collimator lens 5 and the line Z extending between the optical axis of the first collimator lens 5 and the optical axis of the second collimator lens 6. The point X2 is the intersection between an edge of the circumference of the second collimator lens 6 and the line Z.

Figure 34:
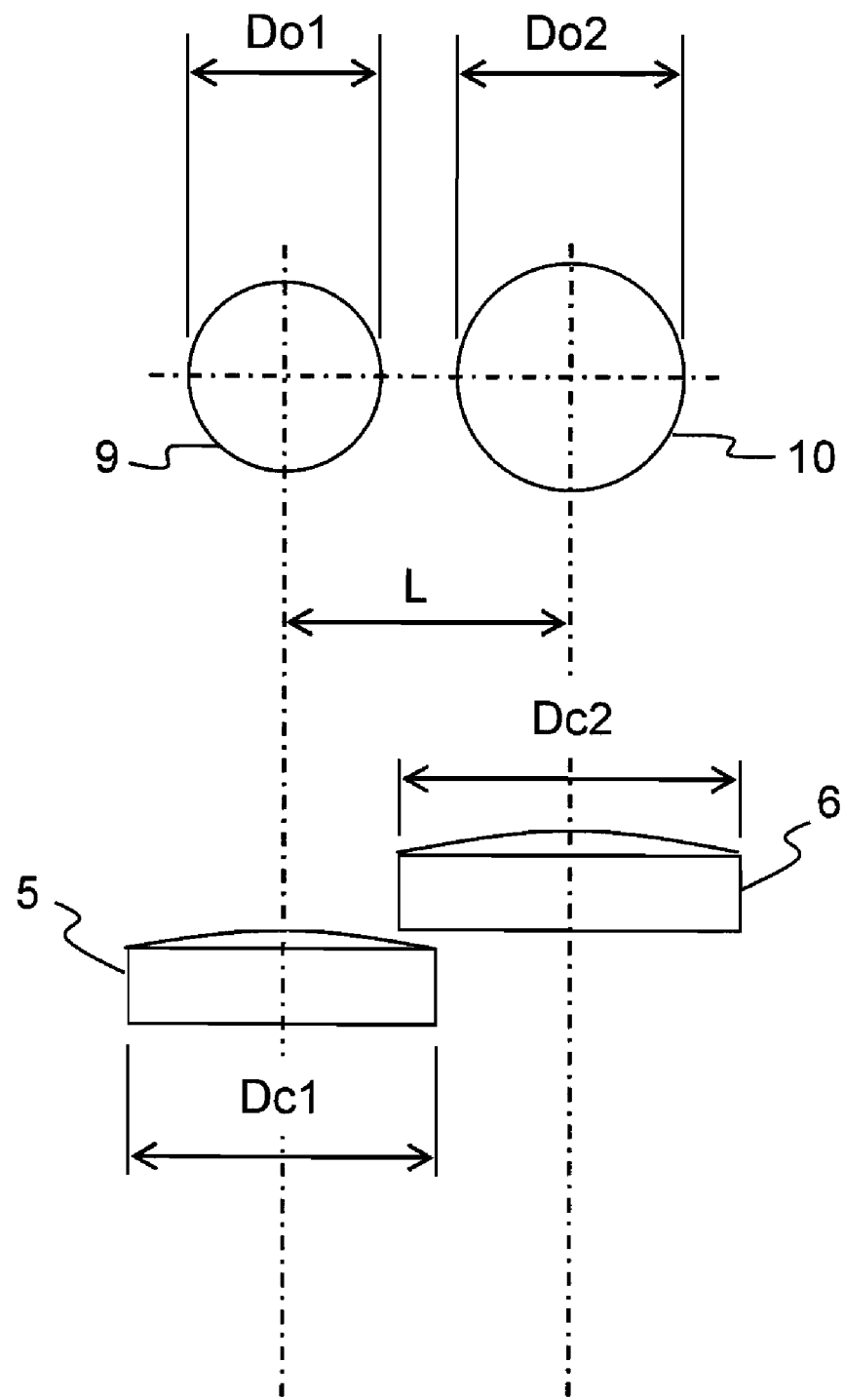
FIG. 34 is an explanatory view showing a further positional relationship between the first collimator lens and the second collimator lens shown in FIG. 1.

Alternatively, the first collimator lens 5 and the second collimator lens 6 may be located as dislocated from each other along their optical axes, as shown in FIG. 34, when the distance L between the optical axis of the first collimator lens 5 and the optical axis of the second collimator lens 6 is determined by $L<(Dc1/2)+(Dc2/2)$ where Dc1 is the diameter of the first collimator lens 5 and Dc2 is the diameter of the second collimator lens 6. This will reduce the distance L, thus contributing to the down sizing of the optical pickup.

Some modifications of the optical pickup of Embodiment 1 will now be described with reference to FIGS. 8 to 13.

Figure 8:
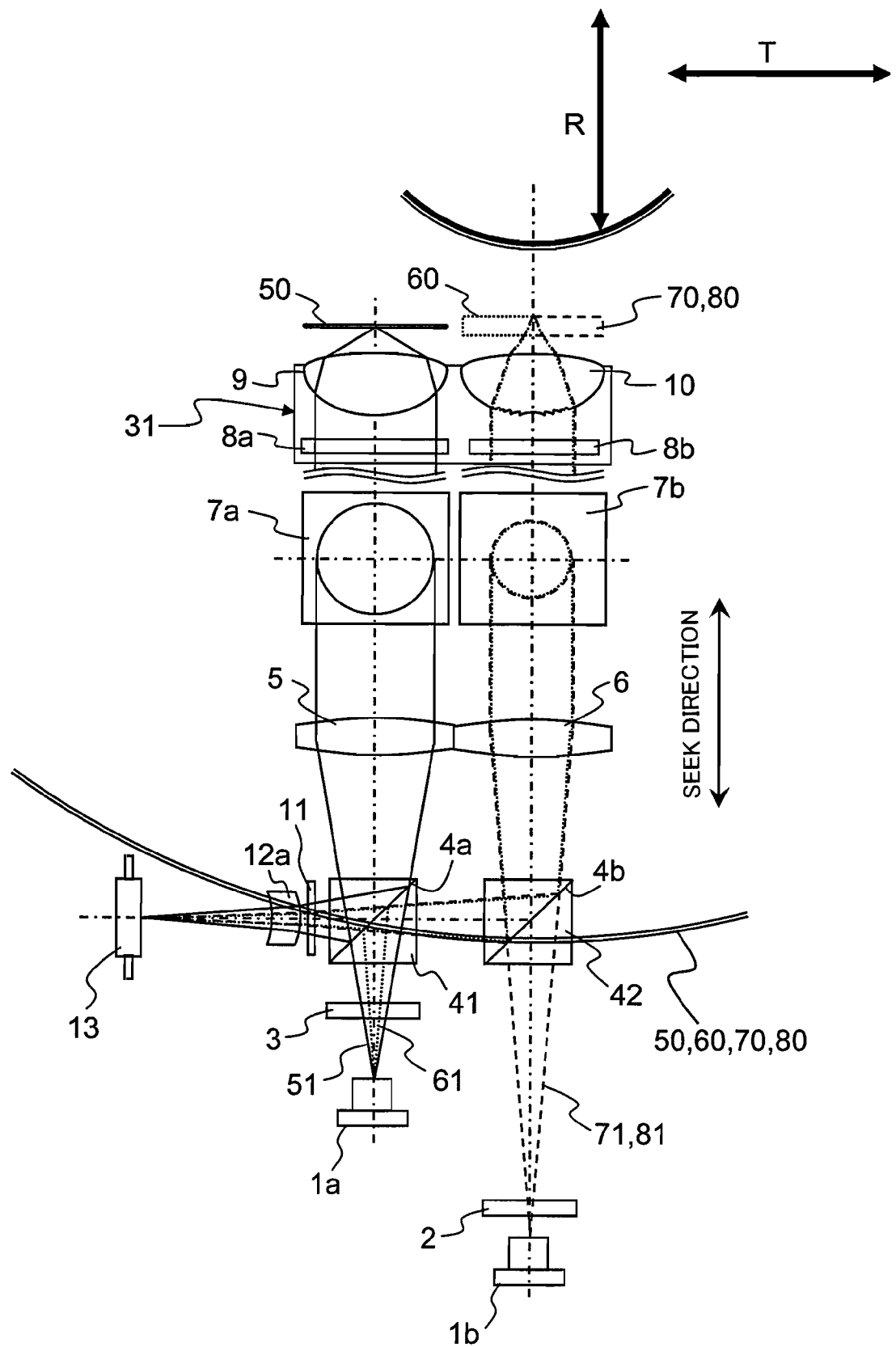
FIG. 8 is a schematic structural view showing a structure of the optical pickup according to Embodiment 1 of the present invention.

FIG. 8 illustrates a first prism 41 and a second prism 42 which have single optical surfaces respectively of the same function and act as the first optical surface 4a and the second optical surface 4b respectively of the multi-surface prism 4 shown in FIGS. 1 to 3.

In this modification, the optical surface 4a of the first prism 41 and the optical surface 4b of the second prism 42 are arranged separately adjustable at the angle so as to align the advancing path with the returning path along their optical axes at more accuracy, hence contributing to the higher performance of the optical pickup. If the multi-surface prism 4 shown in FIGS. 1 to 3 is employed, the two reflective surfaces 4a, 4b may be designed at a higher degree of parallelism, whereby the adjustment of the angle of the prism can be eased or eliminated. Also in FIG. 8, the integrated riser mirror 7 shown in FIGS. 1 to 3 is configured by a first riser mirror 7a and a second riser mirror 7b. If the integrated riser mirror 7 shown in FIGS. 1 to 3 is employed, the two reflective surfaces are implemented by a single unit, thus contributing to the down sizing of the optical pickup. Meanwhile, when the two separate riser mirrors 7a, 7b are employed, the second riser mirror 7b has to have discrete reflective surfaces for reflecting three different wavelengths of the blue-violet light, the red light, and the infrared light of the laser beam. The first riser mirror 7a is, however, arranged simply for reflecting the wavelength of the blue-violet light, an area of the coating for reflecting the three different wavelength of the laser beam which is manufactured with much difficulty can be reduced.

Figure 9:
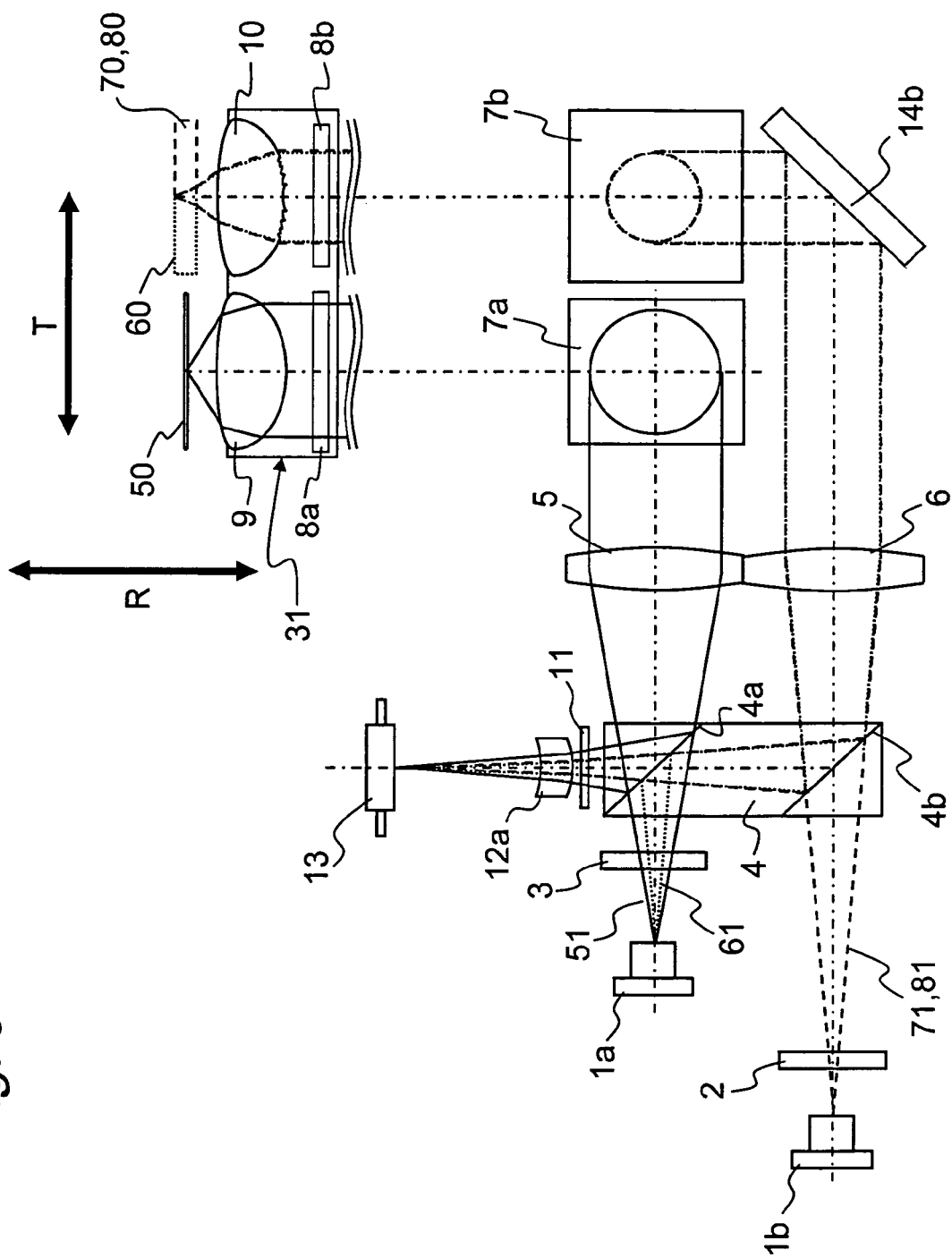
FIG. 9 is a schematic structural view showing a structure of the optical pickup according to Embodiment 1 of the present invention.

FIG. 9 illustrates a second bending mirror 14b provided in the optical path between the second collimator lens 6 and the second objective lens 10 while the optical axes of the first collimator lens 5 and the second collimator lens 6 are arranged to extend in the tangential directions. In this modification, the overall size of the optical pickup can be reduced along the radial direction, thus contributing to the down sizing of the optical disc apparatus installed in the optical pickup.

Figure 10:
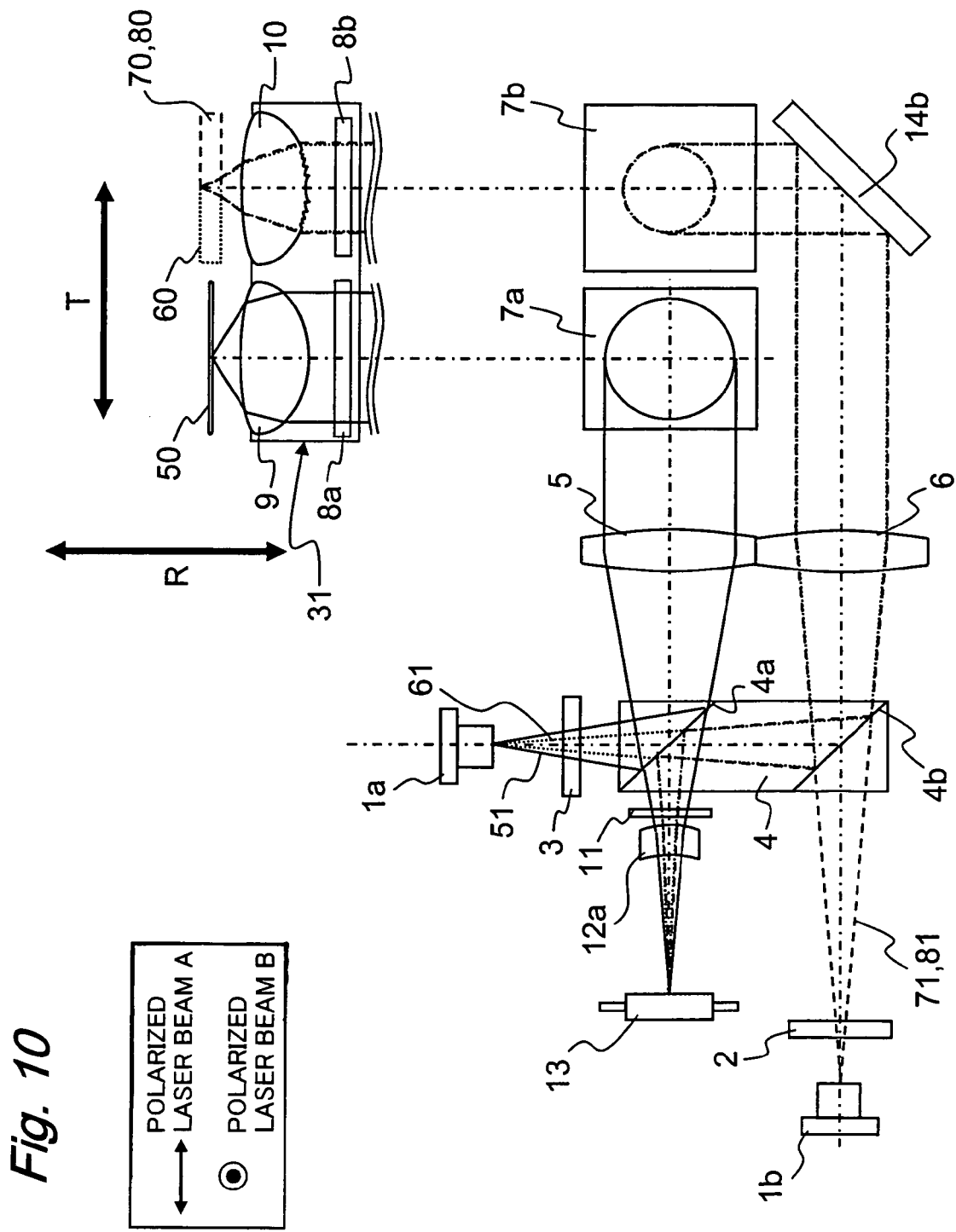
FIG. 10 is a schematic structural view showing a structure of the optical pickup according to Embodiment 1 of the present invention.

FIG. 10 illustrates a structure where the light source 1a and the integrated optical detector 13 shown in FIG. 9 are reversed in the location. Accordingly, the polarization converter 3, the detection diffraction grating 11, and the first detection lens 12a are also placed in different locations. In the modification shown in FIG. 9, the first light source 1a and the second light source 1b are located close to each other thus to minimize the distance in electric circuit from a laser driver IC for driving the semiconductor lasers in the light sources 1a, 1b, hence permitting the driving signal to be received by the semiconductor lasers quickly and accurately. In the modification shown in FIG. 10, the light source 1a which is a heat generating part is disposed just beneath the optical disc to be recorded or played back and can thus be cooled down effectively by a flow of ambient air generated by the rotation of the optical disc.

The optical surface 4a is commonly formed with an optical coating having a polarized light splitting property. When the optical coating is exposed to the blue-violet light at higher intensity of the laser beam for more than a period of time, its optical properties including the light transmittance of the optical coating and the wavefront aberration will decline. Even if the incident light is at higher intensity, the reflection is involved at the optical surface 4a thus preventing the optical surface from declining in the optical properties. Moreover, when the incident light is low in the intensity, for example, during the playback action, the optical properties may hardly be declined by the transmission of the light. Accordingly, it is preferable in the modification shown in FIG. 10 that the first optical disc 50 is to be recorded or played back using the blue-violet laser beam 51 while the second optical disc 60 is to be played back using the blue-violet laser beam 61. This will prevent the optical surface 4a from receiving the laser beam at higher intensity during the recording action of the first optical disc 50.

Figure 11:
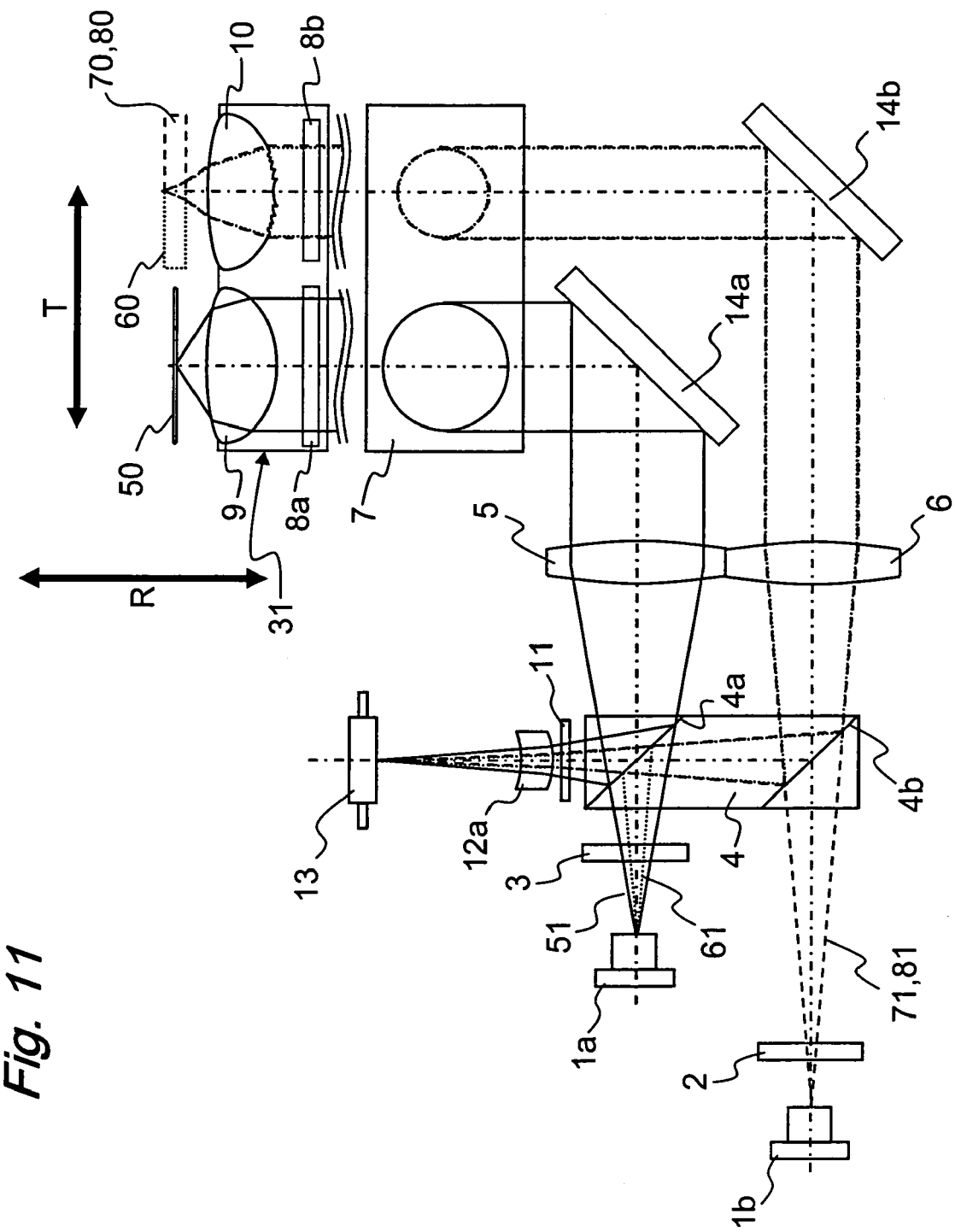
FIG. 11 is a schematic structural view showing a structure of the optical pickup according to Embodiment 1 of the present invention.

FIG. 11 illustrates a first bending mirror 14a provided in the optical path between the first collimator lens 5 and the first objective lens 9 in addition to the arrangement shown in FIG. 9. In this modification, the optical axes of the first and second collimator lenses 5, 6 are arranged to extend in tangential directions, thus reducing the size along the radial direction of the optical pickup. With the integrated riser mirror 7 employed as a riser mirror, the optical pickup can further be decreased in the overall size.

Figure 12:
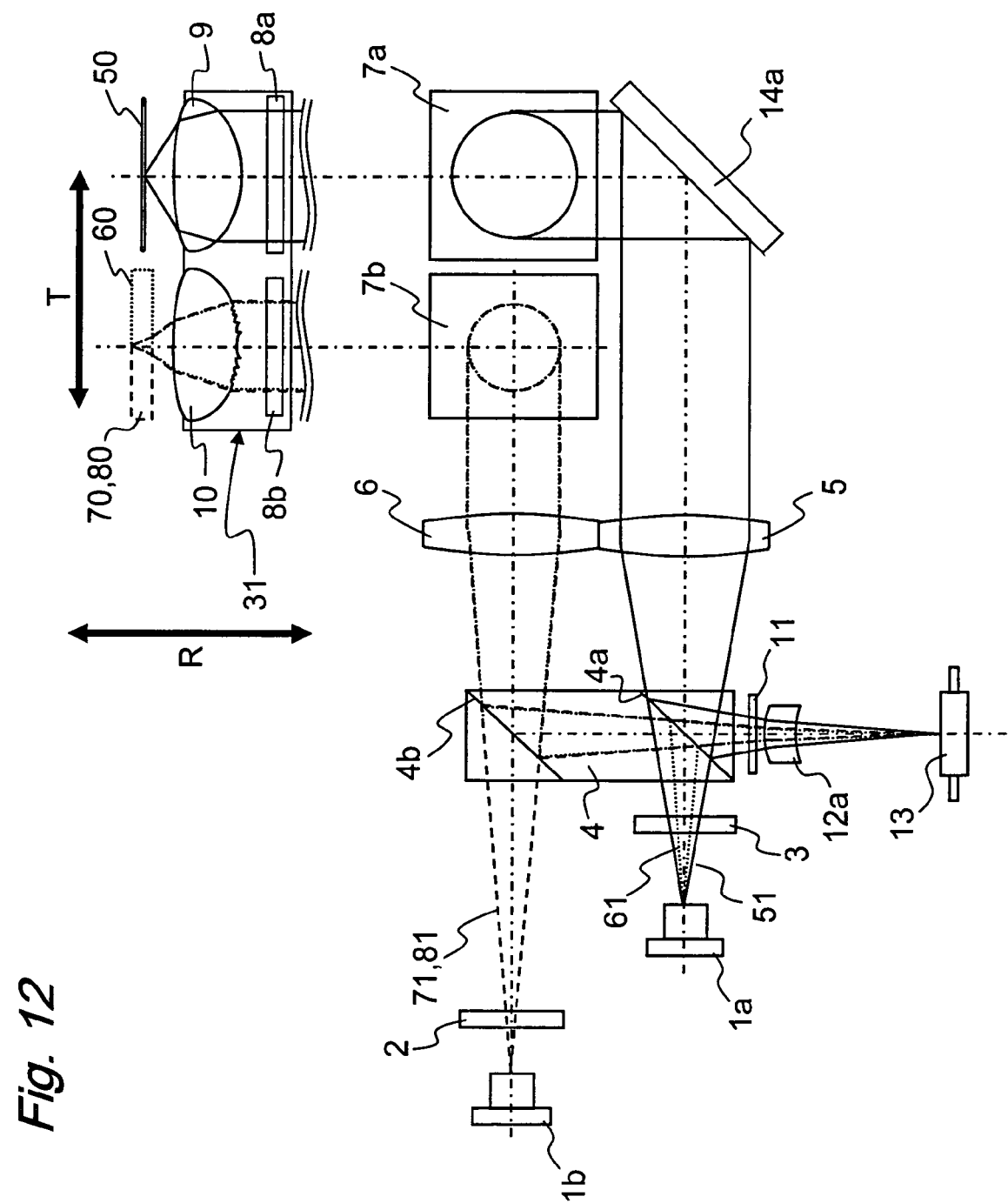
FIG. 12 is a schematic structural view showing a structure of the optical pickup according to Embodiment 1 of the present invention.

FIG. 12 illustrates where the optical axis of the first collimator lens 5 and the optical axis of the second collimator lens 6 are reversed at the location in the arrangement shown in FIG. 9. In response, the other components along each optical axis are placed in corresponding locations. In this modification, the two light sources 1a, 1b and the optical detector 13 all in the optical pickup are arranged to face the outer edge of the optical disc. This allows the two light sources 1a, 1b and the optical detector 13 to be adjustably positioned at ease with the optical disc being rotated.

Further modifications may be made as described below.

Figure 35:
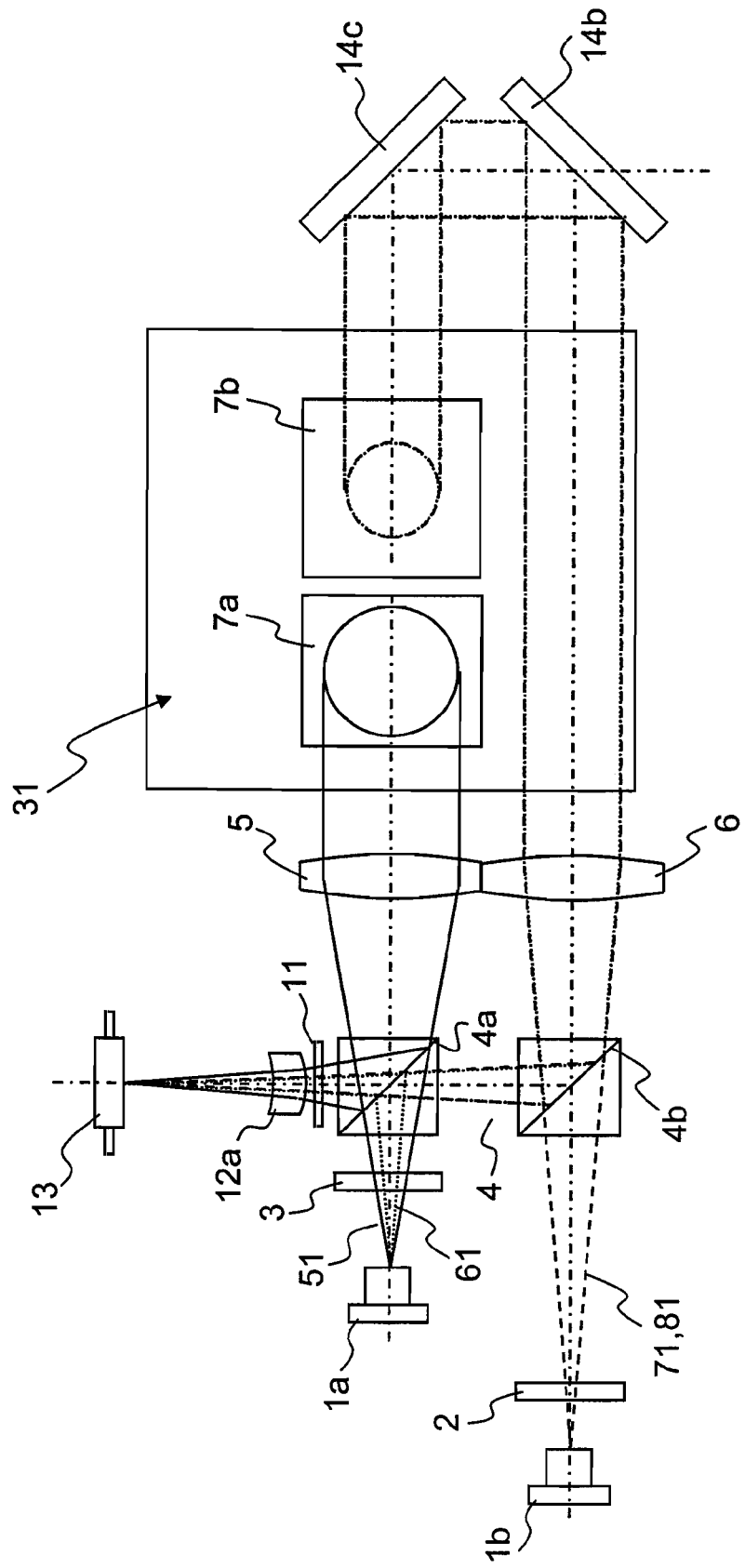
FIG. 35 is a schematic structural view showing a modification of the optical pickup according to Embodiment 1 of the present invention.

FIG. 35 illustrates a further bending mirror 14c provided in the arrangement shown in FIG. 9 for substantially aligning the light axis entering the riser mirror 7b with the optical axis of the laser beam incident on the riser mirror 7a. In this modification, the two bending mirrors 7a, 7b are arranged one behind the other, thus allowing their arrangement to be simplified or implemented by a single riser prism assembly (not shown) which has two riser mirror surfaces 7a, 7b thus for reducing the number of the components.

Figure 36:
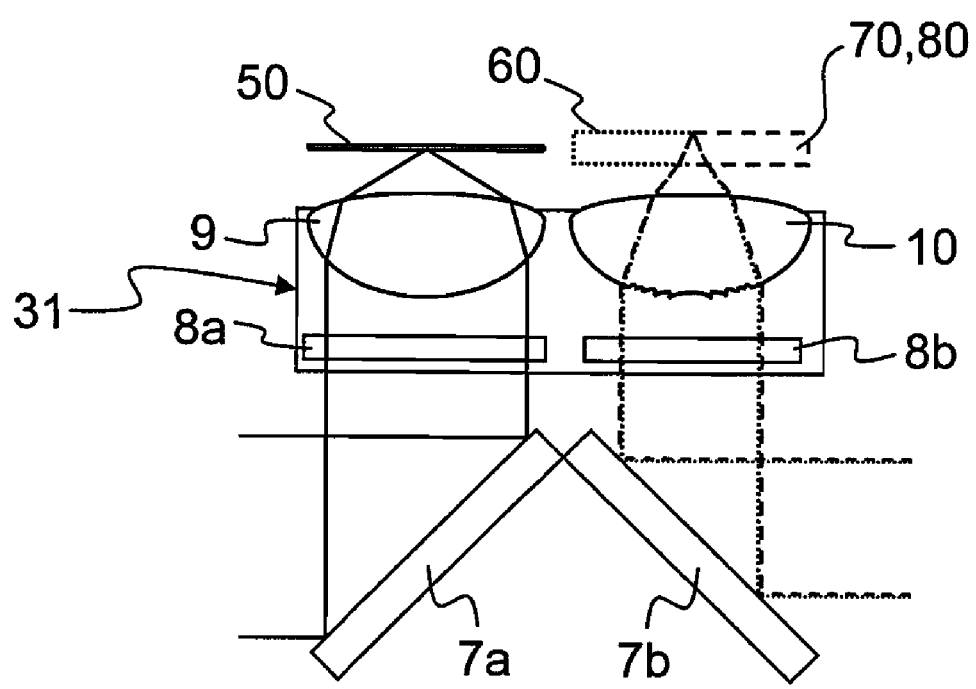
FIG. 36 is a schematic view of the objective lens actuator in the arrangement shown in FIG. 35.

Also in this modification, the light path across the collimator lens 6 overlaps the objective lens actuator 31 in the plane of the drawing. However, the objective lens actuator 31 is dislocated along the height direction of the optical pickup or the thicknesswise direction of the optical disc as shown in FIG. 36. This construction shown in FIG. 35 has the advantage when the thickness of the optical pickup has some margin.

Figure 37:
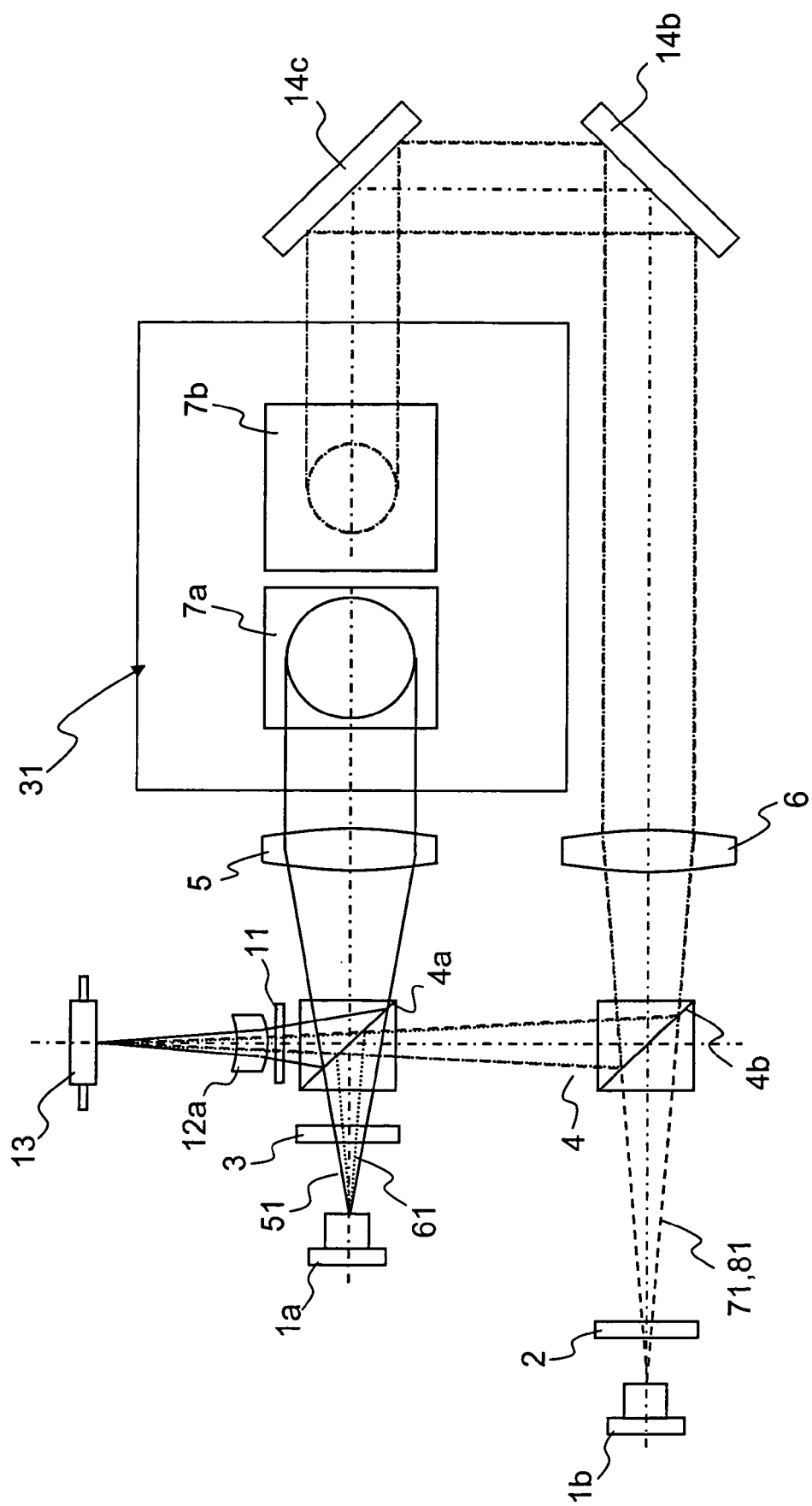
FIG. 37 is a schematic structural view showing a modification of the optical pickup according to Embodiment 1 of the present invention.

FIG. 37 illustrates the optical axes of the two collimator lenses 5, 6 distanced from each other by a desirable length. This allows the light path to extend off the objective lens actuator 31 in the plan view, thus ensuring an advantageous feature for the thinning of the optical pickup.

Figure 38:
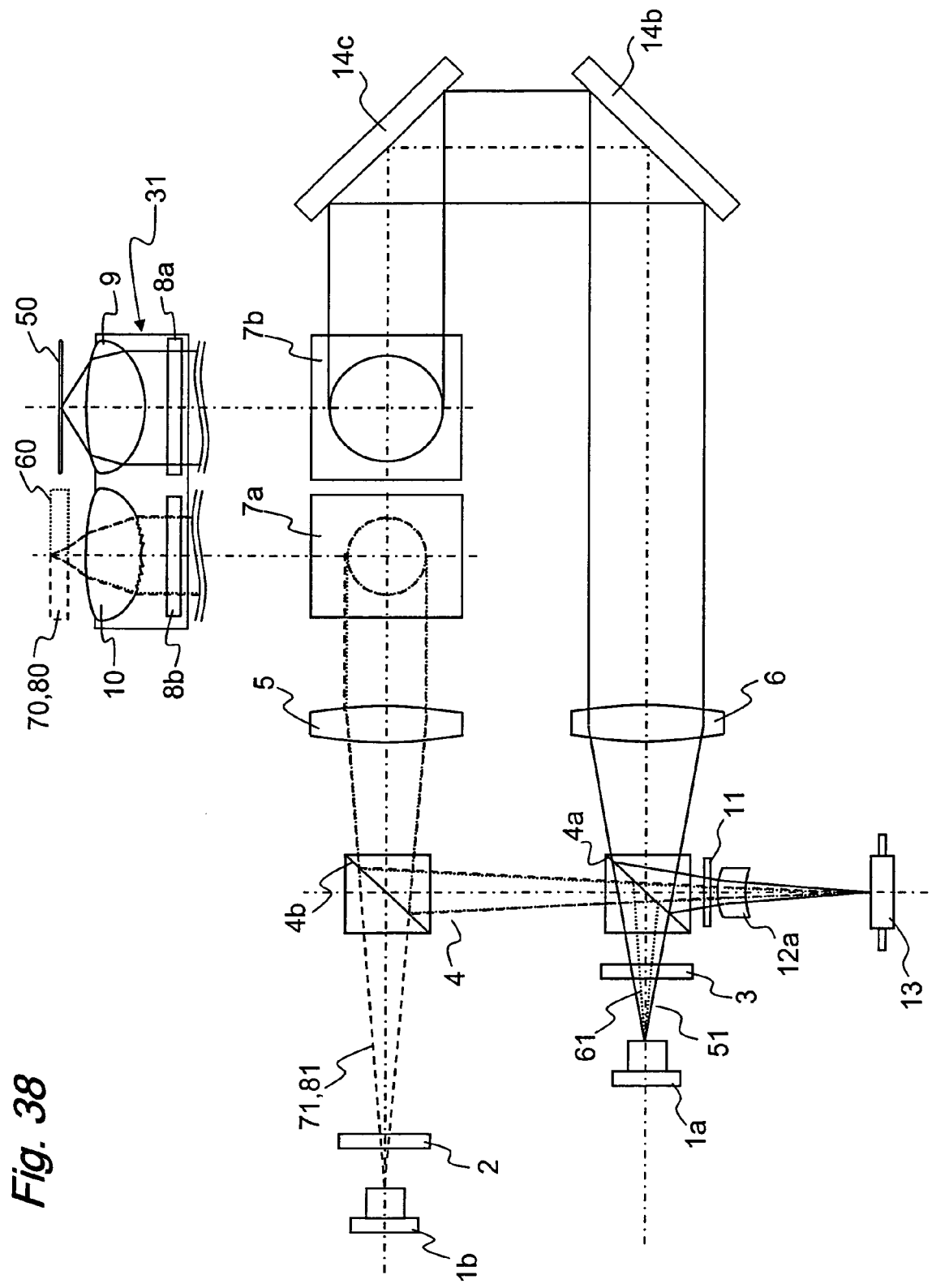
FIG. 38 is a schematic structural view showing a modification of the optical pickup according to Embodiment 1 of the present invention.
Figure 39:
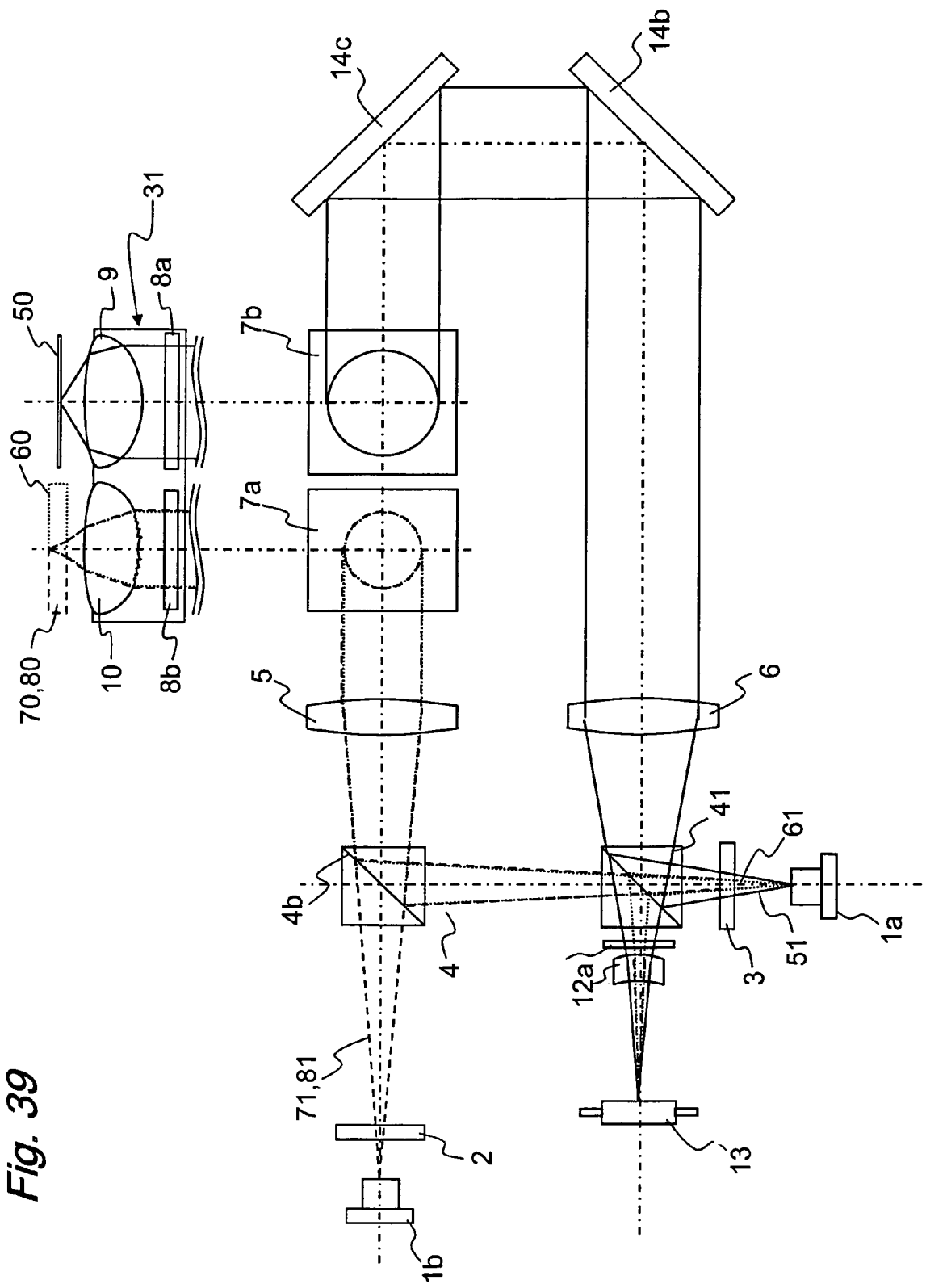
FIG. 39 is a schematic structural view showing a modification of the optical pickup according to Embodiment 1 of the present invention.

Modifications shown in FIGS. 38 and 39 are identical to the arrangement shown in FIG. 37 except that the light sources 1a, 1b and the optical detector 13 are placed at different locations, so that the same effects as described can be provided.

Figure 40:
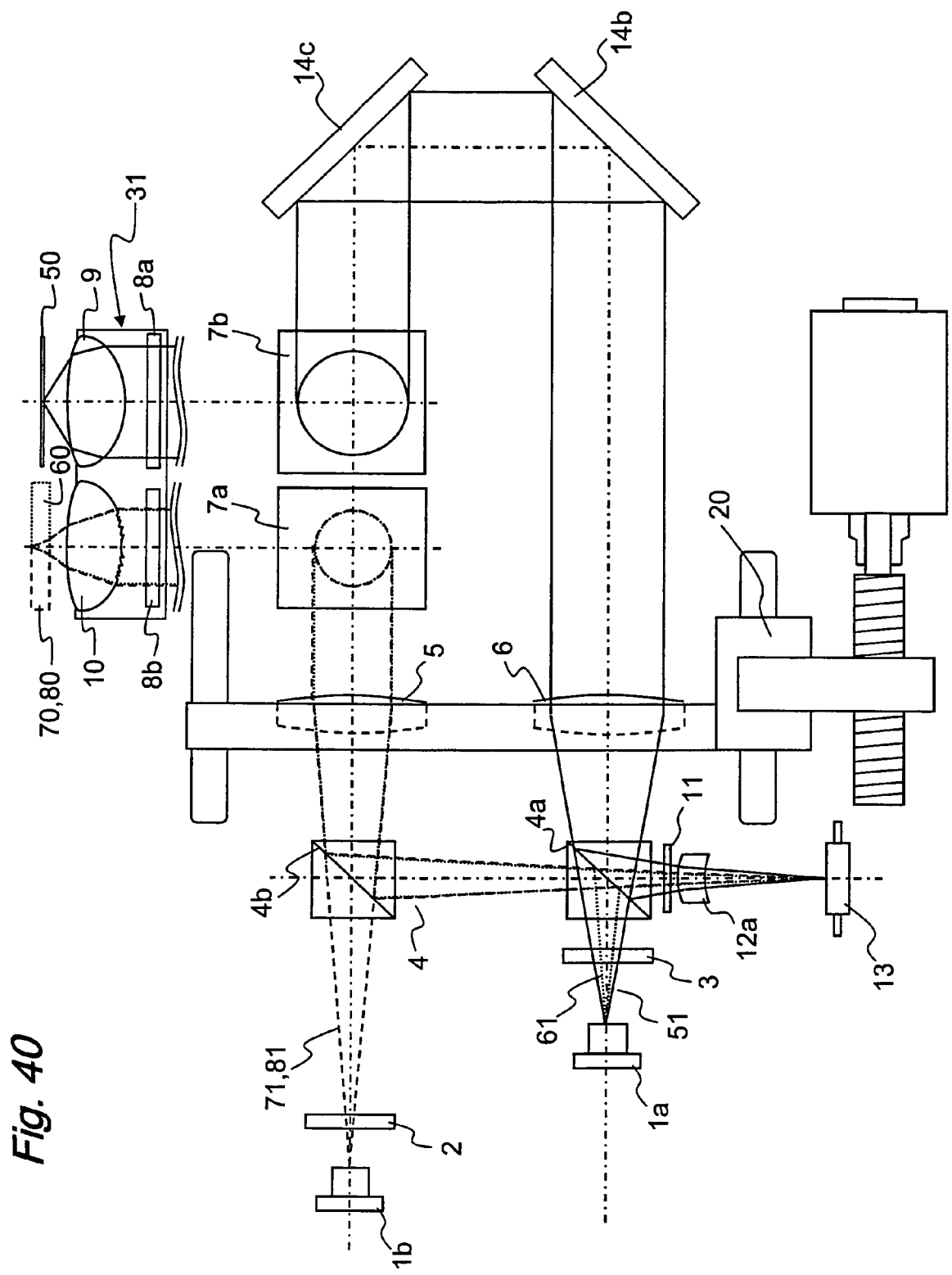
FIG. 40 is a schematic view of the two collimator lenses located separately, as shown in FIGS. 37 to 39, but moved at once.

As shown in FIG. 40, the collimator lens actuator 20 may be modified for simultaneously moving the two collimator lenses 5, 6 of which the optical axes are desirably distanced from each other.

Figure 13:
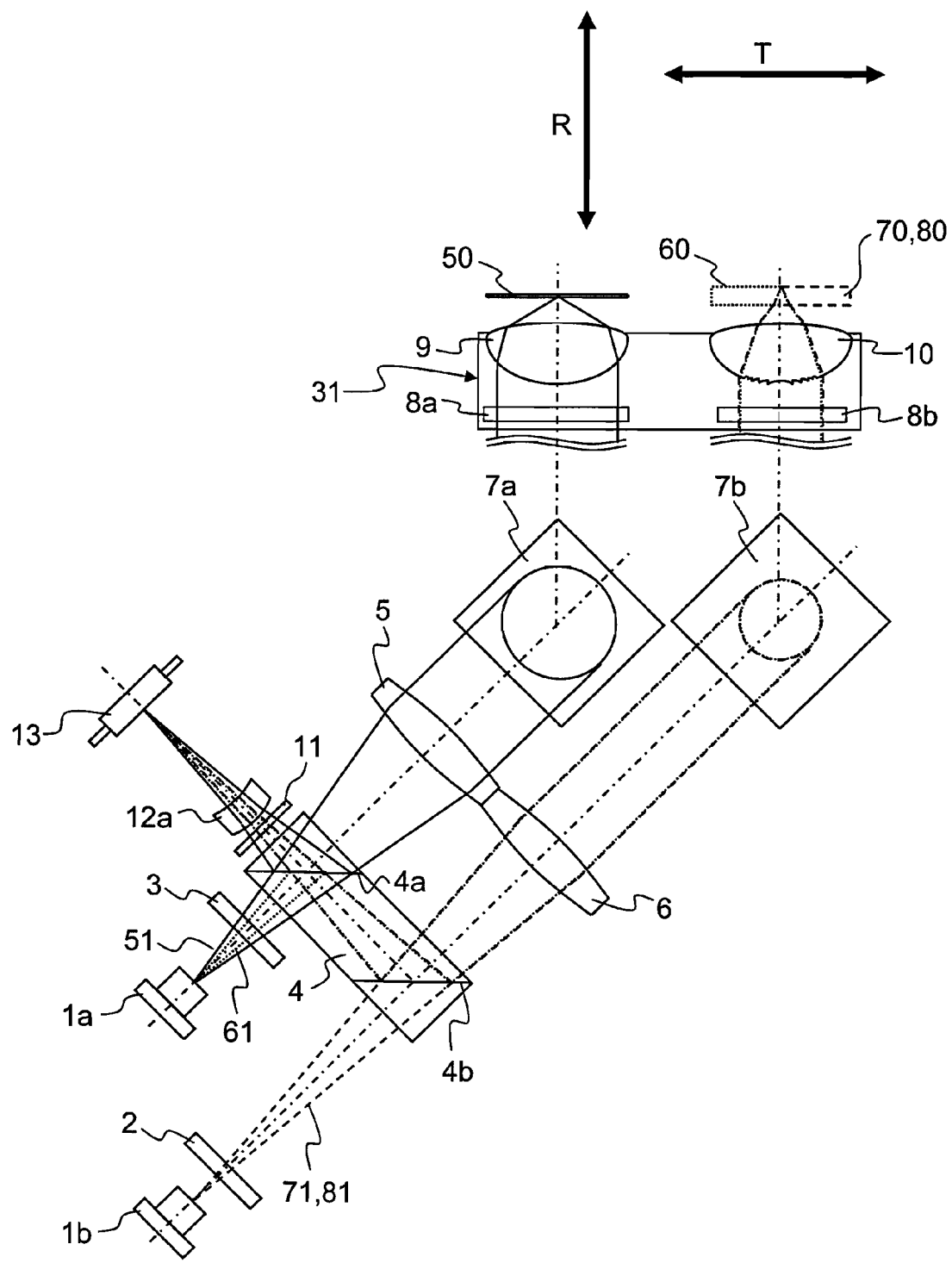
FIG. 13 is a schematic structural view showing a structure of the optical pickup according to Embodiment 1 of the present invention.
Figure 14A:
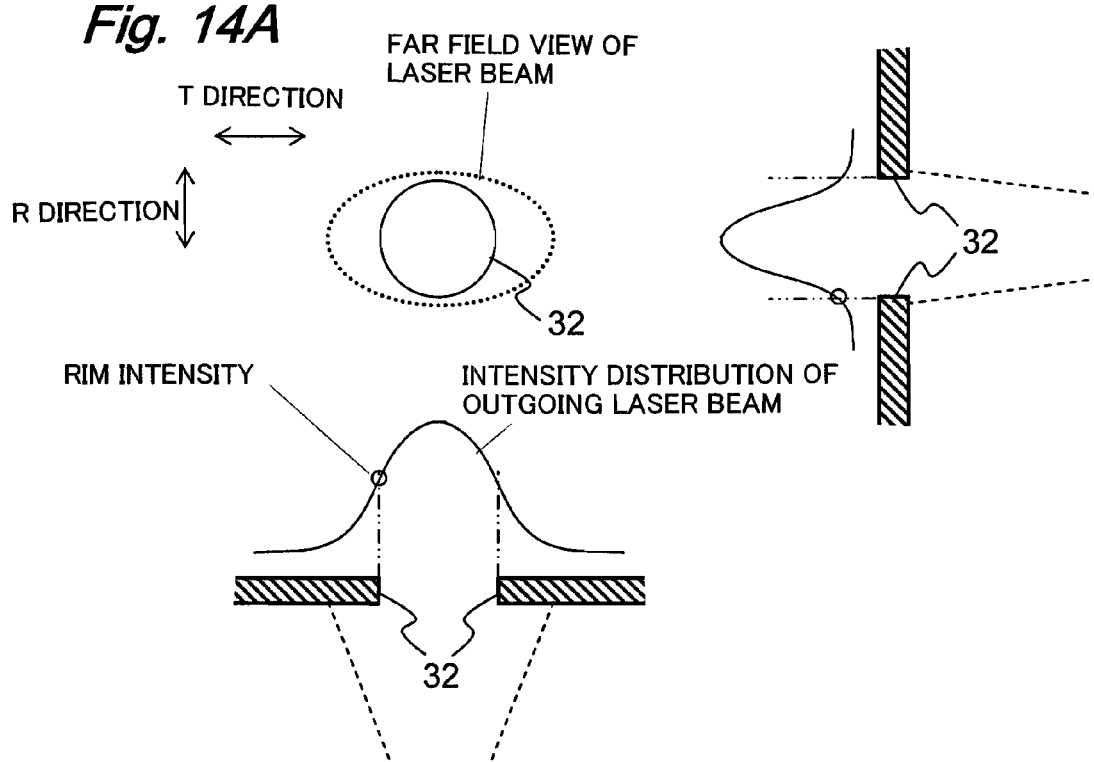
FIG. 14A is a schematic view showing a relationship between the RIM intensity and the intensity distribution in a far view image of the laser beam.

FIG. 13 illustrates the optical axes of the first collimator lens 5 and the second collimator lens 6 in the arrangement shown in FIG. 9 tilted at substantially 45 degrees to the radial direction of the optical disc. In general, the distribution of intensity at a far-field pattern of the laser beam emitted from a semiconductor laser exhibits an oval shape of which the minor axis aligns with the direction of linear polarization. In a common optical pickup, the optical system like that of this embodiment is arranged for splitting the light path with the use of the direction of linear polarization of the light beam. For optimizing the splitting effect with the linear polarization, the direction of polarization of the laser beam received by the beam splitter is preferably aligned with the radial direction R or the tangential direction T of the optical disc. FIG. 14A illustrates a distribution of the intensity of the laser beam released from the objective lens in this modification.

Figure 14B:
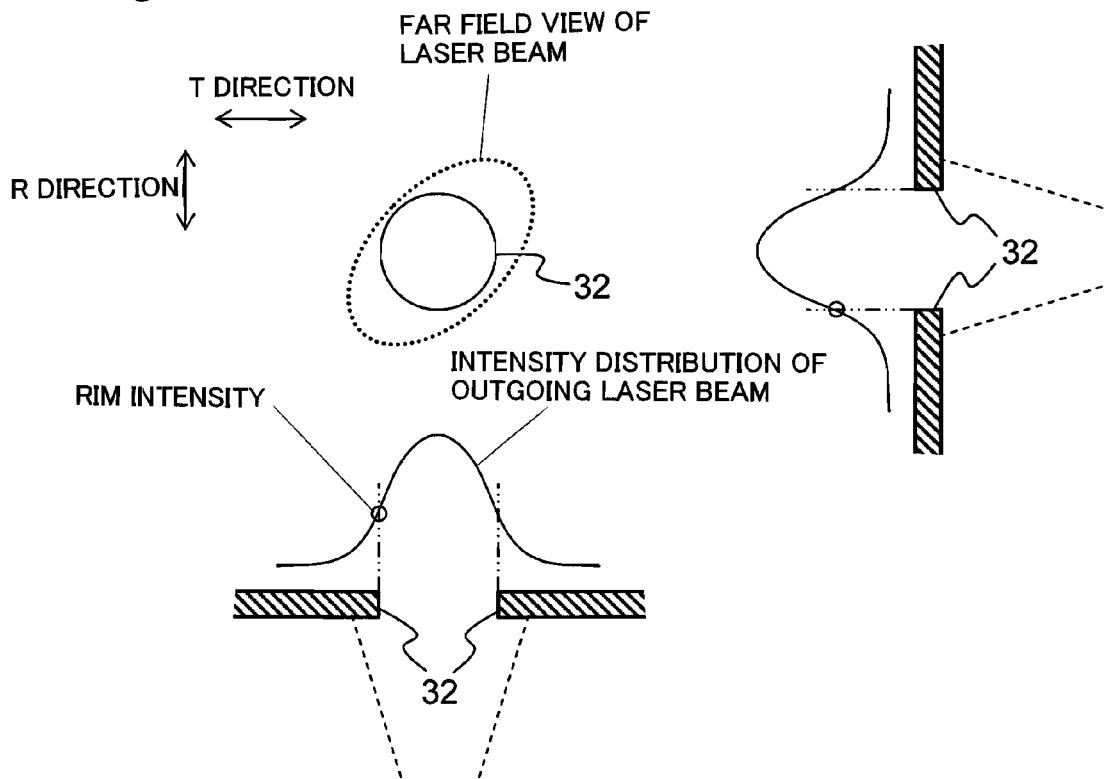
FIG. 14B is a schematic view showing a relationship between the RIM intensity and the intensity distribution in a far view image of the laser beam.

Denoted by 32 is an aperture provided in the objective lens actuator 31. For passing the laser beam at an oval intensity distribution through the aperture 32 of substantially a circle shape, the RIM intensity (a ratio of the maximum intensity to the pupil edge intensity at the output of the objective lens) of the laser beam after passing the aperture 32 is set different between the direction R and the direction T. The optical axes are then tilted at 45 degrees as shown in FIG. 13 for reducing the difference in the RIM intensity between the two directions. FIG. 14B illustrates a distribution of the intensity of the laser beam released from the objective lens in this modification. As the far field pattern of the laser beam is turned to 45 degrees in the aperture 32, the difference in the RIM intensity between the two directions R and T is favorably decreased. Accordingly, the spot of the laser beam produced on the information recording surface of the optical disc appears higher in the roundness than that of the modification shown in FIG. 14A, hence contributing to the improvement of the performance during the action of recording or playing back the optical disc.

In the modification shown in FIG. 13, the direction of the polarization of the laser beam received by the beam splitter such as the multi-surface prism 4 is equal to those shown in FIGS. 1 to 3, thus ensuring the splitting of the light path at optimum due to the polarization.

As explained roughly but not precisely, a beam shaper element (which has, for example, two cylindrical surfaces or non-cylindrical surfaces) may be employed for shifting the distribution of the intensity at the far field pattern of the laser beam from an oval shape to a round shape. This can also reduce the RIM intensity along the directions R and T of the laser beam passing through the aperture 32 even if the optical axes of the collimator lenses are aligned with the radial direction R or the tangential direction T as shown in FIGS. 1 to 3. For example, the beam shaper element may be disposed between the light source 1a and the polarization converter 3 in the arrangement shown in FIG. 12. Since the efficiency of use of the laser beam emitted from its light source is increased by the action of the beam shaper element, the optical pickup can respond to the recording action or the playback action at high speeds on the optical disc and reduce the power consumption due to the higher efficiency of use of the laser beam emitted from the light source.

As explained roughly but not precisely, the light source itself may be turned to substantially 45 degrees about the optical axis so as to have the distribution of the intensity at a far-field pattern of the laser beam turned to 45 degrees just after the emission from the light source. In addition, a relevant element such as a half-waveplate is provided across the optical path for determining a desired direction of the polarization, whereby the same effect as of the modification shown in FIG. 13 will be ensured. In this modification, the optical axes of the collimator lenses need not to be tilted to substantially 45 degrees unlike the modification shown in FIG. 13, thus allowing the optical pickup to be reduced in the size along the radial direction.

In this modification, the first optical surface 4a of the multi-surface prism 4 is designed for transmitting almost entirely the polarized laser beam A of the blue-violet laser beam while reflecting almost entirely the polarized laser beam B. When the polarized laser beam A and the polarized laser beam B are of the P polarization light and the S polarization light respectively, the polarized light splitting surfaces can be prepared at a simpler arrangement and with much ease. For the equal reason, the optical surface 4b of the polarized light splitting property for the red laser beam or the infrared laser beam may be prepared simply and easily when the polarized laser beam A to be transmitted almost entirely and the polarized laser beam B to be reflected almost entirely are of the P polarization light and the S polarization light respectively. Alternatively, in case that the laser beam is partially transmitted through for the purpose of monitoring the emission of the light source while reflected mostly by the polarized light splitting layer, the two optical surfaces 4a, 4b may be arranged to reflect the P polarized light and transmit the S polarized light. This modification for monitoring the emission quantity of the laser beam by transmitting a portion of the P polarized light will be easier in the polarized light splitting layer construction than the others.

The arrangement for monitoring the emission quantity of the laser beam from the light source will be described later in more detail in conjunction with Embodiment 9.

For performing the recording action and the playback action on any of the first optical disc 50, the second optical disc 60, the DVD 70, and the CD 80, the present invention is not limited to the objective lens arrangement of Embodiment 1 where the first objective lens 9 is used for performing the recording action or the playback action on the first optical disc 50 while the second objective lens 10 is used for performing the recording or the playback action on each of the second optical disc 60, the DVD 70, and the CD 80. The present invention is equally applicable to, for example, an arrangement where the recording action and the playback action on the first optical disc 50 and the CD 80 are performed through the first objective lens 9 while those on the second optical disc 60 and the DVD 70 are performed through the second objective lens 10 or another arrangement where the recording action and the playback action on the first optical disc 50 and the DVD 70 are performed through the first objective lens 9 while those on the second optical disc 60 and the CD 80 are performed through the second objective lens 10. In brief, the first optical disc 50 and the second optical disc 60 are assigned to their respective objective lenses for performing the recording and playback actions. In this modification, their relevant optical components such as the reflective coating at the optical surfaces are arranged to match the wavelengths of the laser beam emitted from each light source.

Although the two different wavelengths of the laser beams emitted from the light source 1b are of the red color laser beam and the infrared laser beam respectively in Embodiment 1, they may be emitted from a red laser light source and an infrared laser light source separately. When the two, red laser and infrared laser, light sources of a single wavelength are provided separately, their cost will be declined significantly. Also, there may separately be provided a pair of light sources for emitting a blue-violet laser beam at high power to be used for performing either the recording action or the playback action on the first optical disc 50 and for emitting a blue-violet laser beam at low power to be used for performing only the playback action on the second optical disc 60.

Moreover while the light source 1a and the light source 1b in Embodiment 1 are provided separately, they may be combined to a single unit for emitting the first to third laser beams.

Throughout the modifications shown in FIGS. 8 to 13, the two collimator lenses may be driven separately or at once by a modified arrangement of the collimator lens actuator. In this case, the first collimator lens 5 and the second collimator lens 6 may be implemented separately or combined to an integrated unit with equal advantage.

The two objective lenses in this embodiment are arranged along the tangential direction. This allows the optical pickup to hardly strike against the spindle motor during the action of accessing the innermost end of the optical disc with the use of any of the two objective lenses. Its optical system having the objective lenses disposed along the radial line (known as a seek center line) which extends across the center of the optical disc may hence utilize the three-beam technique (or the DPP technique) with ease for producing the tracking control signal. If the objective lenses in the optical system are arranged not along the seek center line, the one-beam technique may be employed for generation of the tracking control signal as will be described in no mode detail.

The optical disc such as the DVD 70 has a rib, called a stack ring, at a thickness of some hundreds micrometers provided on the inner edge (at the outside of the clamp region) thereof for preventing the optical discs in a stack from coming into direct contact with one another at their light incident surfaces.

Since the first objective lens 10a is greater in the numerical aperture NA than the second objective lens 10b, the focal distance of the first objective lens 10a remains short and its working distance WD from the optical disc also becomes short. Accordingly, if the first objective lens 10a is located at the inner side of the optical disc than the second objective lens 10b, it may be disturbed by the stack ring against the first objective lens 10a during the action of the second objective lens 10b for accessing the innermost end of the optical disc to record and play back data on optical disc.

Figure 60:
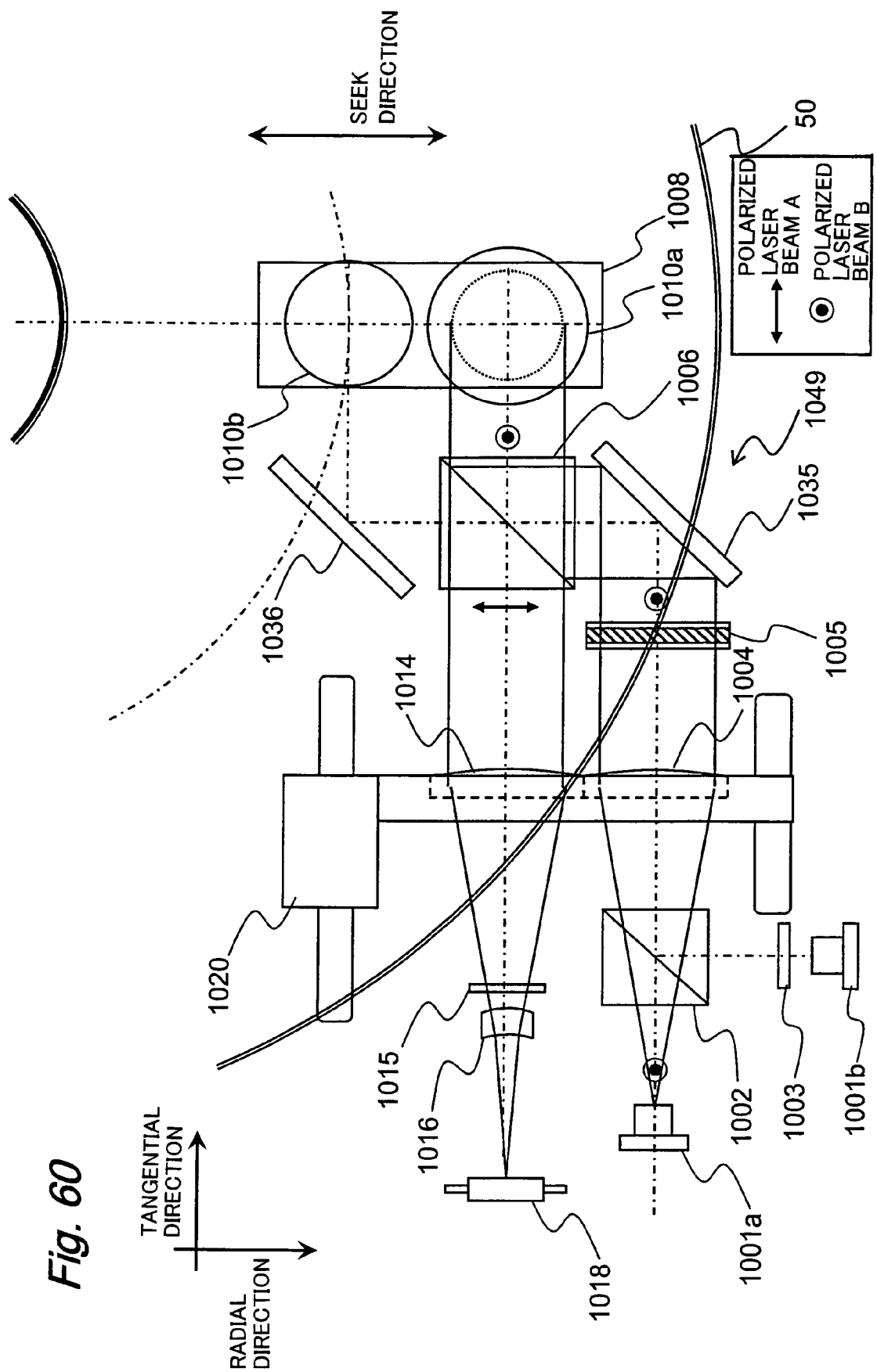
FIG. 60 is a schematic structural view of an optical pickup at its action of recording or playing back the first optical disc according to Embodiment 8 of the present invention.
Figure 61:
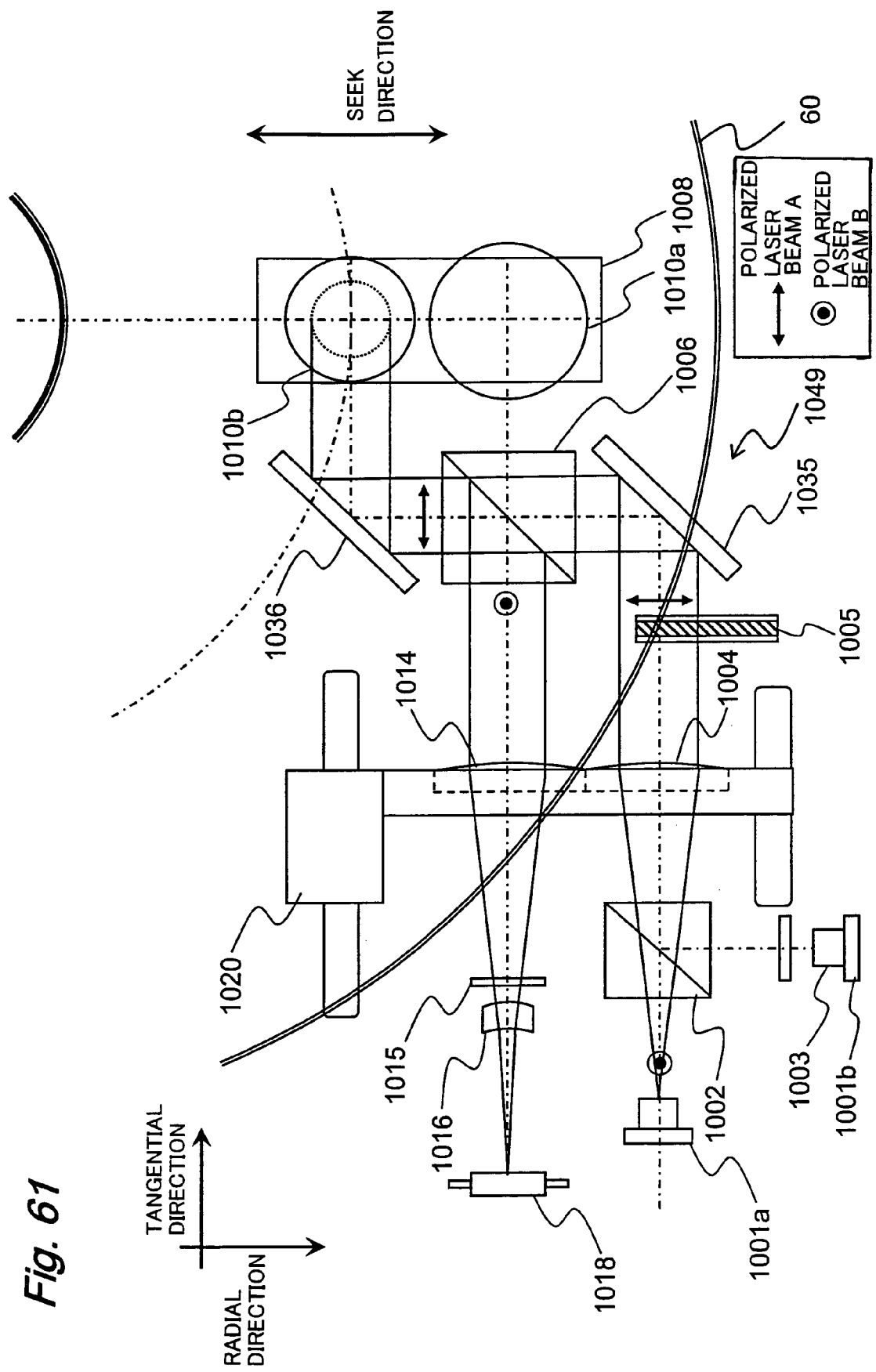
FIG. 61 is a schematic structural view of the optical pickup according to Embodiment 8 of the present invention at its action of recording or playing back the second optical disc.

For avoiding such a drawback, the first objective lens 10a which is smaller in the working distance WD is preferably located at the outer side of the optical disc than the second objective lens 10b as shown in FIGS. 60 and 61.

This modification protects the second objective lens 10b which is greater in the working distance WD from being interrupted by the stack ring when the first objective lens 10a accesses the innermost end of the optical disc 50.

When the two objective lenses are arranged in the radial direction, they extend along the seek center line and can thus allow the three-beam technique (or the DPP technique) to be employed at ease in their optical systems. As general, the two objective lenses may be arranged either in the radial direction or in the tangential direction.

Figure 41:
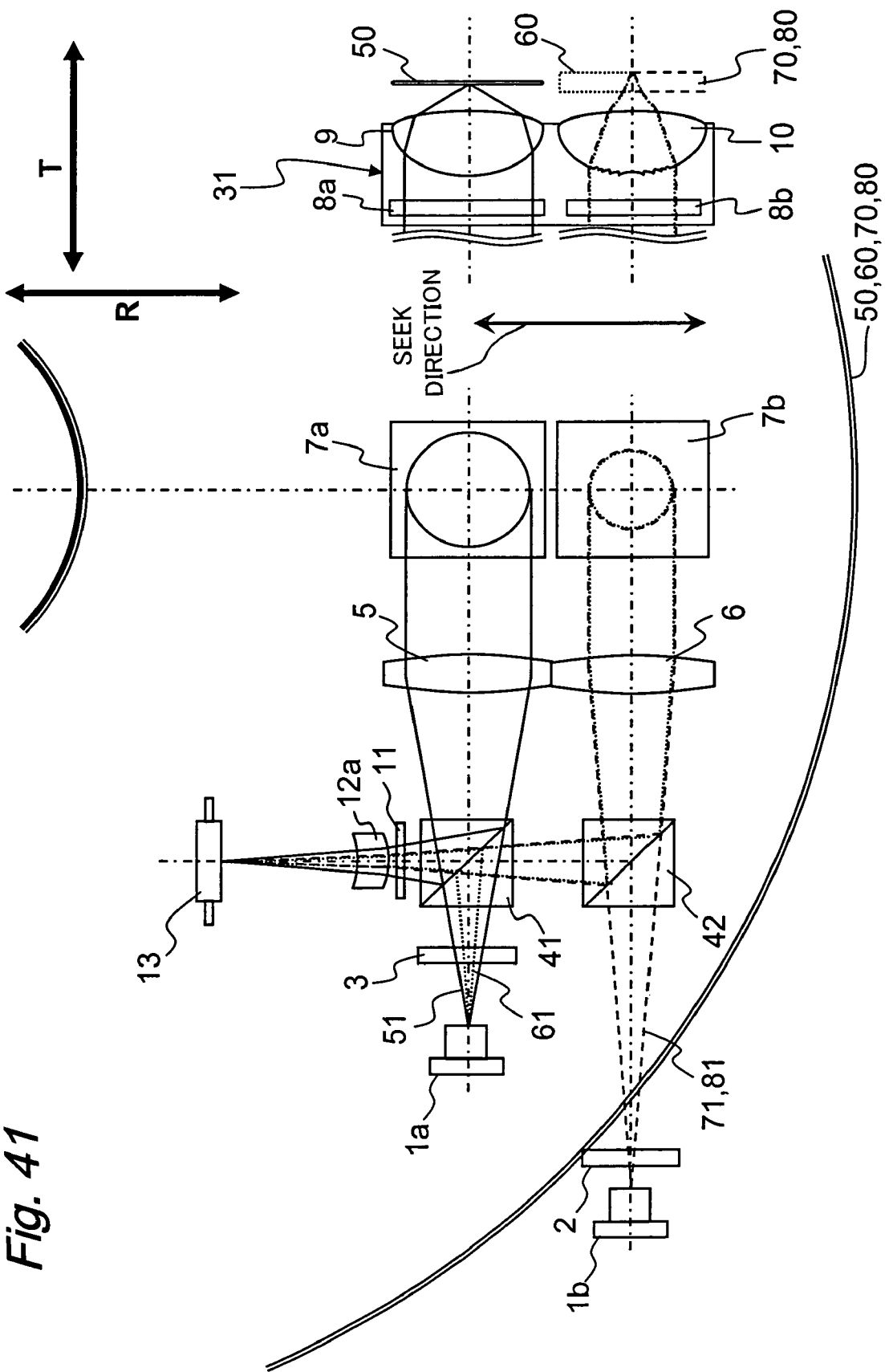
FIG. 41 is a schematic structural view showing a modification of the optical pickup according to Embodiment 1 of the present invention with the two objective lenses arranged in a radial direction.
Figure 42:
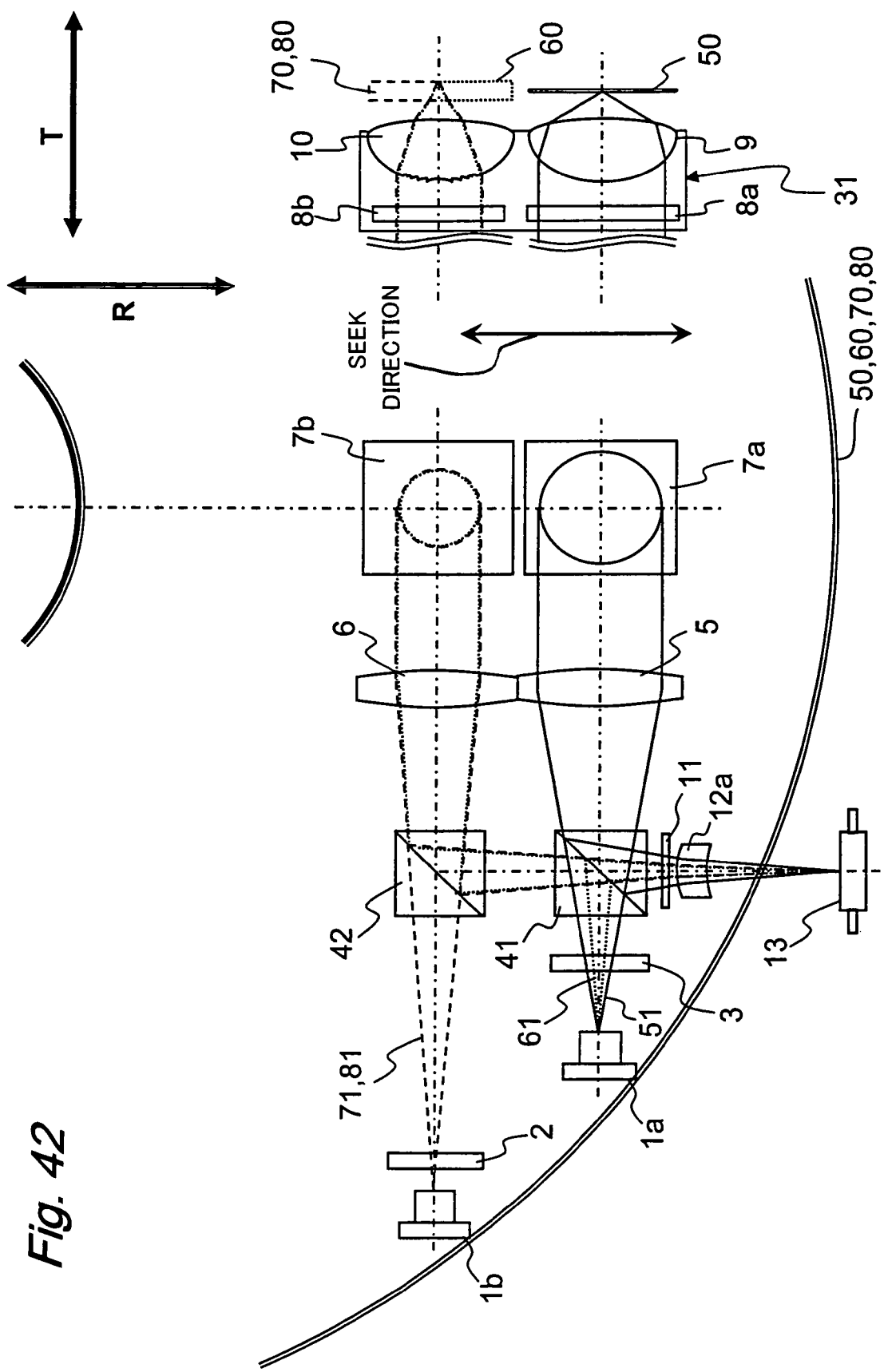
FIG. 42 is a schematic structural view showing a modification of the optical pickup according to Embodiment 1 of the present invention with the two objective lenses arranged in a radial direction.
Figure 43:
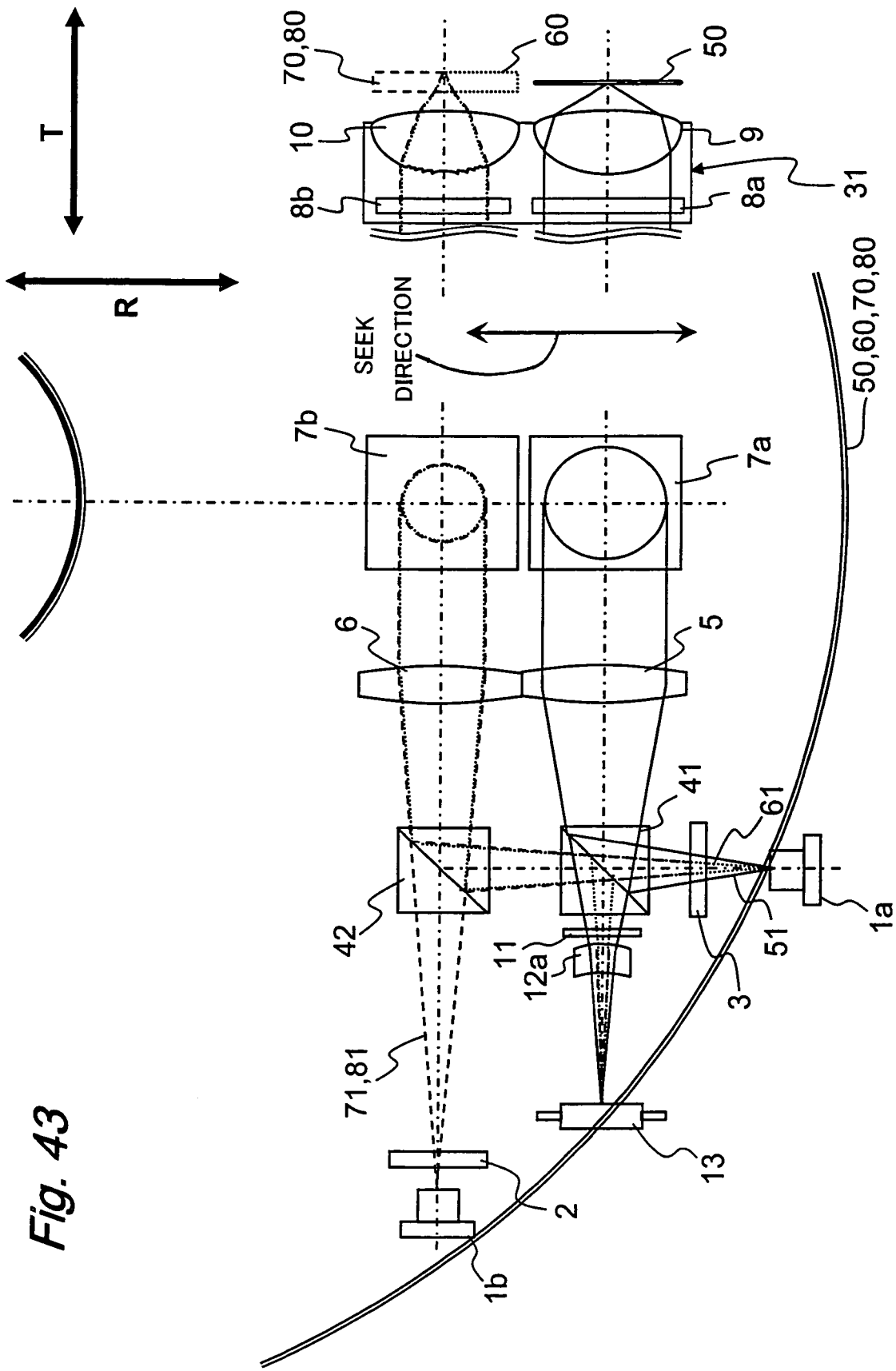
FIG. 43 is a schematic structural view showing a modification of the optical pickup according to Embodiment 1 of the present invention with the two objective lenses arranged in a radial direction.

FIGS. 41 to 43 illustrate a modification where the two objective lenses 9, 10 are arranged in the radial direction to extend along the seek center line and can thus employ the three-beam technique (or the DPP technique) in their optical systems. In this modification, the arrangement along the radial direction may be replaced with equal success by that along the tangential direction. Accordingly, the two objective lenses 9, 10 may be arranged either in the radial direction or in the tangential direction.

It would be understood that the polarization converter 3 is not limited to the liquid crystal device or the transparent piezoelectric device described in this embodiment. As will be explained in no more detail, a waveplate actuator may be provided for moving the waveplate to and from the light path or switching between the waveplate and the transparent plate across the light path. Using the waveplates of half-wavelength type, this embodiment may be improved in the performance. However, the arrangement of the waveplates is of no limitations.

Embodiment 2

FIGS. 15, 16, 17, 18, and 19 are schematic views of an optical pickup showing another embodiment of the present invention.

Throughout FIGS. 15 to 19, like components having the same functions are denoted by like numerals as those of Embodiment 1 and will be explained in no more detail. While the multi-surface prism 4 in the optical pickup of Embodiment 1 has the first optical surface 4a and the second optical surface 4b, the optical pickup of Embodiment 2 includes a multi-surface prism 4 having a third optical surface 4c in addition to the first optical surface 4a and the second optical surface 4b. The third optical surface 4c of the multi-surface prism 4 has a dichroic property of transmitting almost entirely the blue-violet laser beam and reflecting the red laser beam and the infrared laser beam almost entirely. Also in this embodiment, a pair of optical detectors, a first optical detector 13a and a second optical detector 13b, are provided while a second detection lens 12b is disposed between the multi-surface prism 4 and the second optical detector 13b. The other arrangement is equal to that of the optical pickup of Embodiment 1.

(First Optical Disc)

The action of the optical pickup of Embodiment 2 for performing either the recording action or the playback action on the first optical disc 50 will be described with reference to FIG. 15.

A blue-violet laser beam 51 emitted from the light source 1a and acting as the first laser beam is of linear polarization or the polarized laser beam B which is polarized vertical to the surface of the drawing. The polarized laser beam B of the laser beam 51 is passed, without changing its direction of polarization, through the polarization converter 3 which remains loaded between its electrodes (not shown) with no voltage and received by the multi-surface prism 4. The third optical surface 4c of the multi-surface prism 4 allows the polarized light B of the laser beam 51 to pass almost entirely while the first optical surface 4a reflects the polarized light B almost entirely. The laser beam 51 passed through the multi-surface prism 4 is transmitted to the first collimator lens 5 where it is converted to substantially a collimated light beam. The laser beam 51 at substantially the collimated light beam is then bent through substantially 90 degrees along the optical axis by the integrated riser mirror 7 and converted into a circularly polarized laser beam By the first ¼ waveplate 8a. The laser beam 51 at the circularly polarized light is received and focused across the transparent substrate by the first objective lens 9 to form its spot on the information recording surface of the first optical disc 50. It is noted that, for ease of the description, the optical axis bent in the direction vertical to the paper surface by the integrated riser mirror 7 is illustrated to extend in a direction parallel to the paper surface (as is repeated equally hereinafter).

Similar to Embodiment 1, the spherical aberration derived from a variation in the thickness of the transparent substrate of the first optical disc 50 when forming the spot of the laser beam on the information recording surface of the first optical disc 50 can be canceled by the first collimator lens 5 being moved forward and backward along the optical axis with the collimator lens actuator 20 to shift the laser beam falling on the first objective lens 9 or the laser beam 51 to a diverged or converged light.

Then, the laser beam 51 reflected on the information recording surface of the first optical disc 50 is transmitted along the returning path to the first ¼ waveplate 8a where it is converted from the circularly polarized light to a polarized laser beam A of which the polarization is vertical to that of the polarized laser beam B to be received by the first ¼ waveplate 8a. The polarized light A of the laser beam 51 is then bent by the integrated riser mirror 7 and converted by the first collimator lens 5 from substantially the collimated light beam to a converged light before falling on the first optical surface 4a of the multi-surface prism 4. The optical surface 4a allows the laser beam 51 along the returning path to be passed almost entirely. The laser beam 51 released along the returning path from the multi-surface prism 4 is split by the detection diffractor 11 for detection of a servo signal and provided with a predetermined of spherical aberration by the first detection lens 12a before received by the first optical detector 13a. The first optical detector 13a then produces the data signal and the servo signal from the laser beam 51 which has been received.

Figure 15:
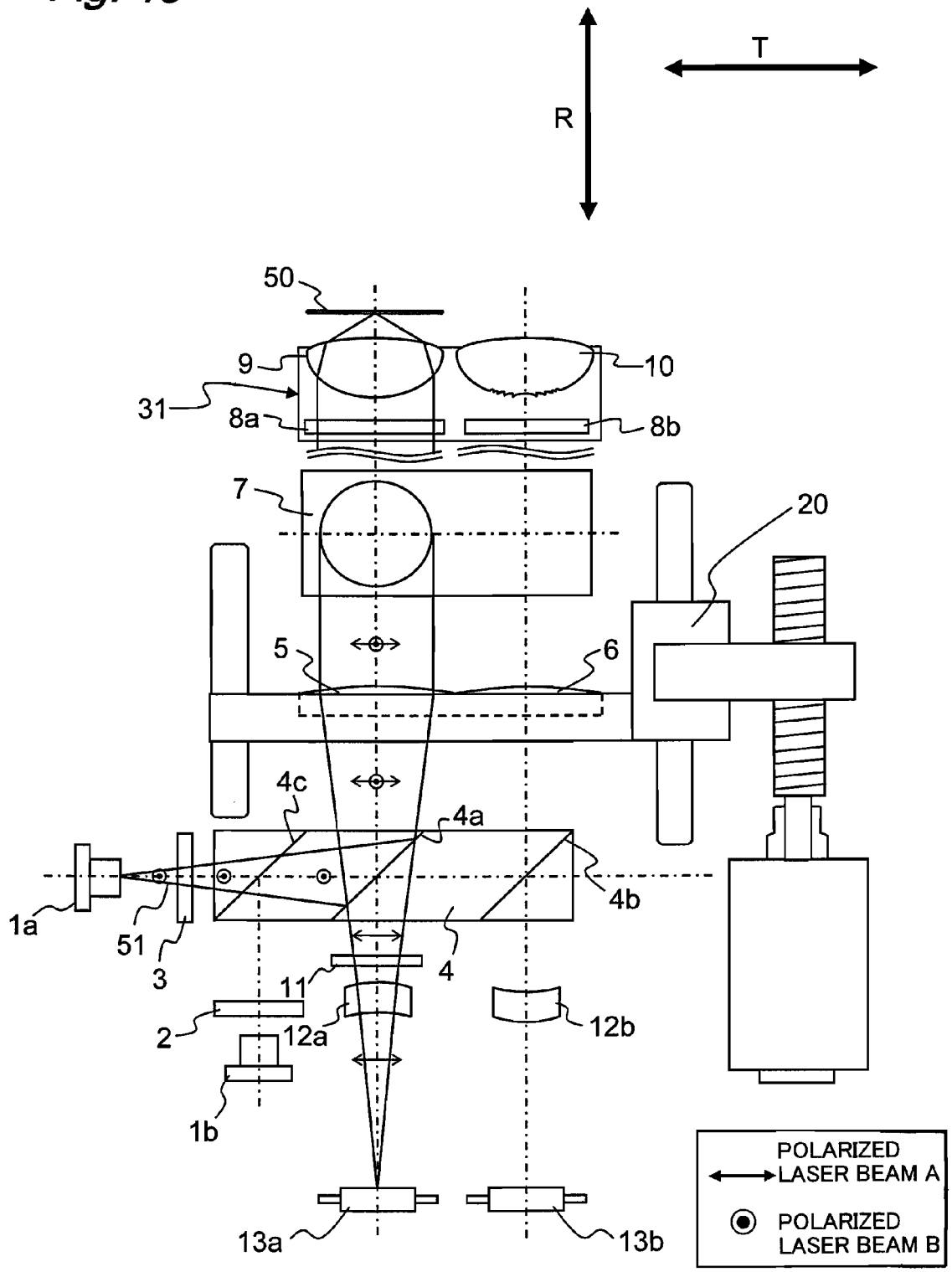
FIG. 15 is a schematic structural view of an optical pickup at its action of recording or playing back the first optical disc according to Embodiment 2 of the present invention.

In this embodiment similar to Embodiment 1, the first ¼ waveplate 8a, the second ¼ waveplate 8b, the first objective lens 9, and the second objective lens 10 shown in FIG. 15 are mounted together on the objective lens actuator 31 for being driven at once to follow surface undulations and data track eccentricities of the first optical disc 50. This allows the first ¼ waveplate 8a to remain reduced in the effective diameter. Alternatively, when its effective diameter is slightly increased, the first ¼ waveplate 8a may be disposed not on the objective lens actuator 31. In the this case, the objective lens actuator 31 can be decreased in the weight particularly at its movable region, hence contributing to the recording action and the playback action at higher speeds on the optical disc.

(Second Optical Disc)

The action of the optical pick of Embodiment 2 for recording or playing back data on the second optical disc 60 will be described with reference to FIG. 16.

A blue-violet laser beam 61, similar to the laser beam 51, emitted from the light source 1a and acting as the first laser beam is of linear polarization or the polarized laser beam B. With its electrodes (not shown) located with a voltage, the polarization converter 3 converts the laser beam 61 from the polarized laser beam B to the polarized laser beam A. The polarized light A of the laser beam 61 is then received by the third optical surface 4c of the multi-surface prism 4. The third optical surface 4c allows the polarized light A of the laser beam 61 to pass almost entirely before entering the first optical surface 4a of the multi-surface prism 4. The first optical surface 4a permits the polarized light A of the laser beam 61 to be passed almost entirely before received by the second optical surface 4b. The polarized light A of the laser beam 61 is reflected almost entirely and bent at its light path by the second optical surface 4b. The polarized light A of the laser beam 61 passed along the advancing path through the multi-surface prism 4 is received and converted into substantially a collimated light beam by the second collimator lens 6. The polarized light A at substantially the collimated light beam of the laser beam 61 is then bent through substantially 90 degrees along the optical axis by the integrated riser mirror 7 to run in a direction vertical to the paper surface. Then, the polarized light A of the laser beam 61 is converted into a circularly polarized laser beam By the second ¼ waveplate 8b and focused across the transparent substrate by the second objective lens 10 to form the spot on the information recording surface of the second optical disc 60.

It is also possible that the collimator lens actuator 20 is driven to move the second collimator lens 6 forward and backward along the optical axis for producing the diverged or converged light of the laser beam entering into the second objective lens 10, so that the spherical aberration derived from a variation in the thickness of the transparent substrate of the second optical disc 60 can be canceled.

Then, the polarized light A of the laser beam 61 reflected on the information recording surface of the second optical disc 60 is transmitted along the returning path to the second ¼ waveplate 8b where it is converted from the circularly polarized light to the polarized light B. The polarized light B of the laser beam 61 is then bent at the optical path by the integrated riser mirror 7 and converted by the second collimator lens 6 from substantially the collimated light beam to a converged light before falling on the second optical surface 4b of the multi-surface prism 4. The second optical surface 4b allows the polarized light B of the laser beam 61 to be reflected almost entirely before received by the first optical surface 4a of the multi-surface prism 4. The polarized light B of the laser beam 61 is reflected almost entirely by the first optical surface 4a and bent at the optical path. The polarized light B of the laser beam 61 released from the multi-surface prism 4 is split by the detection diffractor 11 for detecting a servo signal and provided with a predetermined of spherical aberration by the first detection lens 12a before received by the first optical detector 13a. The first optical detector 13a then produces the data signal and the servo signal from the laser beam 61 which has been received.

Figure 16:
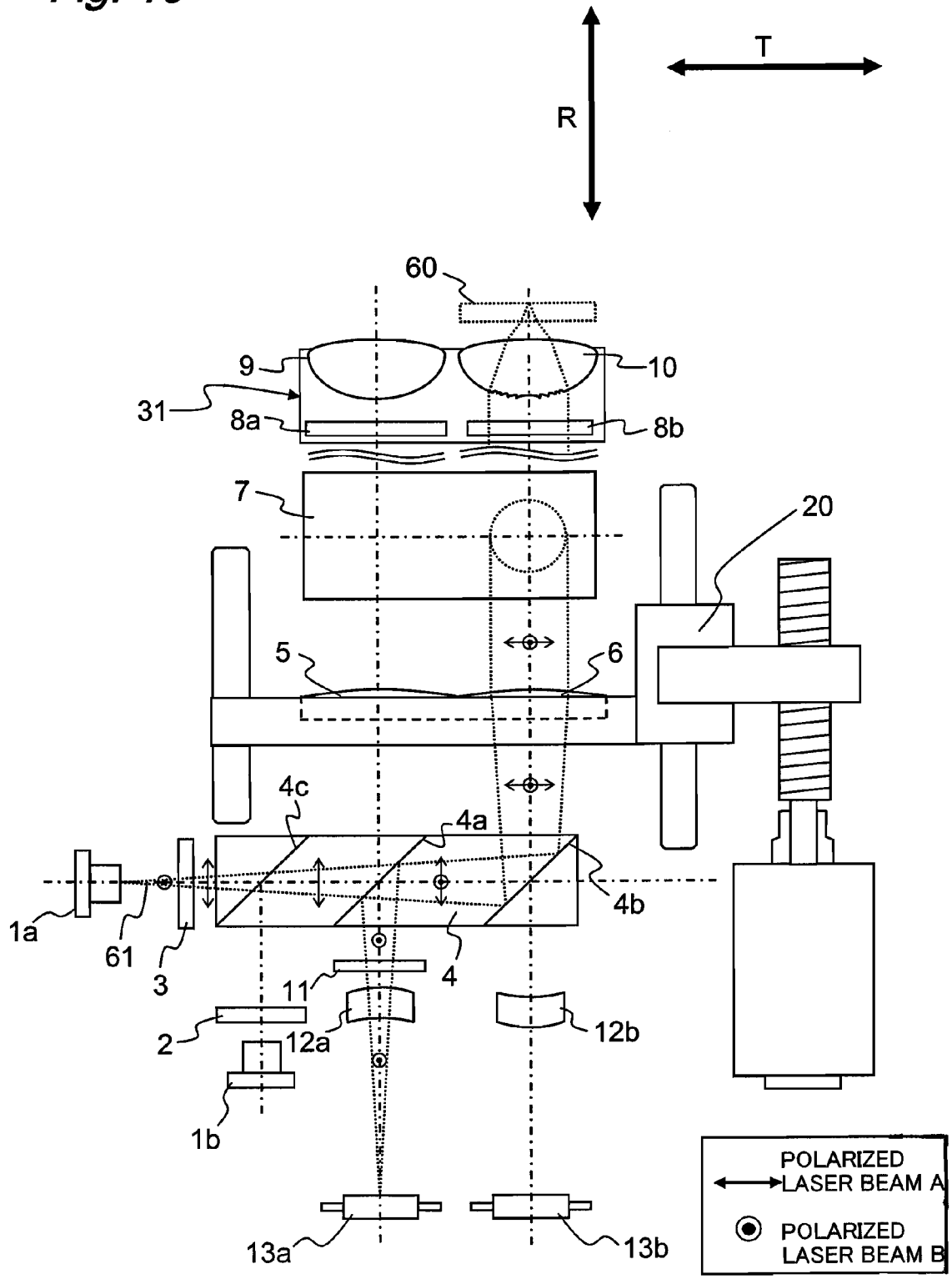
FIG. 16 is a schematic structural view of the optical pickup according to Embodiment 2 of the present invention at its action of recording or playing back the second optical disc.

Similarly, the first ¼ waveplate 8a, the second ¼ waveplate 8b, the first objective lens 9, and the second objective lens 10 shown in FIG. 16 are mounted together on the objective lens actuator 31 for being driven at once to follow surface undulations and data track eccentricities of the first optical disc 50, whereby the effective diameter of the second ¼ waveplate 8b can be minimized. Alternatively, when its effective diameter is slightly increased, the second ¼ waveplate 8b may be disposed not on the objective lens actuator 31. In the latter case, the objective lens actuator 31 can be decreased in the weight particularly at its movable region, hence contributing to the recording action and the playback action at higher speeds on the optical disc.

The action of a modification of the optical pickup of Embodiment 2 for recording or playing back data on the second optical disc 60 will now be described with reference to FIG. 17.

Figure 17:
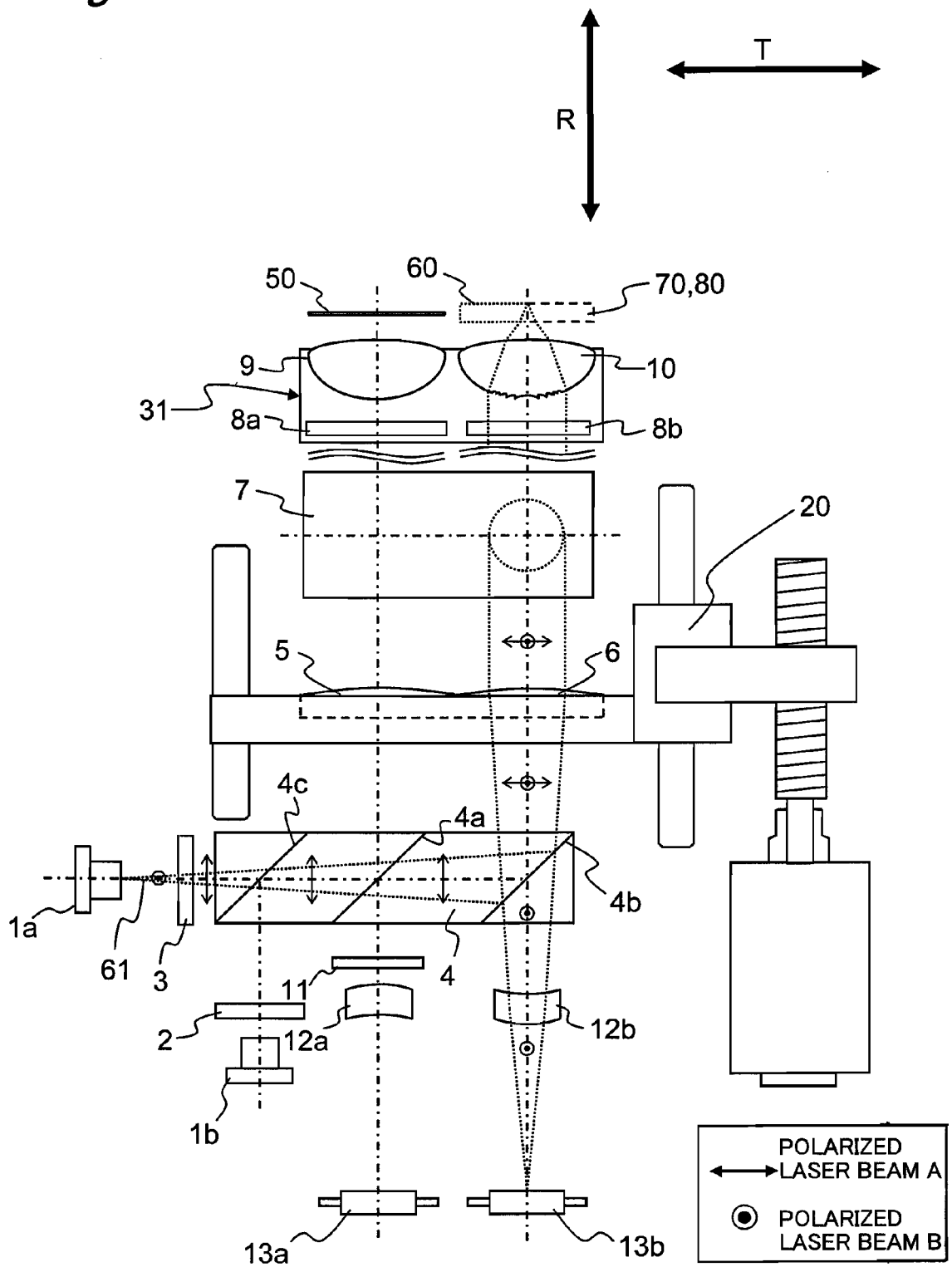
FIG. 17 is a schematic structural view of the optical pickup according to Embodiment 2 of the present invention at its action of recording or playing back the second optical disc.

In FIG. 17, the second optical surface 4b of the multi-surface prism 4 is arranged to have a PBS property for switching between the transmission and the reflection depending on the direction of polarization of the blue-violet laser beam but not reflecting the laser beam almost entirely. The other arrangement of the modification remains unchanged. In this case, the polarized light A of the laser beam 61 at the advancing path is reflected almost entirely by the second optical surface 4b of the multi-surface prism 4, and then the laser beam 61 is guided to the optical axis of the second collimator lens 6. On the other hand, the polarized light B of the laser beam 61 at the returning path is passed almost entirely through the second optical surface 4b of the multi-surface prism 4 and directed to the detection optical system made of the second detection lens 12b and the second optical detector 13b. The second optical detector 13b produces the data signal and the servo signal from the laser beam 61 at the returning path.

(DVD)

The action of the optical pick of Embodiment 2 for recording or playing back data on the DVD 70 will be described with reference to FIG. 18.

A red color laser beam 71 emitted from the light source 1b and acting as the second laser beam is of linear polarization or the polarized laser beam B. The polarized light B of the laser beam 71 is passed through the diffraction grating 2 which produces diffracted light for generating the tracking error signal with the use of the DPP technique and received by the third optical surface 4c of the multi-surface prism 4. The third optical surface 4c allows the polarized light B of the laser beam 71 to be reflected almost entirely and bent at the optical path before falling on the first optical surface 4a. The first optical surface 4a allows the polarized light B of the laser beam 71 to pass almost entirely and enter the second optical surface 4b. The polarized light B of the laser beam 71 is reflected almost entirely by the second optical surface 4b of the multi-surface prism 4 and then received by the collimator lens 6. The laser beam 71 in the advancing path is converted into substantially a collimated light beam by the collimator lens 6 and bent to substantially 90 degrees along the optical axis by the integrated riser mirror 7 to run in a direction vertical to the paper surface. Then, the laser beam 71 is further converted into a circularly polarized laser beam By the second ¼ waveplate 8b and focused across the transparent substrate by the second objective lens 10 to form its spot on the information recording surface of the DVD 70.

The red color laser beam 71 reflected on the information recording surface of the DVD 70 is transmitted along the returning path to the second ¼ waveplate 8b where it is converted into the polarized light A. The polarized light A of the laser beam 71 is reflected by the integrated riser mirror 7 and converted by the collimator lens 6 from substantially the collimated light beam to a converged light before falling on the second optical surface 4b of the multi-surface prism 4. The second optical surface 4b allows the polarized light A of the laser beam 71 to pass almost entirely along the returning path. The polarized light A of the laser beam 71 passed through the multi-surface prism 4 at the returning path is provided with a predetermined of spherical aberration by the second detection lens 12b before received by the second optical detector 13b. The second optical detector 13b then produces the data signal and the servo signal from the laser beam 71 which has been received.

The action of another modification of the optical pickup of Embodiment 2 for recording or playing back a data on the DVD 70 will now be described with reference to FIG. 19.

Figure 19:
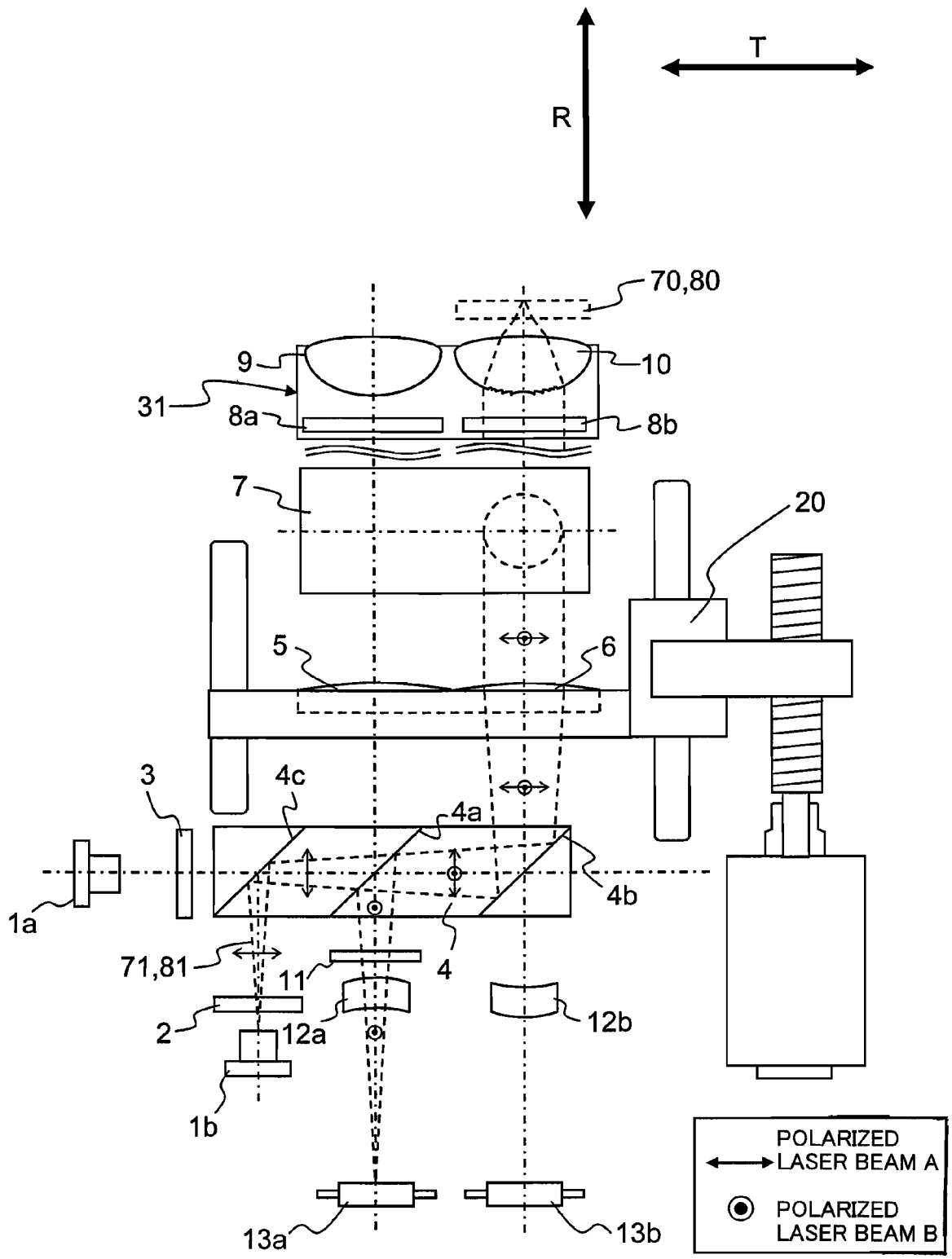
FIG. 19 is a schematic structural view of the optical pickup according to Embodiment 2 of the present invention at its action of recording or playing back the DVD or the CD.
Figure 20:
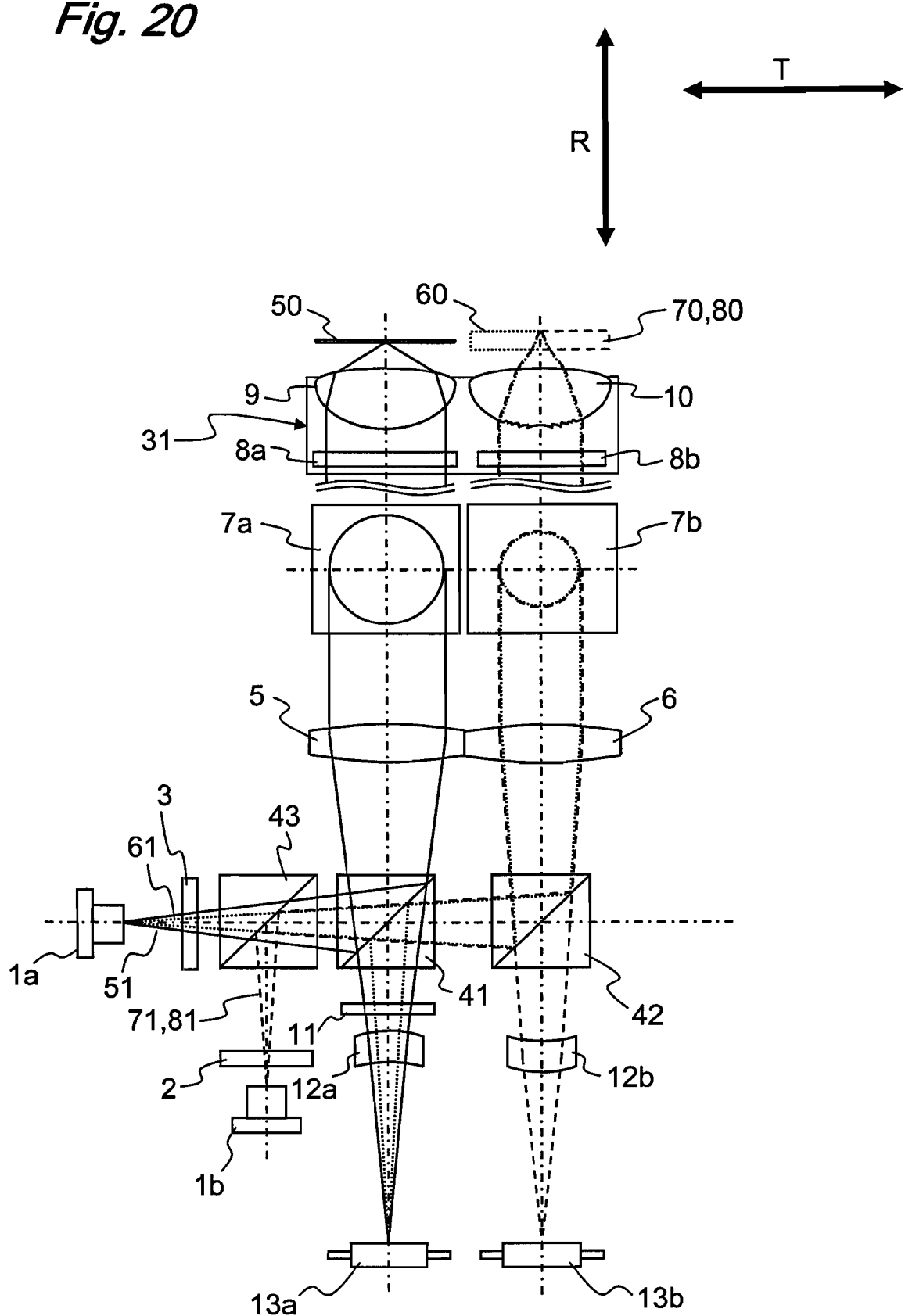
FIG. 20 is a schematic structural view showing a structure of the optical pickup according to Embodiment 2 of the present invention.
Figure 21:
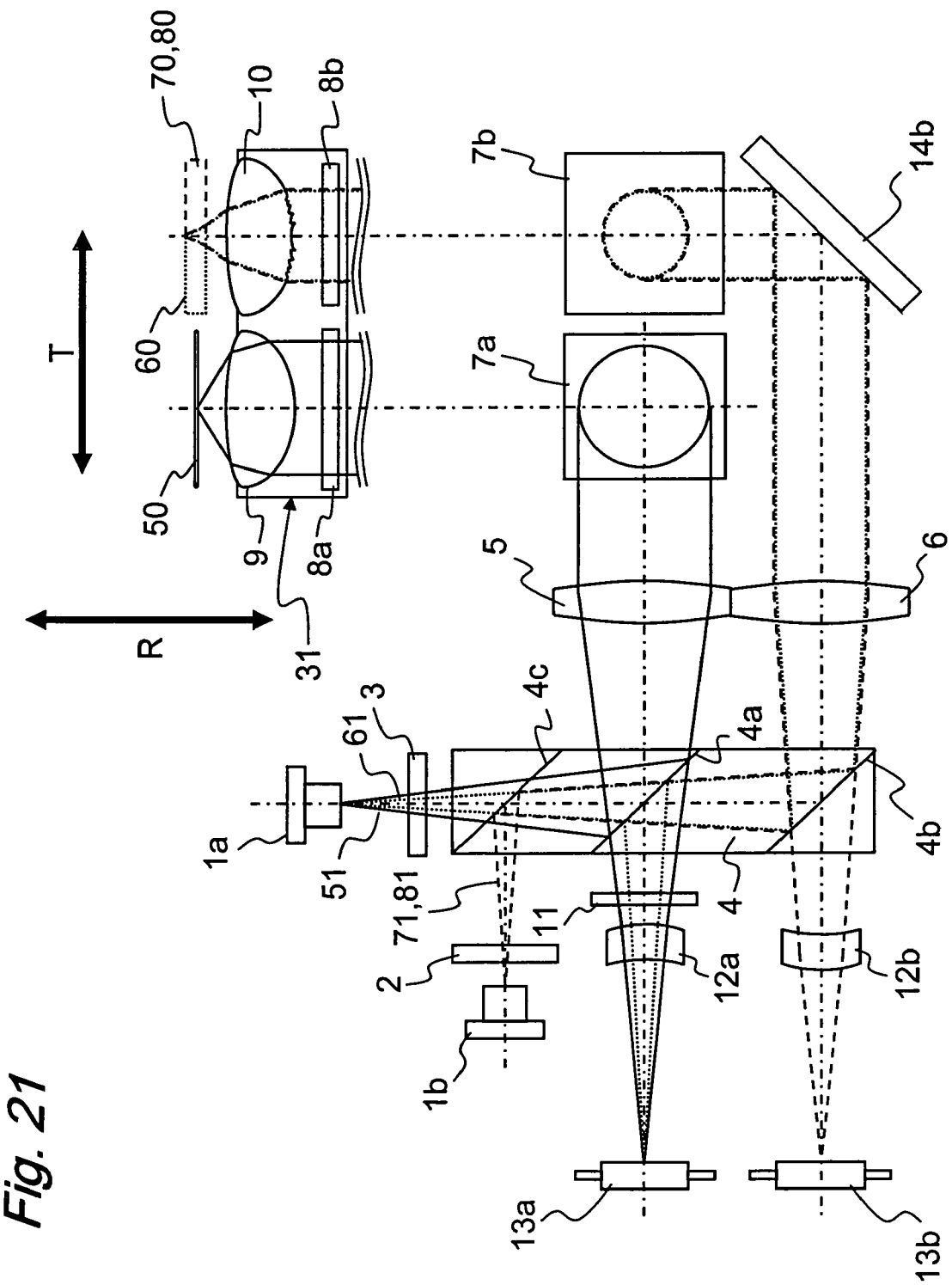
FIG. 21 is a schematic structural view showing a structure of the optical pickup according to Embodiment 2 of the present invention.
Figure 22:
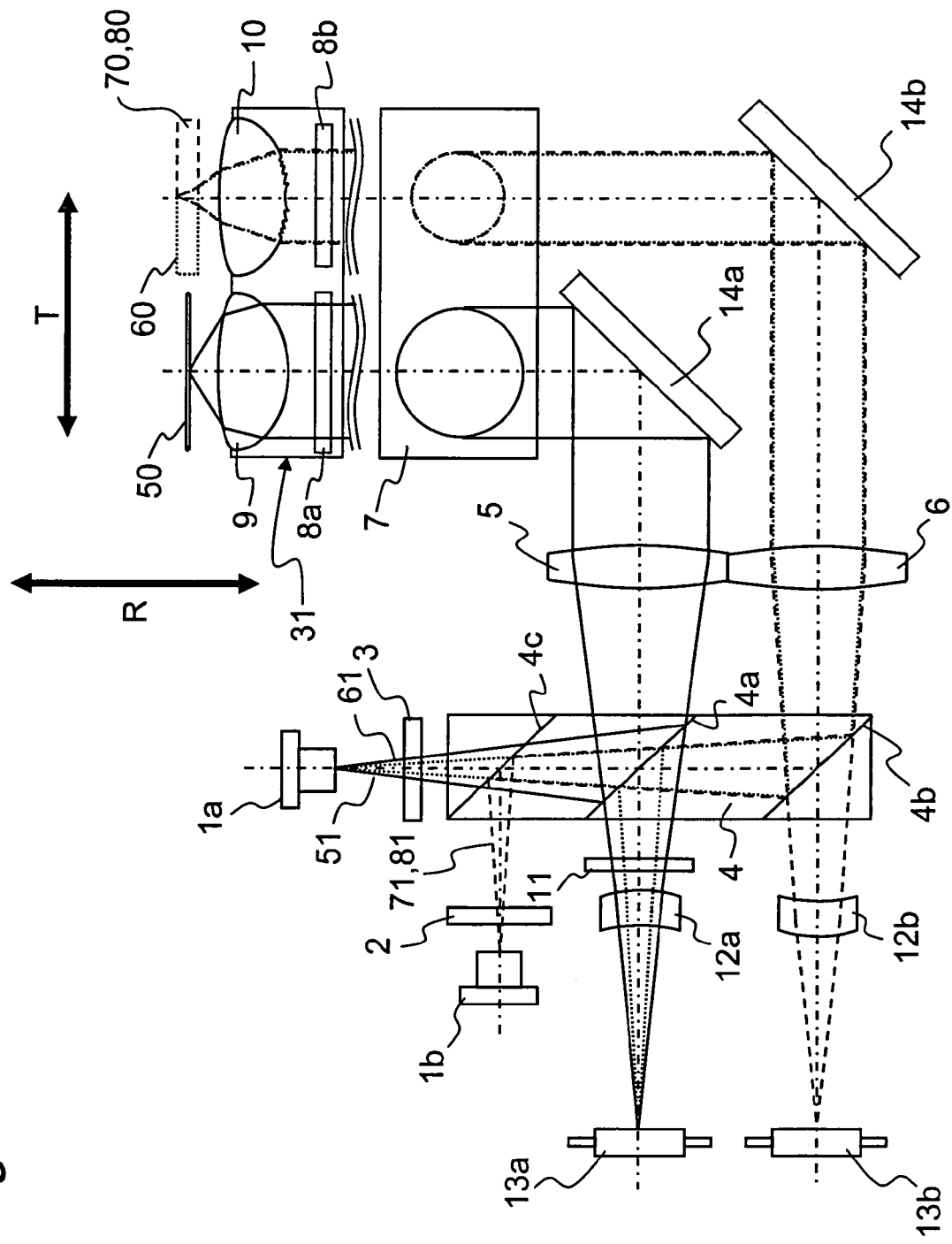
FIG. 22 is a schematic structural view showing a structure of the optical pickup according to Embodiment 2 of the present invention.
Figure 23:
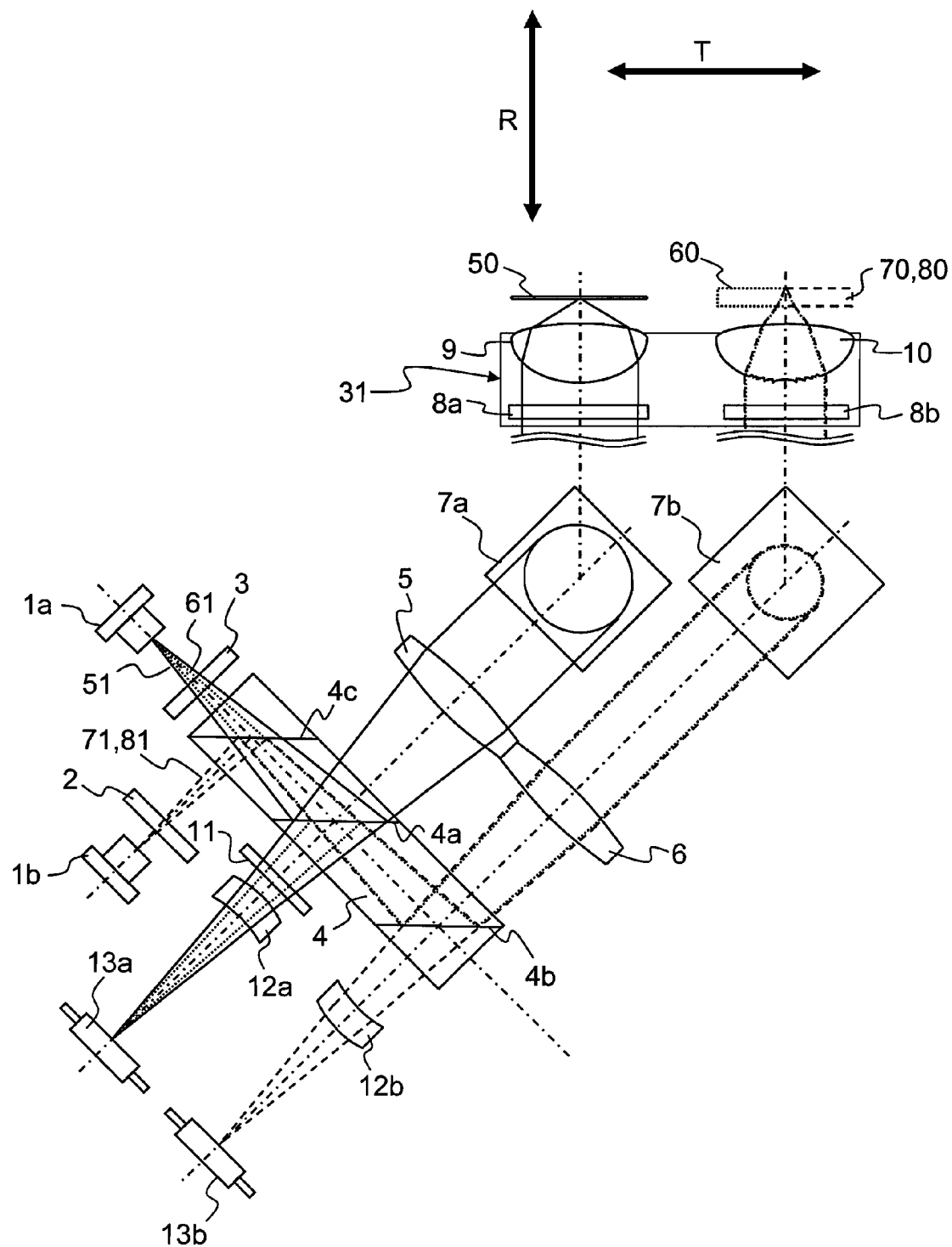
FIG. 23 is a schematic structural view showing a structure of the optical pickup according to Embodiment 2 of the present invention.

In the another modification shown in FIG. 19, the second optical surface 4b of the multi-surface prism 4 is arranged to have an optical property for reflecting almost entirely any polarized light of the red laser beam but not a PBS property for switching the transmission and the reflection depending on the direction of polarization of the red laser beam. In addition, the first optical surface 4a is arranged to have the PBS property as described above but not the property of reflecting almost entirely the red laser beam. The other arrangement of the another modification remains not changed.

In the another modification shown in FIG. 19, the polarized light A of the red laser beam 71 at the advancing path is passed almost entirely through the first optical surface 4a and reflected almost entirely by the second optical surface 4b of the multi-surface prism 4 before guided to the optical axis by the second collimator lens 6. Meanwhile, the polarized light B of the red laser beam 71 at the returning path is reflected almost entirely by the second optical surface 4b of the multi-surface prism 4 and bent at the light path, and then reflected almost entirely by the first optical surface 4a and bent at the light path before transmitted to the optical system made of the first detection lens 12a and the first optical detector 13a. The first optical detector 13a produces the data signal and the servo signal from the red laser beam 71 at the returning path. (CD)

The optical pickup of Embodiment 2 is capable of performing either the recording action or the playback action on the CD 80 with the second light source 1b emitting an infrared laser beam as the third laser beam, one of two different wavelengths to be emitted. The action of the optical pickup for recording and playing back data on the CD 80 is identical to the action for recording and playing back data on the DVD 70 described previously with reference to FIGS. 18 and 19 and will be described in no more detail.

For operating the first optical disc 50, the arrangement of Embodiment 2 shown in FIG. 15 may preferably be employed. For operating the second optical disc 60, the arrangement shown in FIG. 16 or 17 may be selected. For operating the DVD 70 and the CD 80, the arrangement shown in FIG. 18 or 19 may be employed.

Figure 18:
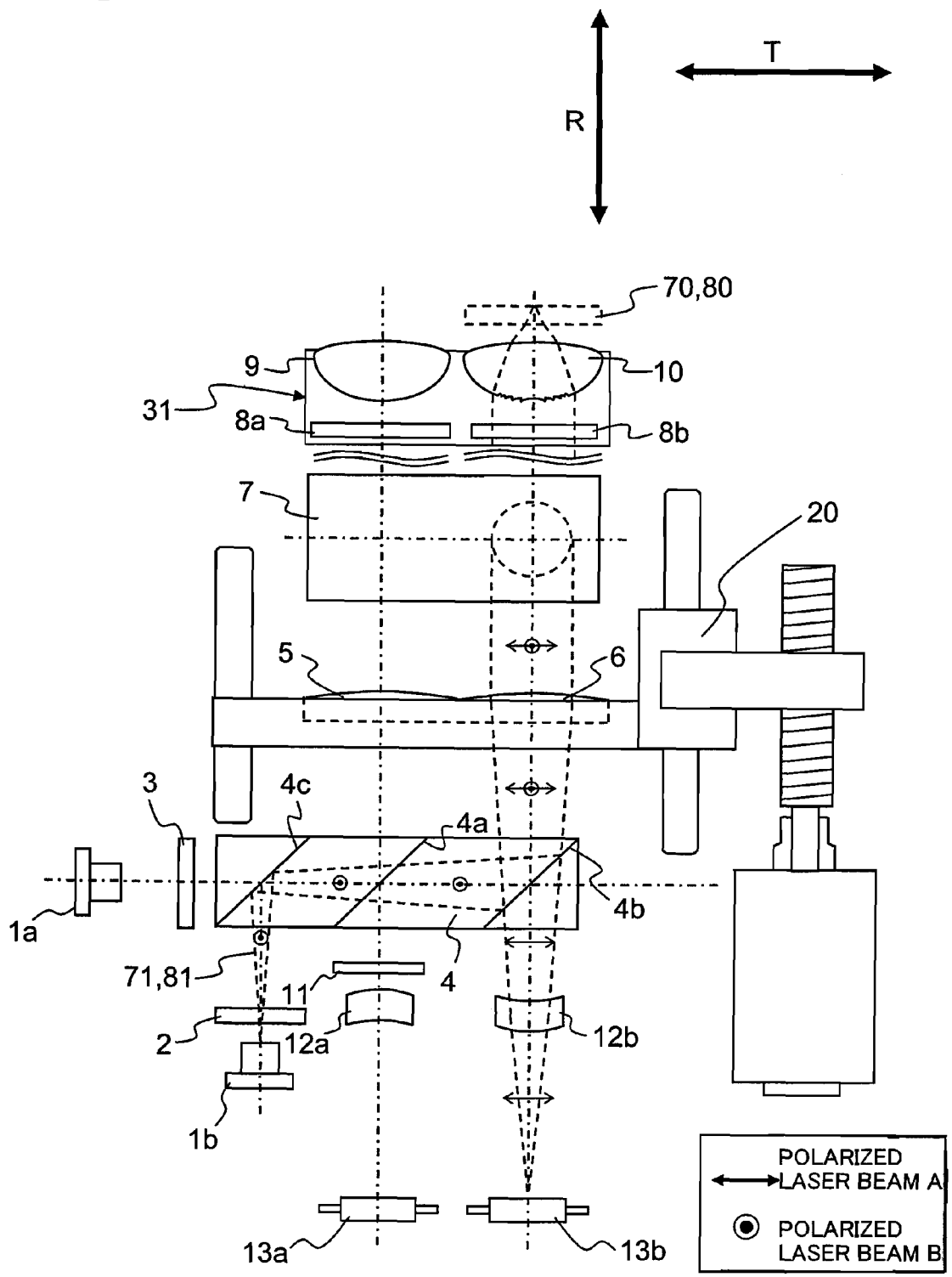
FIG. 18 is a schematic structural view of the optical pickup according to Embodiment 2 of the present invention at its action of recording or playing back the DVD or the CD.

For example, with the arrangement shown in FIG. 16 for operating the second optical disc 60 and the arrangement shown in FIG. 18 for operating the DVD and the CD, the first optical detector 13a receives two reflected lights of the laser beam from the first optical disc 50 and the second optical disc 60. At the time, the light source 1a is driven as a single source for performing either the recording action or the playback action on each of the two different discs. As the light source and the optical detector respond at one-to-one relationship to the action of each of the two different optical discs, the positional adjustment of the first optical detector 13a to the first optical disc 50, for example, may equally be applied to the second optical disc 60. This will eliminate repeat of the troublesome adjusting action. Also, the second detection lens 12b and the second optical detector 13b are provided for operating only the DVD and the CD. As compared with the use of the integrated optical detector 13 in Embodiment 1, this modification allows the second optical detector 13b to become less intricate at the arrangement of its photo detector.

Another modification of this embodiment may be provided when the arrangement shown in FIG. 17 for operating the second optical disc 60 and the arrangement shown in FIG. 18 for operating the DVD and the CD are selected. In this modification, the first optical detector 13a is driven for operating the first optical disc 50 while the second optical detector 13b is driven for operating the second optical disc 60, the DVD 70, and the CD 80. While the detection diffraction grating 11 for producing diffracted light for determining the tracking control signal is provided across the light path to the first optical disc 50, the action of determining the tracking control signal for the second optical disc 60 is performed by the phase difference detecting method which requires no diffracted light. When the arrangement shown in FIG. 17 for operating the second optical disc 60 is selected, the detection light can be received directly by the second optical detector 13b without being passed through the detection diffraction grating 11. Accordingly, as loss of the light by the diffraction is avoided, the playback signal will be increased in the signal to noise ratio. More particularly, the playback signal will be improved in the quality as having received no unwanted interference from the diffracted light produced by the detection diffraction grating 11.

A further modification of this embodiment with the arrangement shown in FIG. 17 for recording and playing back the second optical disc 60 and the arrangement shown in FIG. 19 for recording and playing back the DVD and the CD may be provided where the first optical detector 13a is dedicated for operating the first optical disc 50, the DVD 70, and the CD 80 and the second optical detector 13b is dedicated for operating the second optical disc 60. When the first optical disc 50, the DVD 70, and the CD 80 are subjected to both the recording action and the playback action and the second optical disc 60 is subjected to only the playback action, the first optical detector 13a needs to have its photosensitive region adapted for measuring a less amount of the light during the playback action and a large amount of the light during the recording action. The second optical detector 13b is, however, arranged to have its photosensitive region adapted for measuring only a less amount of the light during the playback action. Accordingly, the second optical detector may be simplified in the construction and decreased in the cost, thus contributing to the improvement of the signal to noise ratio easily.

As described, the optical pickup of Embodiment 2 is a bit higher in the number of the components than that of Embodiment 1 by preparing the third optical surface 4c of the multi-surface prism 4 as well as the second detection lens 12b and the second optical detector 13b. However, the optical pickup of Embodiment 1 may become intricate in the arrangement of the first detection diffraction grating 11 for producing a control signal and the photosensitive region pattern of the integrated optical detector 13 when the reflections of the light from all the first optical disc 50, the second optical disc 60, the DVD 70, and the CD 80 are to be received by the integrated optical detector 13. It is fairly essential for performing the recording action and the playback action at higher speeds to simplify the manufacturing process of the optical detector. The combination of the first optical detector 13a and the second optical detector 13b may be manufactured at easier manners with lower cost than the integrated optical detector 13 as its arrangement is simple.

Other modifications of the optical pickup of Embodiment 2 are illustrated in FIGS. 20 to 25. The advantages of the other modifications are identical to those of the modification of Embodiment 1 shown in FIGS. 8 to 13.

Figure 24:
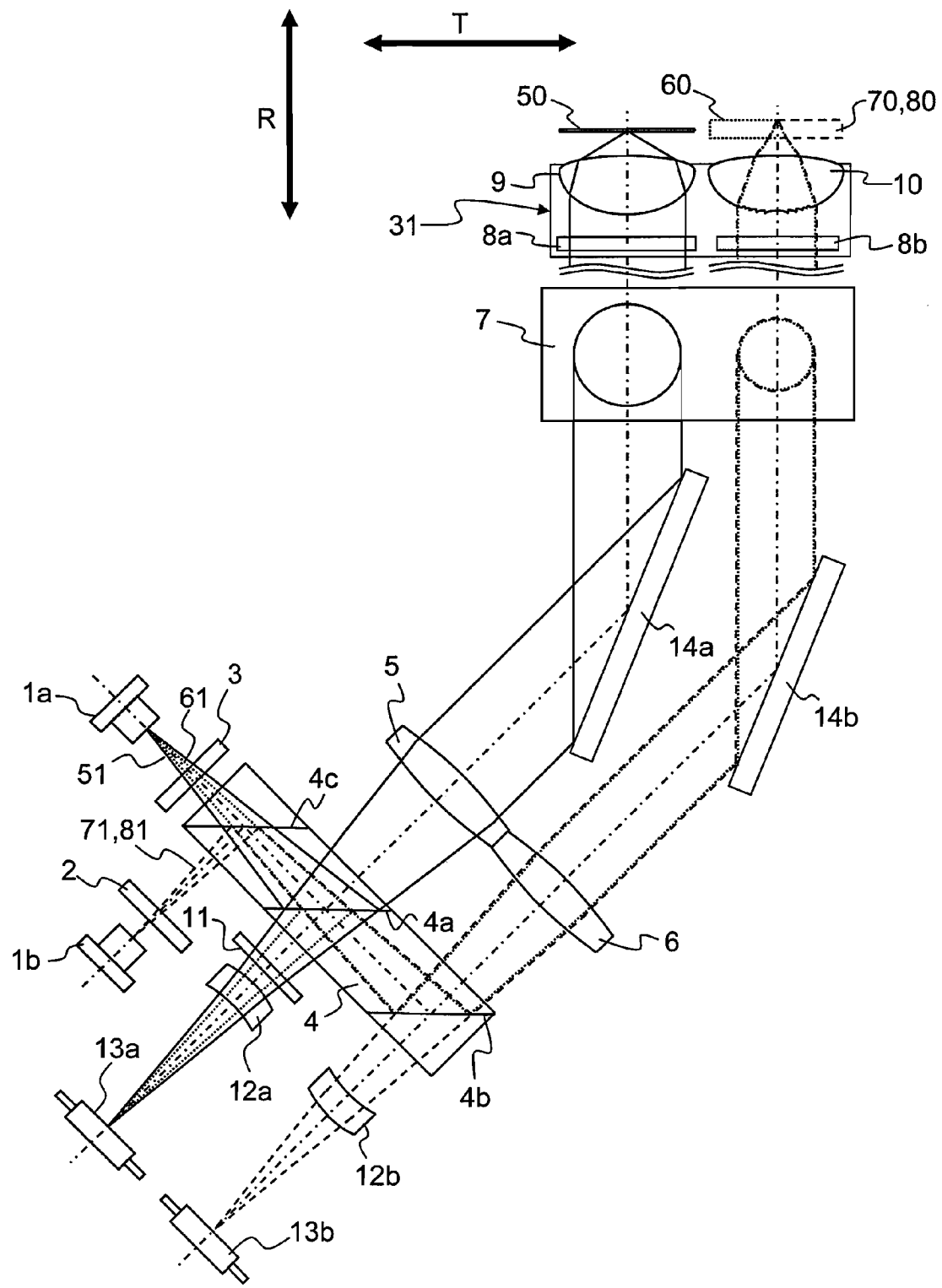
FIG. 24 is a schematic structural view showing a structure of the optical pickup according to Embodiment 2 of the present invention.
Figure 25:
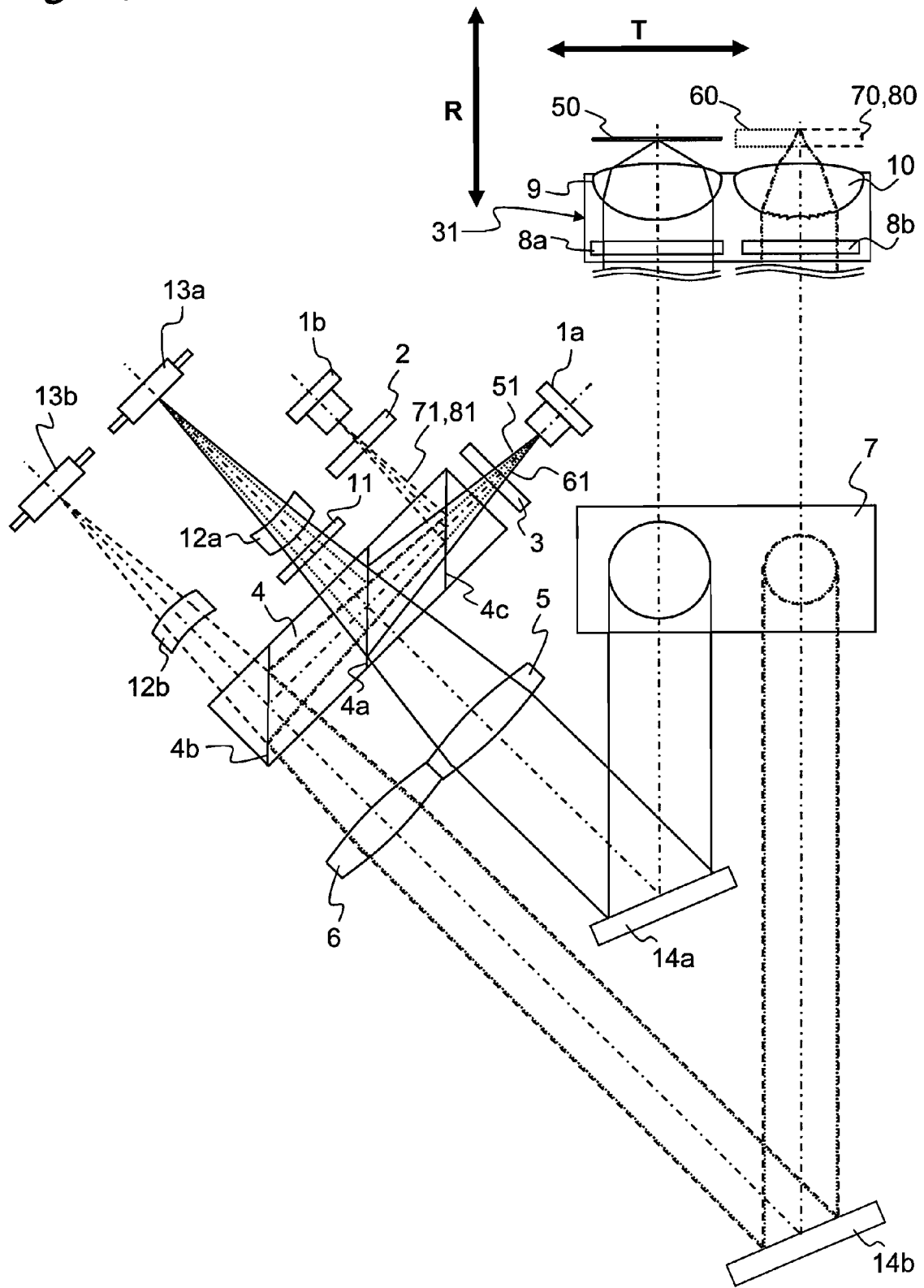
FIG. 25 is a schematic structural view showing a structure of the optical pickup according to Embodiment 2 of the present invention.

In addition, further modifications dissimilar to any modification of Embodiment 1 are shown in FIGS. 24 and 25 where the light path is bent to other than 90 degrees by the bending mirror. The arrangement of the optical pickup shown in FIG. 24 is favorably sized smaller along the radial direction than the modifications shown in FIGS. 15 to 20. The arrangement of the optical pickup shown in FIG. 25 is favorably sized smaller along the radial direction than the modifications shown in FIGS. 21 and 22.

The other arrangements not illustrated in Embodiments 1 and 2 are also fundamentally similar in the advantageous features. The optical detector in Embodiment 1 is implemented by one signal integrated optical detector 13 and it can contribute to the reduction of the overall number of the components and the downsizing of the optical pickup. Embodiment 2 unlike Embodiment 1 includes two or more optical detectors and allows its photosensitive region to be patterned with much ease. The other embodiments described in Embodiment 1 are effectively realized in Embodiment 2 with equal advantage.

Although the dichroic property of the third optical surface 4c is specified for passing almost entirely the blue-violet laser beam and reflecting almost entirely the red laser beam and the infrared laser beam throughout the descriptions, it may be modified with the two light sources reversed in the arrangement where the blue-violet laser beam is almost entirely reflected while the red laser beam and the infrared laser beam are passed almost entirely. In the latter case, the arrangement of Embodiment 2 can remain effective to provide the equal advantages.

In the embodiments, two different wavelengths of the laser beam emitted from their respective light sources 1a, 1b are combined along the optical axis by the third optical surface 4c and separated again by the optical surface 4a or 4b depending the wavelength and the direction of polarization. Then, the laser beams are guided to respective objective lenses disposed along the different light paths. This allows the two light sources to be located closer to each other, hence minimizing the electric circuitry distance between each light source and the laser driver IC for driving the light source. Accordingly, the drive signal can be transmitted to the light sources quickly and accurately.

As described, the optical pickup of each of Embodiments 1 and 2 has the light path switching unit disposed between the light source and the coupling lens. Alternatively, the light path switching unit in each of the optical pickups of Embodiments 3 to 9, which will be described beneath in more detail, is disposed between the coupling lens and the objective lens.

Embodiment 3

Figure 44:
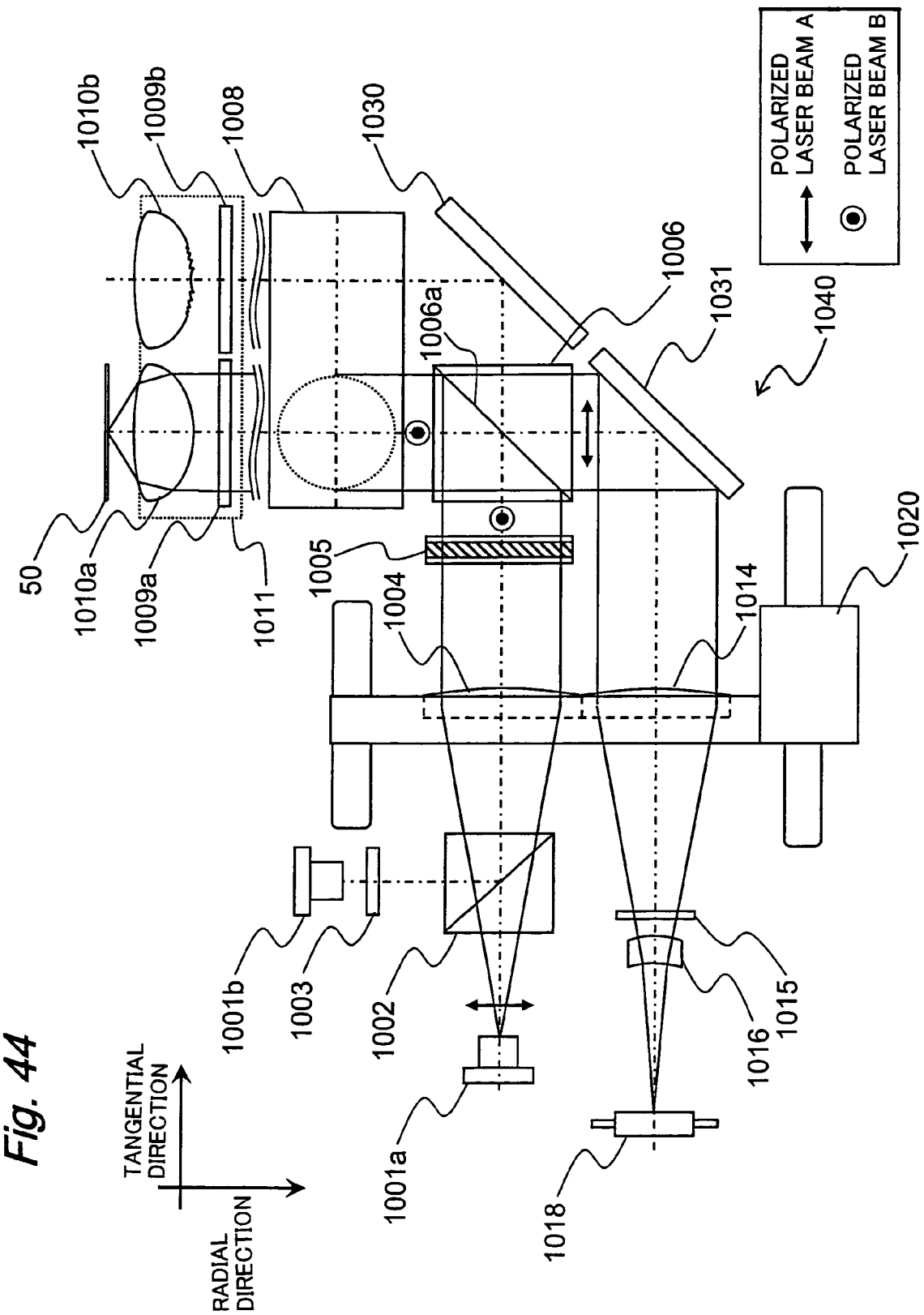
FIG. 44 is a schematic structural view of the optical pickup according to Embodiment 3 of the present invention at its action of recording or playing back the first optical disc.
Figure 45:
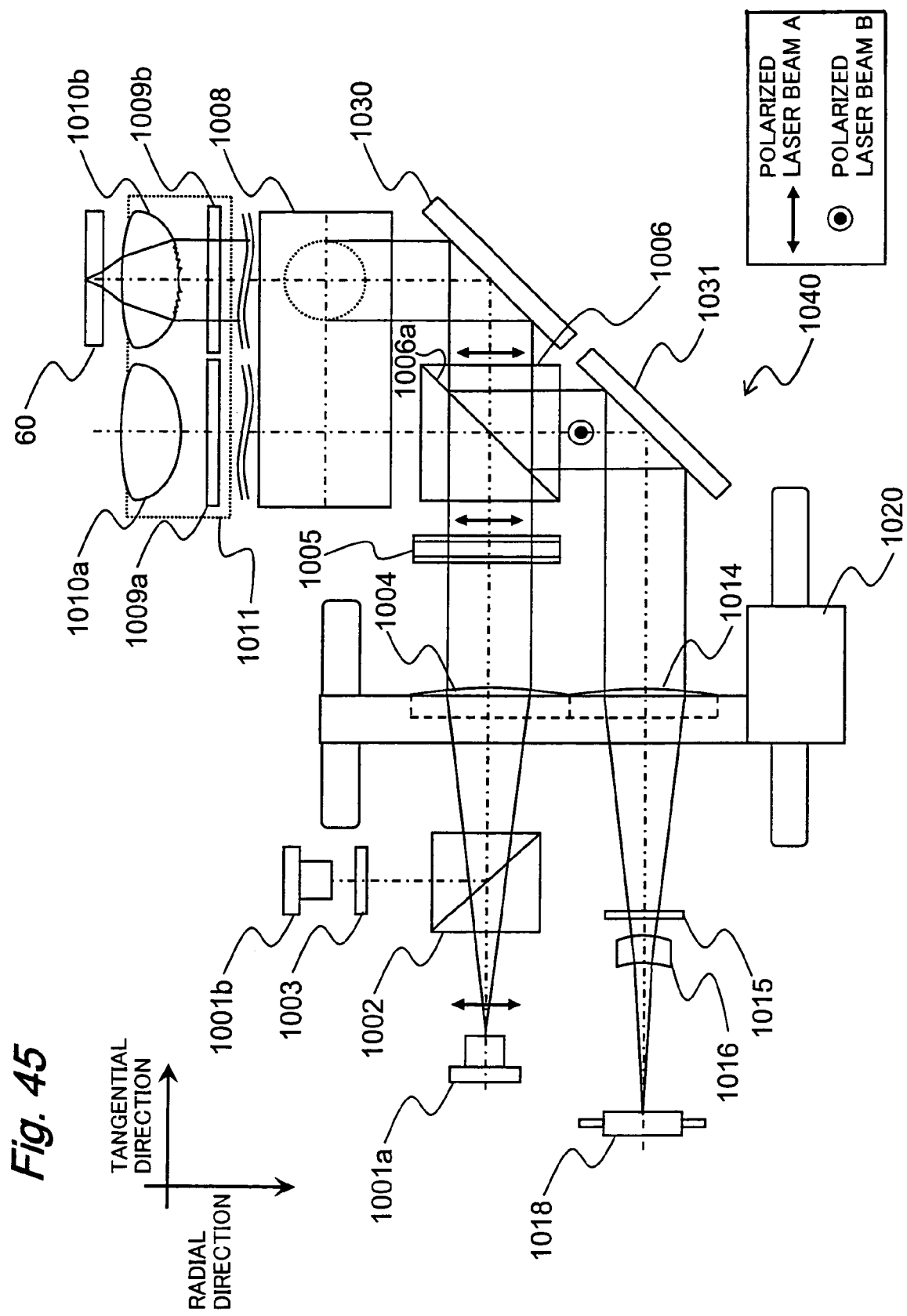
FIG. 45 is a schematic structural view of the optical pickup according to Embodiment 3 of the present invention at its action of recording or playing back the second optical disc.
Figure 46:
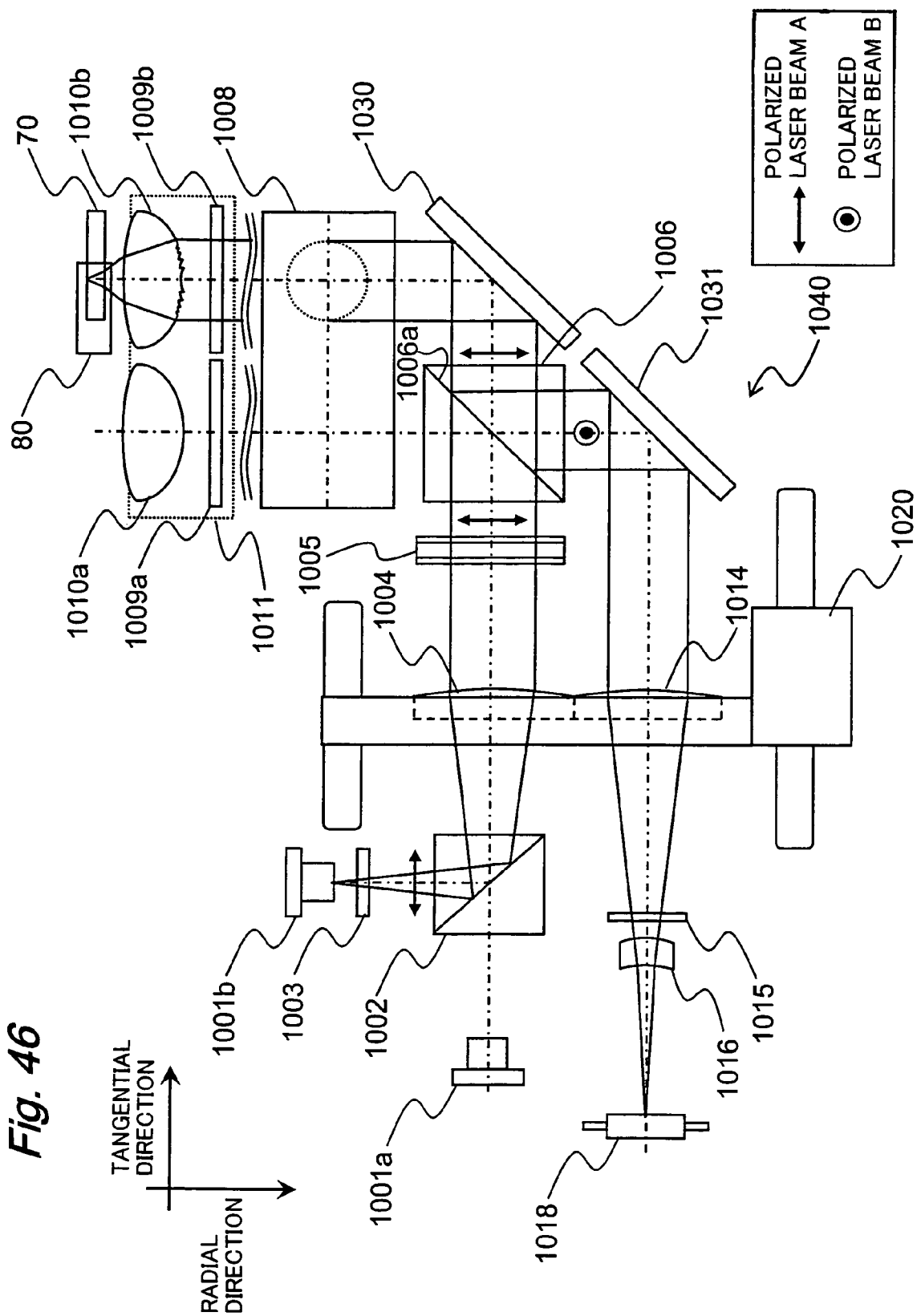
FIG. 46 is a schematic structural view of the optical pickup according to Embodiment 3 of the present invention at its action of recording or playing back the DVD or the CD.

FIGS. 44, 45, and 46 are schematic views of an optical pickup showing a further embodiment of the present invention.

Shown in FIGS. 44, 45, and 46 are a first light source 1001a for emitting a blue-violet laser beam acting as the first laser beam and a second light source 1001b for emitting two different wavelengths of laser beam, a red laser beam acting as the second laser beam and an infrared laser beam acting as the third laser beam.

There are also provided a dichroic prism 1002, a diffraction grating 1003, an advancing path collimator lens 1004 acting as the coupling lens at the advancing path, a polarization converter 1005 made of a liquid crystal device, a transparent piezoelectric device or the like, a polarizing beam splitter 1006 having the function of a light path switching prism, a riser mirror 1008, a pair of ¼ waveplates 1009a, 1009b, a pair of objective lenses 1010a, 1010b, an objective lens actuator 1011, a returning path collimator lens 1014 acting as the coupling lens at the returning path, a detection hologram 1015, a detection lens 1016, an optical detector 1018, a collimator lens actuator 1020, a first reflective mirror 1030, and a second reflective mirror 1031, which all are assembled to complete the optical pickup 1040.

The polarization converter 1005 and the polarizing beam splitter 1006 constitute a light path switching unit.

The polarizing beam splitter 1006 has a polarized light splitting surface 1006a thereof provided for passing almost entirely a polarized light A of the laser beam (polarized horizontal to the paper surface in the drawing) and reflecting almost entirely a polarized light B of the laser beam (polarized vertical to the paper surface in the drawing). The polarized light splitting surface 1006a is simply one example to provide the function of an optical surface.

Denoted by 50 and 60 are a first optical disc of which the transparent substrate has a thickness of substantially 0.1 mm and a second optical disc of which the transparent substrate has a thickness of substantially 0.6 mm respectively while denoted by 70 and 80 are a DVD and a CD respectively.

The optical pickup 1040 of this embodiment is provided for performing both the recording action and the playback action on the first optical disc 50 and only the playback action on the second optical disc 60. It also performs both the recording action and the playback action on the DVD 70 and the CD 80. However, the present invention is not limited to the optical pickup for performing the actions in the described manner but may be applied to an optical pickup capable of performing the recording action on the second optical disc 60.

(First Optical Disc)

The action of the optical pickup 1040 for recording or playing back information on the first optical disc 50 will now be described with reference to FIG. 44.

A blue-violet laser beam emitted from the light source 1001a and acting as the first laser beam is passed through the dichroic prism 1002 and converted to substantially a collimated light beam by the advancing path collimator lens 1004. The advancing path collimator lens 1004 is mounted to a lens holder in the collimator lens actuator 1020 for being driven a stepping motor to move along the optical axis of the laser beam.

The blue-violet laser beam emitted from the first light source 1001a is of polarized laser beam A (of which the direction of polarization extends upward and downward in the drawing). The blue-violet laser beam at substantially the collimated light beam produced by the collimator lens 1004 is transmitted to the polarization converter 1005. With its electrodes (not shown) loaded with a voltage, the polarization converter 1005 converts the blue-violet laser beam from the polarized laser beam A to the polarized laser beam B (of which the direction of polarization extends vertical to the paper surface in the drawing) which is turned to 90 degrees in the direction of polarization from the incident mode. The polarized light B of the blue-violet laser beam released from the polarization converter 1005 is transmitted to the polarized light splitting surface 1006a of the polarized laser beam splitter 1006. The polarized light splitting surface 1006a reflects almost entirely the polarized light B of the blue-violet laser beam. The blue-violet laser beam passed through the polarized laser beam splitter 1006 is bent through substantially 90 degrees at the light path by the riser mirror 1008 to run in a direction vertical to the paper surface and then converted into a circularly polarized laser beam By the ¼ waveplate 1009a. The blue-violet laser beam at the circularly polarized light is focused across the transparent substrate by the first objective lens 1010a at the advancing path to form spot on the information recording surface of the first optical disc 50.

The two ¼ waveplates 1009a, 1009b, the first objective lens 1010a, and the second objective lens 1010b are mounted together on the objective lens actuator 1011 for being driven at once to follow surface undulations and data track eccentricities of the first optical disc 50. Alternatively, the two ¼ waveplates 1009a, 1009b may fixedly be mounted to the lower side of the objective lens actuator 1011 and not driven at the same time.

It is noted that the light path bent to the direction vertical to the paper surface by the riser mirror 1008 is illustrated to extend in a direction horizontal to the paper surface for ease of the description (as is repeated equally hereinafter).

As described previously in Embodiment 1, when the laser beam is focused to form the spot of the beam on the information recording surface of the first optical disc 50, it may have a predetermined of spherical aberration derived from a variation in the thickness of the transparent substrate of the first optical disc 50. Such spherical aberration formed depending on the thickness of the transparent substrate can be offset by a degree of spherical aberration at the opposite polarity which is produced by a diverged or converged light of the laser beam entering the first objective lens 1010a. For example, as shown in FIG. 44, the collimator lens actuator 1020 is driven to move the advancing path collimator lens 1004 forward and backward along the optical axis so as to produce the diverged or converged light of the laser beam which enters to the first objective lens 1010a. Accordingly, the spherical aberration at the opposite polarity can be created in the first objective lens 1010a for canceling the spherical aberration derived from the variation in the thickness of the transparent substrate of the optical disc.

In this manner equal to that of Embodiment 1 and the like, the arrangement with the collimator lens actuator 1020 being driven to move the advancing path collimator lens 1004 forward and backward along the optical axis also forms a spherical compensating mechanism.

Then, the blue-violet laser beam acting as a first reflection light after reflected on the information recording surface of the first optical disc 50 is transmitted along the returning path to the ¼ waveplate 1009a where it is converted to the polarized laser beam A. The polarized light A of the blue-violet laser beam along the returning path is then received by the polarized light splitting surface 1006a of the polarizing beam splitter 1006. The polarized light splitting surface 1006a passes the polarized light A of the blue-violet laser beam at the returning path. The blue-violet laser beam passed along the returning path through the polarizing beam splitter 1006 is reflected by the second reflective mirror 1031 and received by the returning path collimator lens 1014. The blue-violet laser beam at the returning path is converted from substantially the collimated light beam to a converged light by the returning path collimator lens 1014, split further by the detection hologram 1015 for detection of the servo signal, and then provided with a predetermined of astigmatism by the detection lens 1016 before transmitted to the optical detector 1018. The optical detector 1018 produces the data signal and the servo signal from the blue-violet laser beam received at the returning path.

(Second Optical Disc)

The action of the optical pickup 1040 for playing back information on the second optical disc 60 will then be described with reference to FIG. 45.

A blue-violet laser beam emitted from the light source 1001a is passed through the dichroic prism 1002 and converted to substantially a collimated light beam by the advancing path collimator lens 1004. The blue-violet laser beam emitted from the first light source 1001a is of polarized laser beam A (of which the direction of polarization extends upward and downward in the drawing). The blue-violet laser beam at substantially the collimated light beam produced by the advancing path collimator lens 104 is transmitted to the polarization converter 1005. With electrodes (not shown) loaded with no voltage, the polarization converter 1005 passes the polarized light A of the blue-violet laser beam without changing the direction of polarization. The polarized light A of the blue-violet laser beam is received by the polarized light splitting surface 1006a of the polarized laser beam splitter 1006. The polarized light splitting surface 1006a passes the polarized light A of the blue-violet laser beam. The blue-violet laser beam passed through the polarizing beam splitter 1006 is reflected by the first reflective mirror 1030, bent to substantially 90 degrees at the optical axis by the riser mirror 1008 to run in a direction vertical to the paper surface, converted into a circularly polarized laser beam by the ¼ waveplate 1009b, and focused across the transparent substrate by the second objective lens 1010b to form the spot of the beam on the information recording surface of the second optical disc 60.

The two ¼ waveplates 1009a, 1009b, the first objective lens 1010a, and the second objective lens 1010b are mounted together on the objective lens actuator 1011 for being driven at once to follow surface undulations and data track eccentricities of the second optical disc 60.

Alternatively, the collimator lens actuator 1020 may be driven to move the advancing path collimator lens 1004 forward and backward along the optical axis for producing the diverged or converged light of the laser beam which enters to the second objective lens 1010b, whereby the spherical aberration derived from a variation in the thickness of the transparent substrate of the second optical disc 60 can be eliminated.

Then, the reflected blue-violet laser beam, acting as the second reflection light, on the information recording surface of the second optical disc 60 is transmitted along the returning path to the ¼ waveplate 1009b where it is converted to the polarized laser beam B. The polarized light B of the blue-violet laser beam is then reflected by the first reflective mirror 1030 and received by the polarized light splitting surface 1006a of the polarizing beam splitter 1006. The polarized light splitting surface 1006a reflects the polarized light B of the blue-violet laser beam at the returning path. The blue-violet laser beam released along the returning path from the polarizing beam splitter 1006 is reflected by the second reflective mirror 1031 and converted from substantially the collimated light beam to a converged light by the returning path collimator lens 1014. The blue-violet laser beam at the returning path is passed through the detection hologram 1015, provided with a predetermined of astigmatism by the detection lens 1016, and received by the optical detector 1018. The optical detector 1018 produces the data signal and the servo signal from the blue-violet laser beam received at the returning path.

(DVD, CD)

The action of the optical pickup 1040 for recording or playing back information on the DVD 70 or the CD 80 will be described with reference to FIG. 46.

A red color laser beam emitted from the light source 1001b and acting as the second laser beam is passed through the diffraction grating 1003 which produces diffracted light for generating the tracking error signal with the use of a DPP (differential push pull) technique, reflected by the dichroic prism 1002, and converted into substantially a collimated light beam by the advancing path collimator lens 1004.

The red laser beam emitted from the second light source 1001b is of polarized laser beam A (of which the direction of polarization extends leftward and rightward in the drawing). The red laser beam at substantially the collimated light beam is received along the advancing path by the polarization converter 1005. The polarization converter 1005 remains not loaded with any voltage and allows the red laser beam to pass through without changing direction of polarization of the beam. The polarized light A of the red laser beam is then received by the polarized light splitting surface 1006a of the polarizing beam splitter 1006. The polarized light splitting surface 1006a passes the polarized light A of the red laser beam. The polarized light A of the red laser beam passed through the polarizing beam splitter 1006 is reflected by the first reflective mirror 1030, bent to substantially 90 degrees at the optical axis by the riser mirror 1008 to run in a direction vertical to the paper surface, converted into a circularly polarized laser beam by the ¼ waveplate 1009b, and focused across the transparent substrate by the second objective lens 1010b to form the spot of the beam on the information recording surface of the DVD 70.

Then, the polarized light A of the red laser beam, reflected on the information recording surface of the DVD 70 and acting as the third reflection light, is transmitted along the returning path to the ¼ waveplate 1009b where it is converted to the polarized light B. The polarized light B of the red laser beam is then reflected by the first reflective mirror 1030 and received by the polarized light splitting surface 1006a of the polarizing beam splitter 1006. The polarized light splitting surface 1006a reflects the polarized light B of the red laser beam at the returning path. The red laser beam released along the returning path from the polarizing beam splitter 1006 is reflected by the second reflective mirror 1031 and converted from substantially the collimated light beam to a converged light by the returning path collimator lens 1014, passed through the detection hologram 1015, provided with a predetermined of astigmatism by the detection lens 1016, and received by the optical detector 1018. The optical detector 1018 produces the data signal and the servo signal from the red laser beam received at the returning path.

The optical pickup 1040 of this embodiment is capable of performing either the recording action or the playback action on the CD 80 with the second light source 1001b emitting the infrared laser beam as the third laser beam, one of two different wavelengths to be emitted. The action of the optical pickup 1040 for recording and playing back a data on the CD 80 is identical to the action for recording and playing back data on the DVD 70 and will be described in no more detail. The red laser beam at the returning path after reflected on the information recording surface of the CD 80 acts as the fourth reflection light.

(Location of Light Sources)

The first light source 1001a for emitting the blue-violet laser beam and the second light source 1001b for emitting two different wavelengths of laser beam, the red color laser beam and the infrared laser beam, may reverse their locations.

Figure 47:
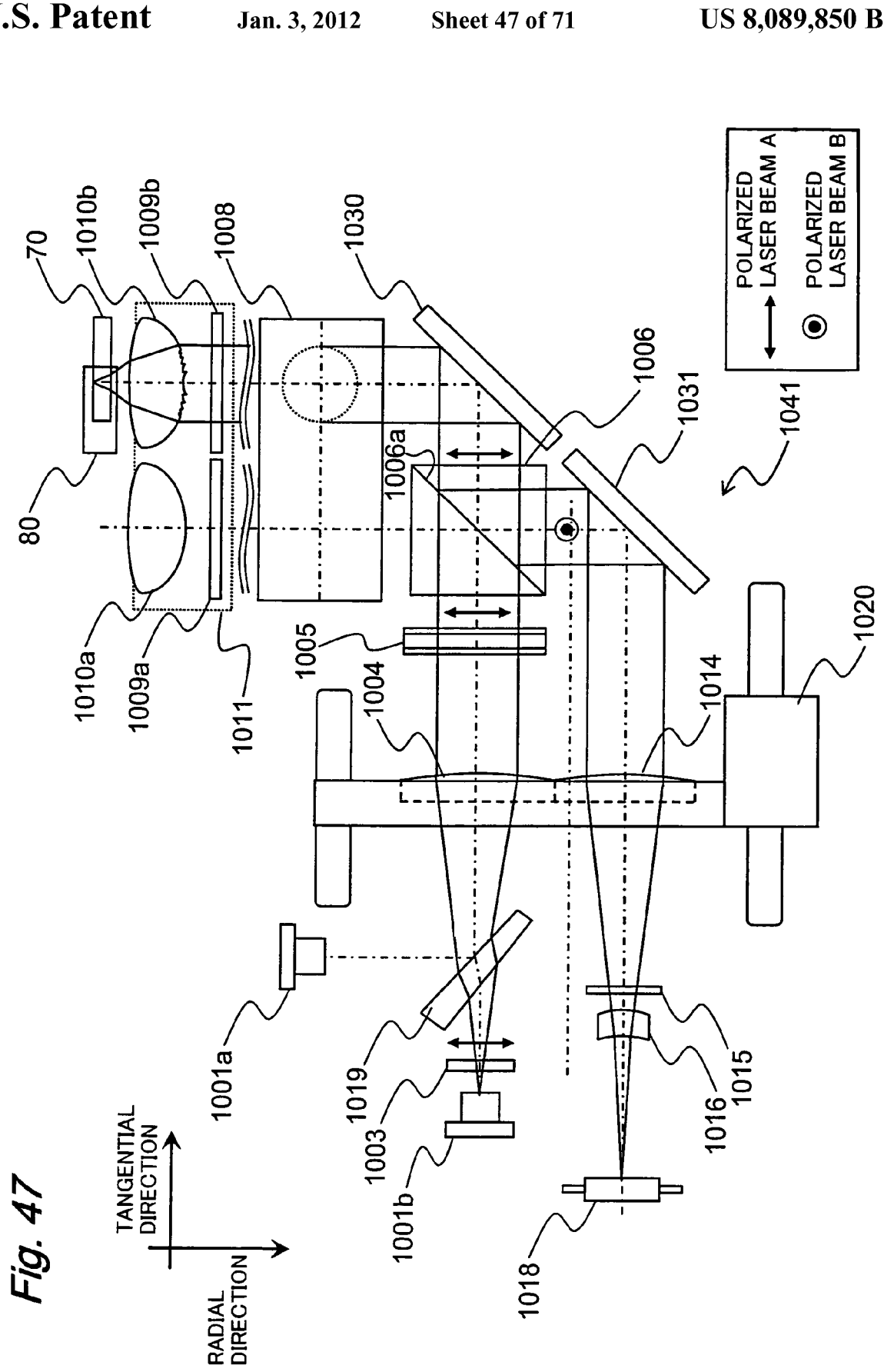
FIG. 47 is a schematic structural view showing a modification of the optical pickup according to Embodiment 3 of the present invention equipped with a wedge prism.

The dichroic prism 1002 may be replaced by a wedge shaped prism 1019 having a wavelength selecting function and installed in such an optical pickup 1041 as shown in FIG. 47. The wedge prism 1019 is less expensive than the dichroic prism 1002 and hardly forms astigmatism even when a diverged light emitted from a light source is passed through the wedge prism 1019 in a design. However, the wedge prism 1019 may create a small degree of astigmatism in the passing light due to a variation in its apex angle.

It is desired that the blue-violet laser beam for recording and playing back the first optical disc 50 or the second optical disc 60 has to have higher in the wavefront aberration property than the red laser beam or the infrared laser beam for recording and playing back the DVD 70 or the CD 80. Therefore, as shown in FIG. 47, the blue-violet laser beam emitted from the first light source 1001a is reflected by the wedge prism 1019 for suppressing the increase of the wavefront aberration at the blue-violet laser beam.

The first light source 1001a for emitting the blue-violet laser beam and the second light source 1001b for emitting the red laser beam and the infrared laser beam of two different wavelengths are located close to each other with the dichroic prism 1002 and the wedge prism 1019 between them. This allows the first light source 1001a and the second light source 1001b to be driven by a single laser driver IC.

(Riser Mirror)

The riser mirror 1008 may be made of a first riser mirror and a second riser mirror which correspond to the first objective lens 1010a and the second objective lens 1010b respectively.

When the riser mirror 1008 is arranged of a single unit, its two reflective surfaces can be produced by a signal component thus contributing to the downsizing of the optical pickup.

On the other hand, in the riser mirror made of the two separate mirrors, the first riser mirror may be formed with a reflective coating for reflecting the blue-violet laser beam while the second riser mirror is formed with a reflective coating for reflecting all the three wavelengths of the blue-violet laser beam, the red laser beam, and the infrared laser beam. In such case, as the reflective coating can be changed with respect to each riser mirror, area of the reflective coating for reflecting the three different wavelengths, of which the fabrication is not easy in practice, can be smaller.

(Reflective Mirrors)

Figure 48:
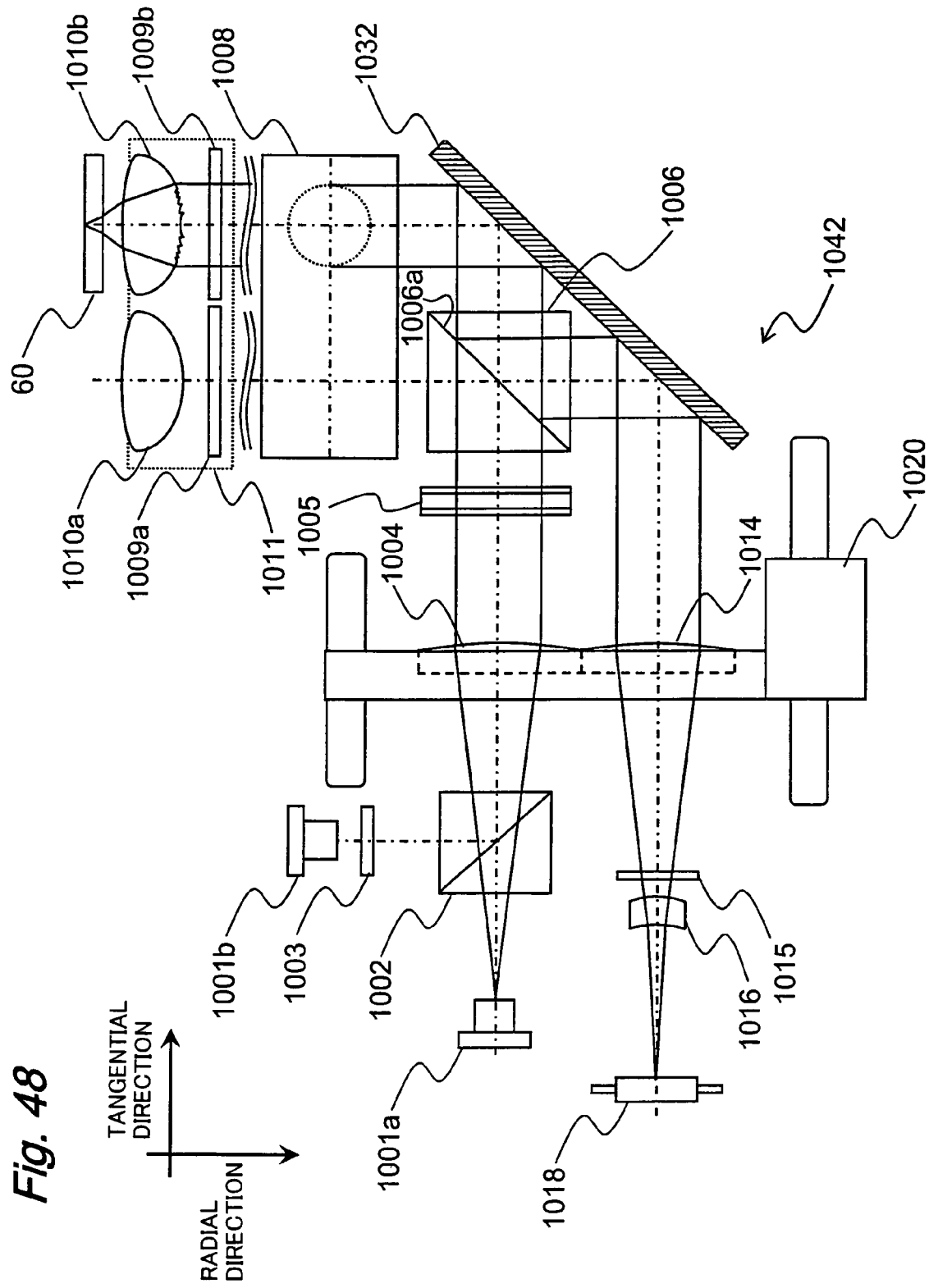
FIG. 48 is a schematic structural view showing a modification of the optical pickup according to Embodiment 3 of the present invention equipped with an integrated reflective mirror.

The first reflective mirror 1030 and the second reflective mirror 1031 in the optical pickup 1040 may be replaced by a single integrated reflective mirror 1032 such as installed in an optical pickup 1042, as shown in FIG. 48. The latter can decrease the total number of the components and the steps of the assembling.

Figure 49:
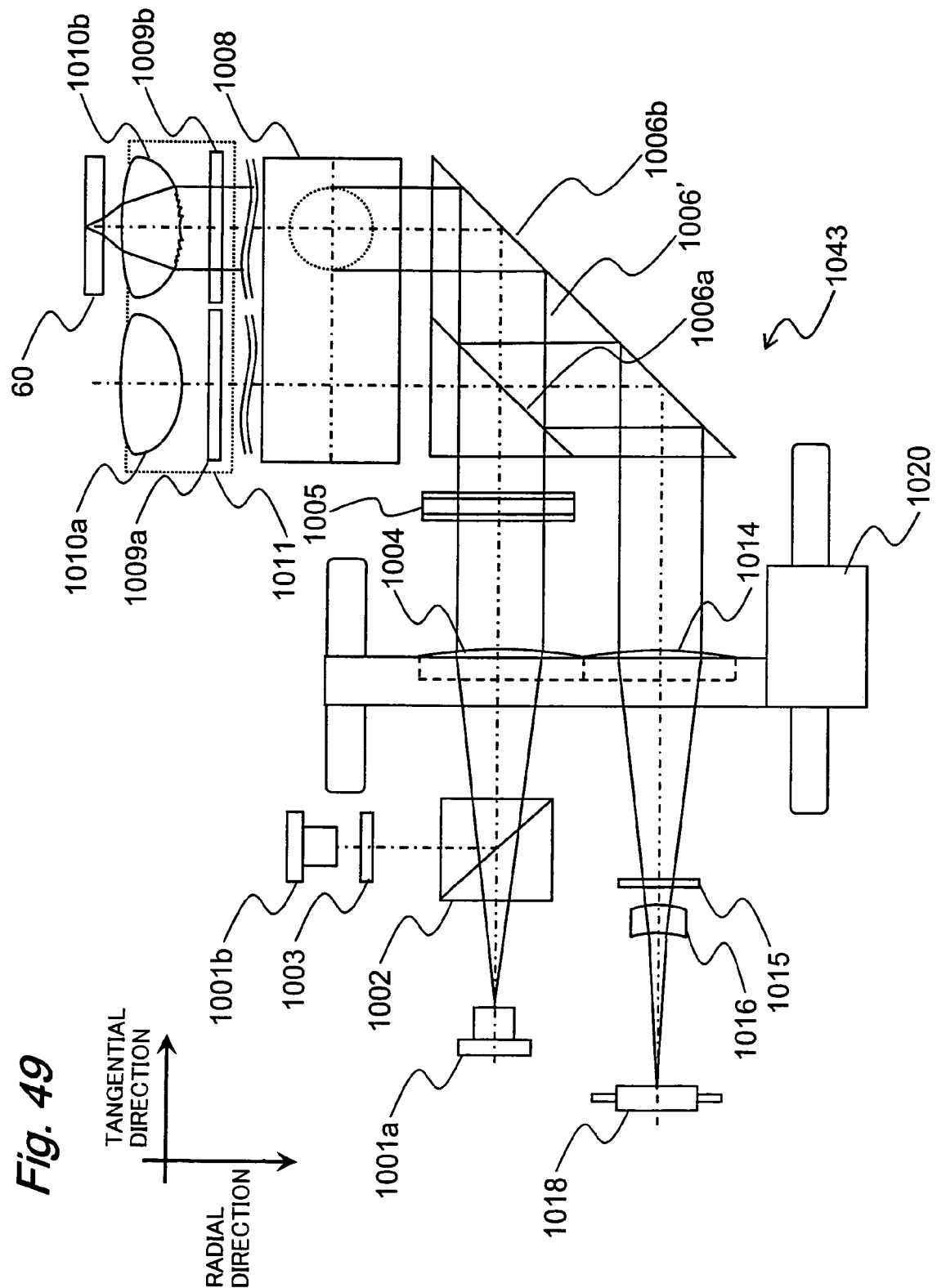
FIG. 49 is a schematic structural view showing a modification of the optical pickup according to Embodiment 3 of the present invention equipped with an integrated polarizing beam splitter.

Alternatively, the first reflective mirror 1030, the second reflective mirror 1031, and the polarizing beam splitter 1006 in the optical pickup 1040 may be replaced by a single integrated polarizing beam splitter 1006' such as installed in an optical pickup 1043, as shown in FIG. 49. The integrated polarizing beam splitter 1006' is made of a right triangle prism and a parallel plate bonded together. The latter can also decrease the overall number of the components and the steps of the assembling. Moreover, this arrangement permits the reflective mirror surface 1006b to extend parallel with the polarized light splitting surface 1006a at higher precision.

(First Objective Lens, Second Objective Lens)

The first objective lens 1010a and the second objective lens 1010b are equivalent to the first objective lens 9 and the second objective lens 10 in Embodiment 1. Accordingly, the description of the function and shape of the first objective lens 1010a and the second objective lens 1010b will be omitted.

Also, the detection of the focusing error signal from the first optical disc 50 and the second optical disc 60, the detection of the tracking error signal from the first optical disc 50 and the second optical disc 60, the construction and action of the detection hologram 1015 equivalent to the detection diffraction grating 11 in Embodiment 1, the servo function for the DVD and the CD, and the construction and action of the collimator lens actuator 1020 equivalent to the collimator lens actuator 20 in Embodiment 1 are identical to those of Embodiment 1 and will be explained in no more detail.

For increasing the working distance (WD) over the CD 80 with the collimator lens actuator 1020 driven to direct the red laser beam emitted from the second light source 1001b to the second objecting lens 1010b, the advancing path collimator lens 1004 may be moved towards the second light source 1001b thus to create a diverged light of the red laser beam but not substantially the collimated light beam before falling on the second objective lens 1010b.

Using the collimator lens actuator 1020, both the red laser beam and the infrared laser beam of two different wavelengths emitted from the laser source 1001b are enabled to be received in their parallel light, diverged light, or converged light by the second objective lens 1010b. This allows the second objective lens 1010b to be enhanced in the design freedom and the optical head to be simplified in the construction.

(Simultaneous Driving of Advancing Path Collimator Lens and Returning Path Collimator Lens)

The returning path collimator lens 1014 is driven together with the advancing path collimator lens 1004 along the optical axis by the collimator lens actuator 1020.

When the advancing path collimator lens 1004 is moved along the optical axis to create a diverged or converged light of the laser beam for eliminating the spherical aberration derived from a variation in the thickness of the transparent substrate in the optical disc, the reflected light of the blue-violet laser beam at the returning path after reflected from the information recording surface of the first optical disc 50 (or the second optical disc 60) appears at the diverged or converged light.

The synergistic relationship between the light source 1001a and the optical detector 1018 remains unchanged when the returning path collimator lens 1014 and the advancing path collimator lens 1004 are moved together along the optical axis. This suppresses the spherical aberration and the defocusing at the spot of the laser beam on the optical detector 1018, thus declining an offset in the focusing error signal. Accordingly, the arrangement with the collimator lens actuator 1020 for driving the returning path collimator lens 1014 and the advancing path collimator lens 1004 at once along the optical axis constitutes a spherical compensating mechanism.

Assuming that the advancing path collimator lens 1004 and the returning path collimator lens 1014 are designed so that their focal distances are equal to each other, the movement of the advancing path collimator lens 1004 and the movement of the returning path collimator lens 1014 are substantially equal to each other for maintaining the synergistic relationship between the light source 1001a and the optical detector 1018. Accordingly, the collimator lens actuator 1020 is contemplated as shown in FIG. 44 for driving the two collimator lenses together along the optical axis.

The shape and other features of the advancing path collimator lens 1004 and the returning path collimator lens 1014 are identical to those described in Embodiment 1 and will be explained in no more detail.

(Relationship Between Seek Center Line on Optical Disc and Location of Objective Lens)

Figure 50:
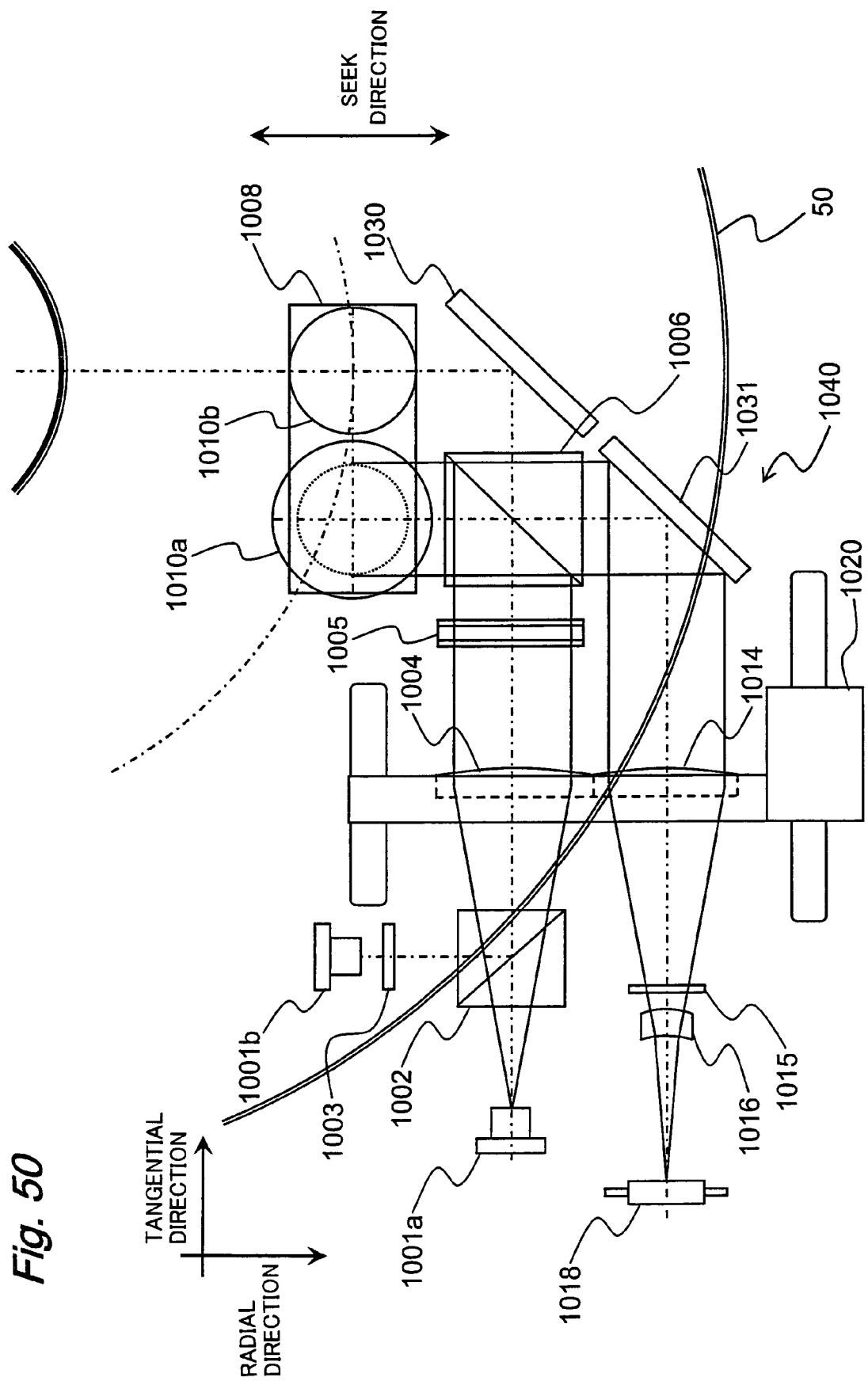
FIG. 50 is a schematic view showing a relationship between the first and second objective lenses and the seek center line of the optical disc according to Embodiment 3 of the present invention.

As shown in FIG. 50, the optical pickup 1040 has the second objective lens 1010b located on the straight or seek center line which extends across the center of the optical disc to be accessed (e.g., the first optical disc 50) and in parallel with the seek direction of the optical pickup. Also, the optical pickup 1040 has the first objective lens 1010a located on the tangent line of the optical disc with respect to the second objective lens 1010b.

The location of the second objective lens 1010b on the seek center line for the DVD 70 and the CD 80 is determined so as to minimize a change in the angle of the data tracks during the seek action of the optical pickup 1040 because the DPP technique, the method for detecting the tracking error signal, is susceptible to a change in the angle of the data tracks.

Meanwhile, the method of detecting the tracking error signal from the first optical disc 50 which is known as a one-beam tracking error signal detecting method remains not susceptible to a change in the angle of the data tracks during the seek action of the optical pickup 1040. Accordingly, the first objective lens 1010a for accessing the first optical disc 50 can be located off the seek center line.

Figure 51:
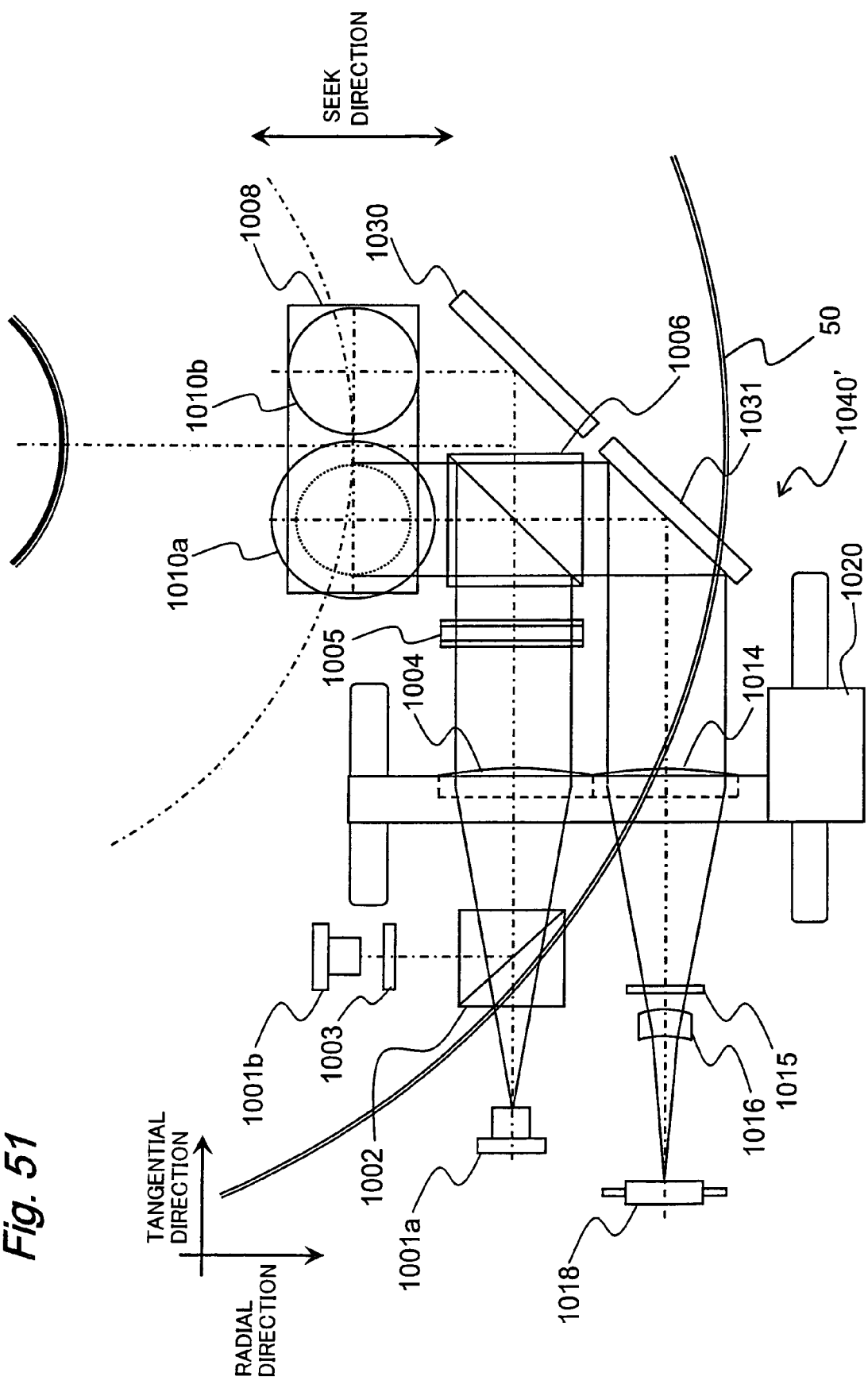
FIG. 51 is a schematic view showing another relationship between the first and second objective lenses and the seek center line of the optical disc according to Embodiment 3 of the present invention.

Alternatively, the two objective lenses 1010a, 1010b may be located substantially at symmetrical relationship about the seek center line for reducing a change in the angle of the data tracks during the seek action of the optical pickup such as an optical pickup 1040' shown in FIG. 51.

(Rim Intensity and Beam Shaping Parts)

When the direction of polarization of the laser beam emitted from the first light source 1001a is predetermined such as in the optical pickup 1040 of the present embodiment, the rim intensity along a radial direction of the optical disc increases while the rim intensity along the tangent direction decreases. For decreasing the rim intensity along the radial direction of the optical disc and increasing the rim intensity along the tangent direction, the first light source 1001a is turned through 90 degrees about the optical axis of the laser beam to be emitted from the first light source 1001a. This causes the blue-violet laser bean emitted from the first light source 1001a to be of polarized laser beam B (of which the direction of polarization extends vertical to the paper surface in the drawing).

Therefore, for performing the recording or playback action of the first optical disc 50, the polarization converter 1005 is loaded with no voltage between its electrodes thus to pass the polarized light B of the blue-violet laser beam therethrough without changing the polarization direction. For the playback action of the second optical disc 60, the polarization converter 1005 is loaded with a voltage between its electrodes thus to convert the blue-violet laser beam into the polarized laser beam A which is shifted 90 degrees in polarization direction from the incoming polarized light B.

For having the rim intensity equalized between the radial direction and the tangent direction of the optical disc, the first light source 1001a is turned through 45 degrees about the optical axis of the laser beam so that the laser beam emitted therefrom is of polarized laser beam A or B while the ½ waveplate is located just after the emitting from the first light source 1001a for shifting the direction of polarization.

The rim intensity may be equalized between the radial direction and the tangent direction of the optical disc by not turning the first light source 1001a along the optical axis of the laser beam but shaping or converting the laser beam emitted from the first light source 1001a from an oval distribution mode of the intensity to substantially a circular distribution mode with the use of a beam shaping part. When the beam shaping part is employed, the efficiency of receiving the laser beam will also increase.

Embodiment 4

Figure 52:
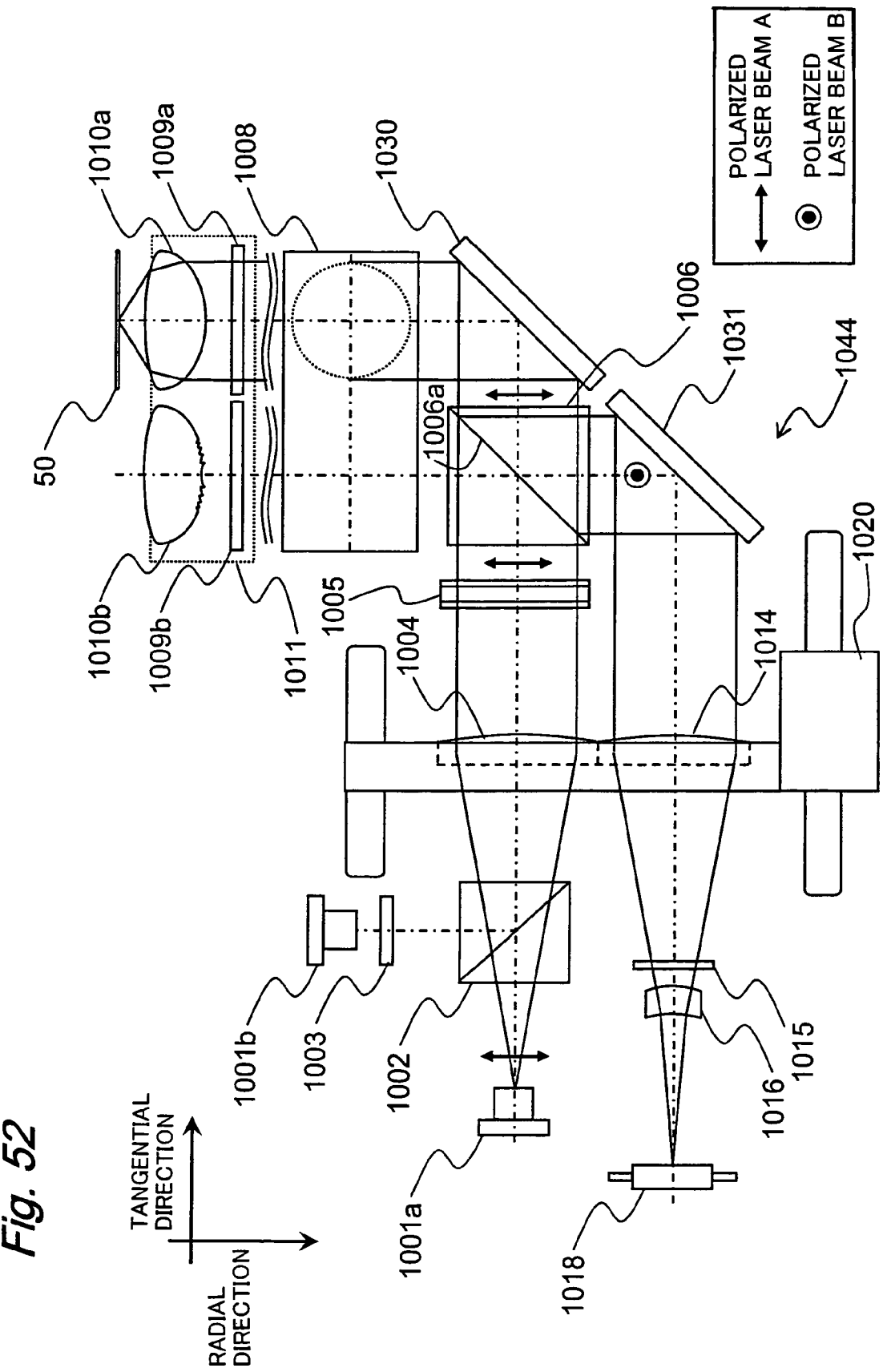
FIG. 52 is a schematic structural view of an optical pickup at its action of recording or playing back the first optical disc according to Embodiment 4 of the present invention.
Figure 53:
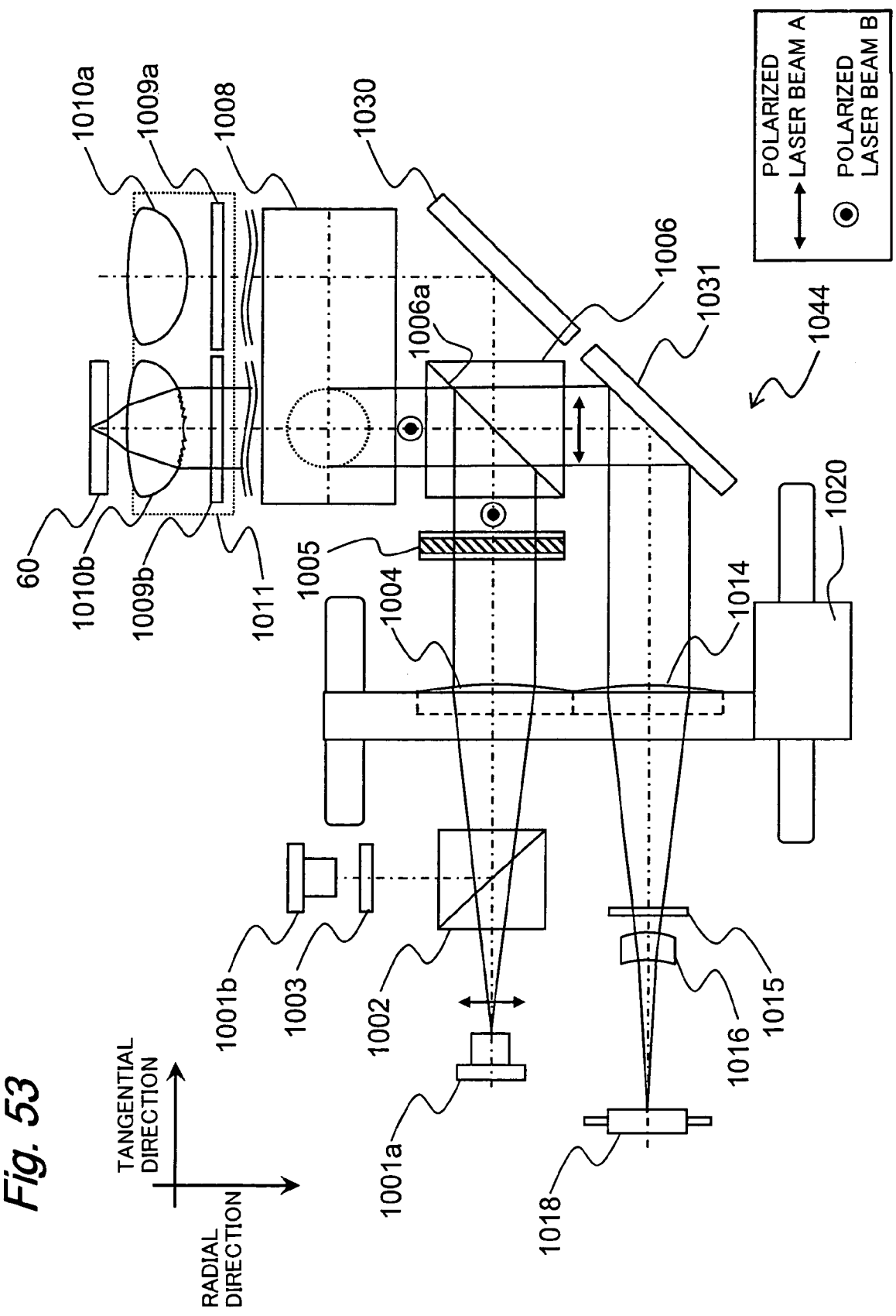
FIG. 53 is a schematic structural view of the optical pickup according to Embodiment 4 of the present invention at its action of recording or playing back the second optical disc.

FIGS. 52 and 53 are schematic views of an optical pickup 1044 showing a further embodiment of the present invention.

The optical pickup 1044 is specified in which the first objective lens 1010a and the second objective lens 1010b are located at opposite positions to those in the optical pickup 1040 described in Embodiment 3.

In FIGS. 52 and 53, like components are denoted by like numerals as those of Embodiment 3 shown in FIGS. 44 to 46 and will be explained in no more detail.

(First Optical Disc)

The action of the optical pickup 1044 for performing either the recording action or the playback action on the first optical disc 50 will be described referring to FIG. 52.

A blue-violet laser beam emitted from the light source 1001a is passed through the dichroic prism 1002 and converted into substantially a collimated light beam by the advancing path collimator lens 1004. The advancing path collimator lens 1004 is held by a lens holder in the collimator lens actuator 1020 and can thus be driven by a stepping motor for movement along the optical axis of the laser beam.

The blue-violet laser beam emitted from the first light source 1001a is of polarized laser beam A (of which the direction of polarization extends upward and downward in the drawing). The blue-violet laser beam at substantially the collimated light beam released from the collimator lens 1004 is received by the polarization converter 1005. With electrode (not shown) of the polarization converter 1005 remaining not loaded with a voltage, the polarization converter 1005 passes the blue-violet laser beam without changing the direction of polarization. The polarized light A of the blue-violet laser beam passed through the polarization converter 1005 thus falls on the polarized light splitting surface 1006a of the polarizing beam splitter 1006. The polarized light splitting surface 1006a passes the polarized light A of the blue-violet laser beam. The blue-violet laser beam passed in the advancing path through the polarizing beam splitter 1006 is reflected by the first reflective mirror 1030, bent through substantially 90 degrees at the light path by the riser mirror 1008 to run in a direction vertical to the paper surface, converted into a circularly polarized laser beam by the ¼ waveplate 1009a, and focused across the transparent substrate by the first objective lens 1010a to form the spot of the beam on the information recording surface of the first optical disc 50.

The polarized light A of the blue-violet laser beam reflected on the information recording surface of the first optical disc 50 is transmitted along the returning path to the ¼ waveplate 1009a where it is converted to the polarized laser beam B. The polarized light B of the blue-violet laser beam is then reflected at the returning path by the first reflective mirror 1030 before received by the polarized light splitting surface 1006a of the polarizing beam splitter 1006. The polarized light splitting surface 1006a reflects the polarized light B of the blue-violet laser beam at the returning path. The blue-violet laser beam released at the returning path from the polarizing beam splitter 1006 is reflected by the second reflective mirror 1031 and received by the returning path collimator lens 1014. The blue-violet laser beam at the returning path is converted from substantially the collimated light beam to a converged light by the returning path collimator lens 1014, split further by the detection hologram 1015 for detection of the servo signal, and then provided with a predetermined astigmatism by the detection lens 1016 before transmitted to the optical detector 1018. The optical detector 1018 produces the data signal and the servo signal from the blue-violet laser beam received at the returning path.

(Second Optical Disc)

The action of the optical pickup 1044 for playing back data on the second optical disc 60 will then be described with reference to FIG. 53.

A blue-violet laser beam emitted from the light source 1001a is passed through the dichroic prism 1002 and converted to substantially a collimated light beam by the advancing path collimator lens 1004. The blue-violet laser beam emitted from the first light source 1001a is of polarized laser beam A (of which the direction of polarization extends upward and downward in the drawing). The blue-violet laser beam at substantially the collimated light beam produced by the advancing path collimator lens 1004 is transmitted to the polarization converter 1005. When loaded with a voltage, the polarization converter 1005 converts the polarized light A of the blue-violet laser beam from the polarized light A to the polarized light B (polarized vertical to the paper surface in the drawing) of which the direction of polarization is turned through 90 degrees. The polarized light B of the blue-violet laser beam is received by the polarized light splitting surface 1006a of the polarizing beam splitter 1006. The polarized light splitting surface 1006a reflects the polarized light B of the blue-violet laser beam. The blue-violet laser beam released from the polarizing beam splitter 1006 is bent to substantially 90 degrees at the optical axis by the riser mirror 1008 to run in a direction vertical to the paper surface, converted into a circularly polarized laser beam by the ¼ waveplate 1009b, and focused across the transparent substrate by the second objective lens 1010b to form the spot of the beam on the information recording surface of the second optical disc 60.

The polarized light B of the blue-violet laser beam reflected on the information recording surface of the second optical disc 60 is transmitted along the returning path to the ¼ waveplate 1009b where it is converted to the polarized laser beam A. The polarized light A of the blue-violet laser beam is received by the polarized light splitting surface 1006a of the polarizing beam splitter 1006. The polarized light splitting surface 1006a passes the polarized light A of the blue-violet laser beam at the returning path. The blue-violet laser beam passed along the returning path through the polarizing beam splitter 1006 is reflected by the second reflective mirror 1031 and converted from substantially the collimated light beam to a converged light by the returning path collimator lens 1014. The blue-violet laser beam at the returning path is passed through the detection hologram 1015, provided with a predetermined astigmatism by the detection lens 1016, and received by the optical detector 1018. The optical detector 1018 produces the data signal and the servo signal from the blue-violet laser beam received at the returning path.

(DVD, CD)

For recording or playing back the DVD 70 or the CD 80, a red color laser beam or an infrared laser beam is emitted from the second light source 1001b, passed through the diffraction grating 1003 which produces diffracted light for generating the tracking error signal with the use of a DPP technique, reflected by the dichroic prism 1002, and converted into substantially a collimated light beam by the advancing path collimator lens 1004.

The red laser beam or the infrared laser beam emitted from the second light source 1001b is of polarized laser beam A (of which the direction of polarization extends leftward and rightward in the drawing). The red laser beam or the infrared laser beam at substantially the collimated light beam is then received along the advancing path by the polarization converter 1005. The polarization converter 1005 remains loaded with a voltage and converts the red laser beam or the infrared laser beam from the polarized laser beam A to the polarized laser beam B (polarized vertical to the paper surface in the drawing) of which the direction of polarization is turned through 90 degrees. The polarized light B of the red laser beam or the infrared laser beam is then received by the polarized light splitting surface 1006a of the polarizing beam splitter 1006. The polarized light splitting surface 1006a reflects the polarized light B of the red laser beam or the infrared laser beam. The polarized light B of the red laser beam or the infrared laser beam released from the polarizing beam splitter 1006 is bent to substantially 90 degrees at the optical axis by the riser mirror 1008 to run in a direction vertical to the paper surface, converted into a circularly polarized light by the ¼ waveplate 1009b, and focused across the transparent substrate by the second objective lens 1010b to form the spot of the beam on the information recording surface of the DVD 70 or the CD 80.

Then, the polarized light B of the red laser beam or the infrared laser beam reflected on the information recording surface of the DVD 70 or the CD 80 is converted into the polarized light A at the returning path by the ¼ waveplate 1009b and received by the polarized light splitting surface 1006a of the polarizing beam splitter 1006. The polarized light splitting surface 1006a passes the polarized light A of the red laser beam or the infrared laser beam at the returning path. The red laser beam or the infrared laser beam released along the returning path from the polarizing beam splitter 1006 is reflected by the second reflective mirror 1031, converted from substantially the collimated light beam to a converged light by the returning path collimator lens 1014, passed through the detection hologram 1015, provided with a predetermined astigmatism by the detection lens 1016, and received by the optical detector 1018. The optical detector 1018 produces the data signal and the servo signal from the red laser beam or the infrared laser beam received at the returning path.

Embodiment 5

Figure 54:
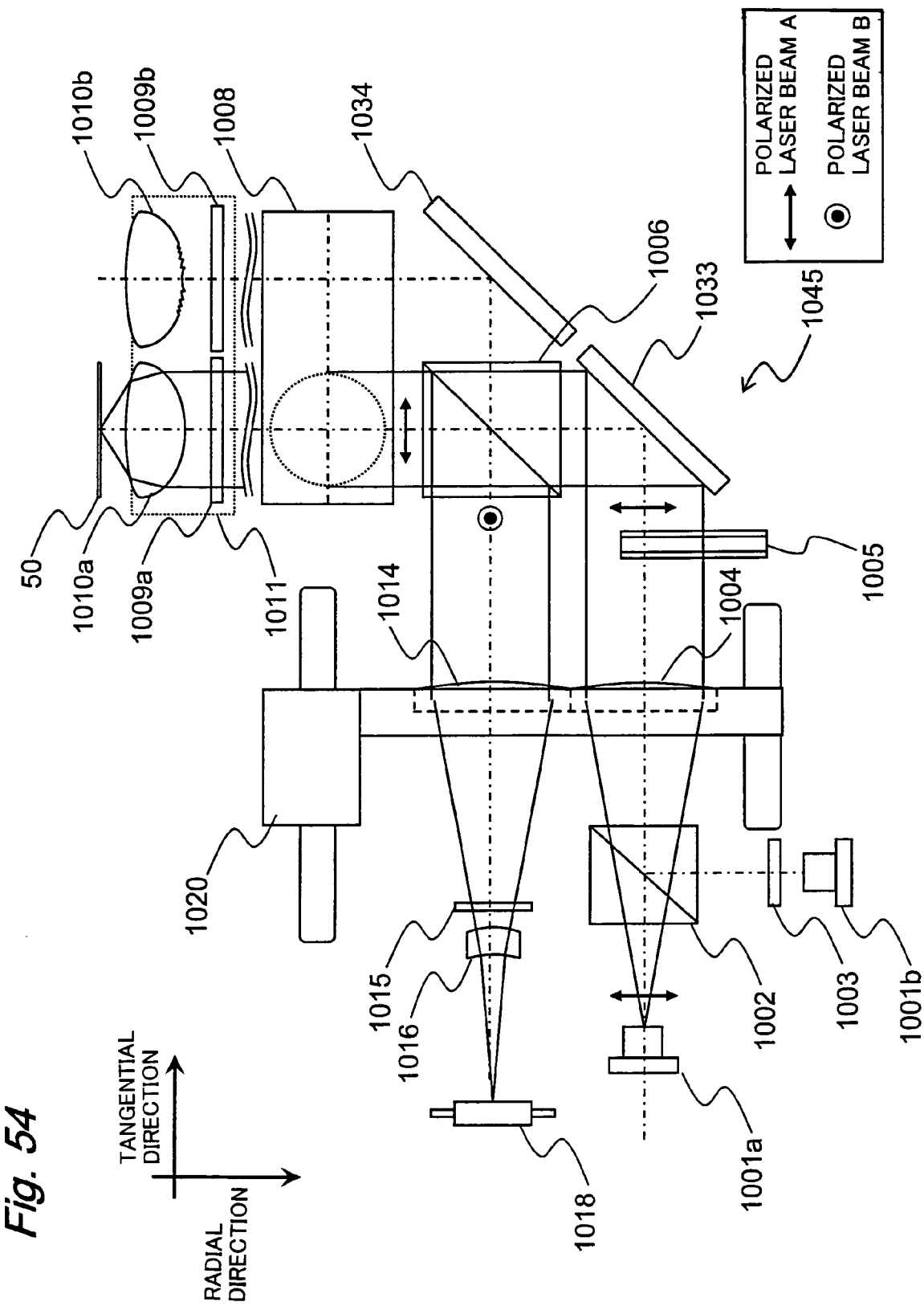
FIG. 54 is a schematic structural view of an optical pickup at its action of recording or playing back the first optical disc according to Embodiment 5 of the present invention.
Figure 55:
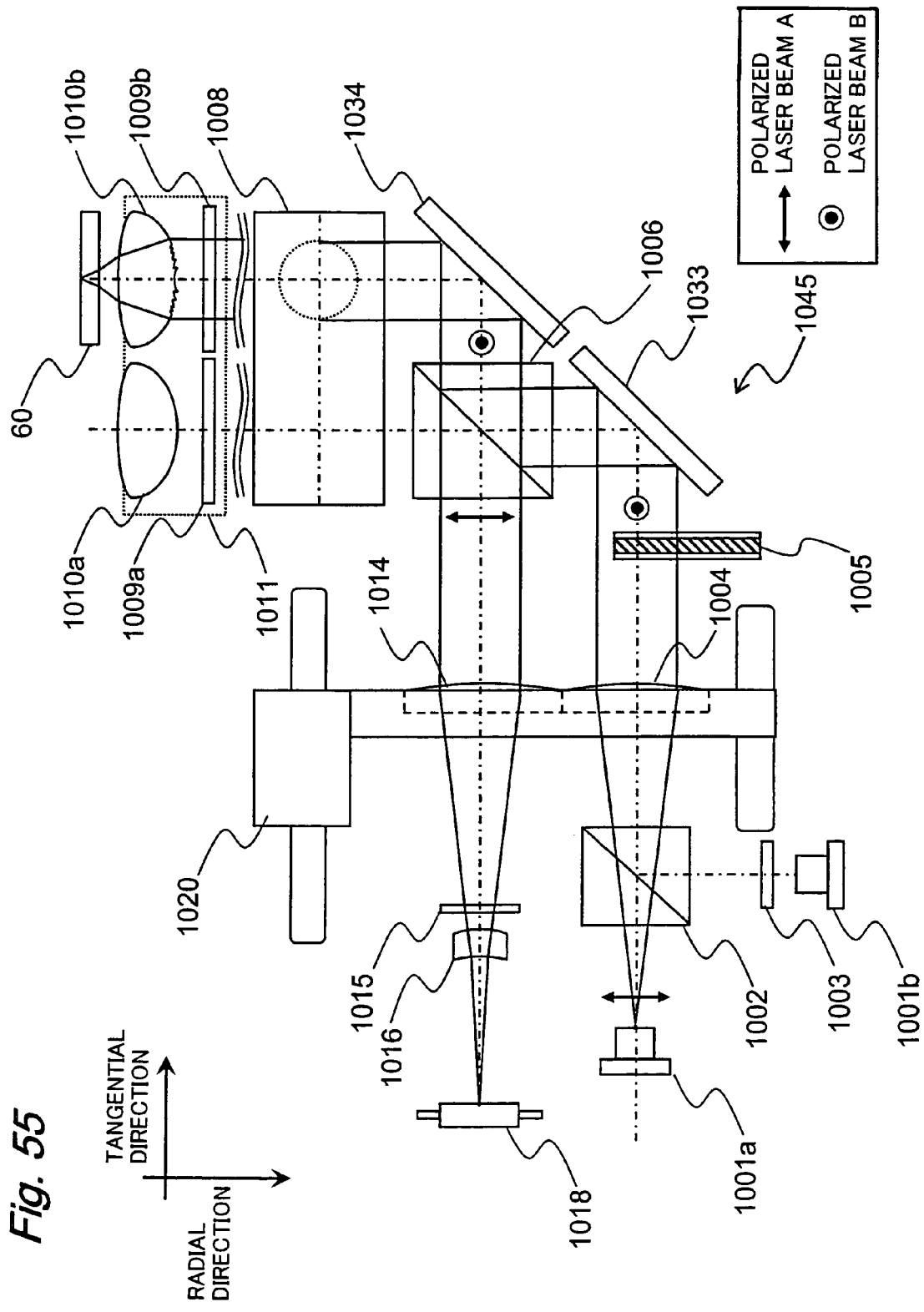
FIG. 55 is a schematic structural view of the optical pickup according to Embodiment 5 of the present invention at its action of recording or playing back the second optical disc.

FIGS. 54 and 55 are schematic views of an optical pickup 1045 showing a further embodiment of the present invention.

The optical pickup 1045 is specified in which the first light source 1001a and the second light source 1001b, and the optical detector 1018 are located at opposite positions to those in the optical pickup 1040 of Embodiment 3. The other arrangements are identical to those of the optical pickup 1040. In FIGS. 54 and 55, like components are denoted by like numerals as those shown in FIGS. 44 to 46 and will be explained in no more detail.

(First Optical Disc)

The action of the optical pickup 1045 for performing either the recording action or the playback action on the first optical disc 50 will be described referring to FIG. 54.

A blue-violet laser beam emitted from the light source 1001a and acting as the first laser beam is passed through the dichroic prism 1002 and converted into substantially a collimated light beam by the advancing path collimator lens 1004. The advancing path collimator lens 1004 is held by a lens holder in the collimator lens actuator 1020 and can thus be driven by a stepping motor for movement along the optical axis of the laser beam.

The direction of polarization of the blue-violet laser beam emitted from the first light source 1001a is of polarized laser beam A (of which the direction of polarization extends upward and downward in the drawing). The blue-violet laser beam at substantially the collimated light beam released from the collimator lens 1004 is received by the polarization converter 1005. When remaining not loaded between electrodes (not shown) of the polarization converter 1005 with a voltage, the polarization converter 1005 passes the blue-violet laser beam without changing the direction of polarization. The polarized light A of the blue-violet laser beam is reflected by the first reflective mirror 1033, passed through the polarized light splitting surface 1006a of the polarizing beam splitter 1006 where it is bent through substantially 90 degrees at the light path by the riser mirror 1008 to run in a direction vertical to the paper surface, and received by the ¼ waveplate 1009a. The polarized light A of the blue-violet laser beam is then converted into a circularly polarized laser beam by the ¼ waveplate 1009a and focused across the transparent substrate by the first objective lens 1010a to form its spot on the information recording surface of the first optical disc 50.

The polarized light A of the blue-violet laser beam reflected on the information recording surface of the first optical disc 50 is transmitted along the returning path to the ¼ waveplate 1009a where it is converted to the polarized laser beam B. The polarized light B of the blue-violet laser beam is then reflected at the returning path by the polarized light splitting surface 1006a of the polarizing beam splitter 1006 and converted from substantially the collimated light beam to a converged light by the returning path collimator lens 1014, split further by the detection hologram 1015 for detection of the servo signal, and then provided with a predetermined astigmatism by the detection lens 1016 before transmitted to the optical detector 1018. The optical detector 1018 produces the data signal and the servo signal from the blue-violet laser beam received at the returning path.

(Second Optical Disc)

The action of the optical pickup 1045 for playing back information on the second optical disc 60 will then be described with reference to FIG. 55.

A blue-violet laser beam emitted from the light source 1001a is passed through the dichroic prism 1002 and converted to substantially a collimated light beam by the advancing path collimator lens 1004. The blue-violet laser beam emitted from the first light source 1001a is of polarized laser beam A (of which the direction of polarization extends upward and downward in the drawing). The polarized light A of the blue-violet laser beam at substantially the collimated light beam produced by the advancing path collimator lens 1004 is transmitted to the polarization converter 1005. With electrodes (not shown) of the polarization converter 1005 loaded with a voltage, the polarization converter 1005 converts the polarized light A of the blue-violet laser beam from the polarized light A to the polarized laser beam B (of which the direction of polarization extends vertical to the paper surface in the drawing) of which the direction of polarization is turned through 90 degrees. The polarized light B of the blue-violet laser beam is reflected by the first reflective mirror 1033, the polarized light splitting surface 1006a of the polarizing beam splitter 1006, and the second reflective mirror 1034 and bent to substantially 90 degrees at the optical axis by the riser mirror 1008 to run in a direction vertical to the paper surface. The polarized light B of the blue-violet laser beam bent along the advancing path is converted into a circularly polarized laser beam by the ¼ waveplate 1009 band focused across the transparent substrate by the second objective lens 1010b to form the spot of the beam on the information recording surface of the second optical disc 60.

The polarized light B of the blue-violet laser beam reflected on the information recording surface of the second optical disc 60 is transmitted along the returning path to the ¼ waveplate 1009b where it is converted to the polarized laser beam A. The polarized light A of the blue-violet laser beam is reflected by the second reflective mirror 1034 and passed through the polarized light splitting surface 1006a of the polarizing beam splitter 1006. The blue-violet laser beam passed along the returning path through the polarizing beam splitter 1006 is converted from substantially the collimated light beam to a converged light by the returning path collimator lens 1014, passed through the detection hologram 1015, provided with a predetermined astigmatism by the detection lens 1016, and received by the optical detector 1018. The optical detector 1018 produces the data signal and the servo signal from the blue-violet laser beam received at the returning path.

(DVD, CD)

For recording or playing back information from the DVD 70 or the CD 80, a red color laser beam or an infrared laser beam is emitted as the second laser beam from the second light source 1001b, passed through the diffraction grating 1003 which produces diffracted light for generating the tracking error signal with the use of a DPP technique, reflected by the dichroic prism 1002, and converted into substantially a collimated light beam by the advancing path collimator lens 1004.

The red laser beam or the infrared laser beam emitted from the second light source 1001b is of polarized laser beam A (of which the direction of polarization extends leftward and rightward in the drawing). The red laser beam or the infrared laser beam at substantially the collimated light beam is then received along the advancing path by the polarization converter 1005. When loaded with a voltage, the polarization converter 1005 converts the red laser beam or the infrared laser beam from the polarized laser beam A to the polarized laser beam B (polarized vertical to the paper surface in the drawing) of which the direction of polarization is turned through 90 degrees. The polarized light B of the red laser beam or the infrared laser beam is then reflected by the first reflective mirror 1033, the polarized light splitting surface 1006a of the polarizing beam splitter 1006, and the second reflective mirror 1034 and bent to substantially 90 degrees at the optical axis by the riser mirror 1008 to run in a direction vertical to the paper surface. The polarized light B of the red laser beam or the infrared laser beam bent at the advancing path is converted into a circularly polarized laser beam by the ¼ waveplate 1009b and focused across the transparent substrate by the second objective lens 1010b to form the spot of the beam on the information recording surface of the DVD 70 or the CD 80.

Then, the polarized laser beam B of the red laser beam or the infrared laser beam reflected on the information recording surface of the DVD 70 or the CD 80 is converted into the polarized laser beam A at the returning path by the ¼ waveplate 1009b. The polarized light A of the red laser beam or the infrared laser beam is reflected by the second reflective mirror 1034 and passed through the polarized light splitting surface 1006a of the polarizing beam splitter 1006. The polarized light A of the red laser beam or the infrared laser beam passed at the returning path through the polarizing beam splitter 1006 is converted from substantially the collimated light beam to a converged light by the returning path collimator lens 1014, passed through the detection hologram 1015, provided with a predetermined astigmatism by the detection lens 1016, and received by the optical detector 1018. The optical detector 1018 produces the data signal and the servo signal from the red laser beam or the infrared laser beam received at the returning path.

Embodiment 6

Figure 56:
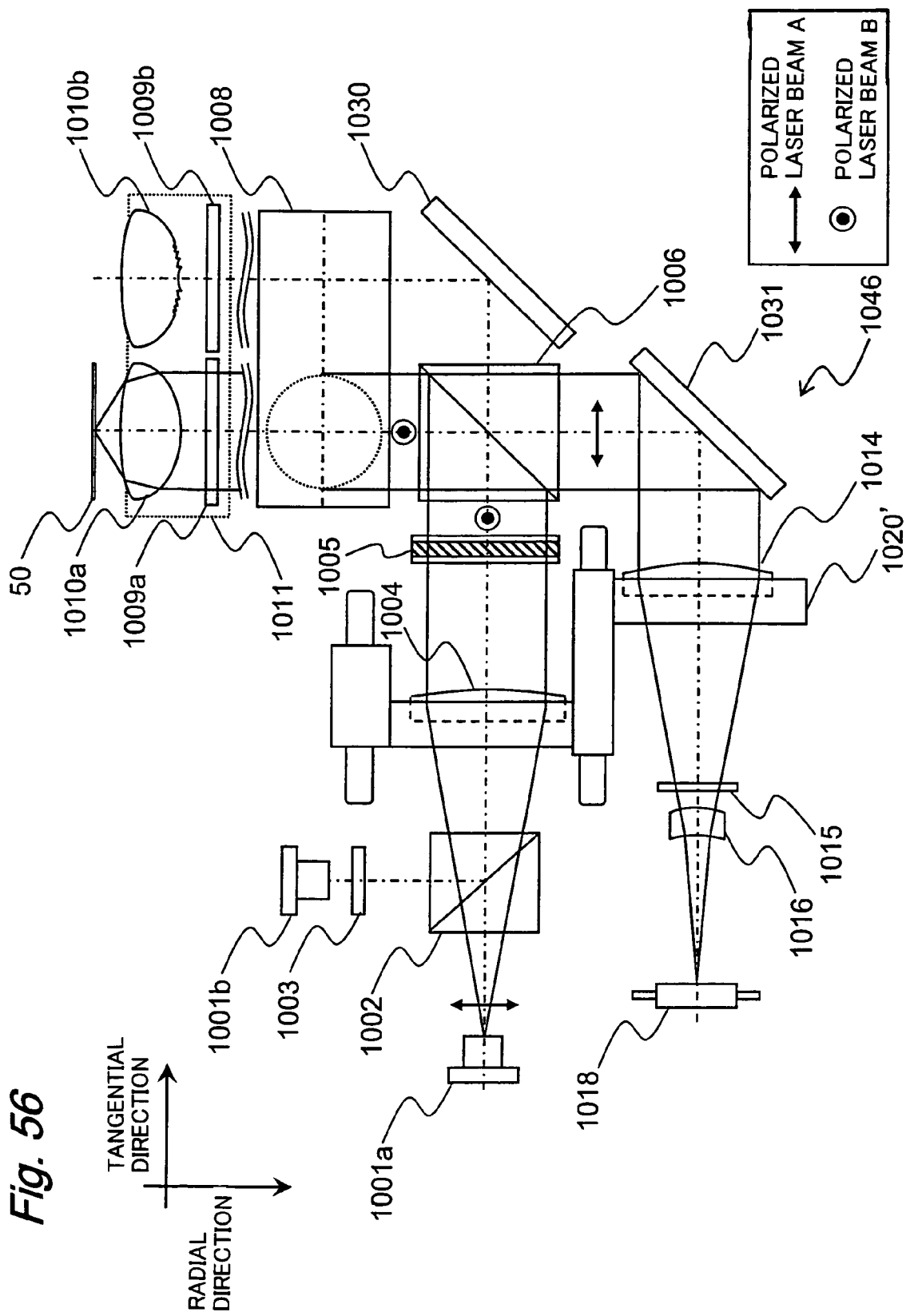
FIG. 56 is a schematic structural view of an optical pickup at its action of recording or playing back the first optical disc according to Embodiment 6 of the present invention.

FIG. 56 is a schematic view of an optical pickup 1046 showing a further embodiment of the present invention.

The optical pickup 1046 is differed from the optical pickup 1040 of Embodiment 3 by the location of advancing path collimator lens 1014 and the configuration of a collimator lens actuator 1020'. The collimator lens actuator 1020' is operated similar to the collimator lens actuator 1020. The other arrangements are identical to those of the optical pickup 1040. In FIG. 56, like components are denoted by like numerals as those shown in FIGS. 44 to 46 and will be explained in no more detail.
(First Optical Disc)

The action of the optical pickup 1046 for performing either the recording action or the playback action on the first optical disc 50 will be described with reference to FIG. 56.

A blue-violet laser beam emitted from the light source 1001a and acting as the first laser beam is passed through the dichroic prism 1002 and converted into substantially a collimated light beam by the advancing path collimator lens 1004.

The advancing path collimator lens 1004 is held by a lens holder in the collimator lens actuator 1020' and can thus be driven by a stepping motor for movement along the optical axis of the laser beam.

The blue-violet laser beam emitted from the first light source 1001a is of polarized laser beam A (of which the direction of polarization extends upward and downward in the drawing). The blue-violet laser beam at substantially the collimated light beam released from the collimator lens 1004 is received by the polarization converter 1005. With electrodes (not shown) of the polarization converter 1005 loaded with a voltage, the polarization converter 1005 converts the blue-violet laser beam from the polarized laser beam A to the polarized laser beam B of which the direction of polarization is turned through 90 degrees (in a vertical direction to the paper surface in the drawing). The polarized light B of the blue-violet laser beam released from the polarization converter 1005 is reflected by the polarized light splitting surface 1006a of the polarizing beam splitter 1006, bent through substantially 90 degrees at the light path by the riser mirror 1008 to run in a direction vertical to the paper surface, converted into a circularly polarized laser beam by the ¼ waveplate 1009a, and focused across the transparent substrate by the first objective lens 1010a to form the spot of the beam on the information recording surface of the first optical disc 50.

The polarized light B of the blue-violet laser beam reflected on the information recording surface of the first optical disc 50 is transmitted along the returning path to the ¼ waveplate 1009a where it is converted to the polarized laser beam A. The polarized light A of the blue-violet laser beam is then passed along the returning path through the polarized light splitting surface 1006a of the polarizing beam splitter 1006. The polarized light A of the blue-violet laser beam passed at the returning path through the polarizing beam splitter 1006 is reflected by the second reflective mirror 1031, converted from substantially the collimated light beam to a converged light by the returning path collimator lens 1014, split further by the detection hologram 1015 for detection of the servo signal, and then provided with a predetermined astigmatism by the detection lens 1016 before transmitted to the optical detector 1018. The optical detector 1018 produces the data signal and the servo signal from the blue-violet laser beam received at the returning path.

It is noted that the distance X1 between the advancing path collimator lens 1004 and the objective lens 1010a and the distance X2 between the returning path collimator lens 1014 and the objective lens 1010a are set substantially equal to each other. More particularly, the advancing path collimator lens 1004 and the returning path collimator lens 1014 are driven together by the collimator lens actuator 1020' for movement along the optical axis of the corresponding objective lenses. This allows the distance X1 between the advancing path collimator lens 1004 and the objective lens 1010a and the distance X2 between the returning path collimator lens 1014 and the objective lens 1010a to remain equal.

As shown in each of the arrangements of Embodiment 3 to 5, the advancing path collimator lens 1004 and the returning path collimator lens 1014 are driven at once by the collimator lens actuator 1020 so as to suppress the spherical aberration and the defocusing of the spot of the falling light beam on the optical detector 1018. On the other hand, Embodiment 6 maintains the distance X1 between the advancing path collimator lens 1004 and the objective lens 1010a and the distance X2 between the returning path collimator lens 1014 and the objective lens 1010a equal, thus substantially eliminating the spherical aberration and the defocusing of the spot of the falling light beam on the optical detector 1018.

The collimator lens actuator 1020' is not limited to the configuration shown in FIG. 56, where there is provided a sub axis between the advancing path collimator lens 1004 and the returning path collimator lens 1014 but may be implemented by any applicable construction. For example, both the main axis and the sub axis are located between the advancing path collimator lens 1004 and the returning path collimator lens 1014.

Embodiment 7

Figure 57:
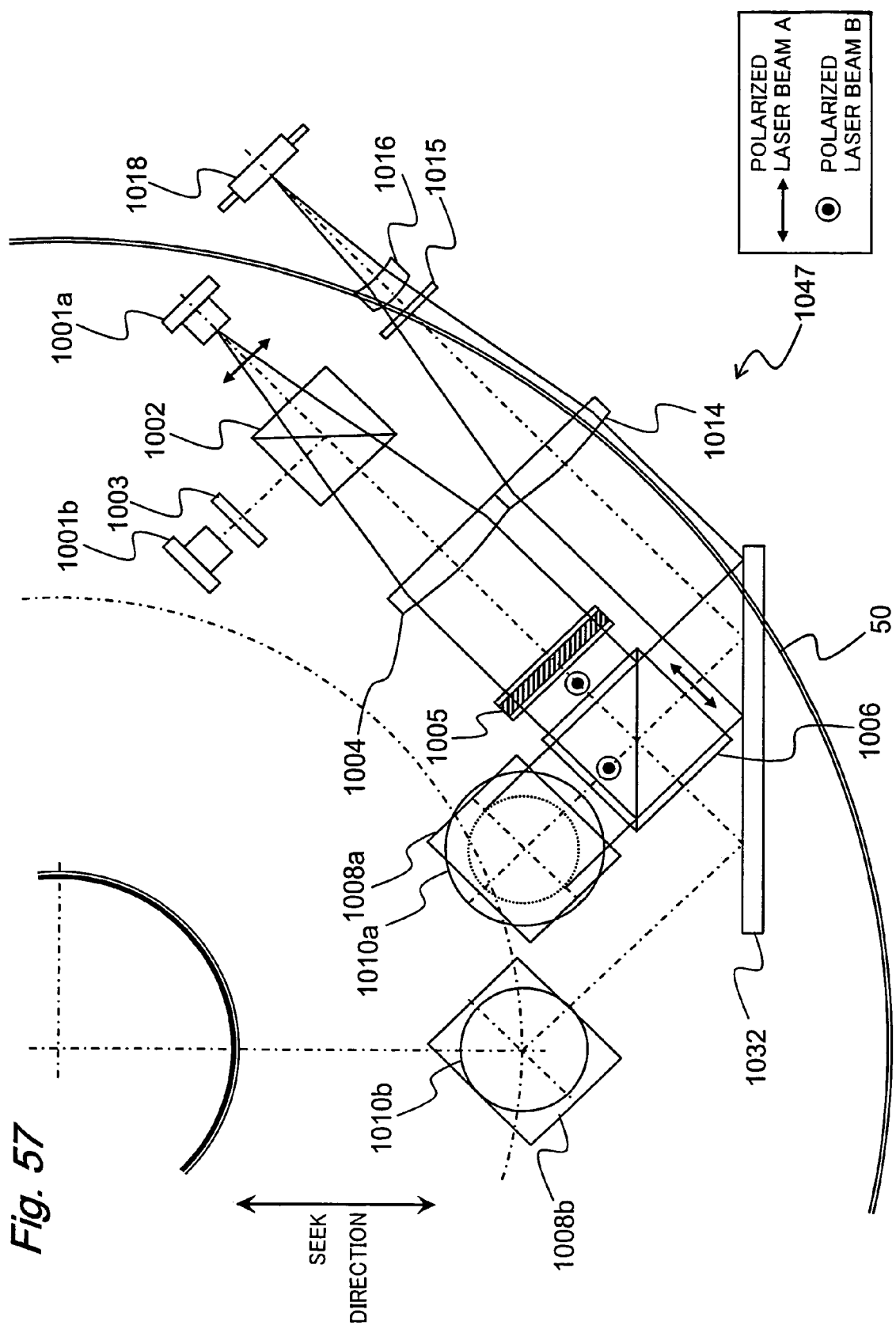
FIG. 57 is a schematic structural view of an optical pickup at its action of recording or playing back the first optical disc according to Embodiment 7 of the present invention.
Figure 58:
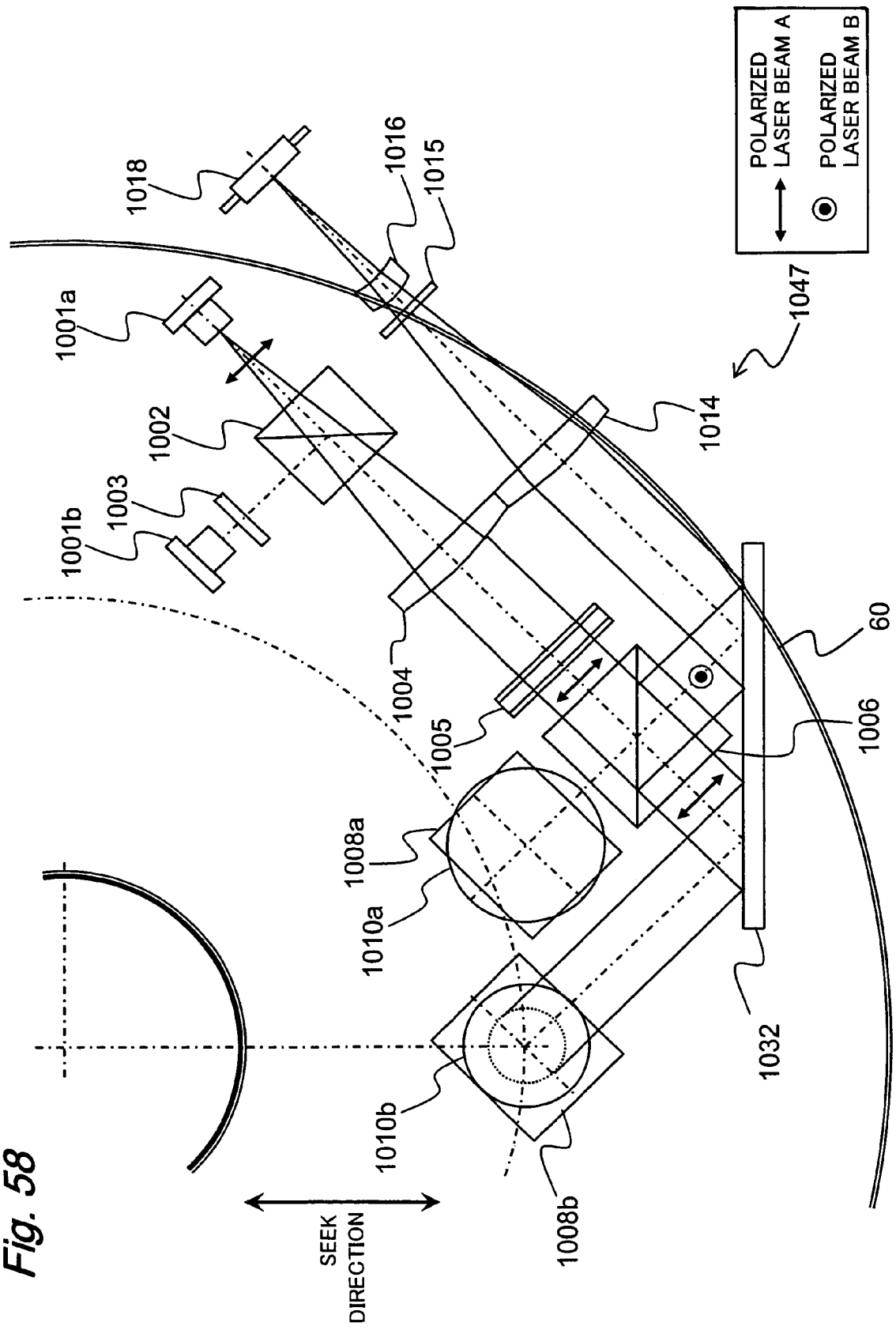
FIG. 58 is a schematic structural view of the optical pickup according to Embodiment 7 of the present invention at its action of recording or playing back the second optical disc.

FIGS. 57 and 58 are schematic views of an optical pickup 1047 showing a further embodiment of the present invention.

The optical pickup 1047 is differed from the optical pickup 1040 of Embodiment 3 by the positional relationship between the optical disc (e.g., the first optical disc 50) and the optical axis of the laser beam. More particularly, the optical axis of the laser beam emitted from the light source 1001*a* is at an angle of substantially 45 degrees to the seek center line. The other arrangements are identical to those of the optical pickup 1040. In FIGS. 57 and 58, like components are denoted by like numerals as those shown in FIGS. 44 to 46 and will be explained in no more detail.

(First Optical Disc)

The action of the optical pickup 1047 for performing either the recording action or the playback action on the first optical disc 50 will be described with reference to FIG. 57.

A blue-violet laser beam emitted from the light source 1001*a* and acting as the first laser beam is passed through the dichroic prism 1002 and converted into substantially a collimated light beam by the advancing path collimator lens 1004. The advancing path collimator lens 1004 is held by a lens holder in the collimator lens actuator 1020 and can thus be driven by a stepping motor for movement along the optical axis of the laser beam.

The blue-violet laser beam emitted from the first light source 1001*a* is of polarized laser beam A (of which the direction of polarization extends diagonally in the drawing). The blue-violet laser beam at substantially the collimated light beam released from the collimator lens 1004 is received by the polarization converter 1005. With electrodes (not shown) of the polarization converter 1005 loaded with a voltage, the polarization converter 1005 converts the blue-violet laser beam from the polarized laser beam A to the polarized laser beam B of which the direction of polarization is turned through 90 degrees (in a vertical direction to the paper surface in the drawing). The polarized light B of the blue-violet laser beam at the advancing path released from the polarization converter 1005 is reflected by the polarized light splitting surface 1006*a* of the polarizing beam splitter 1006 and bent through substantially 90 degrees at the light path by a riser mirror 1008*a* to run in a direction vertical to the paper surface. The polarized light B of the blue-violet laser beam is then converted into a circularly polarized laser beam by a ¼ waveplate (not shown) and focused across the transparent substrate by the first objective lens 1010*a* to form the spot of the beam on the information recording surface of the first optical disc 50.

The polarized light B of the blue-violet laser beam reflected on the information recording surface of the first optical disc 50 is transmitted along the returning path to the ¼ waveplate (not shown) where it is converted back to the polarized laser beam A. The polarized light A of the blue-violet laser beam is then received at the returning path by the polarized light splitting surface 1006*a* of the polarizing beam splitter 1006. The polarized light A of the blue-violet laser beam at the returning path is passed through the polarized light splitting surface 1006*a*, reflected by the integrated reflective mirror 1032, and converted from substantially the collimated light beam to a converged light by the returning path collimator lens 1014. The blue-violet laser beam at the converged light at the returning path is split further by the detection hologram 1015 for detection of the servo signal, provided with a predetermined astigmatism by the detection lens 1016, and received by the optical detector 1018. The optical detector 1018 produces the data signal and the servo signal from the blue-violet laser beam received at the returning path.

(Second Optical Disc)

The action of the optical pickup 1047 for playing back information on the second optical disc 60 will then be described with reference to FIG. 58.

A blue-violet laser beam emitted from the light source 1001*a* is passed through the dichroic prism 1002 and converted to substantially a collimated light beam by the advancing path collimator lens 1004. The blue-violet laser beam emitted from the first light source 1001*a* is of polarized laser beam A (of which the direction of polarization extends diagonally in the drawing). The polarized light A of the blue-violet laser beam at substantially the collimated light beam produced by the advancing path collimator lens 1004 is transmitted to the polarization converter 1005. With electrodes (not shown) of the polarization converter 1005 loaded with no voltage, the polarization converter 1005 passes the polarized light A of the blue-violet laser beam without changing the direction of polarization. The polarized light A of the blue-violet laser beam at the advancing path is passed through the polarized light splitting surface 1006*a* of the polarizing beam splitter 1006, reflected by the integrated reflective mirror 1032, and bent to substantially 90 degrees at the optical axis by a riser mirror 1008*b* to run in a direction vertical to the paper surface. The polarized light A of the blue-violet laser beam at the advancing path is then converted into a circularly polarized laser beam by the ¼ waveplate (not shown) and focused across the transparent substrate by the second objective lens 1010*b* to form the spot of the beam on the information recording surface of the second optical disc 60.

The polarized laser beam A of the blue-violet laser beam reflected on the information recording surface of the second optical disc 60 is transmitted along the returning path to the ¼ waveplate (not shown) where it is converted to the polarized laser beam B. The polarized light B of the blue-violet laser beam is reflected by the integrated reflective mirror 1032 and by the polarized light splitting surface 1006*a* of the polarizing beam splitter 1006. The polarized light B of the blue-violet laser beam released at the returning path from the polarizing beam splitter 1006 is reflected again by the integrated reflective mirror 1032, converted from substantially the collimated light beam to a converged light by the returning path collimator lens 1014, passed through the detection hologram 1015, provided with a predetermined astigmatism by the detection lens 1016, and received by the optical detector 1018. The optical detector 1018 produces the data signal and the servo signal from the blue-violet laser beam received at the returning path.

As described, the optical pickup 1047 of this embodiment has the optical axis of the laser beam emitted from the light source 1001*a* to extend at an angle of substantially 45 degree to the seek center line, whereby the rim intensity of the spot of the laser beam on the optical disc can be substantially equal between the radial direction and the tangential direction of the optical disc. Accordingly, the use of the beam shaping part can be eliminated.

Figure 59:
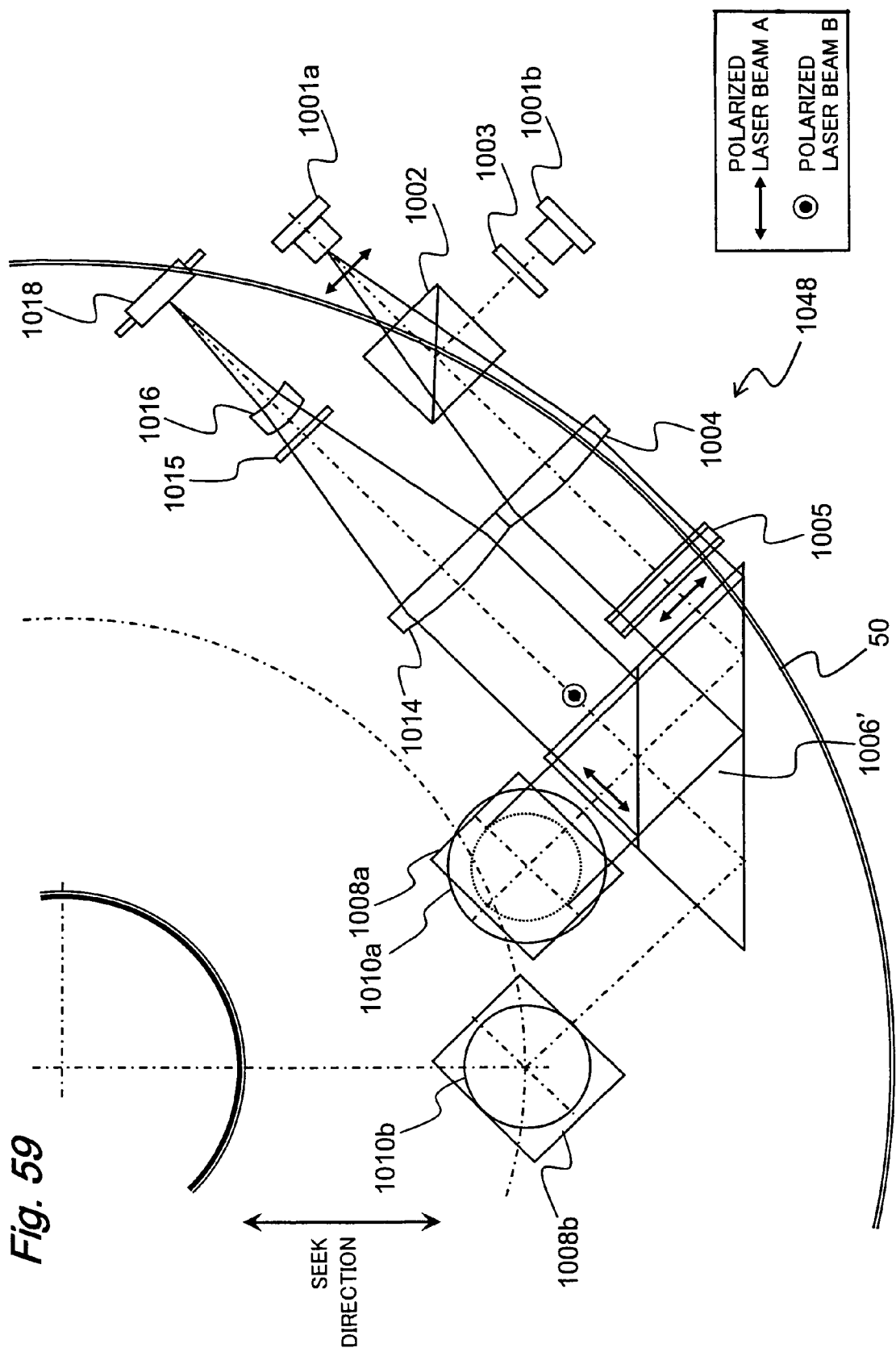
FIG. 59 is a schematic structural view showing a modification of the optical pickup according to Embodiment 7 of the present invention equipped with an integrated polarizing beam splitter.

Also, the optical pickup 1047 may be modified to such an optical pickup 1048 as shown in FIG. 59 where the first light source 1001a and the second light source 1001b are reversed in the position with the optical detector 1018.

Moreover, the integrated reflective mirror 1032 in the optical pickup 1047 may be combined together with the polarizing beam splitter 1006 to produce a polarizing beam splitter 1006' shown in FIG. 59, whereby the total number of the components and the number of the assembly steps can be minimized.

Figure 63:
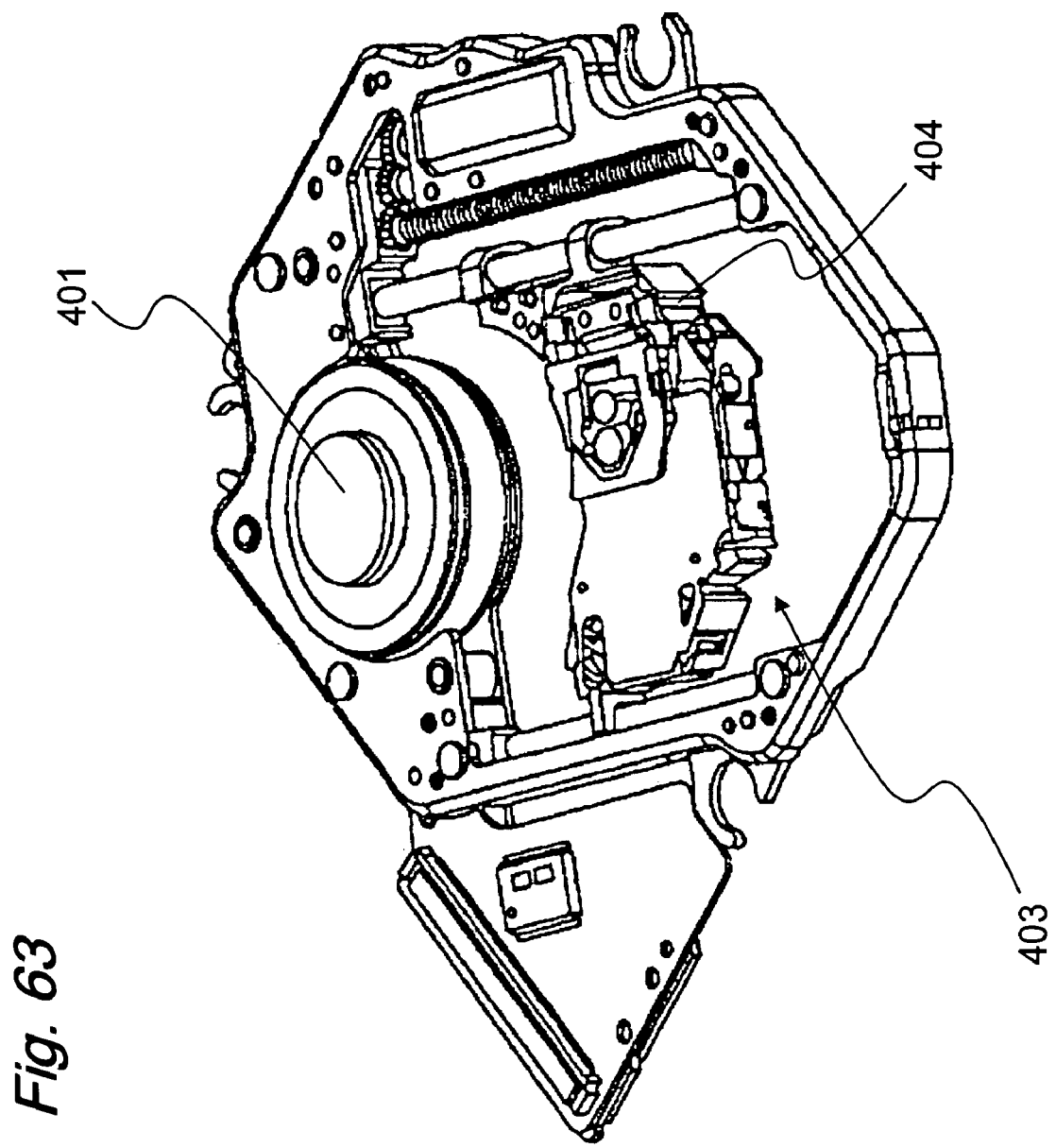
FIG. 63 is a perspective view showing the optical pickup, shown in FIG. 26, with its environmental region.

FIG. 63 illustrates an optical platform 404 which is divided into two, first and second, regions by a plane arranged substantially vertical to the optical disc and containing a straight line which extends across the axis of rotation of the spindle motor in a disc drive unit 401 (FIG. 26) for driving the optical disc or across the center of rotation of the optical disc and is parallel to the seek direction of the optical pickup. It is then preferable that the first light source 1001a and the second light source 1001b are located in the same region, for example, the first region of the optical platform 404. This allows the first light source 1001a and the second light source 1001b to be disposed closer to each other, hence minimizing the electric circuit distance between the light source and the laser driving IC for driving the light sources. As the result, the driving signal can be transmitted rapidly and accurately to the light source.

When the advancing path collimator lens 1004 and the returning path collimator lens 1014 are also located in the first region or same region as of the first light source 1001a and the second light source 1001b, their relevant optical components in the optical system can almost entirely be positioned in the first area. This favorably promotes the downsizing of the optical pickup. As nearly all the optical components in the optical system are located in one region, the other region or second region can be occupied by the components of the objective lens actuator. Consequently, the objective lens actuator can be arranged substantially equal in the thickness to the optical platform, thus reducing the thickness of the optical pickup.

Embodiment 8

FIGS. 60 and 61 are schematic views of an optical pickup 1049 showing a further embodiment of the present invention.

The optical pickup 1049 is differed from the optical pickup 1045 of Embodiment 5 by the fact that the first light source 1001a and the second light source 1001b are oriented in the radial direction but not the tangential direction. The other arrangements are not different but equal to those of the optical pickup 1045. In FIGS. 60 and 61, like components are denoted by like numerals as those shown in FIGS. 44 to 46 and will be explained in no more detail.

(First Optical Disc)

The action of the optical pickup 1049 for performing either the recording action or the playback action on the first optical disc 50 will be described with reference to FIG. 60.

A blue-violet laser beam emitted from the light source 1001a and acting as the first laser beam is passed through the dichroic prism 1002 and converted into substantially a collimated light beam by the advancing path collimator lens 1004. The advancing path collimator lens 1004 is held by a lens holder in the collimator lens actuator 1020 and can thus be driven by the stepping motor for movement along the optical axis of the laser beam.

The blue-violet laser beam emitted from the first light source 1001a is of polarized laser beam B (of which the direction of polarization extends vertical to the paper surface in the drawing). The blue-violet laser beam at substantially the collimated light beam released from the collimator lens 1004 is received by the polarization converter 1005. With electrodes (not shown) of the polarization converter 1005 loaded with no voltage, the polarization converter 1005 passes the blue-violet laser beam without changing the direction of polarization. The polarized light B of the blue-violet laser beam passed through the polarization converter 1005 is reflected by the first reflective mirror 1035 and by the polarized light splitting surface 1006a of the polarizing beam splitter 1006. The polarized light B of the blue-violet laser beam at the advancing path is then bent through substantially 90 degrees at the light path by the riser mirror 1008 to run in a direction vertical to the paper surface, converted into a circularly polarized laser beam by a ¼ waveplate (not shown), and focused across the transparent substrate by the first objective lens 1010a to form the spot of the beam on the information recording surface of the first optical disc 50.

The polarized light B of the blue-violet laser beam reflected on the information recording surface of the first optical disc 50 is transmitted along the returning path to the ¼ waveplate (not shown) where it is converted to the polarized laser beam A. The polarized light A of the blue-violet laser beam is then passed along the returning path through the polarized light splitting surface 1006a of the polarizing beam splitter 1006. The blue-violet laser beam at the returning path passed through the polarizing beam splitter 1006 is then converted from substantially the collimated light beam to a converged light by the returning path collimator lens 1014, split further by the detection hologram 1015 for detection of the servo signal, provided with a predetermined astigmatism by the detection lens 1016, and received by the optical detector 1018. The optical detector 1018 produces the data signal and the servo signal from the blue-violet laser beam received at the returning path.

(Second Optical Disc)

The action of the optical pickup 1049 for playing back information on the second optical disc 60 will then be described with reference to FIG. 61.

A blue-violet laser beam emitted from the light source 1001a is passed through the dichroic prism 1002 and converted to substantially a collimated light beam by the advancing path collimator lens 1004. The blue-violet laser beam emitted from the first light source 1001a is of polarized laser beam B (of which the direction of polarization extends vertical to the paper surface in the drawing). The blue-violet laser beam at substantially the collimated light beam produced by the advancing path collimator lens 1004 is transmitted to the polarization converter 1005. With electrodes (not shown) of the polarization converter 1005 loaded with a voltage, the polarization converter 1005 converts the blue-violet laser beam from the polarized laser beam B to the polarized laser beam A (polarized upward and downward in the drawing) of which the direction of polarization is turned through 90 degrees. The polarized light A of the blue-violet laser beam released from the polarization converter 1005 is reflected by the first reflective mirror 1035 and passed through the polarized light splitting surface 1006a of the polarizing beam splitter 1006. The polarized light A of the blue-violet laser beam at the advancing path is then reflected by the second reflective mirror 1036, bent to substantially 90 degrees at the optical axis by the riser mirror 1008 to run in the direction vertical to the paper surface, converted into a circularly polarized laser beam by the ¼ waveplate (not shown), and focused across the transparent substrate by the second objective lens 1010b to form its spot on the information recording surface of the second optical disc 60.

The polarized light A of the blue-violet laser beam reflected on the information recording surface of the second optical disc 60 is transmitted along the returning path to the ¼ waveplate (not shown) where it is converted back to the polarized laser beam B. The polarized light B at the returning path of the blue-violet laser beam is reflected by the second reflective mirror 1036 and by the polarized light splitting surface 1006a of the polarizing beam splitter 1006. The blue-violet laser beam released along the returning path from the polarizing beam splitter 1006 is converted from substantially the collimated light beam to a converged light by the returning path collimator lens 1014, passed through the detection hologram 1015, provided with a degree of astigmatism by the detection lens 1016, and received by the optical detector 1018. The optical detector 1018 produces the data signal and the servo signal from the blue-violet laser beam received at the returning path.

As described, the optical pickup 1049 of this embodiment has the first objective lens 1010a arranged radially of the optical disc in relation to the second objective lens 1010b, so that the two objective lenses 1010a, 1010b are arranged across the seek center line, hence minimizing a change in the angle of the tracks during the seek action of the optical pickup. This allows the tracking error signal on the first optical disc 50 to be detected by the three-beam method such as the DPP technique.

The optical disc such as the DVD 70 has a rib, called a stack ring, at a thickness of some hundreds micrometers provided on the inner portion (at the outside of the clamp region) thereof for preventing the optical discs in a stack from coming into direct contact with one another at their light incident surfaces.

Since the first objective lens 1010a is greater in the numerical aperture NA than the second objective lens 1010b, its focal distance remains short and its working distance WD from the optical disc also becomes short. Accordingly, if the first objective lens 101a is located at the inner side of the optical disc than the second objective lens 1010b, the first objective lens 1010a may be disturbed by the stack ring during the action of the second objective lens 1010b for accessing the innermost end of the optical disc.

For avoiding such a drawback, the first objective lens 1010a which is smaller in the working distance WD is preferably located at the outer side of the optical disc than the second objective lens 1010b as shown in FIGS. 60 and 61.

This modification protects the second objective lens 1010b which is greater in the working distance WD from being interrupted by the stack ring when the first objective lens 1010a accesses the innermost end of the optical disc 50.

The optical pickup 1049 of this embodiment may be modified in which the first light source 1001a and the second light source 1001b are reversed in the position with the optical detector 1018 like those in the optical pickup 1040 of Embodiment 3 which are opposite at the location to those in the optical pickup 1045 of Embodiment 5. The first objective lens 1010a and the second objective lens 1010b may also be reversed in the position.

As described throughout Embodiments 3 to 8, the advancing path collimator lens 1004 and the returning path collimator lens 1014 of which the optical axes extend in parallel with each other are moved at once along their respective axes by the collimator lens actuator 1020.

However, the advancing path collimator lens 1004 and the returning path collimator lens 1014 are not necessarily set parallel to each other in the optical axis but may be arranged with their optical axes extending orthogonal to each other as equally covered by the present invention. In view of permitting no increase of the overall dimensions of the optical pickup, both the advancing path collimator lens 1004 and the returning path collimator lens 1014 of which the optical axes extend parallel to each other are preferably moved at once along their respective optical axes by the collimator lens actuator 1020 as described in Embodiments 3 to 8.

Although the polarized light splitting surface 1006a of the polarizing beam splitter 1006 has the functions of splitting the optical path of the blue-violet laser beam emitted from the first light source 1001a into a path to the first objective lens 1010a and a path to the second objective lens 1010b and of combining the optical paths of the blue-violet laser beam reflected on the information recording surface of either the first information recording medium 50 or the second information recording medium 60, its two functions for splitting and combining the optical paths may be provided separately.

Figure 62:
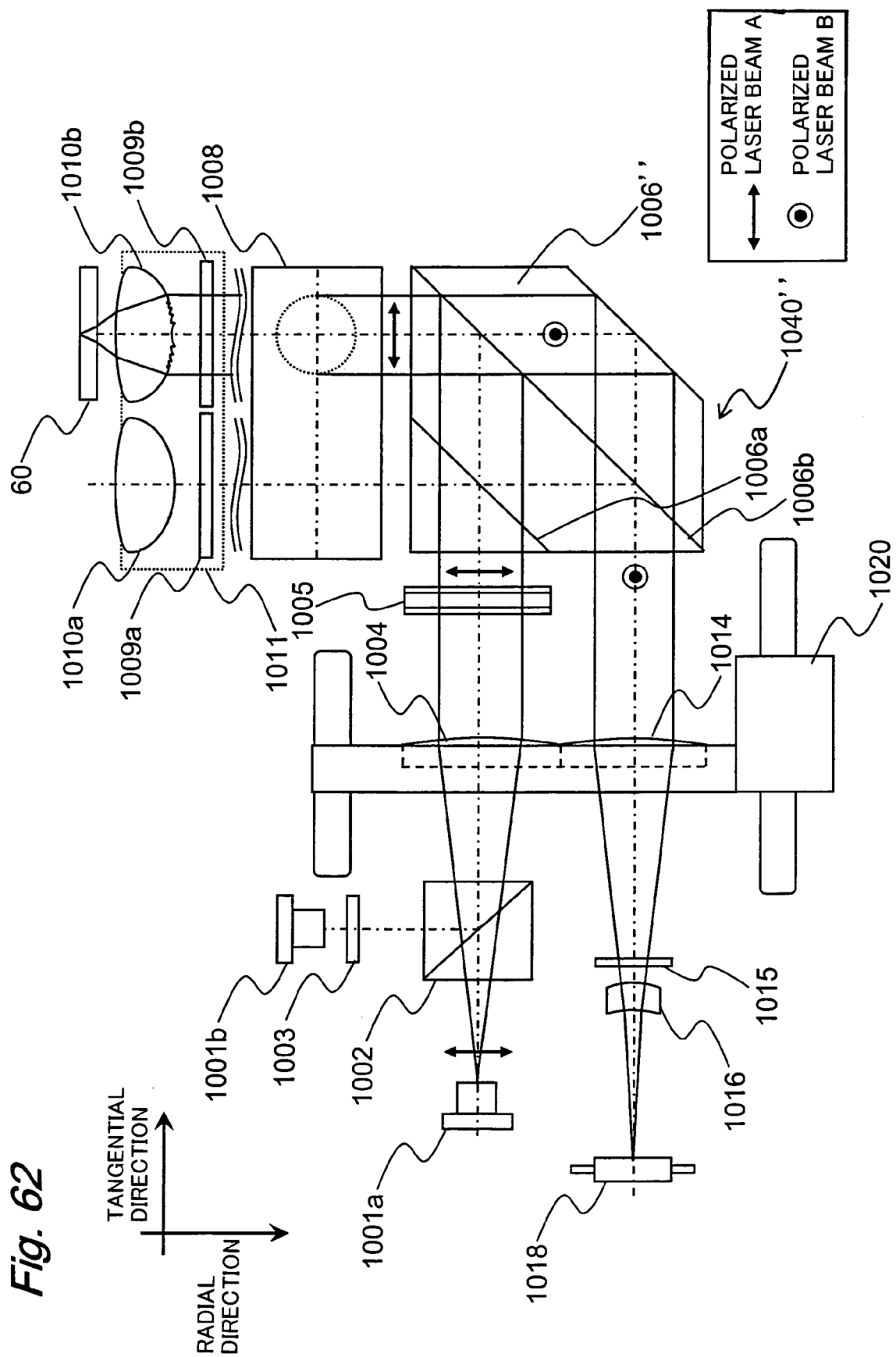
FIG. 62 is a schematic structural view showing a modification of the optical pickup according to Embodiment 3 of the present invention equipped with another integrated polarizing beam splitter.

FIG. 62 illustrates, for example, an optical pickup 1040" where a polarizing beam splitter 1006" has two different polarized light splitting surfaces 1006a, 1006b thereof. The polarized light splitting surface 1006a is arranged so as to pass almost entirely the polarized light A of the laser beam and reflect the polarized light B of the laser beam. The polarized light splitting surface 1006b is arranged so as to pass almost entirely the polarized light B of the laser beam and reflect the polarized light A of the laser beam. More particularly in the optical pickup 1040", the polarized light splitting surface 1006a functions for splitting the optical path while the polarized light splitting surface 1006b functions for combining the optical paths. It would be understood that this modification also falls in the scope of the present invention.

As described in Embodiments 3 to 8 with the objective lenses provided for focusing the first optical disc 50, the second optical disc 60, the DVD 70, and the CD 80 to perform the recording action or the playback action, the first objective lens 101a is used for recording or playing back the first optical disc 50 and the second objective lens 1010b is used for recording or playing back the second optical disc 60, the DVD 70, and the CD 80. The present invention is however not limited to the above combination but may be applied to a modification where the first objective lens 101a is used for recording or playing back the first optical disc 50 and the CD 80 and the second objective lens 1010b is used for recording or playing back the second optical disc 60 and the DVD 70, or a modification where the first objective lens 1010a is used for recording or playing back the first optical disc 50 or the DVD 70 and the second objective lens 1010b is used for recording or playing back the second optical disc 60 or the CD 80. In those modifications, the voltage to be applied to the electrodes of the polarization converter can favorably be controlled so that the polarizing beam splitter switches the laser beam emitted from a light source between the two optical paths to their respective objective lenses.

While the red laser beam and the infrared laser beam are emitted from the light source 1001b provided in each of the embodiments for emitting two different wavelengths of the laser beam in the embodiments, they may be emitted from two separate light sources designed for emitting the red laser beam and the infrared laser beam respectively. This allows the two separate light sources for emitting the red laser beam and the infrared laser beam respectively to be implemented by single-wavelength laser devices which are lower in the price. Also, there may be provided separately a high power blue-violet laser beam light source for recording or playing back the first optical disc 50 and a low power blue-violet laser beam light source for only playing back the second optical disc 60.

Moreover as described in Embodiments 3 to 8, the optical detector 1018 is arranged for, but not limited to, producing the data signal and the servo signal from the blue-violet laser beam, the red laser beam, and the infrared laser beam to be focused for performing the recording action or the playback action on each of the first optical disc 50, the second optical disc 60, the DVD 70, and the CD 80. For example, the optical detector may be implemented by a plurality of optical detectors for receiving the blue-violet laser beam, the red laser beam, and the infrared laser beam respectively.

The arrangements of Embodiments 1 and 2 shown in FIGS. 35 to 40 and FIGS. 41 to 43 may be utilized in each of Embodiments 3 to 8 with equal advantage.

Embodiment 9

A further embodiment of the present invention will be described in conjunction with the arrangement or its modification of any of Embodiments 1 to 8, with reference to FIGS. 64 to 68. Throughout FIGS. 64 to 68, like functioning components are denoted by like numerals as those of the arrangement or its modification and will be explained in no more detail.

It is essential for recording and playing back the optical disc to control the output of each light source at stableness particularly during the recording action. To control the output, a method (referred to as pre-detection of light) is proposed for monitoring the output from the light source through measuring the quantity of light with a light quantity detector which is disposed off the light path. More particularly, the light quantity of the laser beam emitted from the light source is calculated by measuring the quantity of light falling on the light quantity detector with the ratio of light quantity off the light path predetermined. The calculated light quantity is then fed back to a light quantity control circuit for controlling and stabilizing the output of the light source.

As the result, the quantity of the light beam released from the objective lens of the optical pickup and falling on the optical disc can be controlled at stableness. Another method may be provided for controlling the quantity of emitted light from the action of post detection of light at the light source, which is yet unfavorable for controlling the output at fair accuracy. It is nearly mandatory for a common updated optical recording/playback pickup to control the output of a light source through performing the pre-detection of light.

Shown in FIGS. 64 to 68 are some arrangements of this embodiment where the constructions of Embodiment 1 are accompanied with optical pre-detectors as the light quantity detector.

Figure 64:
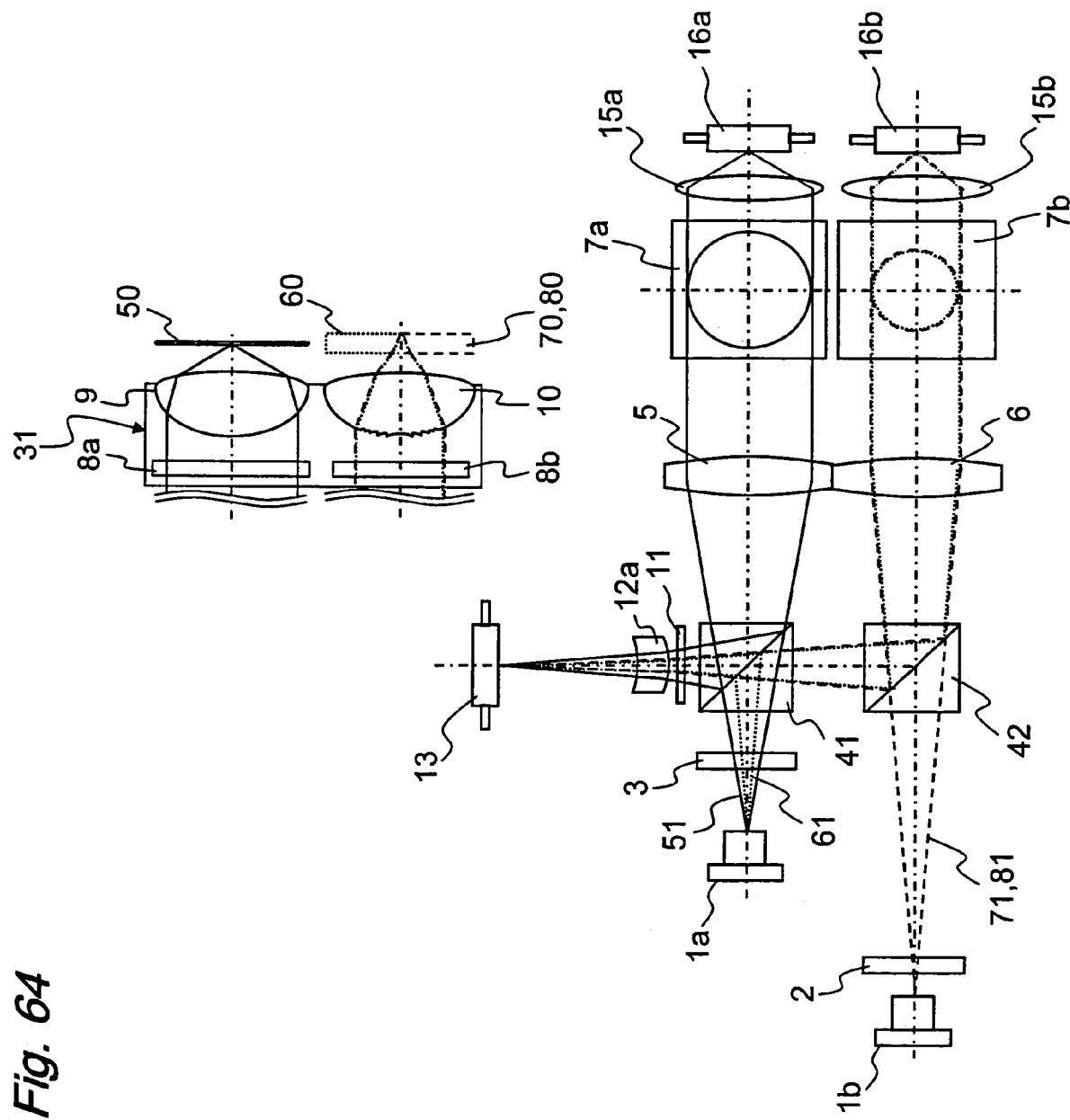
FIG. 64 is a schematic structural view of an optical pickup according to Embodiment 9 of the present invention.

The arrangement shown in FIG. 64 includes a first optical pre-detector 16a located at the rear side of a riser mirror 7a. With this arrangement, the laser beam 51 at the advancing path is passed through the riser mirror 7a at a constant rate along the direction of polarization of the incident light and received by the optical pre-detector 16a for pre-detection. It is desired for ensuring the quantity of the laser beam departing from the objective lens 9 to set the ratio in the whole quantity of the laser beam 51 entering on the riser mirror 7a to the laser beam 51 passed through the riser mirror 7a to not higher than 10%. Also, since the laser beam 51 passed along the advancing path through the riser mirror 7a is to be focused on the light receiving area of the first optical pre-detector 16a by a first pre-detection lens 15a, the laser beam 51 passed through the riser mirror 7a can be utilized without loss in this arrangement. A portion but not all of the laser beam 51 passed through the riser mirror 7a may be received directly by the light receiving area of the optical pre-detector 16a with no use of the first optical pre-detection lens 15a for pre-detection with equal success.

Similarly, a portion of the laser beam 61, the red laser beam 71, and the infrared laser beam 81 may be passed through the riser mirror 7b and received by a second optical pre-detector 16b for pre-detection. Alternatively, as shown in FIG. 64, the laser beam 51 and laser beam 61 acting as the first laser beam, the red laser beam 71 acting as the second laser beam, and the infrared laser beam 81 acting as the third laser beam can be used for the optical pre-detection by using the first optical pre-detector 16a and the second optical pre-detector 16b. Also, combination of any of the laser beams 51, 61, 71, and 81, and the optical pre-detector 16a and 16b may selectively be subjected to the pre-detection process.

Figure 65:
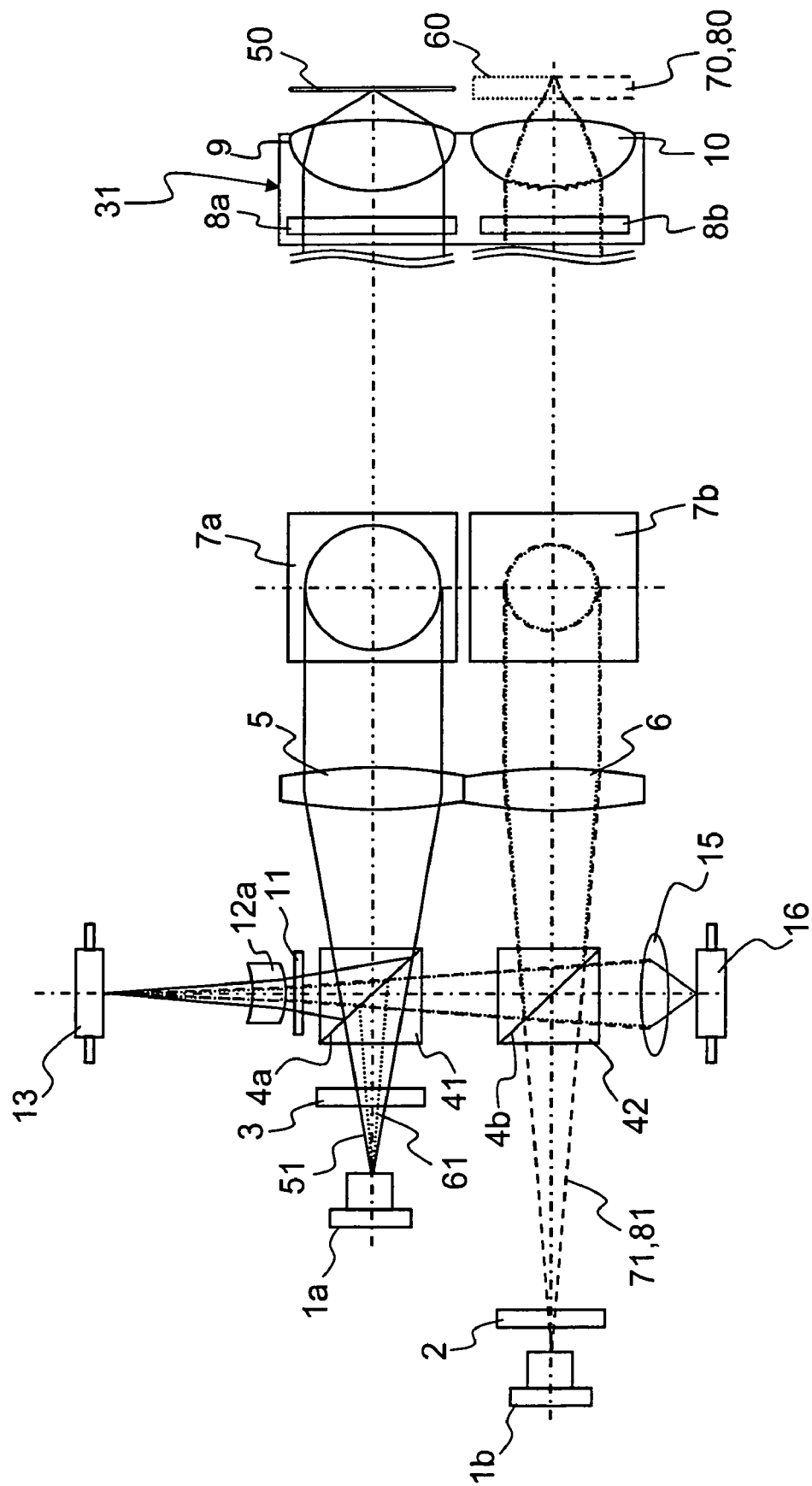
FIG. 65 is a schematic structural view showing a modification of the optical pickup according to Embodiment 9 of the present invention.

The arrangement shown in FIG. 65 includes an integrated optical pre-detector 16 arranged for detecting each of the laser beam 51, the laser beam 61, the red laser beam 71, and the infrared laser beam 81. More particularly, a portion of each of the laser beams falling at the advancing path on the optical surface 4b of a second prism 42 is either passed through or reflected by the optical surface 4b, and then received by the integrated optical pre-detector 16. This allows all or any combination of the laser beam 51, the laser beam 61, the red laser beam 71, and the infrared laser beam 81 to be subjected to the optical pre-detection process with the integrated optical pre-detector 16, hence reducing the total number of the components and the overall dimensions of the optical pickup.

For subjecting the laser beam 51 to the optical pre-detection process, the optical surface 4a of the first prism 41 may preferably be arranged to reflect the laser beam 51 at a specific rate. The arrangement shown in FIG. 65 like that shown in FIG. 64 may be implemented with either the use or not of the pre-detection lens 15.

Figure 66:
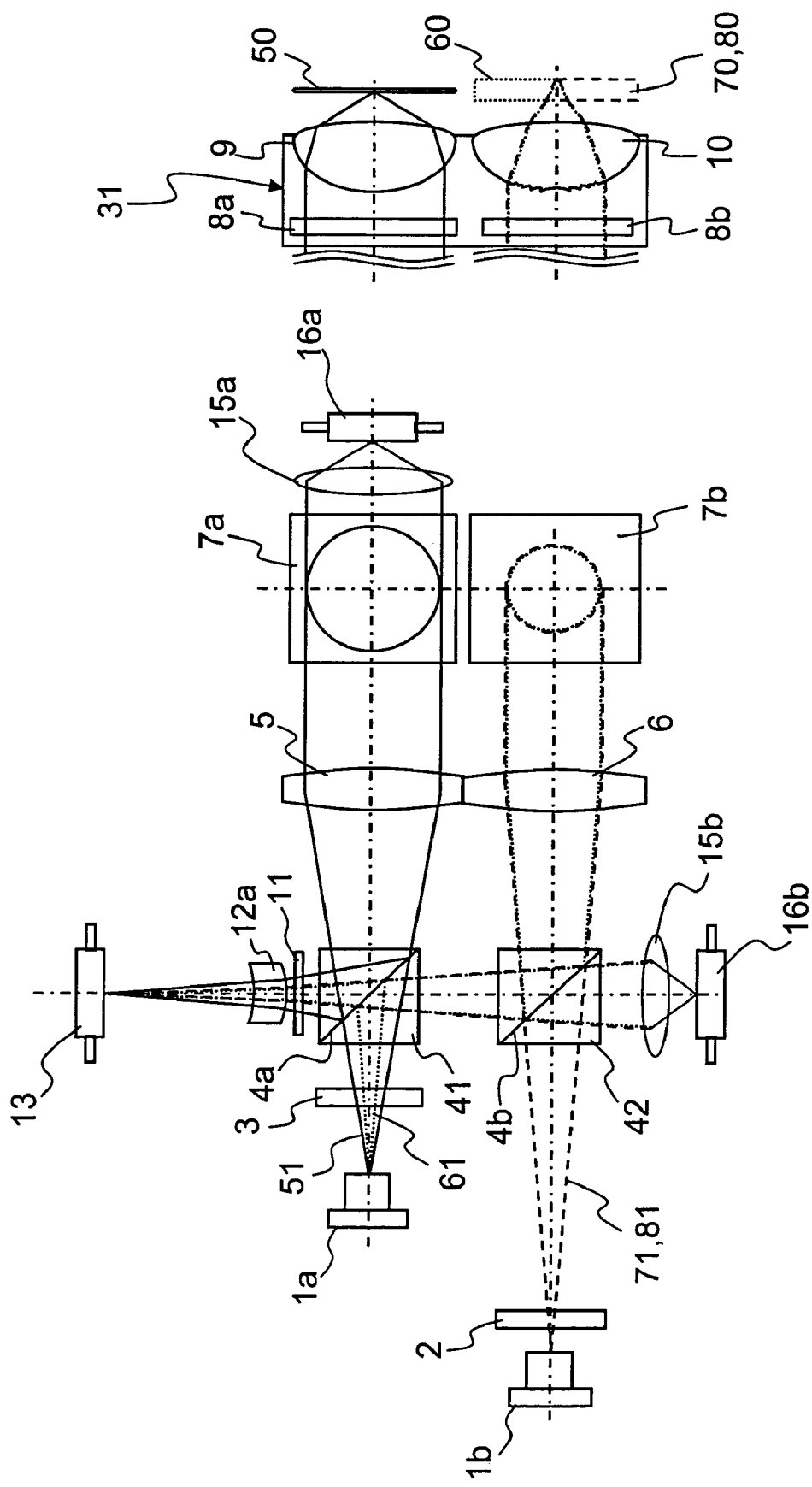
FIG. 66 is a schematic structural view showing another modification of the optical pickup according to Embodiment 9 of the present invention.

The arrangement shown in FIG. 66 is differed from the arrangement shown in FIG. 64 with the employment of the first optical pre-detector 16a and the second optical pre-detector 16b. In the arrangement shown in FIG. 66, the optical pre-detection of the laser beam 51 is performed by the first optical pre-detector 16a which is located to receive a portion of the laser beam 51 passed through a riser mirror 7a while the optical pre-detection of any or a combination of the laser beam 61, the red laser beam 71, and the infrared laser beam 81 is performed by the second optical pre-detector 16b which is located to receive the light reflected by or passed through the optical surface 4b of the second prism 42. This will be implemented with equal advantage.

Figure 67:
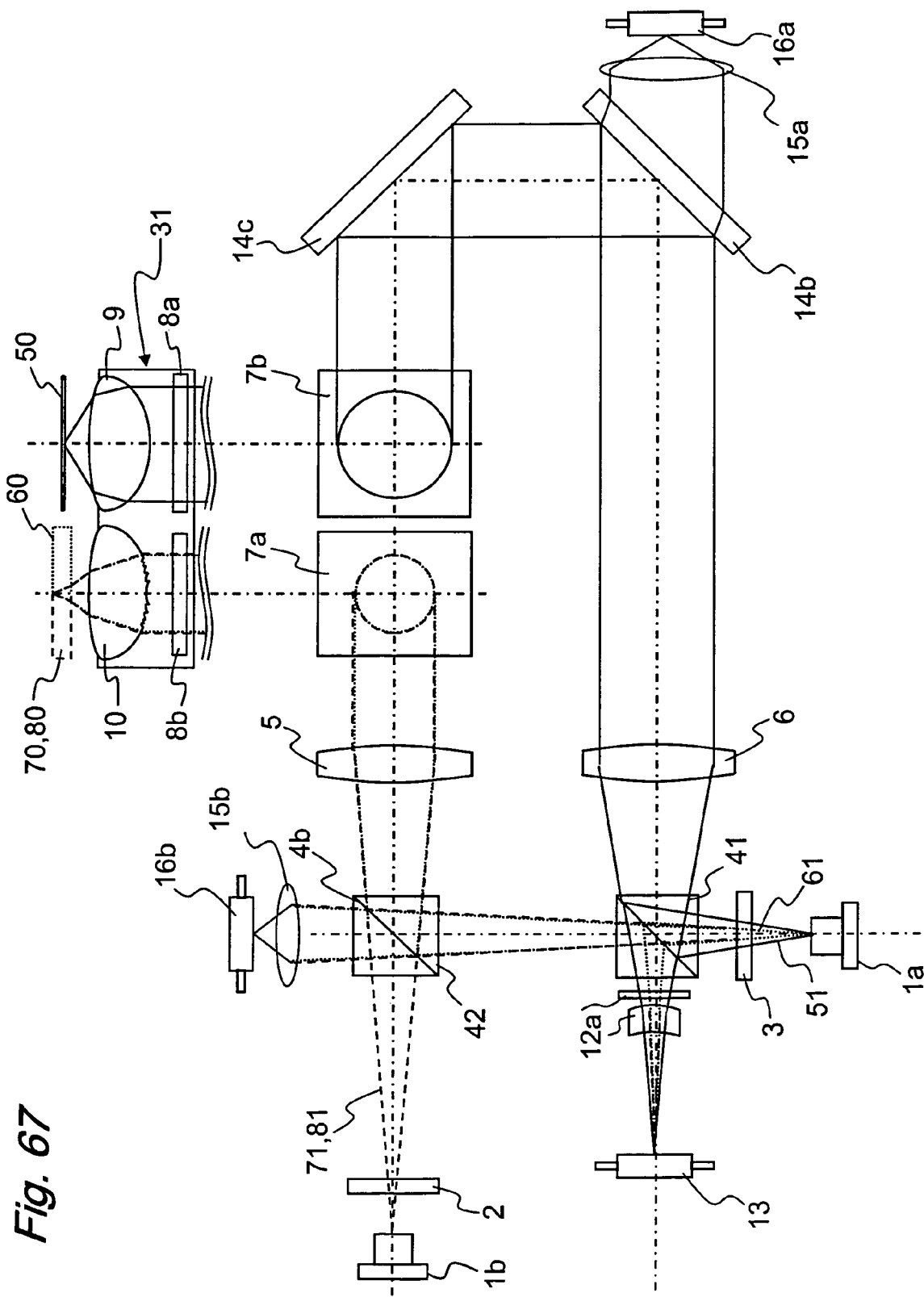
FIG. 67 is a schematic structural view showing a further modification of the optical pickup according to Embodiment 9 of the present invention.
Figure 68:
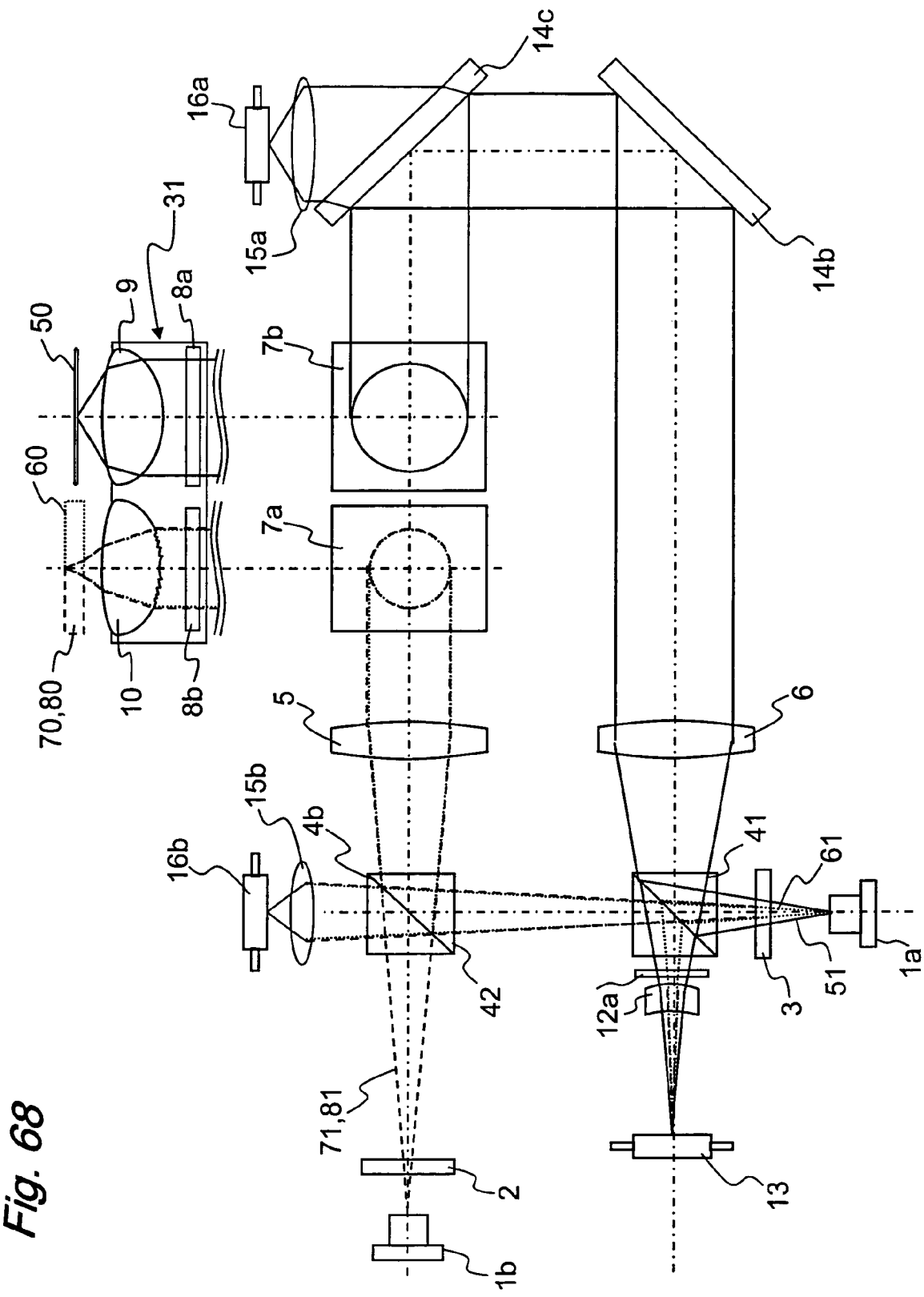
FIG. 68 is a schematic structural view showing a further modification of the optical pickup according to Embodiment 9 of the present invention.
Figure 69:
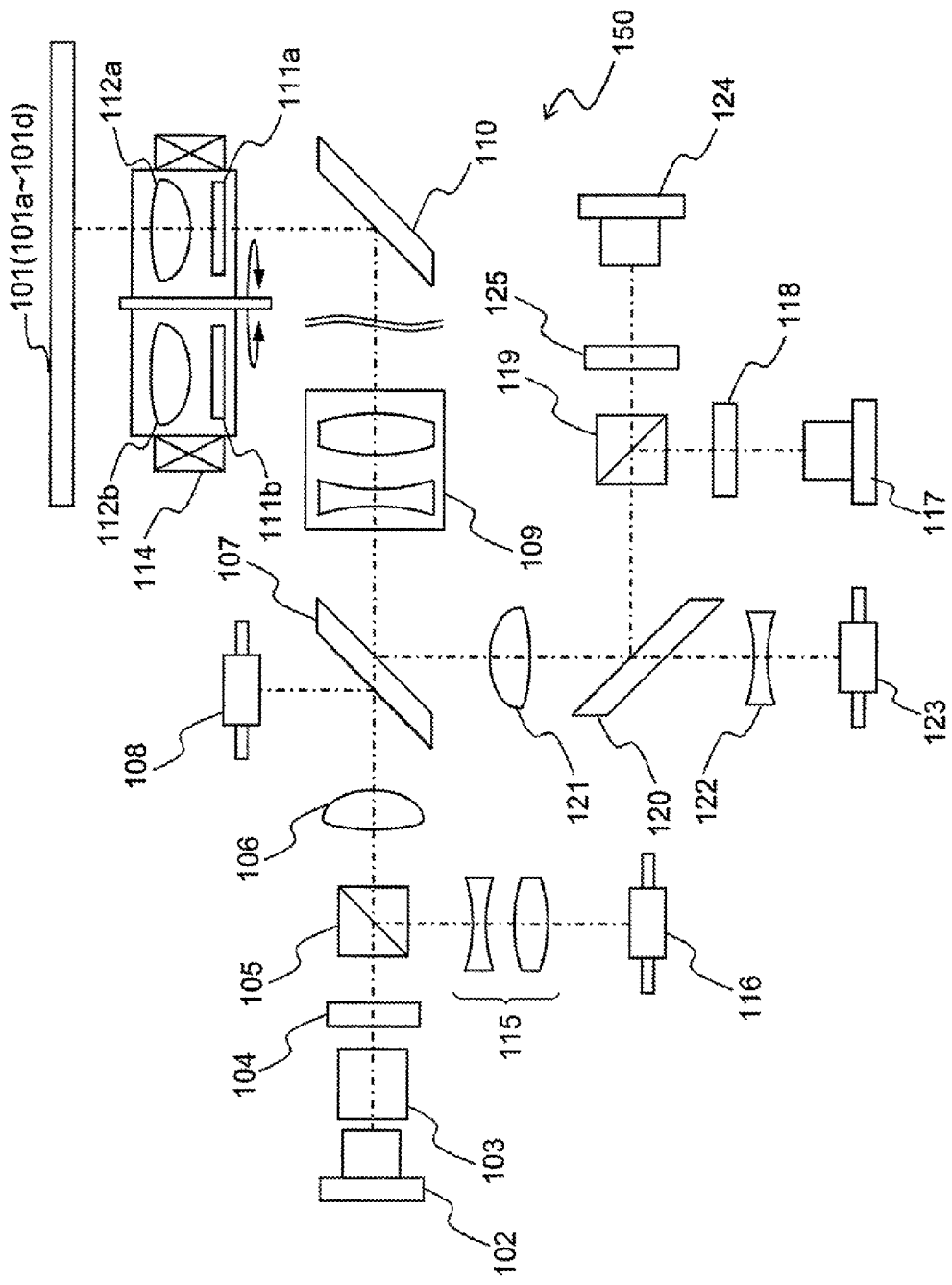
FIG. 69 is a schematic structural view showing a conventional optical pickup.
Figure 70:
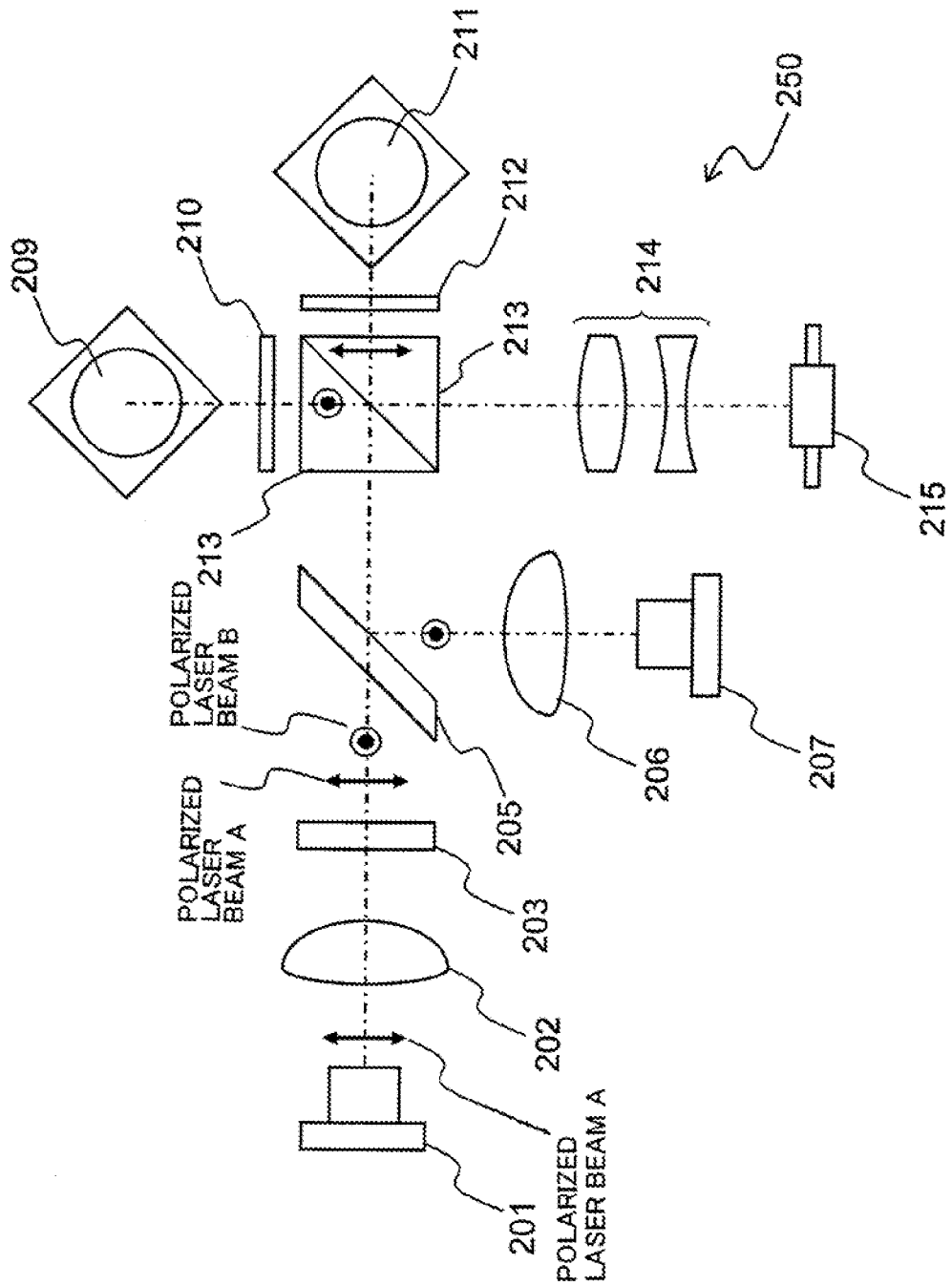
FIG. 70 is a schematic structural view showing another conventional optical pickup.
Figure 71:
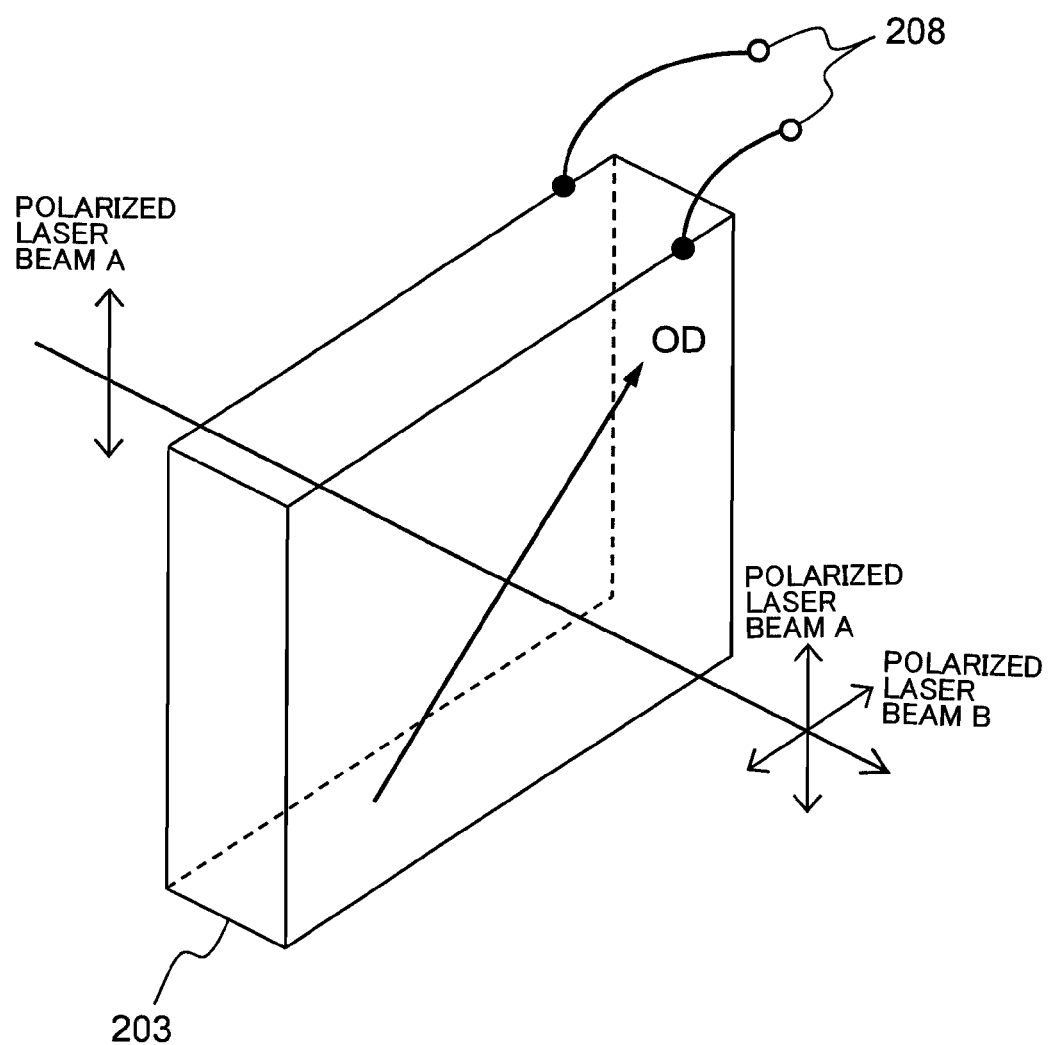
FIG. 71 is a theoretical view showing a polarization converter installed in the optical pickup.

The arrangements shown in FIGS. 67 and 68 are also equally advantageous in which with a pair of bending mirrors 14b, 14c provided for bending the optical path of, for example, the laser beam 51, the first optical pre-detector 16a is located to receive a portion of the laser beam 51 which has passed through either the bending mirror 14b or the bending mirror 14c after entering at the advancing path the bending mirror 14b or the bending mirror 14c.

Embodiment 10

Figure 26:
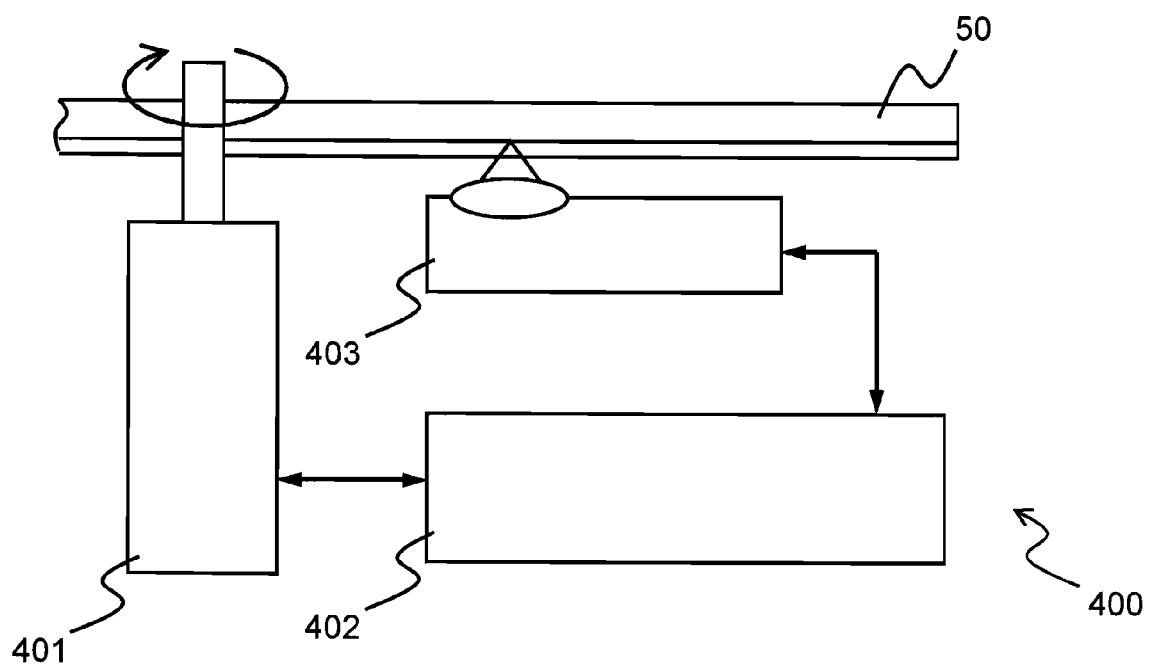
FIG. 26 is a schematic structural view of an optical disc apparatus according to Embodiment 10 of the present invention.

FIG. 26 is a schematic view of an optical disc apparatus showing a still further embodiment of the present invention.

As shown in FIG. 26, the optical disc apparatus denoted by 400 includes an optical disc actuator 401, a controller 402, and an optical pickup 403. While the first optical disc 50 is illustrated, it may be replaced by the second optical disc 60, the DVD 70, or the CD 80.

The optical disc actuator 401 has a mechanism for rotating the first optical disc 50 (the second optical disc 60, the DVD 70, or the CD 80) while the optical pickup 403 is implemented by any of the optical pickups of Embodiments 1 to 9. The controller 402 has a function for controlling the action of the optical disc actuator 401 and the optical pickup 403, a function for processing the control signals and the data signals of the optical pickup 403, and a function of interfacing the signals between the outside and the inside of the optical disc apparatus 400.

Since the optical disc apparatus 400 of this embodiment is equipped with the optical pickup of any of Embodiments 1 to 9, it can favorably perform the action of recording or playing back a plurality of different types of the optical disc.

Embodiment 11

Figure 27:
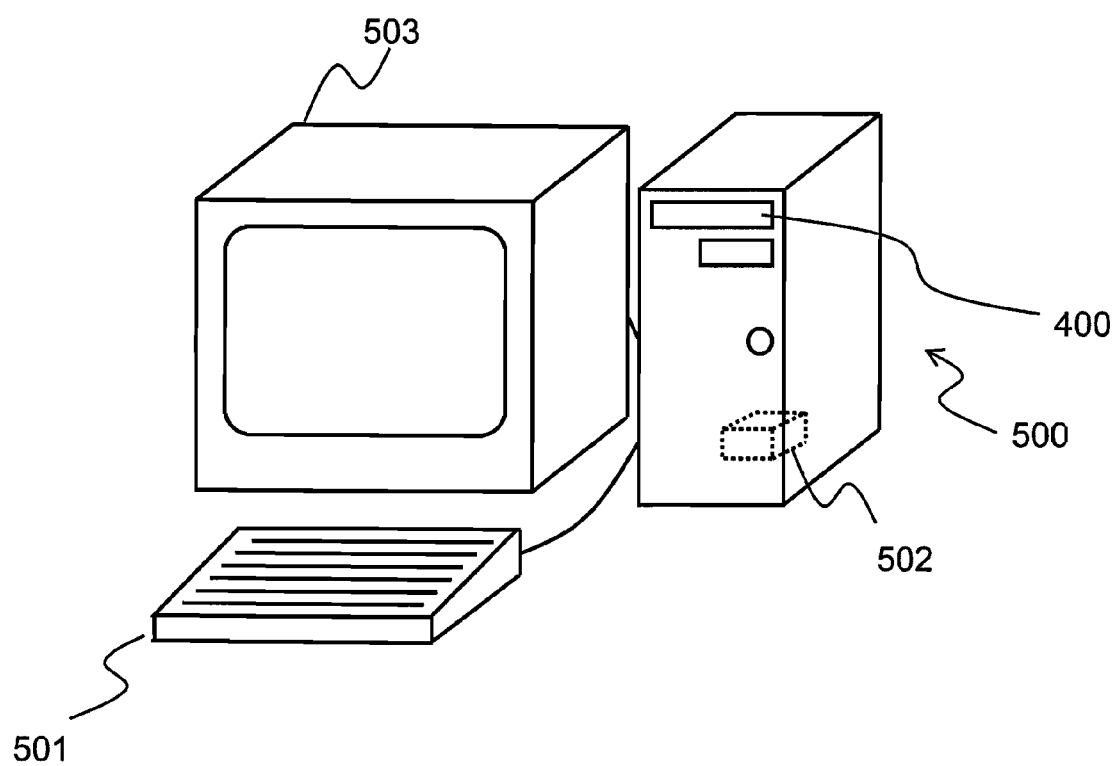
FIG. 27 is a schematic structural view of a computer according to Embodiment 11 of the present invention.

FIG. 27 is a schematic view of a computer as an optical information equipment showing a still further embodiment of the present invention.

As shown in FIG. 27, the computer 500 includes the optical disc apparatus 400 of Embodiment 10, an input device 501, such as a keyboard, a mouse, or a touch panel, for input of data, a central processing unit (CPU) 502 for carrying out arithmetic operations of data read out from the optical disc apparatus 400, and an output device 503, such as an LCD display, a cathode ray tube, or a printer, for displaying or printing out results of the arithmetic operations received from the CPU 502.

Since the computer 500 is equipped with the optical disc apparatus 400 of Embodiment 10, it can favorably carry out the action of recording and playing back different types of the optical disc as is suited for a variety of applications.

Embodiment 12

Figure 28:
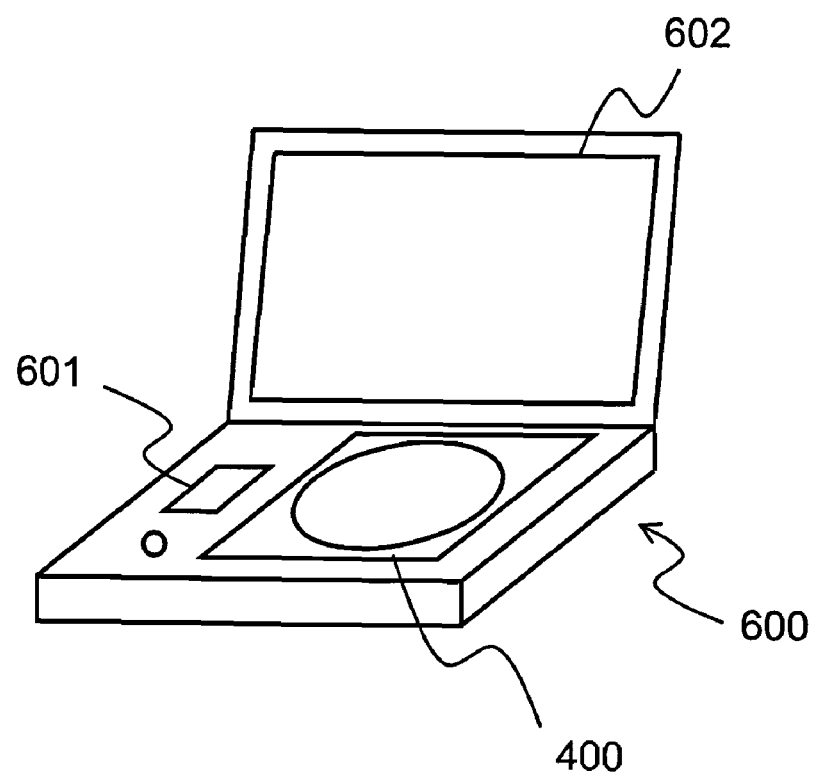
FIG. 28 is a schematic structural view of an optical disc player according to Embodiment 12 of the present invention.

FIG. 28 is a schematic view of an optical information equipment in the form of an optical disc player showing a still further embodiment of the present invention.

As shown in FIG. 28, the optical disc player 600 includes the optical disc apparatus 400 of Embodiment 10 and a converter (e.g., a decoder 601) for converting a data signal received from the optical disc apparatus 400 to an image signal.

The optical disc player 600 may be operated as a car navigation system when accompanied with a position sensor such as a GPS system and a central processing unit (CPU). Also, the optical disc player 600 may be equipped with a display 602 such as a liquid crystal display.

Since the optical disc player 600 includes the optical disc apparatus 400 of Embodiment 10, it can favorably carry out the action of recording and playing back different types of the optical disc as being suited for a variety of applications.

Embodiment 13

Figure 29:
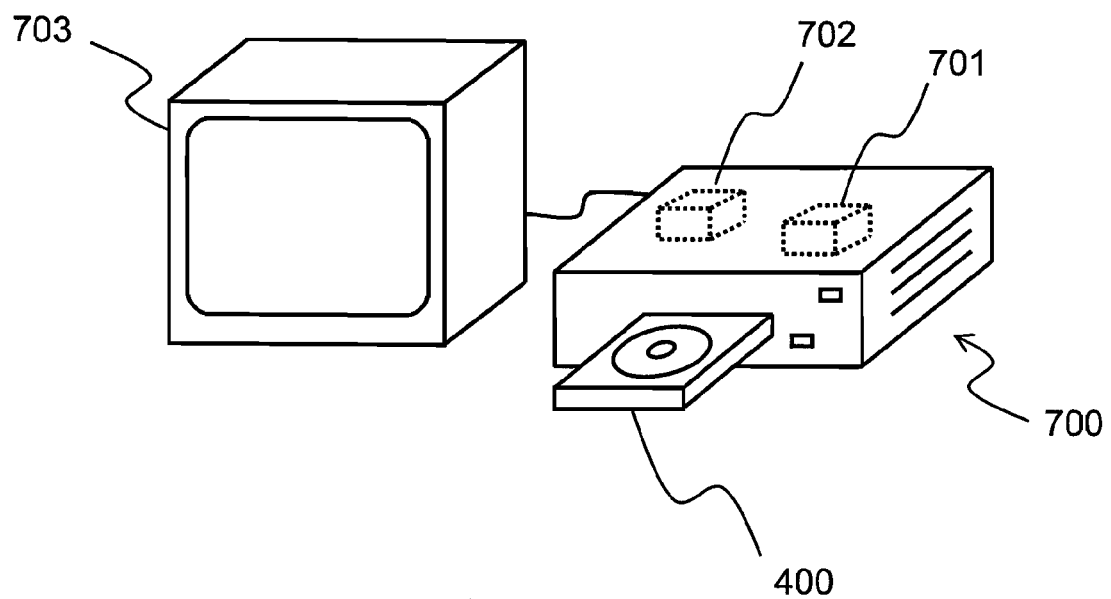
FIG. 29 is a schematic structural view of an optical disc recorder according to Embodiment 13 of the present invention.

FIG. 29 is a schematic view of an optical information equipment in the form of an optical disc recorder showing a still further embodiment of the present invention.

As shown in FIG. 29, the optical disc recorder 700 includes the optical disc apparatus 400 of Embodiment 10 and a converter (e.g., an encoder 701) for converting an image data to a data signal to be saved into the optical disc by the optical disc apparatus 400. In addition, the optical disc recorder 700 may be accompanied with another converter (a decoder 702) for converting a data signal received from the optical disc apparatus 400 to an image signal, whereby the image of records can be played back. Also, an output device 703 such as a cathode ray tube, a liquid crystal display, or a printer may be provided.

Since the optical disc recorder 700 includes the optical disc apparatus 400 of Embodiment 10, it can favorably carry out the action of recording and playing back different types of the optical disc as being suited for a variety of applications.

Furthermore, the foregoing embodiments may also be implemented in any desired combination for ensuring their respective advantages.

The optical pickup according to the present invention is arranged capable of favorably recording or playing back different types of the optical disc. Also, the optical disc apparatus, the computer equipped with the optical disc apparatus, the optical disc players, and the optical disc recorder according to the present invention are arranged capable of favorably recording or playing back different types of the optical disc as being suited for a variety of applications.

As the embodiments of the present invention are described above referring to the relevant drawings, their changes or modifications are apparent to those who are skilled in the art. It would be understood that those changes or modifications reside in the present invention without departing the scope of the present invention which are defined by the appended claims.

Moreover, the specifications, the drawings, the claims, and the disclosure of abstract of U.S. Provisional Applications No. 60/877,605 and No. 60/877,616 filed on Dec. 29, 2006 are incorporated herein by reference.

What is claimed is:

1. An optical pickup comprising:
a first light source configured to emit a first laser beam at a wavelength $\lambda 1$;
a light path switching unit configured to switch the first laser beam emitted from the first light source between a first light path and a second light path;
a first coupling lens disposed across the first light path configured to convert the first laser beam to substantially a collimated light beam;
a first objective lens disposed across the first light path configured to focus the first laser beam passed through the first coupling lens on a first information recording medium which has a first transparent substrate thickness;
a second coupling lens disposed across the second light path configured to convert the first laser beam to substantially a collimated light beam; and
a second objective lens disposed across the second light path configured to focus the first laser beam passed through the second coupling lens on a second information recording medium which has a second transparent substrate thickness different from the first transparent substrate thickness and is different in the type from the first information recording medium,
the light path switching unit being arranged to switch the light path of the first laser beam through selectively transmitting and reflecting the first laser beam emitted from the first light source,
the first coupling lens being configured to convert a first reflected laser beam from the first information recording medium into a converged light; and
the second coupling lens being configured to convert a second reflected laser beam from the second information recording medium into a converged light, wherein
the optical axis of the first coupling lens and the optical axis of the second coupling lens are arranged to extend substantially in parallel with each other.

2. The optical pickup according to claim 1, further comprising:
a lens actuator configured to move the first coupling lens and the second coupling lens along optical axes thereof.

\* \* \* \* \*